(12) United States Patent
Brin et al.

(10) Patent No.: US 10,988,226 B2
(45) Date of Patent: Apr. 27, 2021

(54) METHODS AND APPARATUS FOR CONSTRUCTING AIRSHIPS

(71) Applicant: LTA Research and Exploration, LLC, Palo Alto, CA (US)

(72) Inventors: Sergey Brin, Los Altos Hill, CA (US); Alan Weston, Cocoa Beach, FL (US); Fan Yang Yang, Mountain View, CA (US); Franklin Kyle Kepley, Milpitas, CA (US); Jesus Ricardo Amezquita Zatarain, Fremont, CA (US); Tsu Han, Mountain View, CA (US); John Morehead, Santa Clarita, CA (US); Benjamin Klamm, San Jose, CA (US); Eric Wilms, Mountain View, CA (US); Edward Clements, III, San Luis Obispo, CA (US); David Sanchez, San Luis Obispo, CA (US); Shalom Johnson, San Luis Obispo, CA (US); Tanner Yaberg, Rosamund, CA (US)

(73) Assignee: LTA Research and Exploration, LLC, Palo Alto, CA (US)

( * ) Notice: Subject to any disclaimer, the term of this patent is extended or adjusted under 35 U.S.C. 154(b) by 202 days.

(21) Appl. No.: 16/156,913

(22) Filed: Oct. 10, 2018

(65) Prior Publication Data
US 2019/0112023 A1 Apr. 18, 2019

Related U.S. Application Data

(60) Provisional application No. 62/573,038, filed on Oct. 16, 2017.

(51) Int. Cl.
*B64B 1/08* (2006.01)
*F16B 7/04* (2006.01)
(Continued)

(52) U.S. Cl.
CPC ............. *B64B 1/08* (2013.01); *B64F 5/10* (2017.01); *F16B 7/044* (2013.01); *B29C 70/46* (2013.01);
(Continued)

(58) Field of Classification Search
CPC ..... B64B 1/08; B64F 5/10; F16B 7/044; F16B 7/0486
See application file for complete search history.

(56) References Cited

U.S. PATENT DOCUMENTS

| 4,259,776 | A | * | 4/1981 | Roda | ...................... B64B 1/06 |
| | | | | | 29/423 |
| 5,110,070 | A | * | 5/1992 | Hagenlocher | ............. B64B 1/24 |
| | | | | | 244/125 |

(Continued)

FOREIGN PATENT DOCUMENTS

EP 1209076 A2 5/2002

OTHER PUBLICATIONS

International Search Report and Written Opinion for International Application No. PCT/US2018/055408, dated Feb. 14, 2019.
(Continued)

*Primary Examiner* — Philip J Bonzell
*Assistant Examiner* — Tye William Abell
(74) *Attorney, Agent, or Firm* — Baker Botts L.L.P.

(57) ABSTRACT

Systems, apparatuses, and methods for constructing an airship quickly and cost-effectively are described. In one embodiments, an airship structure may have a plurality of mainframes, each comprising interconnected pyramid structures. One of the pyramid structures may include an apex joint, four base joints, first connectors, and second connectors. The apex joint and base joints may each have slots configured for receiving connectors. The apex joint may have four apex-to-base slots and each base joint may have a
(Continued)

base-to-apex slot and two base-to-base slots. Each of the first connectors may connect the apex joint to one of the four base joints using one of the apex-to-base slots of the apex joint and the base-to-apex slot of that base joint. Each of the second connectors may connect two of the four base joints using one of the base-to-base slots of each of the two base joints connected by that second connector.

29 Claims, 122 Drawing Sheets

(51) Int. Cl.
  *B64F 5/10* (2017.01)
  *B29C 70/46* (2006.01)
  *B33Y 80/00* (2015.01)
  *B29L 12/00* (2006.01)
  *B29L 31/30* (2006.01)
  *B29K 307/04* (2006.01)

(52) U.S. Cl.
  CPC ...... *B29K 2307/04* (2013.01); *B29K 2313/00* (2013.01); *B29L 2012/00* (2013.01); *B29L 2031/3076* (2013.01); *B33Y 80/00* (2014.12); *F16B 7/0486* (2013.01)

(56) References Cited

U.S. PATENT DOCUMENTS

| | | | | |
|---|---|---|---|---|
| 5,285,986 | A * | 2/1994 | Hagenlocher | B64B 1/08 244/97 |
| 5,823,468 | A * | 10/1998 | Bothe | B64B 1/18 244/2 |
| 6,056,240 | A * | 5/2000 | Hagenlocher | E04C 3/28 244/125 |
| 7,568,253 | B2 * | 8/2009 | de la Chevrotiere | E01D 6/00 14/14 |
| 8,397,463 | B2 * | 3/2013 | Allred, III | F16B 7/0426 52/655.1 |
| 9,266,597 | B1 * | 2/2016 | Pasternak | B64B 1/06 |
| 2013/0277496 | A1 * | 10/2013 | Kraus | B64B 1/66 244/25 |
| 2014/0360660 | A1 * | 12/2014 | Latham | B64B 1/58 156/269 |

OTHER PUBLICATIONS

Slate (all-metal) Airship—the "City of Glendale", available at https://welweb.org/ThenandNow/City%20of%20Glendale.html, 13 pages.

AU Notice of Allowance received for Patent Application No. 2018352102, dated Feb. 1, 2021.

\* cited by examiner

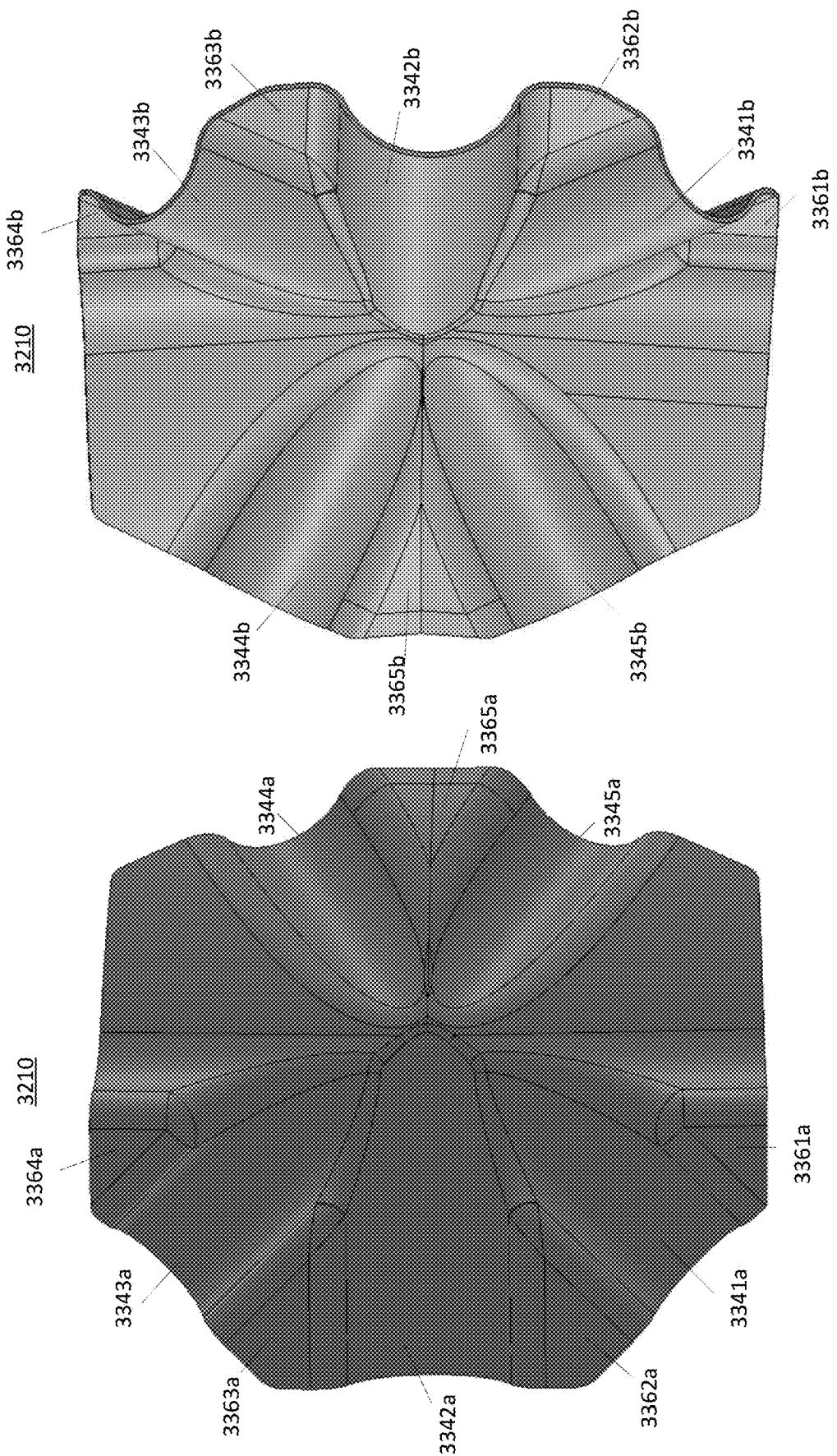

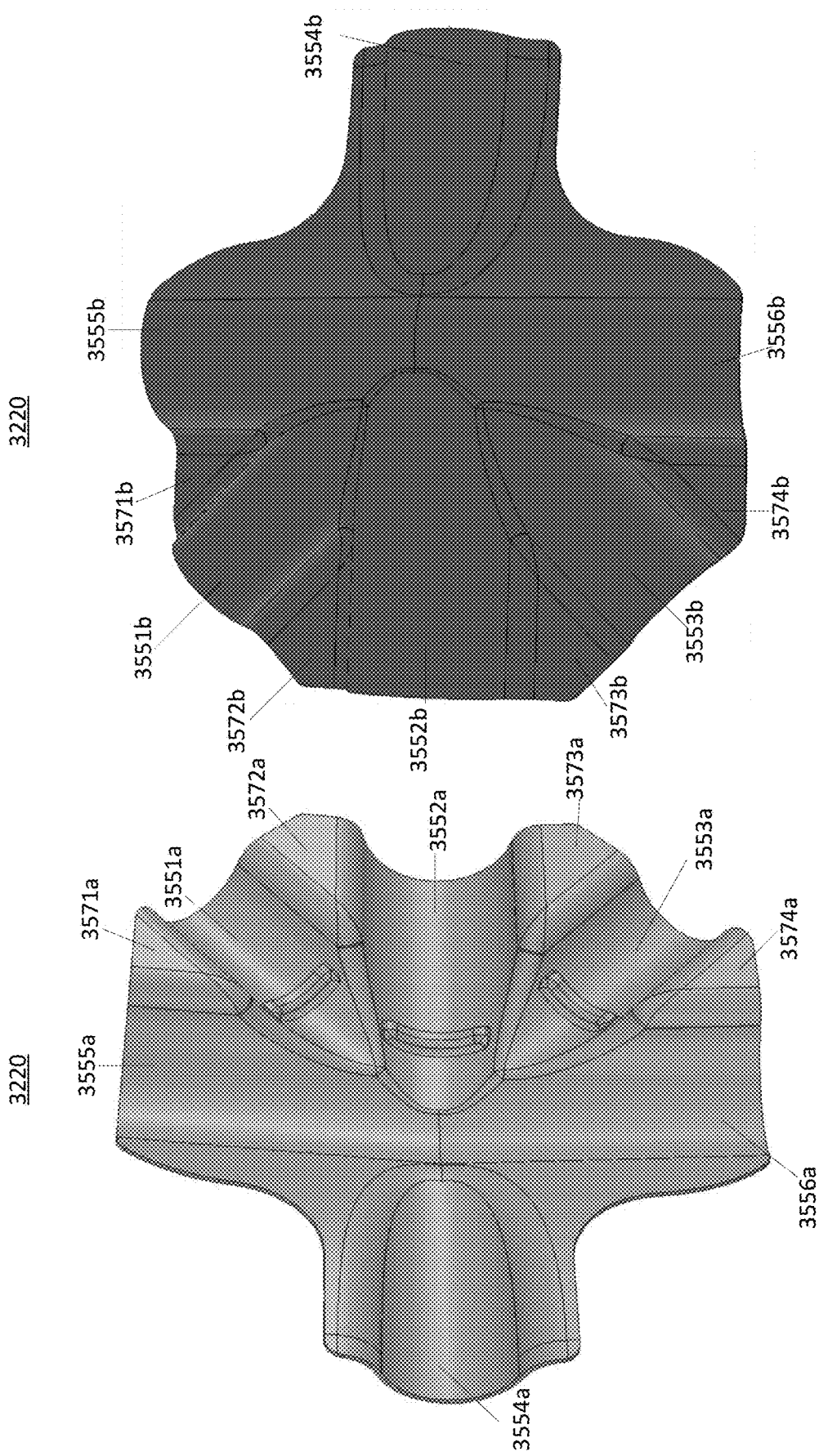

METHODS AND APPARATUS FOR CONSTRUCTING AIRSHIPS

PRIORITY

This application claims the benefit, under 35 U.S.C. § 119(e), of U.S. Provisional Patent Application No. 62/573,038, filed 16 Oct. 2017, which is incorporated herein by reference.

TECHNICAL FIELD

This disclosure generally relates to airships or lighter-than-air aircrafts, and more particularly to apparatuses, methods, and systems for constructing the same.

BACKGROUND

Airships are light-than-air aircrafts that obtain the necessary lift for flight based on buoyancy generated by gas that is less dense than the surrounding air. Typically, an airship comprises a structure attached to an envelop that holds lifting gas, such as helium or hydrogen. Certain airships, such as rigid or semi-rigid airships, may have structural framework to help maintain the shape of the envelop.

SUMMARY OF PARTICULAR EMBODIMENTS

Embodiments disclosed herein pertain to systems, apparatuses, and methods for providing fast and cost-effective ways to construct airships. In particular embodiments, the frame structure of an airship may be built using preconfigured joints designed to facilitate and simplify construction. In particular embodiments, the joints may be manufactured using 3D printing or other additive manufacturing processes. For example, 3D printing may be used to create molds for the joints. The molds may then press against sheets of carbon-fiber twills, which once hardened may be used to create joints for the airship structure.

Further embodiments described herein enable an airship to be built on the ground, thereby enhancing construction safety, speed, and cost. In particular embodiments, detachable wheels may be attached to the outer surface of a mainframe, which may be circular, as it is being built. The partially assembled mainframe may then be placed on a semi-circular jig, with the attached wheels abutting the jig. Such configuration thus allows the mainframe to be rotated as it is being assembled by workers on the ground without subjecting the workers to unnecessary risks.

The embodiments disclosed herein are only examples, and the scope of this disclosure is not limited to them. Particular embodiments may include all, some, or none of the components, elements, features, functions, operations, or steps of the embodiments disclosed above. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 33A-33B illustrate an example of a top piece of a mainframe-to-geodesic extension joint.

FIGS. 35A-35B illustrate an example of a bottom piece of a mainframe-to-geodesic extension joint.

DESCRIPTION OF EXAMPLE EMBODIMENTS

Figure 1:
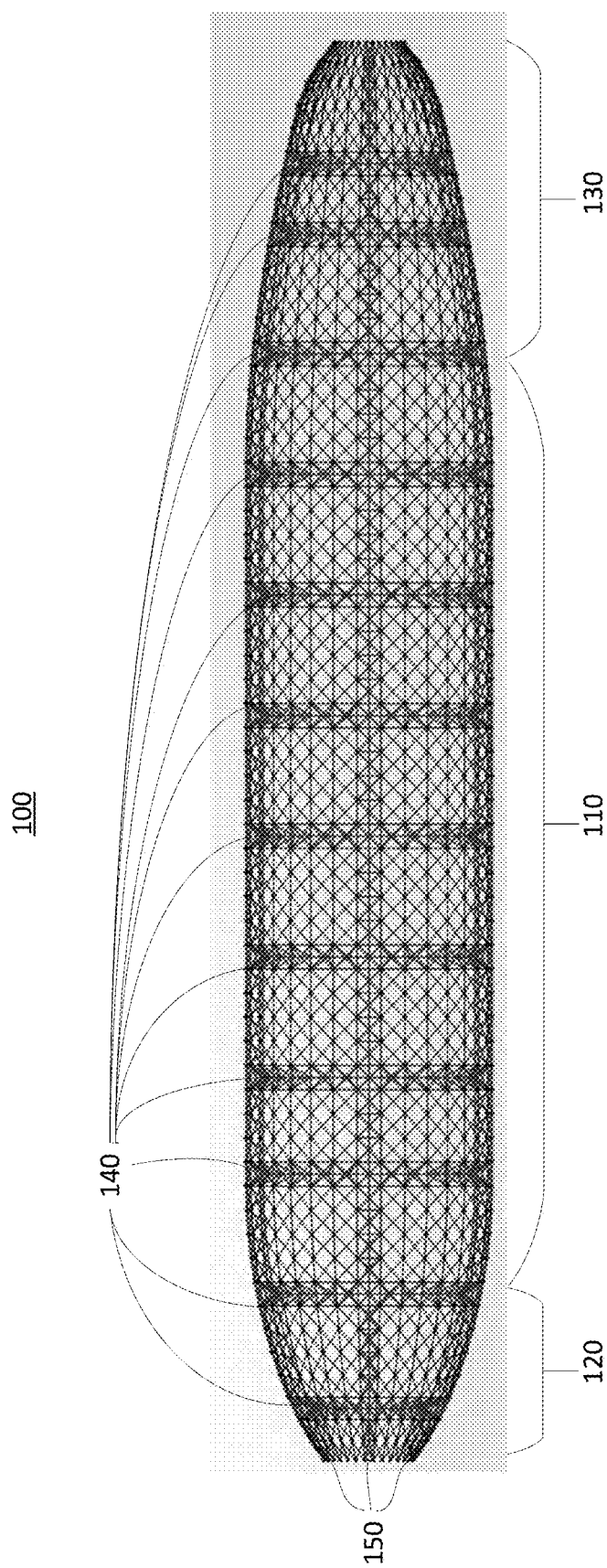
FIG. 1 illustrates an example of a structure of a rigid airship.

Particular embodiments described herein generally relate to the construction and design of components used for building rigid or semi-rigid airships. FIG. 1 illustrates an example structure 100 of a rigid airship. The structure 100 may comprise a hall section 110, a bow section 120, and a stern section 130 to which the airship's rudder may be attached. The structure 100 may comprise multiple main transverse frames or mainframes 140. In particular embodiments, each mainframe 140 is circular. In particular embodiments, the mainframes 140 may be interconnected using longitudinal gangways 150. In particular embodiments, wires (e.g., which may be constructed using Vectran fiber or any other suitable material with suitable strength and flexibility characteristics) connecting points on the inner circumference of each mainframe 140 may physically section the hull 110 into multiple segments. The segments may be used to hold individual airbags containing lifting gas (e.g., helium).

Figure 2A:
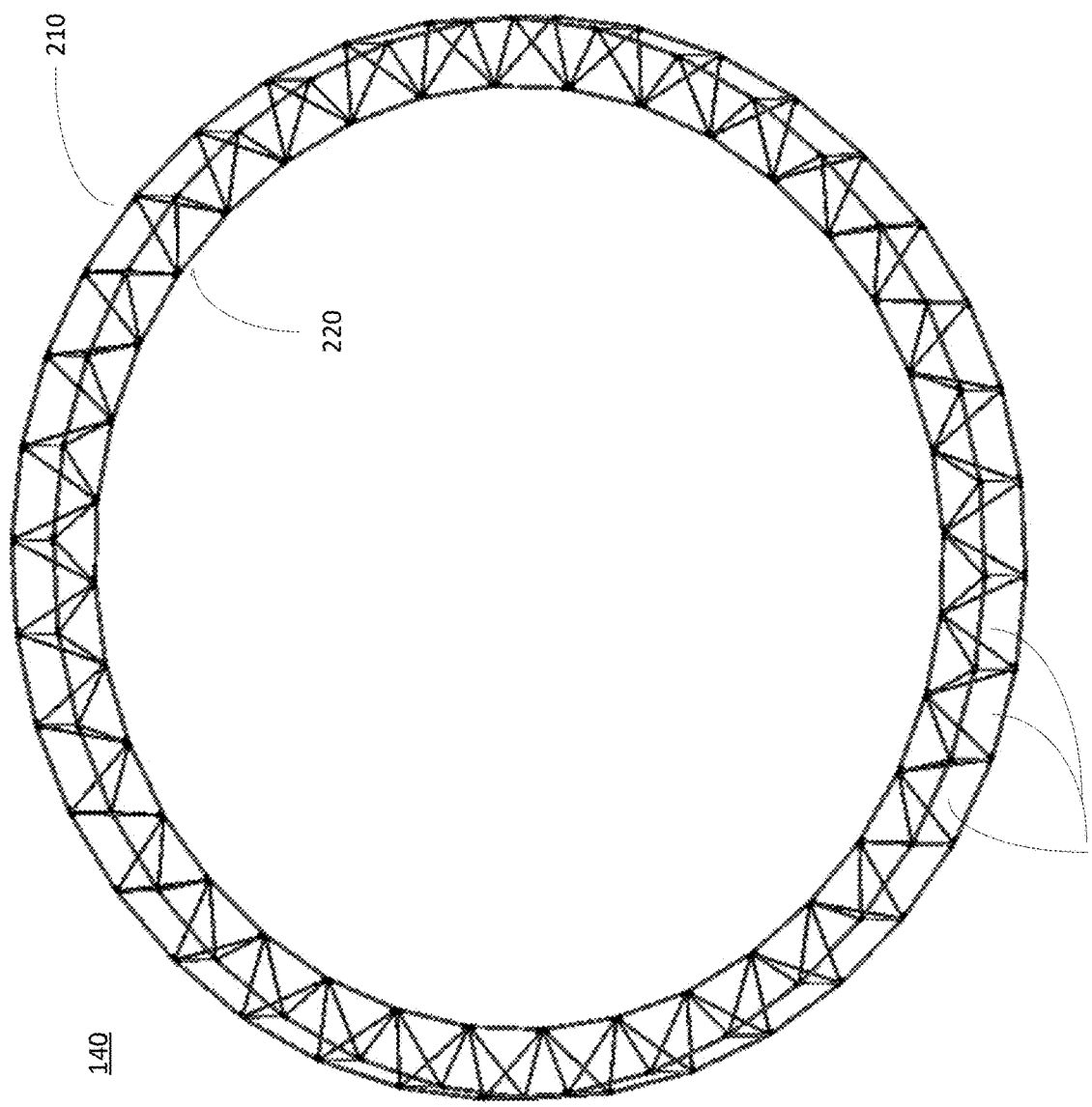
FIG. 2A illustrates an example of a mainframe of a rigid airship.

FIG. 2A illustrates an example mainframe 140. The mainframe 140 may comprise an outer portion 210 and an inner portion 220. In particular embodiments, the mainframe 140 may be constructed using pyramid structures 250. Each pyramid structure 250 may have a base and an apex. In particular embodiments, the pyramid structures 250 may be configured so that their apexes point toward the center of the mainframe 140 and their bases face outwards. In such a configuration, the outer portion 210 of the mainframe 140 is formed by the connectors that form the bases of pyramid structures 250, and the inner portion 220 of the mainframe 140 is formed by the connectors that connect the apexes 270 of those pyramid structures 250.

Figure 2B:
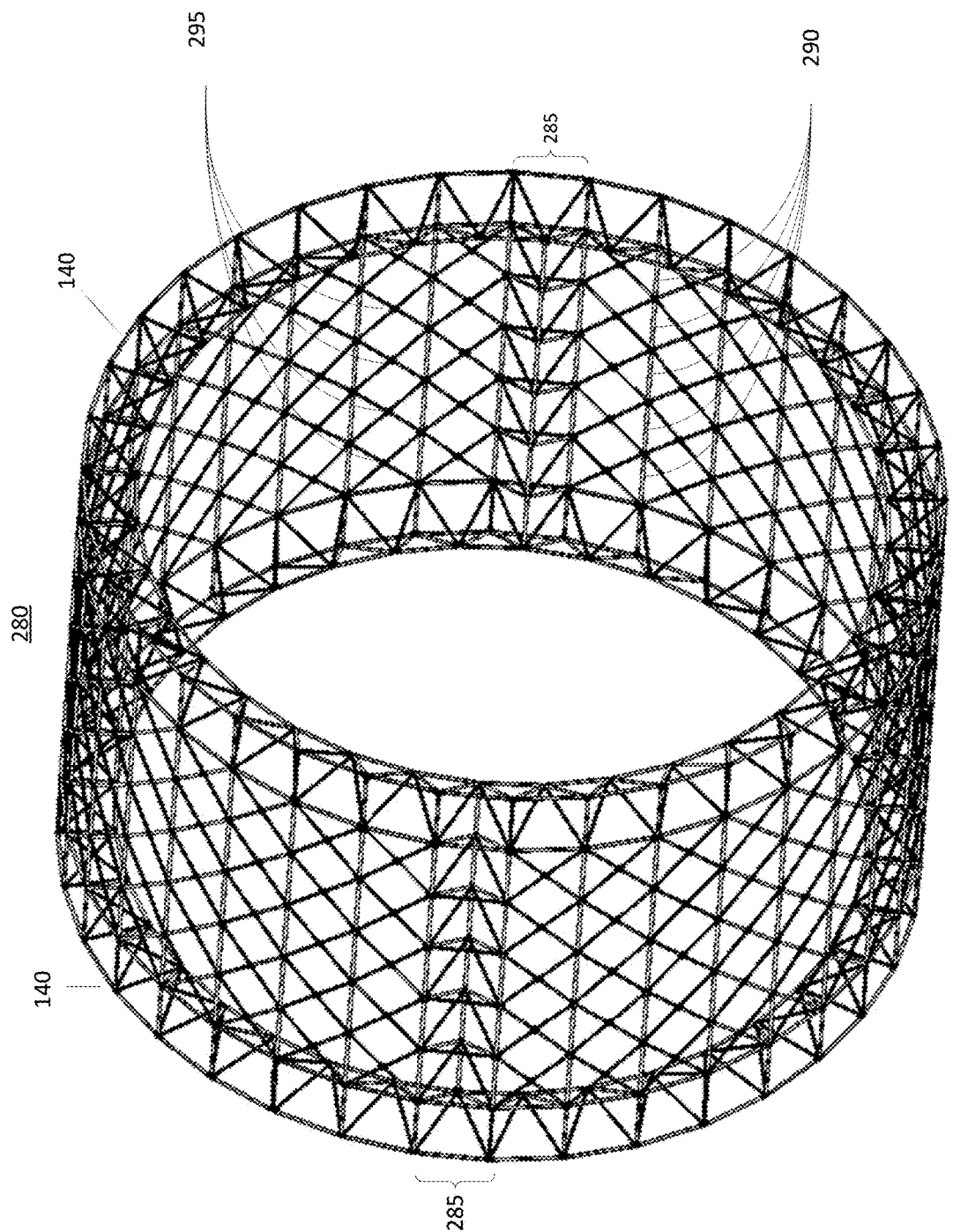
FIG. 2B illustrates an example of a hull segment of a rigid airship.

FIG. 2B illustrates an example hull segment 280. In particular embodiments, the hull segment 280 may be substantially cylindrical. Each opening of the cylindrical hull segment 280 may be constructed using a mainframe 140. In particular embodiments, gangways 285 may connect the mainframes 140. Any number of gangways 285 may be used (e.g., one, two, four, five, eight, etc.). For example, if four gangways 285 are used, they may be evenly spaced along the circumference of a mainframe 140. In particular embodiments, each gangway may be constructed using pyramid structures. The pyramid structures of the gangway 285 may be similar to those used to construct mainframes 140, but different in that the gangway's 285 pyramid structures may form a substantially straight structure (e.g., the bases of the gangway's 285 pyramid structures are in the same plane), whereas the pyramid structures of the mainframe 140 may form a circular structure. In particular embodiments, the two mainframes 140 of the hull segment 280 may be positioned in parallel and aligned according to their respective pyramid structures. In this arrangement, each pair of corresponding pyramid structures in the two mainframes 140 may be connected. In the example shown in FIG. 2B, a series of longitudinal connectors 290 may connect the inner base joints of each pyramid structure in one mainframe to the corresponding inner base joints in the other mainframe. In particular embodiments, the longitudinal connectors 290 and X-pattern structures 295 may form geodesic structures to create walls for the hull 280.

Figure 3A:
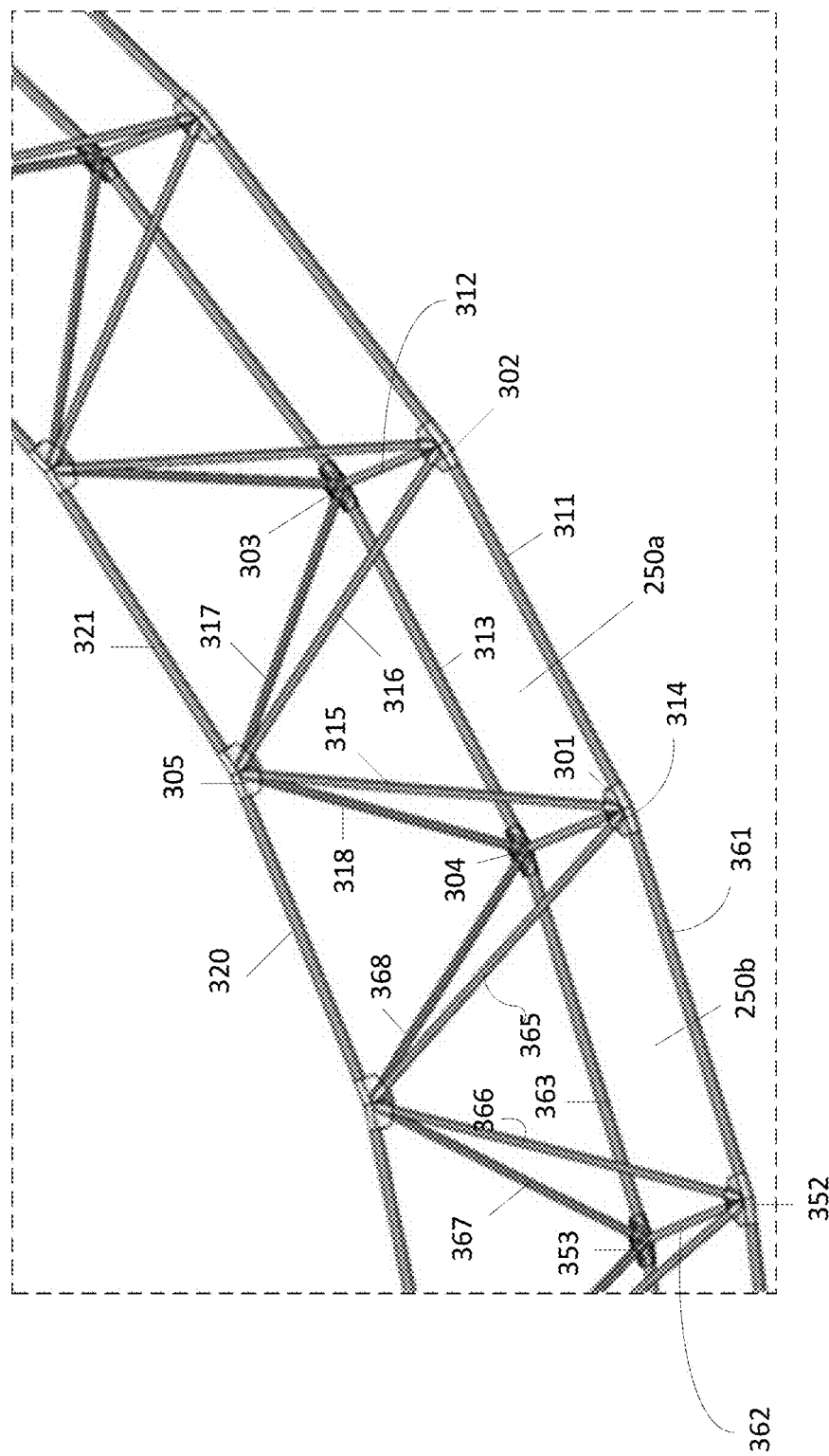
FIG. 3A illustrates an example of a portion of a mainframe of a rigid airship.

FIG. 3A illustrates an example perspective view of a portion of a mainframe 140. In particular embodiments, each pyramid structure 250 used for building the mainframe 140 may have four base joints (e.g., 301, 302, 303, and 304) forming the base of the pyramid (e.g., 250a) and an apex joint (e.g., 305) forming the apex of that pyramid. In particular embodiments, connectors or rods may connect the joints to form a pyramid structure 250. For example, a pyramid's 250a base may be formed by a connector 311 connecting base joints 301 and 302, a connector 312 connecting base joints 302 and 303, a connector 313 connecting base joins 303 and 304, and a connector 314 connecting base joints 304 and 301. The pyramid's 250a sides may be formed by connectors 315, 316, 317, and 318 connecting the apex joint 305 to the base joints 301, 302, 303, and 304, respectively. In particular embodiments, the mainframe 140 may be constructed using adjacent pyramid structures 250. For example, between two adjacent pyramids 250, one connector (e.g., 314) may be shared between the bases of the two pyramids 250a and 250b. In such a configuration, two adjacent pyramids may share one base connector and two corresponding base joints. For instance, FIG. 3A shows the base joints 301 and 304 and their connector 314 being shared by the two labeled pyramids 250a and 250b. In particular embodiments, the apex joints (e.g., 305 and 355) of adjoining pyramids (e.g., 250a and 250b, respectively) may be connected by an apex connector 320. In particular embodiments, the structural pattern of interconnected pyramid structures 250 described above repeats through the entire mainframe 140. In particular embodiments, the joints may be configured to create a circular mainframe 140. For instance, the apex joint 305 may be configured so that its slots for receiving apex-to-apex connectors 320 and 321 may be angled with respect to each other to form a corner of a polygon that approximates the interior of a circular mainframe 140. Similarly, each of the base joints (e.g., 301-304) may be configured so that its two slots for receiving base connectors forming respective sides of adjacent pyramids may be angled with respect to each other to form a corner of a polygon that approximates an exterior of a circular mainframe 140. For example, base joint 301 may be configured so that connectors 311 and 361 form a corner of a 36-sided polygon. Further details of the joints' configurations are provided below.

In particular embodiments, the connectors (e.g., 311-318, 320, and 321) may be constructed using a composite of carbon-fiber layers sandwiching another core material, such as honeycomb Nomex® or any other suitable material with a high strength-to-weight ratio. For example, a connector may be cylindrical with a hollow cylindrical center (in other words, it may be a tube). The outer and inner surfaces of the hollow cylindrical connector may be made of carbon-fiber layers, which may use sandwich core materials such as honeycomb Nomex®. In particular embodiments, the carbon-fiber layers may be prepreg carbon-fiber layers, approximately 0.5 mm to 0.75 mm thick, and the composite carbon-fiber connector may be approximately 30 mm to 400 mm in diameter. In particular embodiments, a composite connector may be manufactured by infusing the carbon-fiber layers with epoxy resin and sandwiching the layers around honeycomb Nomex®. The sandwiched material may then wrap around a cylindrical mold until the material hardens to form the connector. The resulting connector has several desirable properties for airship construction, including, e.g., strength, stiffness, and extremely lightweight.

Figure 3B:
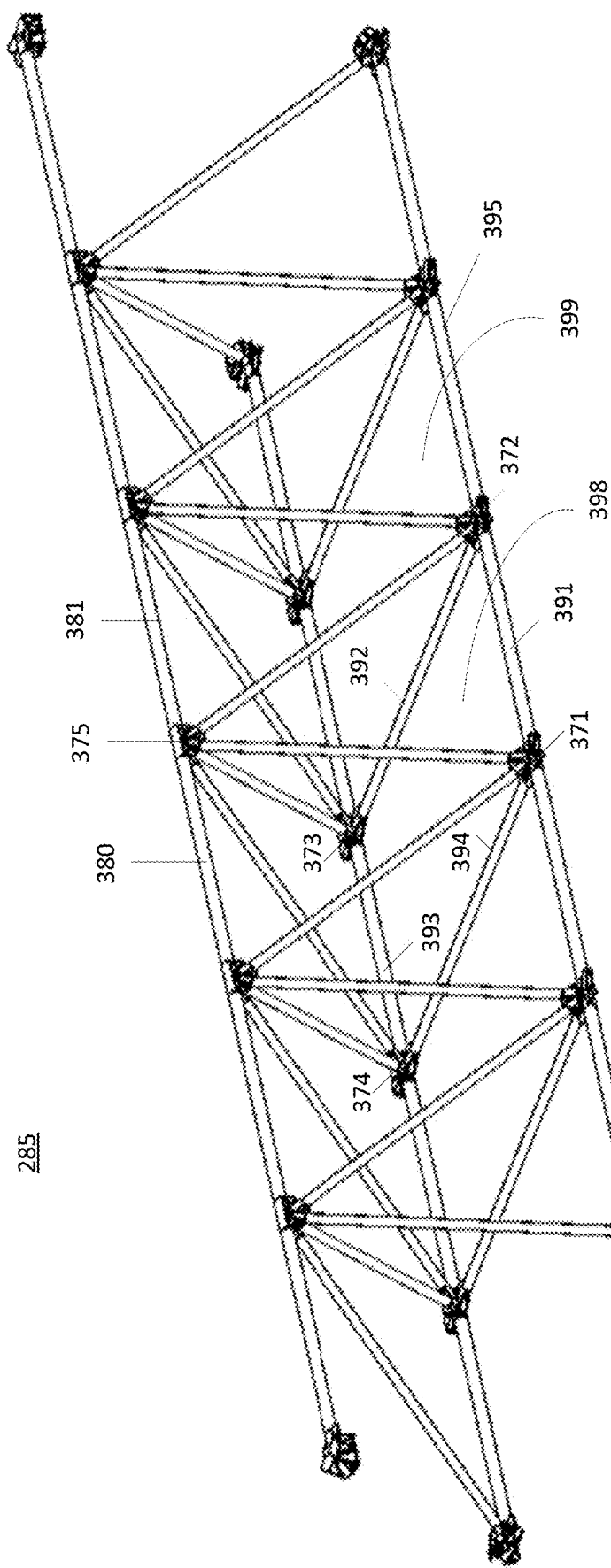
FIG. 3B illustrates an example of a portion of a gangway of a rigid airship.

FIG. 3B illustrates an example perspective view of a portion of a gangway 285 assembly. Like the mainframe 140, the gangway 285, in particular embodiments, may be constructed using interconnected pyramid structures. One of the illustrated pyramid structures 398 has an apex joint 375 and a base with base joints 371, 372, 373, and 374. The apex joint 375 may be connected to the apex joints of the two adjacent pyramid structures via connectors 380 and 381, respectively. The four base joints 371-374 may be interconnected via connectors 391-394, as illustrated. The apex joint 375 and base joints 371-374 may be configured to form a substantially straight gangway structure 285. For instance, the apex joint 375 may be configured so that its slots for receiving apex-to-apex connectors 380 and 381 may be aligned to form a straight line. Similarly, each of the base joints 371-374 may be configured so that its two slots for receiving base connectors forming corresponding sides of the adjacent pyramids are aligned to form a straight line (e.g., base joint 372 may be configured so that connectors 391 and 395 form a straight line).

Figure 3C:
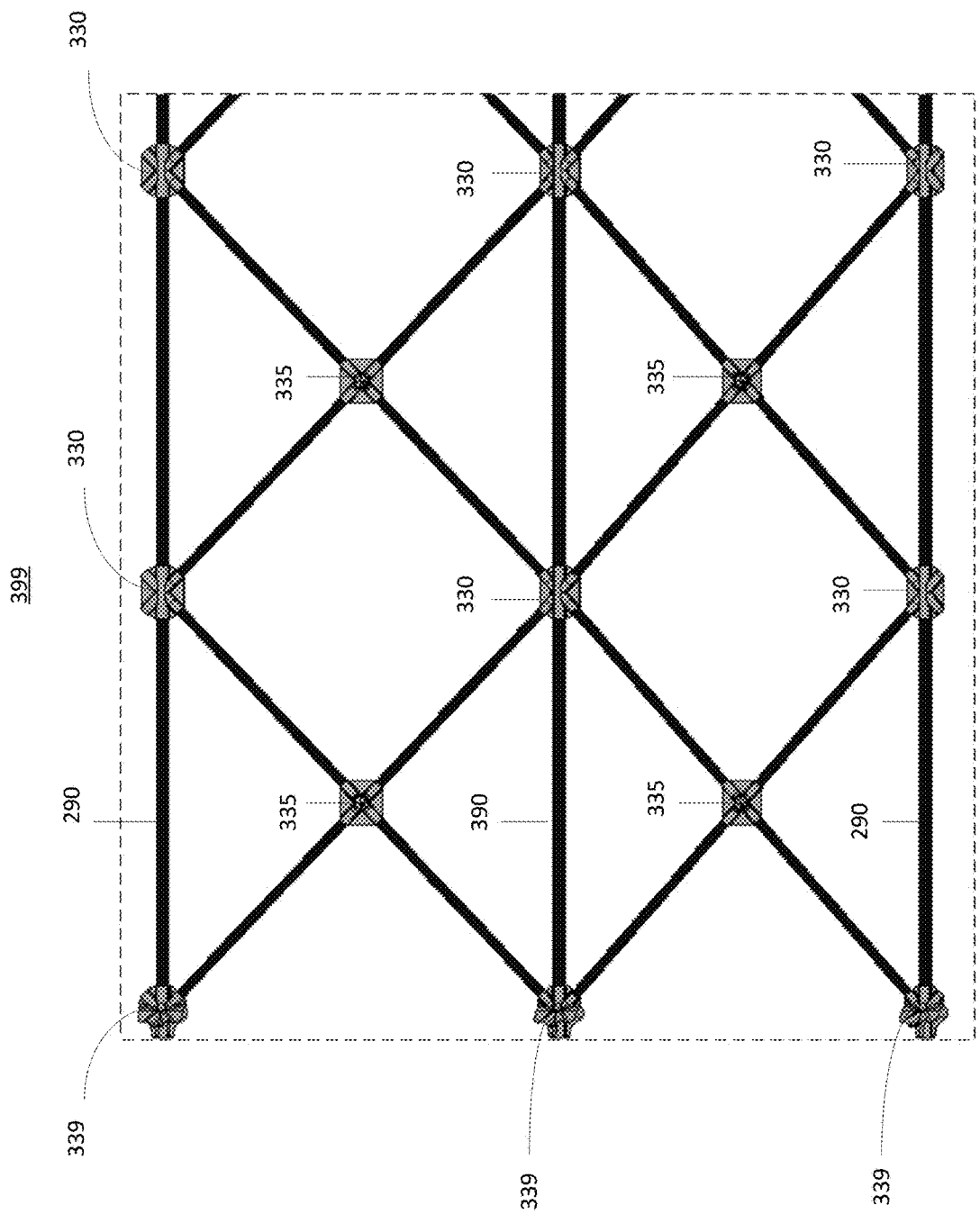
FIG. 3C illustrates an example of a portion of a geodesic structure of a rigid airship.

FIG. 3C illustrates an example top view of a portion of a geodesic structure 399. As discussed above, mainframes 140 may be connected by longitudinal connectors 290. In particular embodiments, two base joints of the mainframes 140 may be connected by a single longitudinal connector 290 that extends through a series of geodesic joints, such as the 6-way geodesic joints 330. Alternatively, two base joints may be connected by a series of longitudinal connectors connected by joints to form a substantially straight line. In particular embodiments, the 6-way geodesic joint 330 may have six connector slot openings. Two of the slots on opposite sides of the joint 330 may form a channel through which a longitudinal connector 290 may pass. The other four connector slots of the 6-way geodesic joint 330 may be configured to connect to four 4-way geodesic joints 335, respectively, to form the geodesic structure. In particular embodiments, each 4-way geodesic joint 335 may serve as the intersection of four connectors to form an "X" pattern, which in turn may be configured to connect two neighboring longitudinal connectors 290. In particular embodiments, the ends of a geodesic structure 399 may be connected to interfacing joints 339. In particular embodiments, an interfacing joint 339 may be configured to have three connector slots as shown in FIG. 3C. In particular embodiments, the interfacing joint 339 may comprise a mainframe-to-geodesic extension (e.g., FIG. 32) with an interface surface configured to envelop the exterior surface of a base joint (e.g., 301) of a mainframe 140. In particular embodiments, adhesives or other attaching means (e.g., screws) may be used to affix the mainframe-to-geodesic extension to the base joint 301 of the mainframe 140.

Figure 3D:
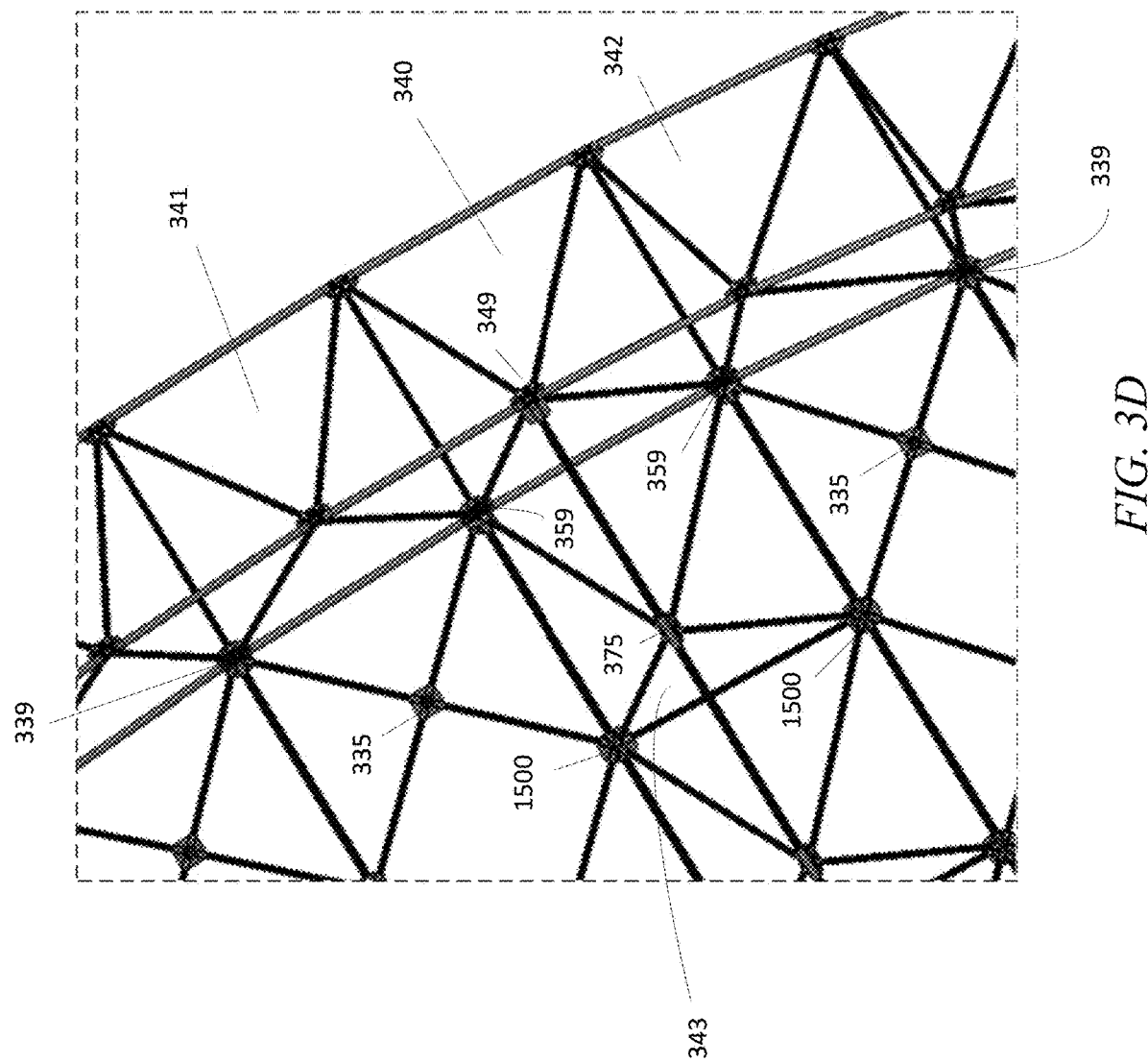
FIG. 3D illustrates an example of a portion of a hull segment where a mainframe intersects a gangway.

FIG. 3D illustrates an example of a portion of the hull structure shown in FIG. 2B where a mainframe 140 (formed in part by the pyramid structures 341, 340, and 342) intersects a gangway 285 (formed in part by the pyramid structure 343). Referring back to FIG. 2B, two mainframes 140 may be connected by one or more gangways 285. In particular embodiments, both the mainframes 140 and gangways 285 may be constructed using pyramid structures. Thus, at the intersection between a mainframe 140 and a gangway 285, the mainframe's 140 pyramid structure (hereinafter referred to as "intersecting mainframe pyramid structure") may need additional slots to connect to or support the gangway's 285 pyramid structure (hereinafter referred to as "intersecting gangway pyramid structure"). FIG. 3D, for example, shows that an intersecting mainframe pyramid structure 340 may be adjacent to three pyramid structures: two mainframe pyramid structures 341 and 342 and one intersecting gangway pyramid structure 343. In particular embodiments, the apex 349 of the intersecting mainframe pyramid structure 340 may have additional connector slots for connecting to the apex of the intersecting gangway pyramid structure 343. In particular embodiments, the apex 349 of the intersecting mainframe pyramid structure 340 may comprise an extension slot for an apex joint of a mainframe's pyramid structure, such as the one shown in FIGS. 20A-20B. Further, the interior base joints 359 of the intersecting mainframe pyramid structure 340 may have additional connector slots to connect to (1) the apex of the intersecting gangway pyramid structure 343, (2) a base joint of the intersecting gangway pyramid structure 343, and (3) a 4-way geodesic joint 335 of the geodesic structure. In particular embodiments, the interior base joints 359 of the intersecting mainframe pyramid structure 340 may comprise a mainframe-to-gangway-and-geodesic extension (e.g., FIGS. 24A-24B) with an interface surface configured to envelop the exterior surface of a base joint (e.g., 301) of a mainframe 140. FIG. 3D further shows a base joint 1500 of a gangway's pyramid structure 343. Description of this base joint 1500 is described further with reference to FIGS. 15A-15G.

Figure 4A:
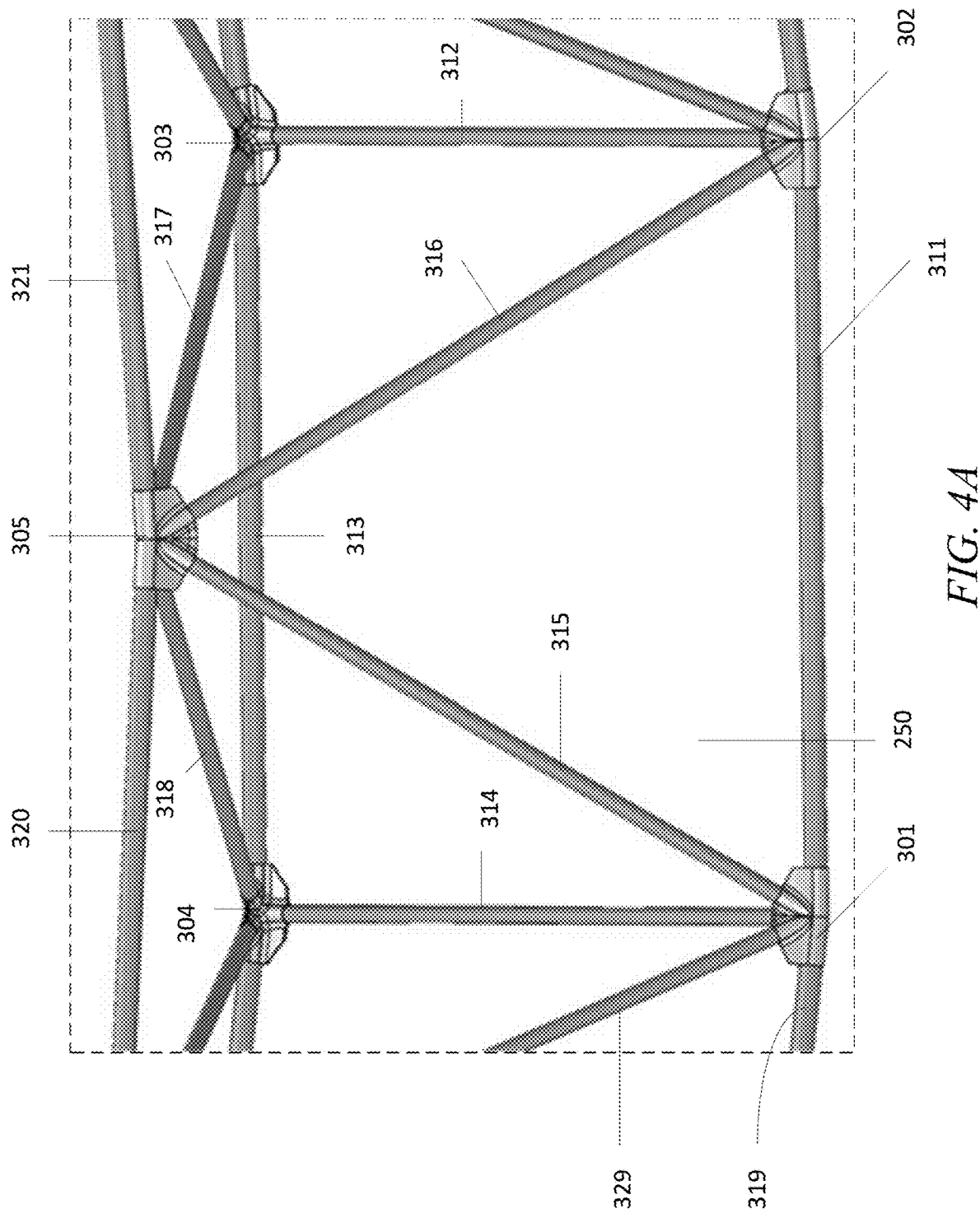
FIGS. 4A-C illustrate an example of a mainframe's pyramid structure.
Figure 4B:
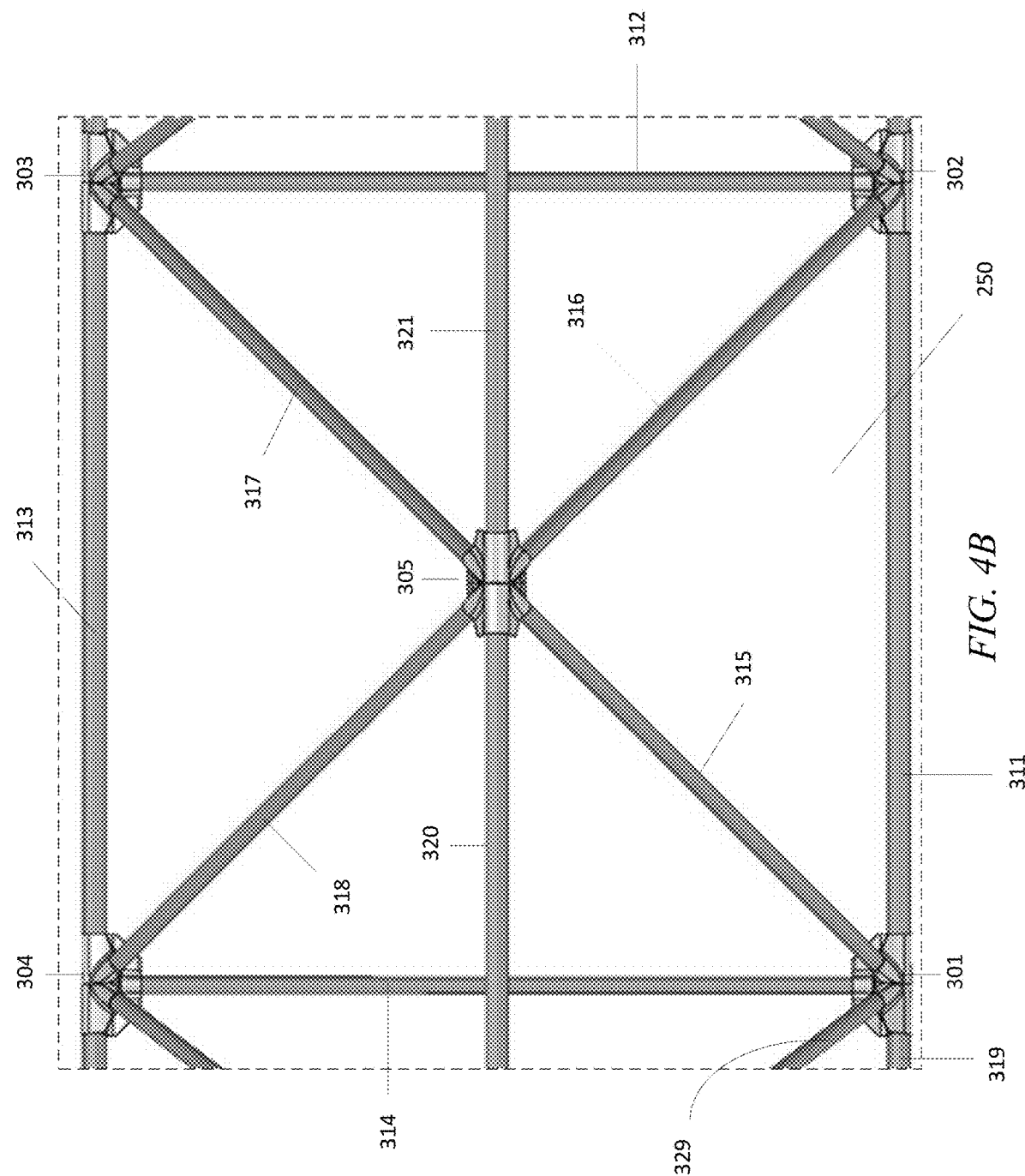
Figure 4C:
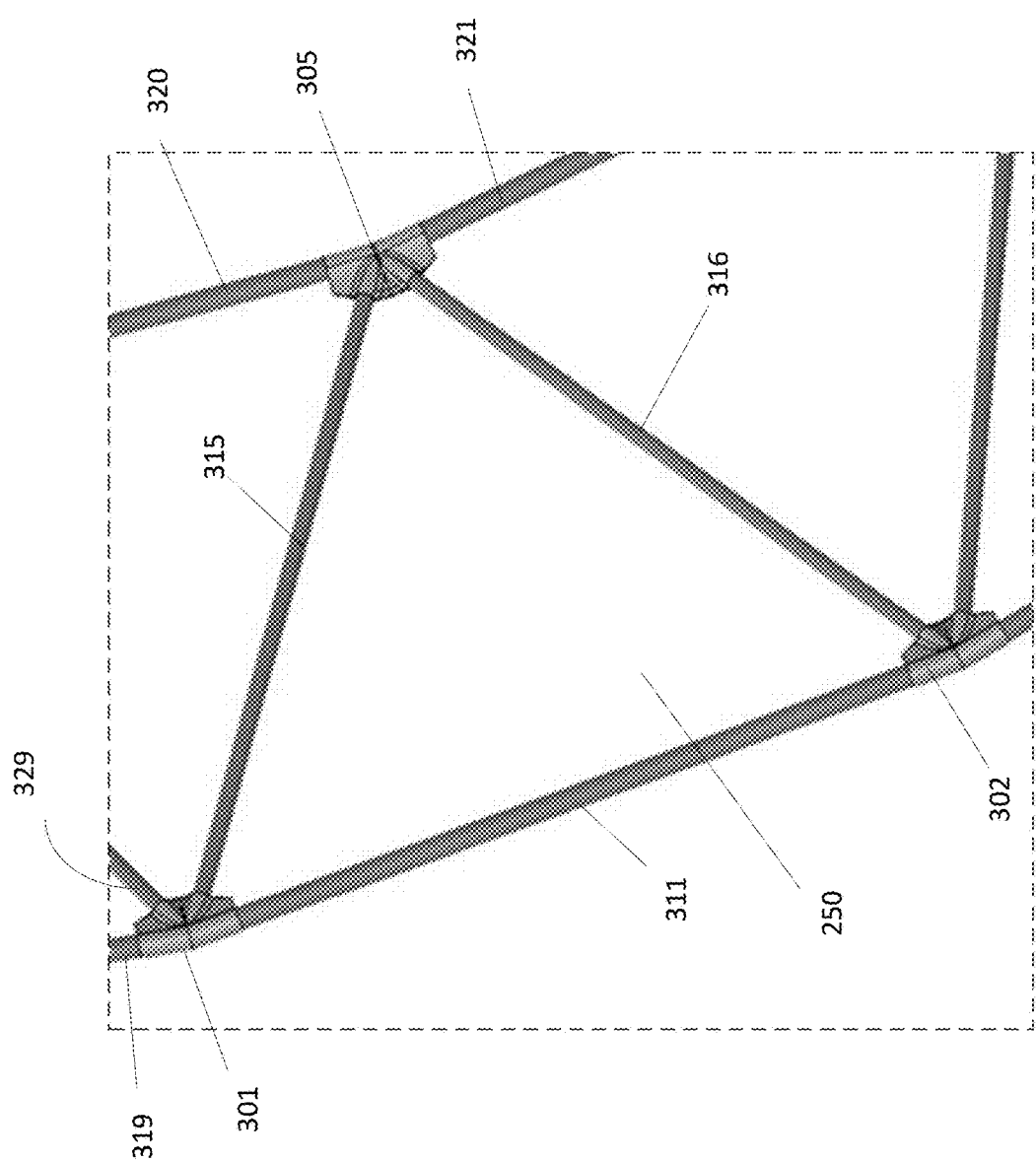

FIGS. 4A-C illustrate an example of a mainframe's 140 pyramid structure 250. FIG. 4A shows a perspective view, FIG. 4B shows a top view, and FIG. 4C shows a side view. In particular embodiments, the apex joint 305 may be configured to connect to six connectors-four connectors (e.g., 315, 316, 317, and 318) for connecting with the base joints (e.g., 301, 302, 303, and 304), respectively, and two connectors (e.g., 320 and 321) for connecting with apex joints of adjoining pyramids, respectively. In particular embodiments, a base joint (e.g., 301, 302, 303, or 304) may be shared by two pyramids and configured to connect to five connectors. One of the five connectors (e.g., 314) may be shared by the bases of the two adjacent pyramids; two of the remaining connectors (e.g., 311 and 319) may form, respectively, the sides of the two adjacent bases that are perpendicular to the shared connector 314; and the remaining two connectors (e.g., 315 and 329) may connect to the apexes of the two adjacent pyramids, respectively.

Figure 5A:
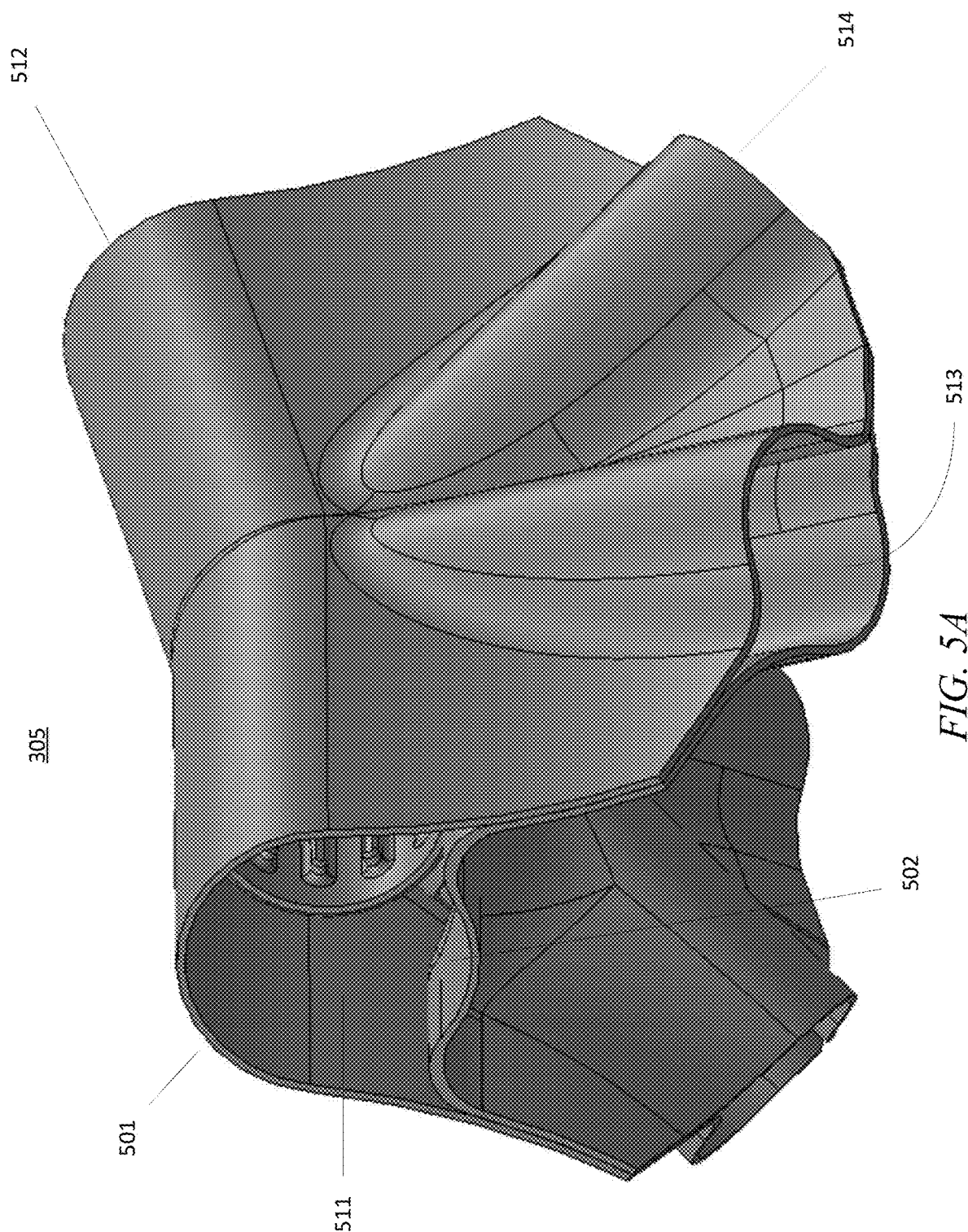
FIGS. 5A-B illustrate an example of an apex joint used for constructing a mainframe's pyramid structure.
Figure 5B:
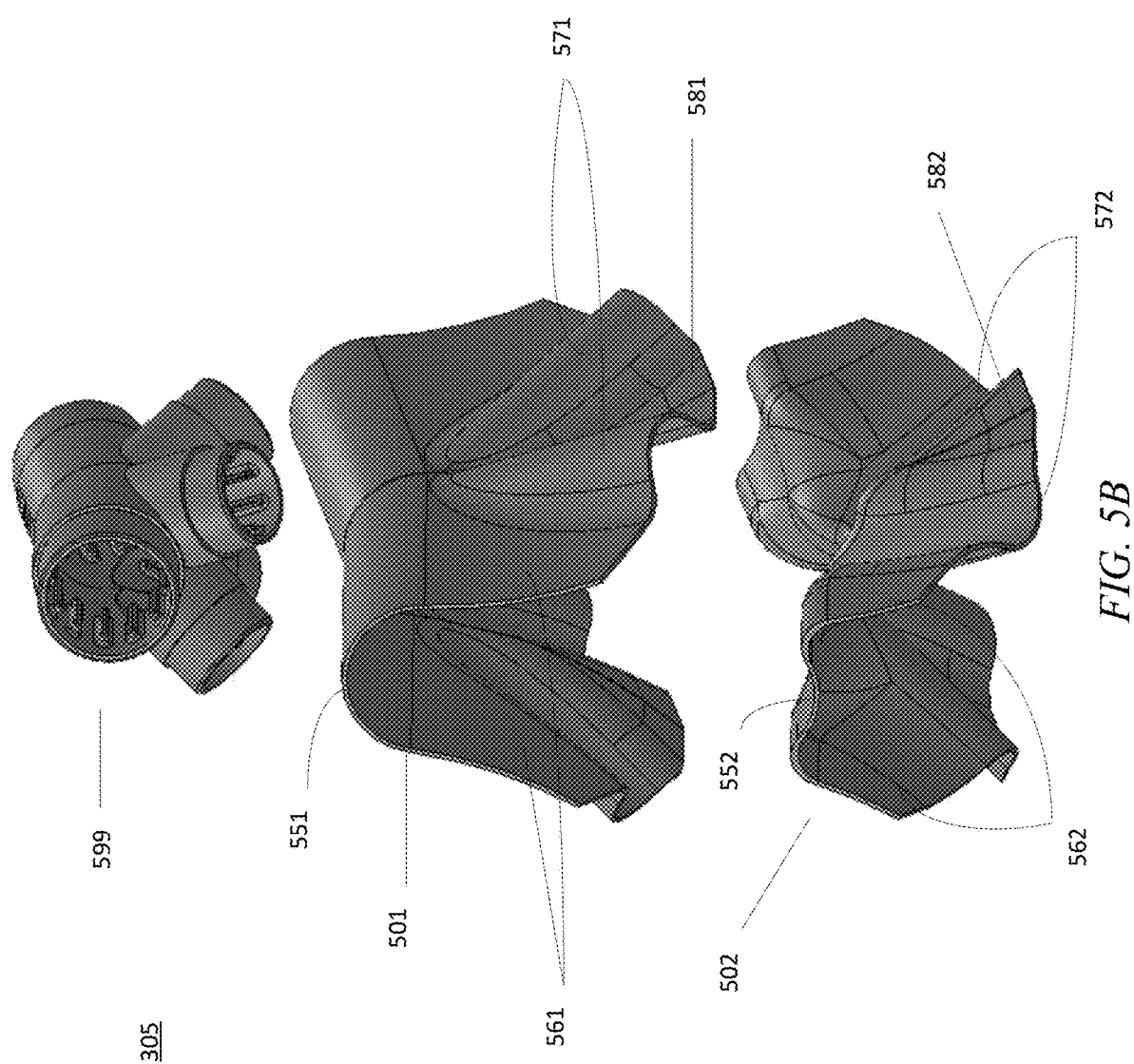

FIGS. 5A and 5B illustrate perspective views of an example of an apex joint 305 used for constructing a pyramid structure of a mainframe. FIG. 5A is an assembled view and FIG. 5B is an exploded view of the joint 305. In particular embodiments, the apex joint 305, as well as the base joints (301-304), may be made of carbon-fiber material and are structural units used for constructing an airship. In particular embodiments, the apex joint 305 may comprise a female half 501 and a male half 502. The apex joint's 305 female 501 and male 502 halves are configured to fit together, with the female half 501 substantially enveloping the male half 502 when the two halves are assembled, as shown in FIG. 5A.

In particular embodiments, the assembled apex joint 305 may be configured to have slots for receiving connectors/rods. From the perspective view shown in FIG. 5A, a slot 511 for receiving an apex connector (e.g., connector 320 or 321 shown in FIG. 3A) is shown. The slot 511 may be formed by the separation between the female half 501 and the male half 502 when they are pieced together. In particular embodiments, the slot 511 may be configured to receive and substantially envelop a tubular object. In particular embodiments, a similar slot 512 for receiving another apex connector may be formed on the opposite end of the apex joint 305. The opening or end of that slot, which is not visible from the perspective shown in FIG. 5A, would be located at 512. In particular embodiments, the slots 511 and 512 may be symmetrical across an imaginary vertical plane dividing the apex joint 305 in half through the center between slot 511 and slot 512. In particular embodiments, each of the slots 511 and 512 may be substantially cylindrical. In certain embodiments where a pyramid structure is used to construct a straight structure, such as a gangway as described below, an apex joint's cylindrical slots for receiving apex connectors may align with each other to form a straight line (in other words, the axes of the cylindrical slots may coincide). On the other hand, in embodiments where pyramid structures are used for constructing a circular mainframe, such as the one shown in FIG. 2, the exterior angle (i.e., the angle measured from outside the joint's body and not through the body) between the two cylindrical slots 511 and 512 (or their corresponding axes) may be less than 180 degrees. The particular angle depends on the geometry of the mainframe. In particular embodiments, a circular mainframe may be approximated by a regular polygon (e.g., 36-sided polygon). As such, the angle between two connectors created by an apex joint 305 may correspond to the interior angle of a vertex or corner of the polygon. The angle may depend on the number of vertices/corners that the polygon is designed to have. For example, the sum of the interior angles of the polygon may be determined based on the formula, (n−2)×180 degrees, where n is the number of vertices/corners of the polygon (the sum of the exterior angles of all the vertices/corners of the polygon is 360 degree). Thus, for example, each interior angle of a regular polygon may be determined based on the formula: ((n−2)×180)/n.

In particular embodiments, the apex joint 305 may also comprise a slot 513 for receiving an apex-to-base connector (e.g., connector 315 shown in FIG. 3A). Similar to the apex-connector slot 511, the apex-to-base slot 513 may be formed by the separation between the female half 501 and the male half 502 when they are pieced together. In particular embodiments, the apex joint 305 may have four such apex-to-base slots to form a pyramid structure. Two of the counterpart apex-to-base slots 513 and 514 are visible in FIG. 5A. While the other two are hidden from view, they are symmetrical to slots 513 and 514. Since each side of the pyramid structure is a triangle, the angle between each pair of apex-to-base slots corresponding to a vertex of a triangle side depends on the desired geometric properties of the pyramid. For example, if the sides of the pyramid structure are to be identical equilateral triangles, then the angle between each pair of apex-to-base slots would be substantially 60 degrees.

In particular embodiments, the female half 501 and the male half 502 may be bonded together using adhesives or any other suitable bonding agent. In particular embodiments, the two halves may be placed together and inserted with connectors/rods. In particular embodiments, zip-ties or clamps may be used to apply inward force so that the two halves are tightly abutting each other. In particular embodiments, each slot (e.g., 511, 513, etc.) may have one or more holes into which liquid adhesive may be injected. For example, the slot 513 may have a hole in the female portion 501 and another hole in the male portion 502. While the two halves are placed together with rods/connectors inserted, liquid adhesive may be injected into one of the holes, and air bubbles and/or excess adhesive may be allowed to exit from the other hole. This mechanism for bonding pieces of joints and connectors may be applied to any of the joints described herein.

FIG. 5B illustrates an exploded view of the apex joint 305, with the female half 501 separated from the male half 502, along with a center plug 599 that may be placed in the inner cavity of the joint 305 to facilitate connector placement. In particular embodiments, the female half 501 and the male half 502 are each symmetrical across a vertical plane through the axes of slots 511 and 512. The two halves 501 and 502 may also be symmetrical across another vertical plane that is perpendicular to the aforementioned vertical plane. Referring to the interior surfaces of the female 501 and male 502 halves for forming the interior of the apex joint 305, the female half 501, in particular embodiments, may generally have a concave surface and the male half 502 may, in general, have a convex surface. In particular embodiments, the interior surface of the apex joint 305 formed by the female half 501 and male half 502 may have placement guides (or plugs) 599 for facilitating rod/connector placement.

In particular embodiments, the top portion 551 of the slots 511 and 512 for apex connectors may have interior concave surfaces (with respect to the interior of the apex joint 305) that is semi-cylindrical. The male half 502 may have a corresponding top portion 552 that has an interior concave surface (with respect to the interior of the apex joint 305). The interior concave surfaces of the top portions 551 and 552 of the female 501 and male halves, respectively, form the interior surface of the slot 511. In particular embodiments, the female half 501 may have flap portions 561 that extends from the top portion 551. Similarly, the male half 502 may have a flap portion 562 that extends from the top portion 552. When the two halves are placed together, the interior surfaces (with respect to the interior of the apex joint 305) of the flap portions may abut each other, creating a sufficient surface area for the two pieces to be bonded together. In particular embodiments, the opposite end of the apex joint 305 may be symmetrically configured across aforementioned the vertical plane.

With respect to the slots (e.g., 513 shown in FIG. 5A) for apex-to-base connectors, in particular embodiments, the female half 502 may have interior concave surfaces (e.g., 571) that are semi-cylindrical to form the top portion of each of the slots. FIG. 5B shows two of the interior concave surfaces 571 on one side of the female half 502, with another two hidden from view as they are the other side of the joint 305. The male half 502 may have corresponding portions with interior concave surfaces 572. The interior concave surfaces 571 of the female 501 and the interior concave surfaces 572 of the male 502 form the interior surface of the slots 513 and 514 for receiving apex-to-base connectors. In particular embodiments, the female half 501 may have a portion 581 that is in between and extends from the interior concave portions 571. Similarly, the male half 502 may have a portion 582 that is in between and extends from the interior concave portions 572. When the two halves are placed together, the interior surfaces of these portions (581 and 582) may abut each other, creating sufficient surface area for the two pieces to be bonded together. In particular embodiments, the opposite side of the apex joint may be symmetrically configured across a plane orthogonal to the aforementioned vertical plane.

Figure 6A:
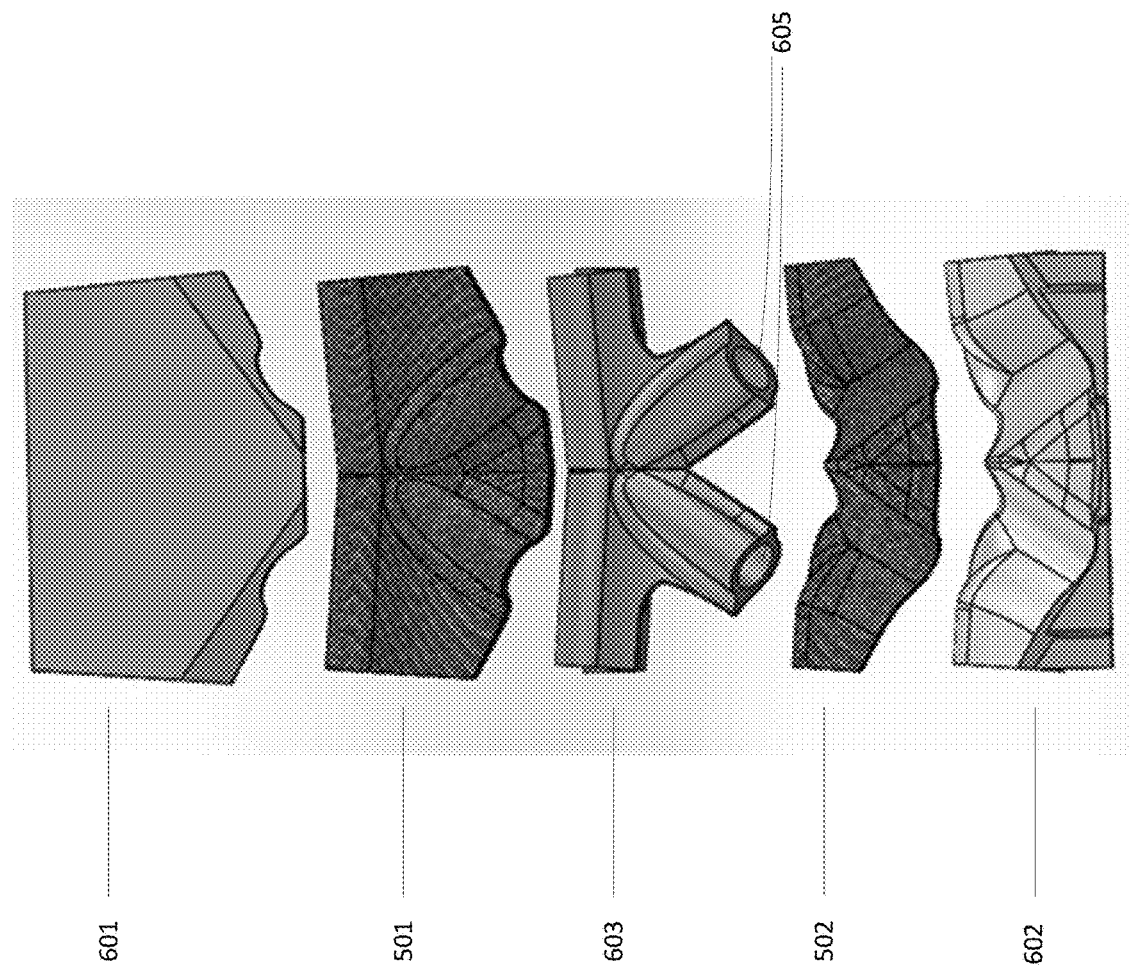
FIGS. 6A-C illustrate an example of an isometric configuration of molds and components of a mainframe's apex joint manufactured using the molds.
Figure 6B:
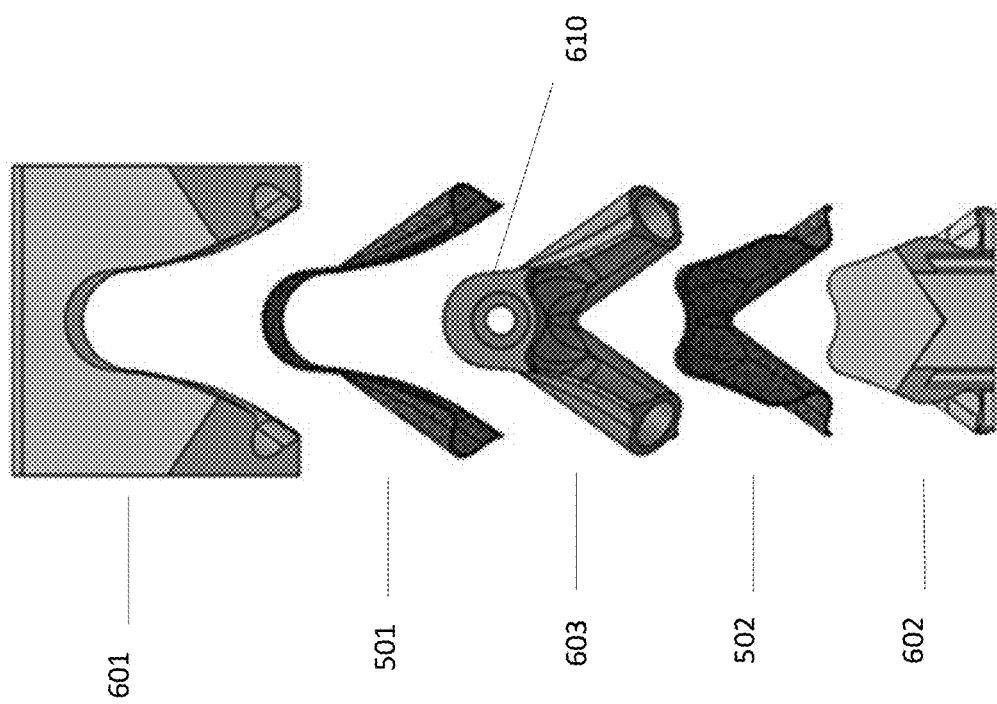
Figure 6C:
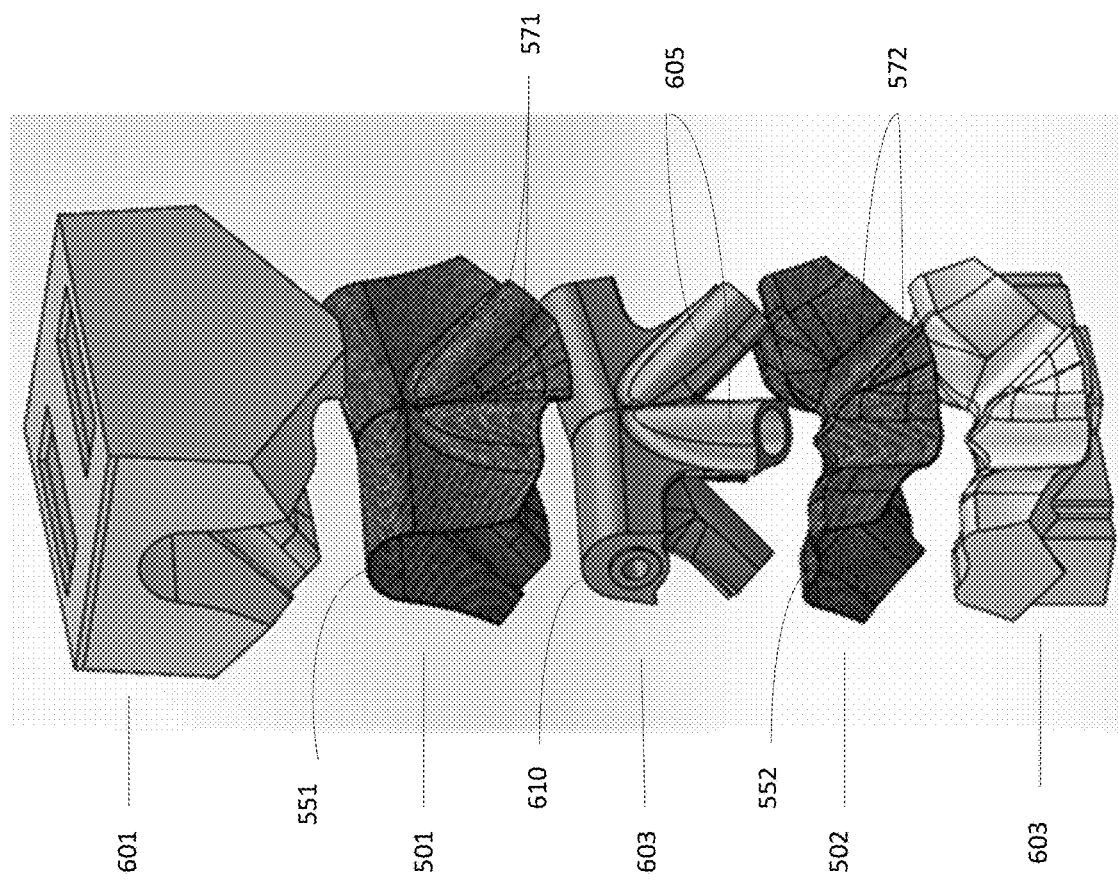

FIGS. 6A-6C illustrate an example of an isometric configuration of molds and the female half 501 and male half 502 of a mainframe's apex joint 305. In particular embodiments, the molds themselves may be manufactured using 3D printing, which provides fast and cost-effect means for manufacturing. In particular embodiments, the molds may be configured so that both the female half 501 and the male half 502 may be manufactured simultaneously. In particular embodiments, layers of carbon-fiber twills or other suitable material may be placed between the molds to create the female 501 and male 502 halves of the apex joint 305. For example, ten layers of carbon-fiber material may be placed between the female exterior mold 601 and the center mold 603, and another ten layers of carbon-fiber material may be placed between the center mold 603 and the male exterior mold 602. In particular embodiments, additional plastic sheets may be placed between the carbon-fiber materials and the molds to make it easier to remove the final product (e.g., in this case the two halves of an apex joint) from the mold. By pressing the sandwiched molds together and waiting for the pressed materials to cure, the layers of carbon-fiber would conform to the contours defined by the molds and maintain that shape. Thereafter, the excess carbon-fiber material may be trimmed.

FIG. 6A illustrates a side view of an embodiment of the molds and the female 501 and male 502 halves created by the molds. In particular embodiment, the mold assembly may include a female exterior mold 601, a male exterior mold 602, and a center mold 603. The female 601 and male 602 exterior molds, when placed together, may form the exterior surface of the apex joint 305 (or the exterior surfaces of its female half 501 and male half 502). The center mold 603 may define the interior contours of the apex joint 305. In particular embodiments, the center mold 603 may be configured to create placements guides on the inside surface of the apex joint to facilitate rod/connector placement. As shown in FIG. 6A, portions of the center mold 603 may define the apex joint's slots for receiving rods/connectors. To improve 3D printing time and structural integrity of the molds, in particular embodiment, the center of the molds 601, 602, and 603 may be made hollow during the 3D printing process and subsequently filled with, e.g., cement or any other suitable material that may solidify or reinforce the structure of the mold. For example, after the center mold 603 has been created, cement may be poured into the hollow region in its tubular portions 605. FIG. 6B illustrates a front view of the molds (601-603) and the female 501 and male 502 halves. It can be seen from this view that, in particular embodiments, the tubular portion 610 of the center mold 603 corresponding to the slots for receiving apex-to-apex connectors may be made hollow along a longitudinal axis so that, e.g., a steel rod may be inserted and used to provide pressing leverage. FIG. 6C illustrates a perspective view of the molds (601-603) and male 501 and female 502 halves. It should be appreciated from this view that the interior contour of the top portion 551 of the female half 501 and the top portion 552 of the male half 502 may be defined by the shape of the tubular portion 610 of the center mold 603. Similarly, the interior contour of the portions 571 and 572 of the female 501 and male 502 halves, respectively, may be defined by the shape of the tubular portions 605 of the center mold 603.

Figure 7A:
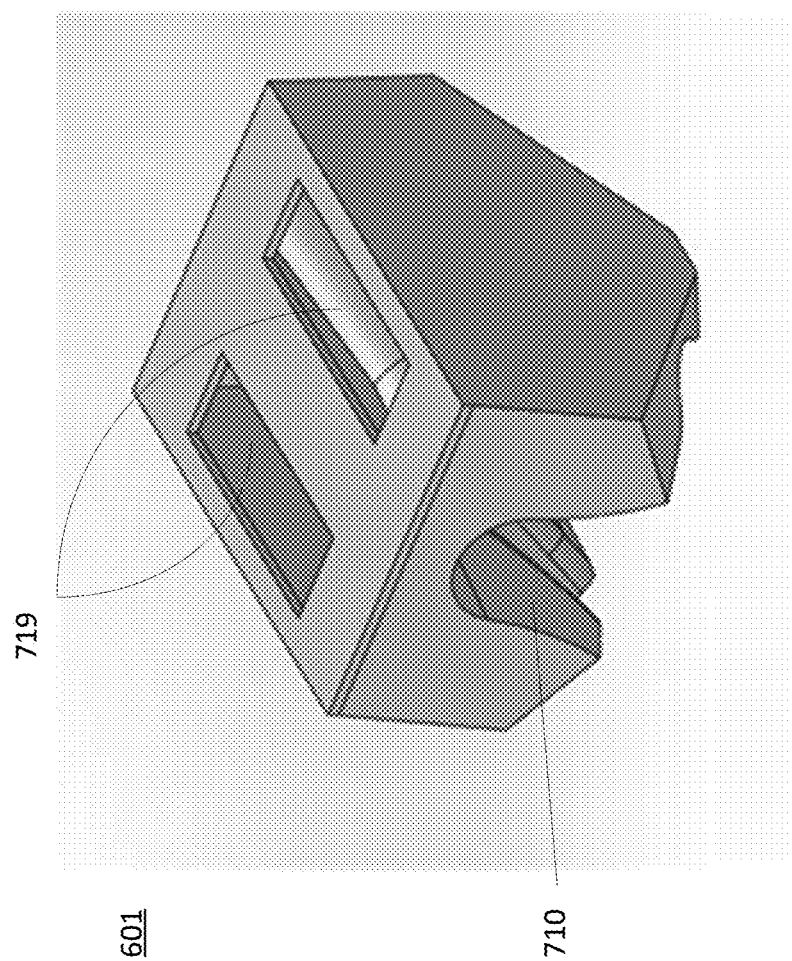
FIGS. 7A-F illustrate examples of molds used for manufacturing a mainframe's apex joint.
Figure 7B:
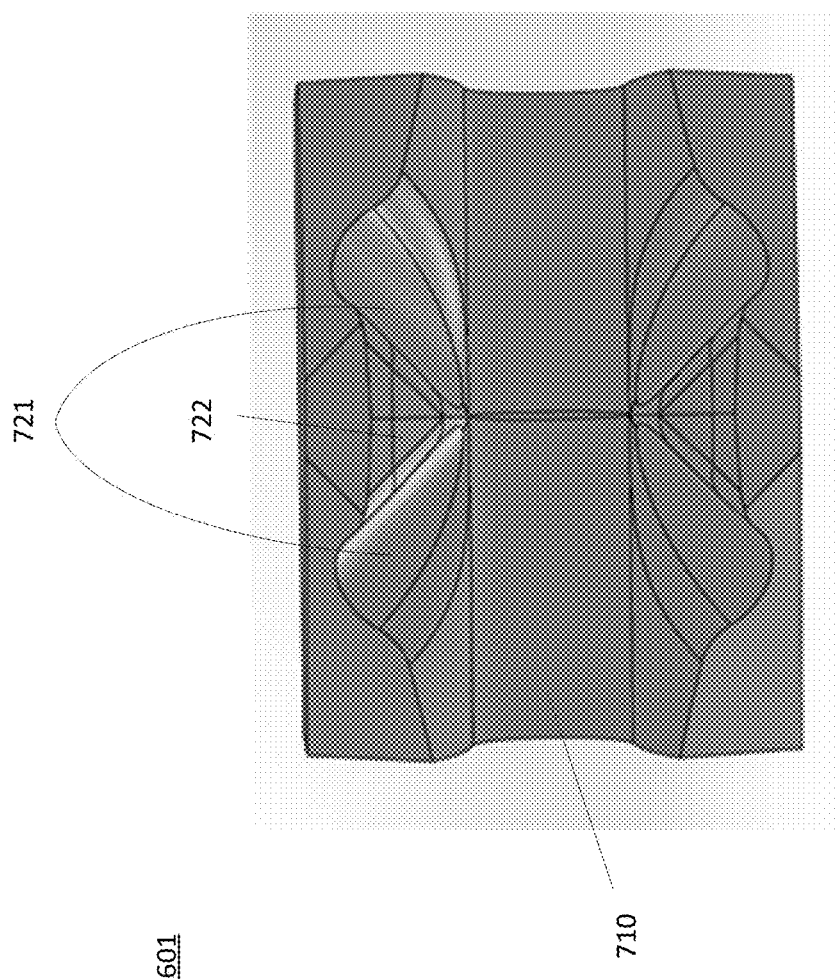

FIGS. 7A-7F illustrate examples of molds used for manufacturing a mainframe's apex joint 305. FIG. 7A illustrates a perspective view of the female exterior mold 601. In particular embodiments, the female exterior mold 601 may be hollow and may provide cavities 719 into which cement or other filling material may be inserted. In particular embodiments, a portion of the female exterior mold 601 may have an interior concave surface 710 that defines the exterior contour of the top portion 551 of the female half 501 of the apex joint 305. FIG. 7B illustrates a bottom view of the female exterior mold 601. From this view, it can be seen that, in particular embodiments, the interior concave surface 710 defining the exterior contour of the top portion 551 may be symmetrical across the aforementioned vertical center plane. In particular embodiments, the mold 601 may have interior concave surfaces 721 that define the exterior contour of the female half 501 corresponding to the slots 513 and 514. In particular embodiments, the mold 601 may have an angled cutout 722 between the interior concave surfaces 721. This angled cutout 722 may define the exterior contour of the aforementioned portion 581 of the female half 501. When the molds are pressed together, the angled cutout 722 also applies force against a corresponding angled cutout of the male mold 602 to help form the aforementioned portion 582 of the male half 502. In particular embodiments, the interior concave surfaces 721 and the angled cutout 722 may be symmetrically defined across a center vertical plane perpendicular to the aforementioned vertical plane.

Figure 7C:
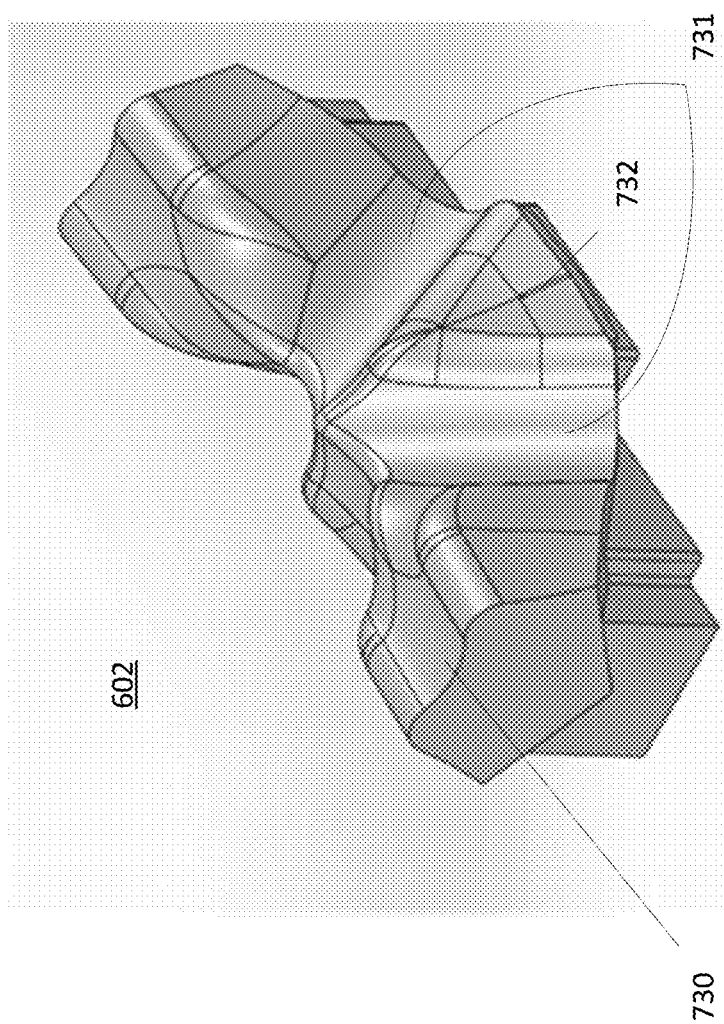
Figure 7D:
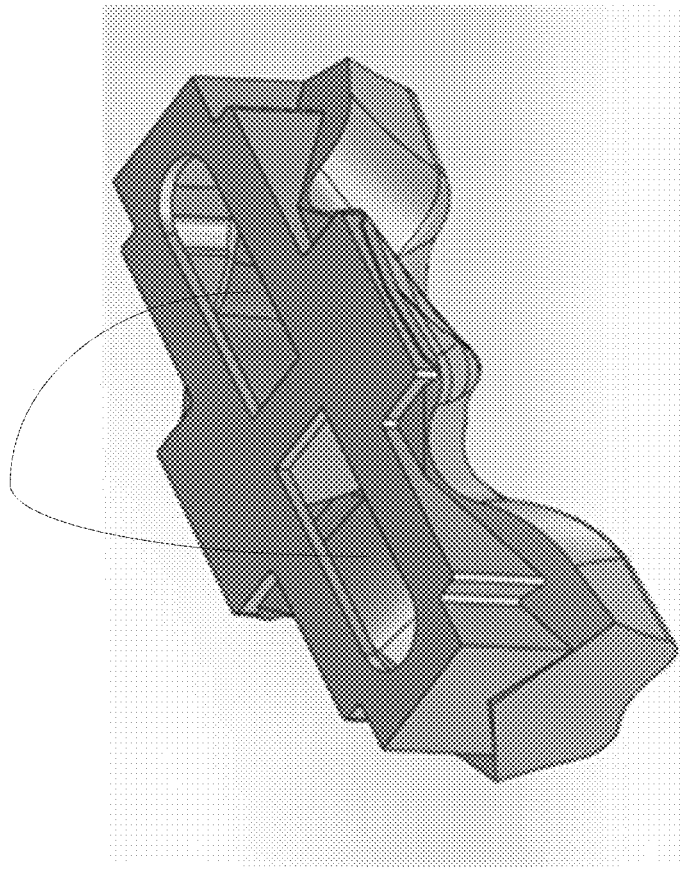

FIG. 7C illustrates a top perspective view of the male exterior mold 602. In particular embodiments, the mold 602 may have a front portion with an interior concave surface 730 (it is "interior" relative to the interior space where the carbon-fiber material is pressed) that defines the exterior contour of the top portion 552 of the male half 502. In particular embodiments, the mold 602 may have interior concave surfaces 731 that define the exterior contour of the male half 502 corresponding to the slots 513 and 514. In particular embodiments, the mold 602 may have an angled cutout 732 between the interior concave surfaces 731. This angled cutout 732 may define the exterior contour of the portion 582 of the male half 502. When the molds are pressed together, the angled cutout 732 also applies force against a corresponding angled cutout 722 of the female mold 601 to help form the aforementioned portion 581 of the female half 501. In particular embodiments, the mold 602 may be symmetric across the vertical center plane and across its orthogonal plane. It should be appreciated that the interior contours may be continuous in the embodiment shown. In particular embodiments, the interior angles and surface shape of the molds may be designed to minimize negative draft, thereby allowing the pressed carbon-fiber material to be more easily removed from the molds. In particular embodiments, the surface shape may also be configured to help the pressed carbon fiber materials to achieve uniform thickness. FIG. 7D illustrates a bottom perspective view of the male exterior mold 602. In particular embodiments, the male exterior mold 602 may be hollow and may provide a cavity 749 into which cement or other filling material may be placed.

Figures 7E, 7F:
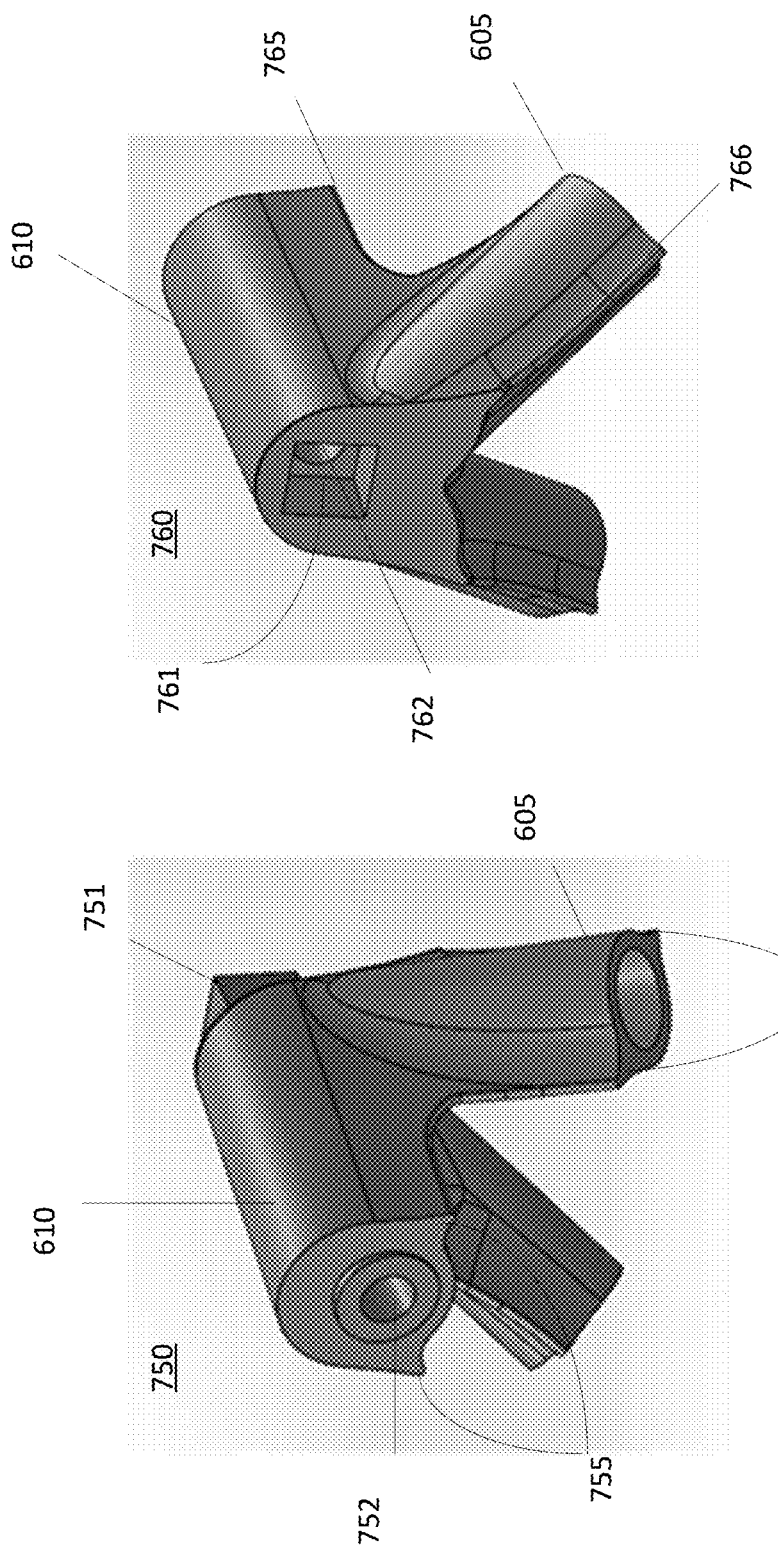

FIGS. 7E and 7F illustrate perspective views of example components of the center mold 603. In particular embodiments, the center mold 603 may have two components that may be separately manufactured (e.g., via 3D printing). FIG. 7E illustrates one of the two components, which will be referred to as the left component 750, and FIG. 7F illustrates the other component, which will be referred to as the right component 760. In particular embodiments, the left 750 and right 760 components may be assembled together to form the center mold 603. In particular embodiments, the left component 750 may have a protruding peg 751 located on the surface that is designed to interface with the right component 760. To receive the protruding peg 751, the right component 760 may have a similarly shaped cavity 761 on its surface designed to interface with the left component 750. In particular embodiments, the protruding peg 751 and the corresponding cavity 761 may be a geometric shape with angles, such as a square (as shown), a triangle, a star, or any other shape, to facilitate alignment. The left 750 and right 760 components may comprise the aforementioned tubular portion 610 of the center mold 603. As discussed above, in particular embodiments, the tubular portion 610 may have a hole (shown by the openings at 752 and 762) extending along the length of the tubular portion 610 so that a rod may be inserted for leverage. In particular embodiments, the hole may extend through the peg 751 and its corresponding cavity 762.

As discussed above, the center mold 603 may have (1) tubular portion 610 for forming slots for receiving apex connectors and (2) tubular portion 605 for forming slots for receiving apex-to-base connectors. In particular embodiments, the tubular portions (e.g., 610 and 605) may have "lips." For instance, the tubular portion 610 may have downward lips 755 and 765 to curve the flap 562 of the male half 502 (e.g., see FIG. 5B) downward. As another example, the tubular portion 605 may have lips 756 and 766 for guiding the carbon-fiber material to, e.g., transition smoothly and/or improving manufacturing consistency. The lips guide portions of the carbon-fiber material corresponding to the female 501 and male 502 halves to lie against each other (e.g., FIG. 5B at 561 and 562; 581 and 582). This creates abutting surface areas that may be used to bond the halves 501 and 502 together. The continuous contours of the female 501 and male 502 halves of the apex joint 305 resulting from being guided by the lips may help reduce negative draft when they are being taken out of the molds.

Figure 8A:
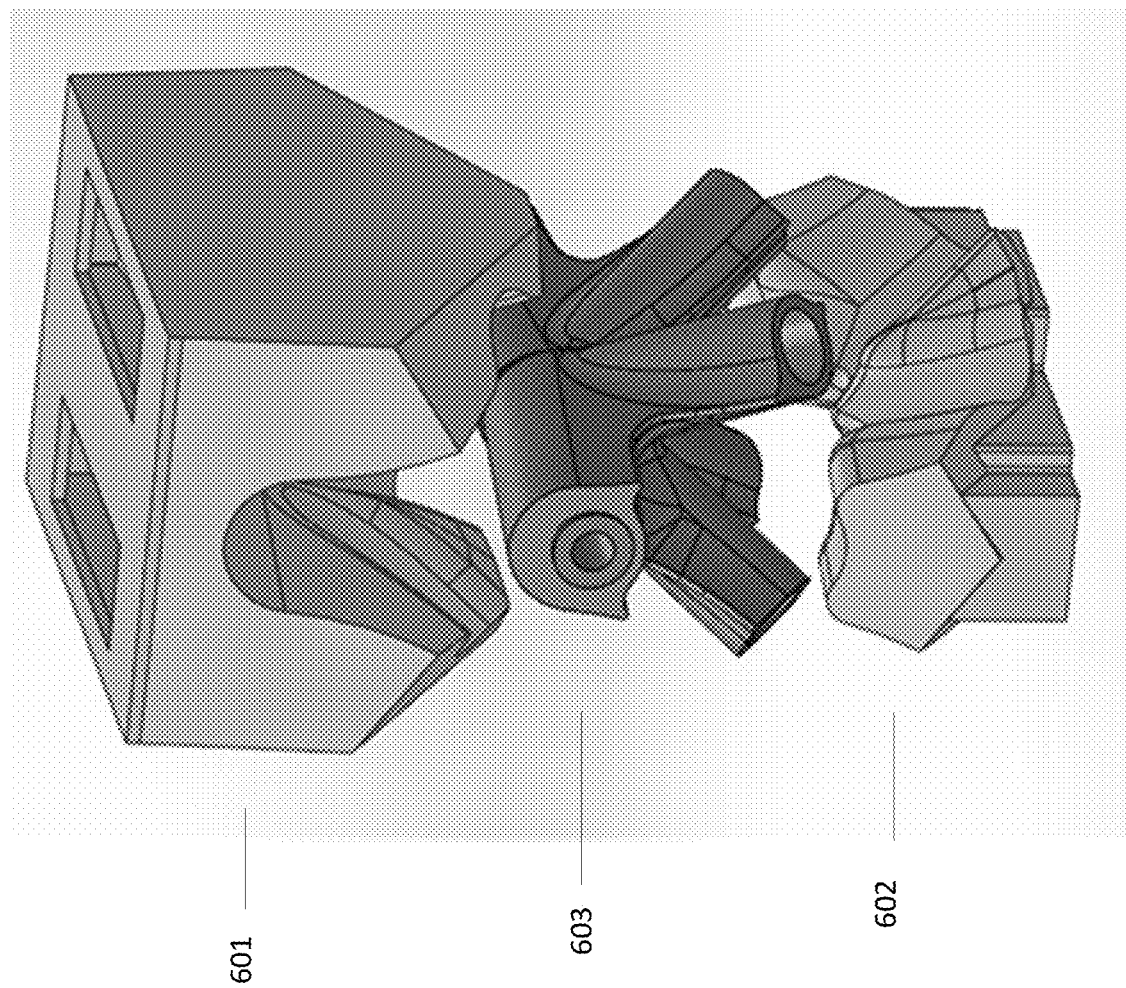
FIGS. 8A-8C illustrate examples of isometric configurations of molds used for manufacturing of a mainframe's apex joint.
Figure 8B:
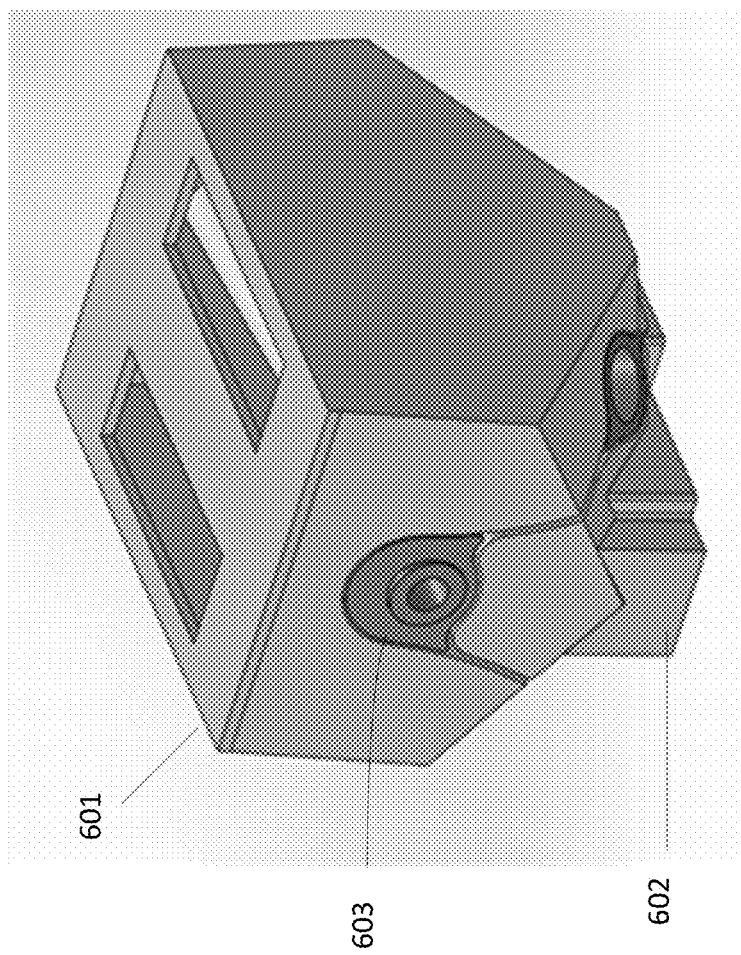
Figure 8C:
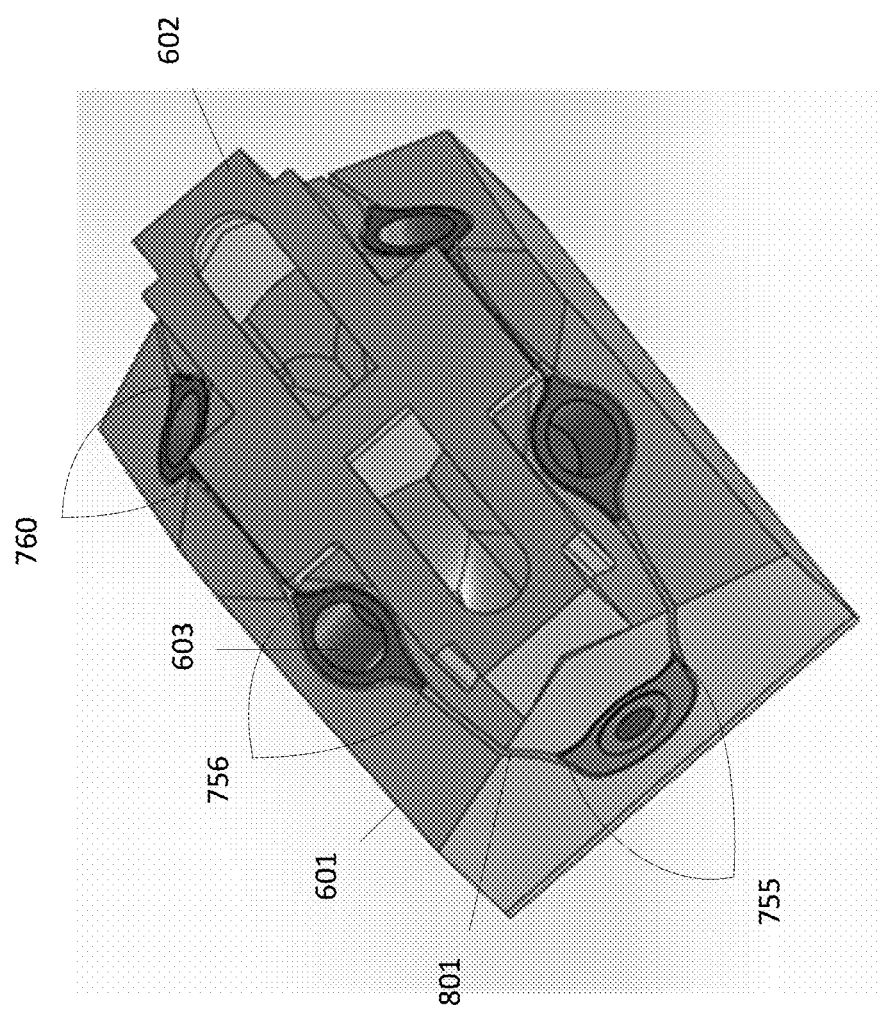

FIGS. 8A-8C illustrate examples of isometric configurations of molds used for manufacturing of a mainframe's apex joint. FIG. 8A illustrates an exploded view of the female exterior mold 601, center mold 603, and male exterior mold 602. FIG. 8B illustrates a top perspective view of the assembled three molds 601-603. FIG. 8C illustrates a bottom perspective view of the assembled three molds 601-603. As shown, due to the center mold 603, when the carbon-fiber materials are pressed against each other, slots are formed for receiving connectors/rods (as evident from the visible center mold 603 in the assembled views). As shown in FIG. 8C, the aforementioned lips (e.g., 755, 756, 766) guide the carbon-fiber layers of the female 501 and male 502 halves through a common, continuous channel 801.

Figure 9A:
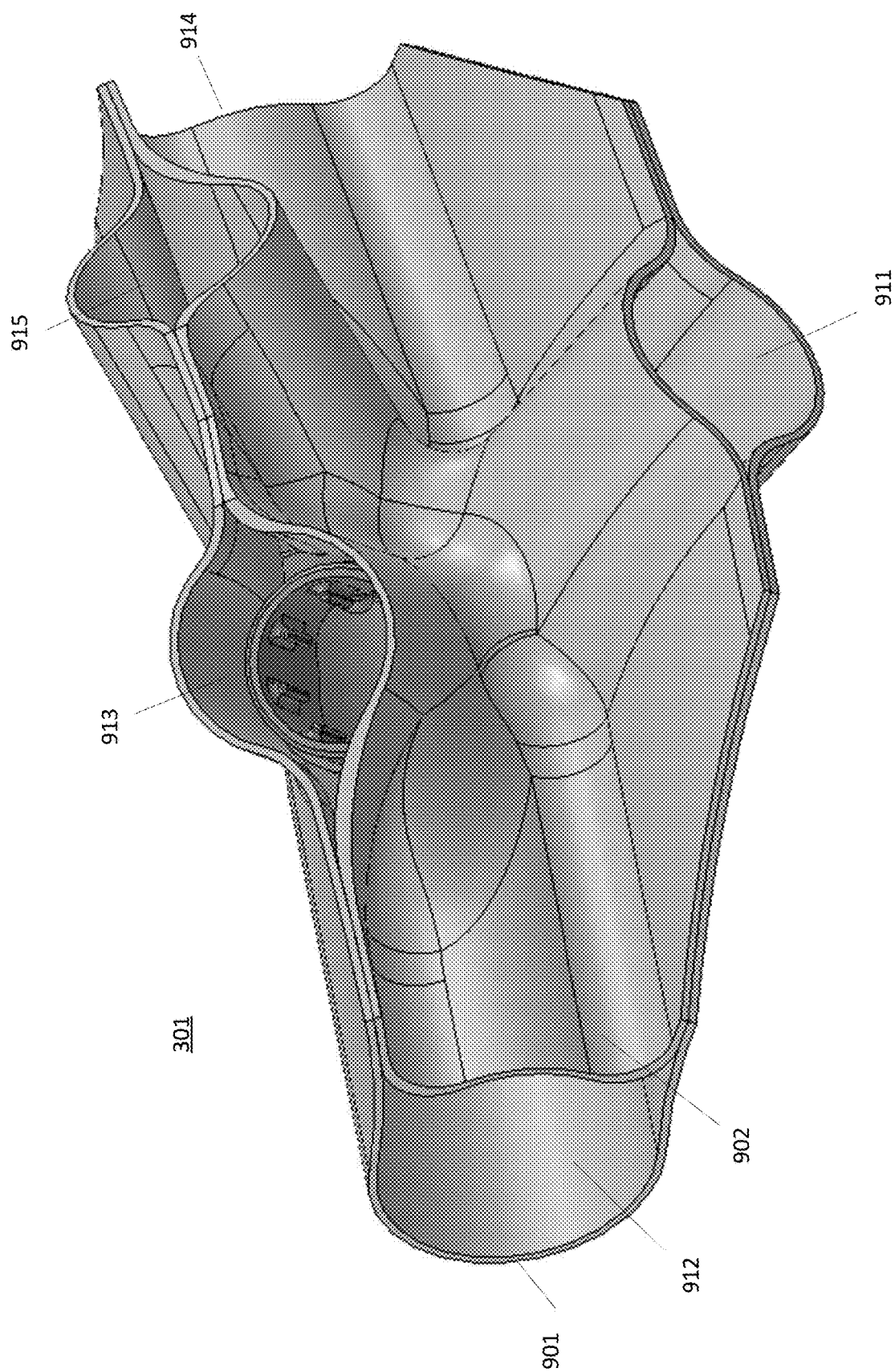
FIGS. 9A-E illustrate an example of a base joint used for constructing a mainframe's pyramid structure.

FIGS. 9A-9E illustrate an example of a base joint 301 (which is representative of base joints 302, 303, and 304 in FIG. 3A) used for constructing a mainframe's pyramid structure. FIG. 9A illustrates an assembled view and FIGS. 9B-9E illustrate exploded views. In particular embodiments, the base joint 301 may be made of carbon fiber or any other similar material. In particular embodiments, the base joint 301 may comprise a female half 901 and a male half 902. The base joint's 301 female 901 and male 902 halves are configured to fit together, with the female half 901 substantially enveloping the male half 902 when the two halves are assembled, as shown in FIG. 9A. In particular embodiments, corresponding portions of the female half 901 and male half 902 may protrude or curve in opposite directions to form slots. For instance, base joint 301 may have five slots 911, 912, 913, 914 (not entirely visible in FIG. 9A), and 915, which may be formed by the separations between the female half 901 and the male half 902 when they are pieced together. In particular embodiments, each of the slots 911, 912, 913, 914, and 915 may be configured to receive and substantially envelop a tubular object, such as a connector. In particular embodiments, each of the slots 911, 912, 913, 914, and 915 may be substantially cylindrical.

In particular embodiments, the base joint 301 may have a total of five slots—a center slot 911 for receiving a connector shared between the bases of two adjacent pyramids (e.g., connector 314 shown in FIG. 3A); a first side slot 912 and a first apex slot 913 for one of the pyramids; and a second side slot 914 (partially shown) and a second apex slot 915 for the other pyramid. The side slot 912 may be configured to receive a connector (e.g., 311 in FIG. 3A) connecting the base joint 301 with an adjacent base joint (e.g., 302 in FIG. 3A) of a first pyramid, and the apex slot 913 may be configured to receive a connector (e.g., 315 in FIG. 3A) connecting the base joint 301 with the apex joint (e.g., 305 in FIG. 3A) of that first pyramid. Similarly, the side slot 914 (partially shown) may be configured to receive a connector (e.g., 361 in FIG. 3A) connecting the base joint 301 with an adjacent base joint (e.g., 352 in FIG. 3A) of a second pyramid, and the apex slot 915 may be configured to receive a connector (e.g., 365 in FIG. 3A) connecting the base joint 301 with the apex joint (e.g., 355 in FIG. 3A) of that second pyramid. In particular embodiments, the base joint 301 may be symmetrical across an imaginary plane dividing the base joint 301 in half through the axis of the slot 911.

In certain embodiments where a pyramid structure is used to construct a straight structure, such as a gangway as described below, a base joint's cylindrical side slots (similar to slots 912 and 914) may align with each other to form a straight line (in other words, the axes of the cylindrical slots may coincide). On the other hand, in embodiments where pyramid structures are used for constructing a circular mainframe (e.g., interconnected pyramid structures forming a loop), such as the one shown in FIG. 2, the interior angle (i.e., the angle measured through the joint's body) between the two cylindrical side slots (or their corresponding axes) may be less than 180 degrees. In particular embodiments, a circular mainframe may be approximated by a regular polygon (e.g., 36-sided polygon). As such, the angle between two connectors created by a base joint 301 may correspond to the interior angle of a vertex or corner of the polygon. The angle may depend on the number of vertices/corners that the polygon is designed to have. For example, the sum of the interior angles of the polygon may be determined based on the formula, (n−2)×180 degrees, where n is the number of vertices/corners of the polygon (the sum of the exterior angles of all the vertices/corners of the polygon is 360 degree). Thus, for example, each interior angle of a regular polygon may be determined based on the formula: ((n−2)×180)/n.

As discussed above, the base joint 301 may comprise a center slot 911 and two side slots 912 and 914. In particular embodiments, the center slot 911 may be substantially perpendicular to each of the side slots 912 and 914. Also, as discussed above, the base joint 301 may form the corner joints of two adjacent pyramid structures, as shown in, e.g., FIG. 3A. As such, center slot 911, side slot 912, and apex slot 913 may define and support the corner structure of one pyramid, and center slot 911, side slot 914, and apex slot 915 may define and support the corner structure of the other pyramid. With respect to each one of the pyramids, such as the pyramid formed using slots 911, 912, and 913, the angle between the apex slot 913 and the center slot 911 and the angle between the apex slot 913 and the side slot 912 depend on the desired geometric properties of the pyramid. For example, if each side of the pyramid structure is an equilateral triangle (the base of the pyramid is not being referred to as a side), then the angle between the apex slot 913 and center slot 911 slots and the angle between the apex slot 913 and the side slot 912 would both be substantially 60 degrees. In particular embodiments, the corresponding structures for the other half of the base joint 301 may have the same configuration.

In particular embodiments, the female half 901 and the male half 902 may be bonded together using adhesives. In particular embodiments, the two halves may be placed together and inserted with connectors/rods. In particular embodiments, zip-ties or clamps may be used to apply inward force so that the two halves are tightly abutting each other. In particular embodiments, each slot (e.g., 911-915) may have one or more holes into which liquid adhesive may be injected. For example, the slot 913 may have a hole in the female portion 901 and another hole in the male portion 902. While the two halves are placed together with rods/connectors inserted, liquid adhesive may be injected into one of the holes, and air bubbles and/or excess adhesive may be allowed to exit from the other hole.

FIGS. 9B, 9C, 9D, and 9E illustrate exploded views of the base joint 301, with the female half 901 separated from the male half 902, from different angles. In particular embodiments, the female half 901 and the male half 902 are each symmetrical across a center plane extending from the axis of slot 911, as discussed with reference to FIG. 9A. Referring to their surfaces for forming the interior of the base joint 301, the female half 901, in particular embodiments, may generally have a concave surface and the male half 902 may, in general, have a convex surface. In particular embodiments, the interior surface of the base joint 301 formed by the female half 901 and male half 902 may have placement guides (or plugs) for facilitating rod/connector placement. In particular embodiments, a plug In particular embodiments, the top portion 951 of the female half 901 may have an interior concave surface (with respect to the interior of the base joint 301) that is semi-cylindrical to form the top portion of each of the side slots 912 and 914. The male half 902 may have top portions 952 that has an interior concave surface (with respect to the interior of the base joint 301). The interior concave surfaces of the top portions 951 and 952 of the female 901 and male 902 halves form the interior surface of the slots 912 and 914. In particular embodiments, the female half 901 may have flap portions 961 that extends from the top portion 951. Similarly, the male half 902 may have flap portions 962 that extends from the top portions 952. When the two halves are placed together, the interior surfaces (with respect to the interior of the base joint 301) of the flap portions may abut each other, creating a sufficient surface area for the two pieces to be bonded together.

With respect to the base-to-apex slots (e.g., 913 and 915 in FIG. 9A) of the base joint 301, the female half 902, in particular embodiments, may have interior concave surfaces 971 (with respect to the interior of the base joint 301) that are semi-cylindrical to form the top portion of each of the slots. The male half 902 may have corresponding portions with interior concave surfaces (with respect to the interior of the base joint 301) 972. The interior concave surfaces 971 of the female 901 and the interior concave surfaces 972 of the male 902 form the interior surface of the slots 913 and 915 for receiving, respectively, connectors to apex joints 305 of adjoining pyramid structures. In particular embodiments, the female half 901 may have a portion 981 that is in between and extends from the interior concave portions 971. Similarly, the male half 902 may have a portion 982 that is in between and extends from the interior concave portions 972. When the two halves are placed together, the interior surfaces of these portions (981 and 982) may abut each other, creating a sufficient surface area for the two pieces to be bonded together.

Figure 9B:
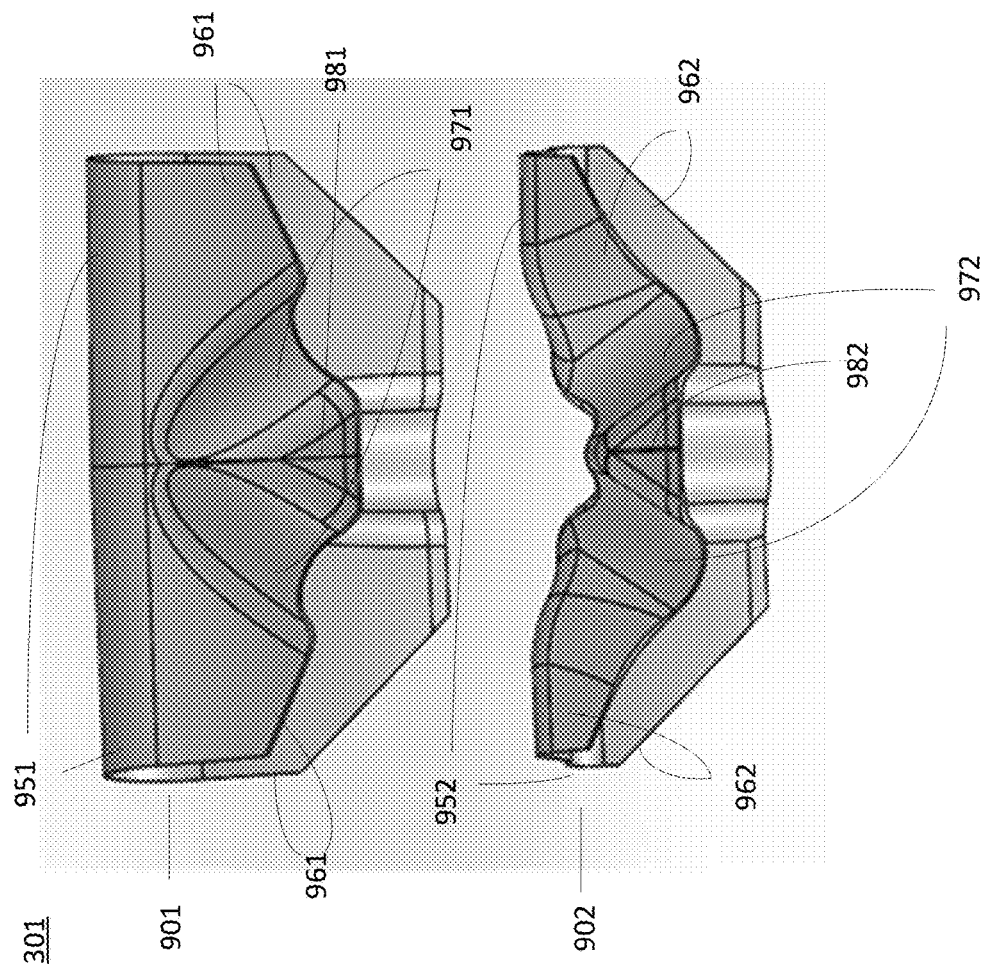
Figure 9C:
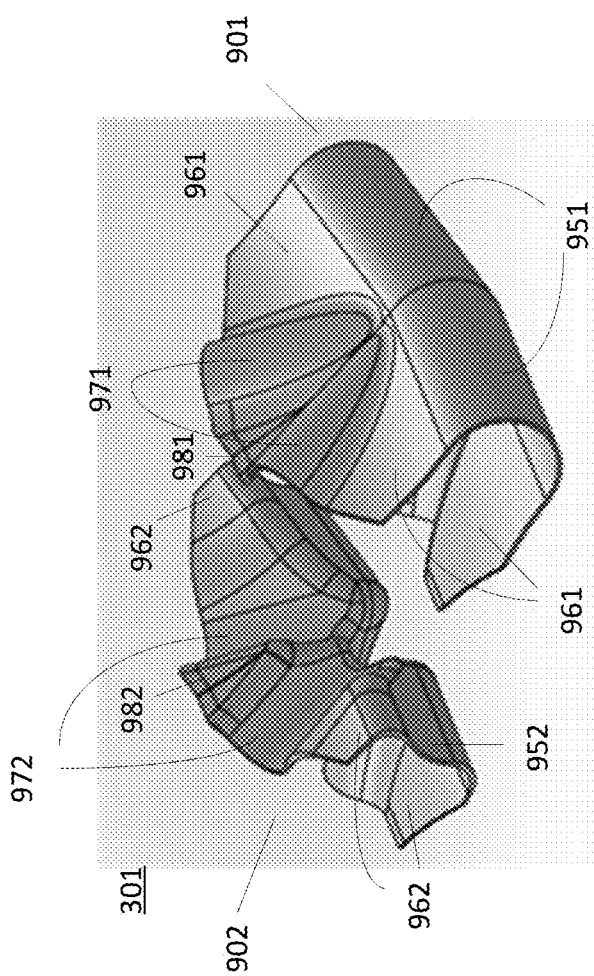
Figure 9D:
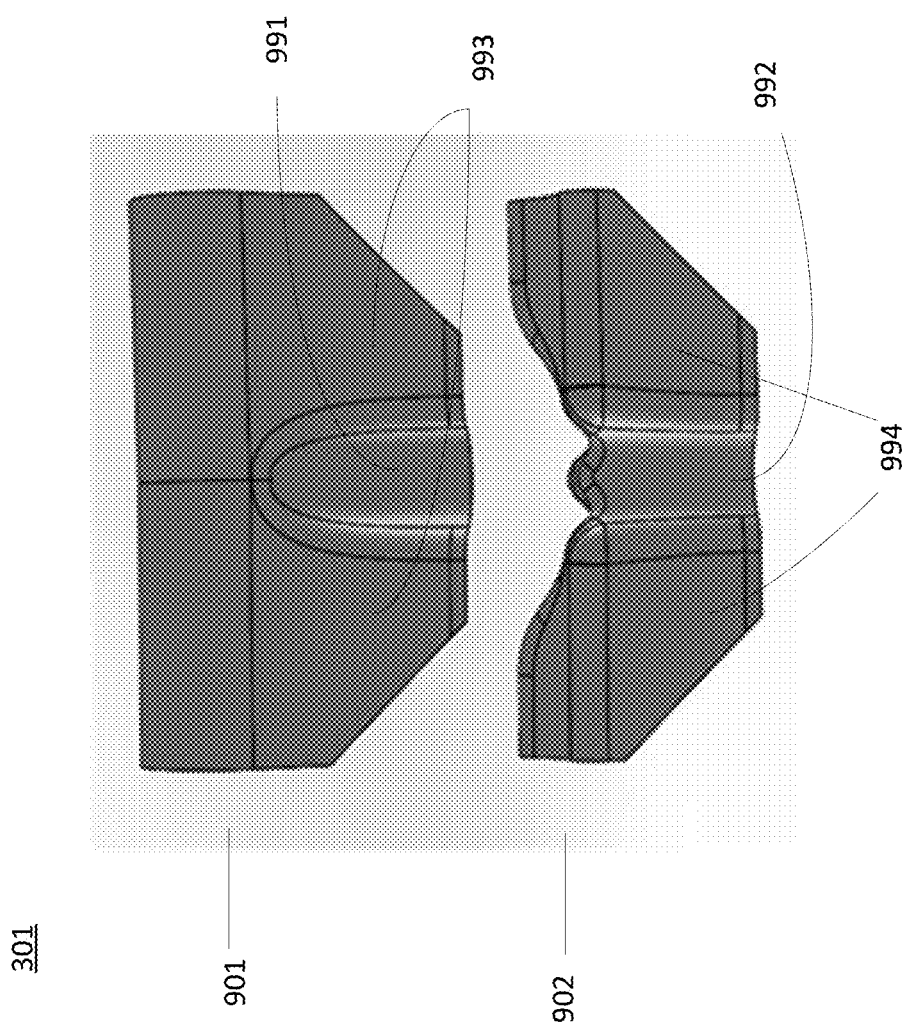

FIG. 9D illustrates the back side of the base joint 301 shown in FIG. 9B, with the female half 901 separated from the male half 902. In particular embodiments, the female half 901 and the male half 902 are each symmetrical across the center plane extending from the axes of the slot 911 (see FIG. 9A). With respect to the slot 911 of the base joint 301, the female half 902, in particular embodiments, may have a portion with an interior concave surface 991 (with respect to the interior of the base joint 301) that is semi-cylindrical to form the top portion of the center slot 911. The male half 902 may have a corresponding portion with an interior concave surface 992 (with respect to the interior of the base joint 301). The interior concave surface 991 of the female 901 and the interior concave surface 992 of the male 902 form the interior surface of the center slot 911. In particular embodiments, the female half 901 may have flap portions 993 that extend from the interior concave surface 991 portion of the center slot 911. Similarly, the male half 902 may have flap portions 994 that extend from the interior concave surface 992 of the center slot 911. When the two halves are placed together, the interior surfaces (with respect to the interior of the base joint 301) of the flap portions may abut each other, creating sufficient surface area for the two pieces to be bonded together.

Figure 9E:
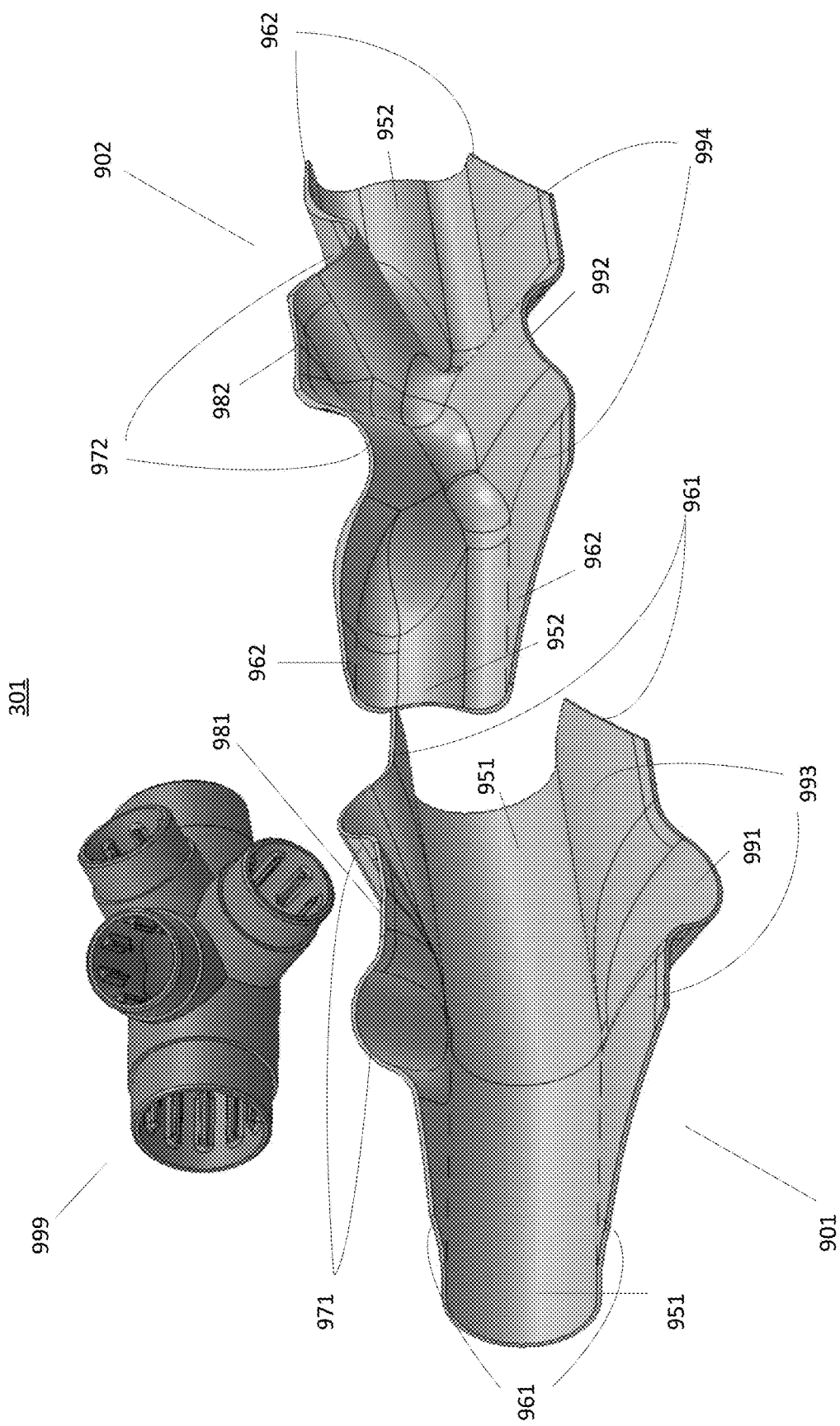

FIG. 9E illustrates the underside of the base joint 301, female half 901 separated from the male half 902. In addition, FIG. 9E illustrates a plug 999 that may be placed between the female 901 and male 902 halves. Once assembled, the plug 999 may be used to guide and maintain placement of connectors.

10A-10D illustrate an example of an isometric configuration of molds and the female half 901 and male half 902 of a mainframe's base joint 301. In particular embodiments, the molds themselves may be manufactured using 3D printing, which provides a fast and cost-effect means for manufacturing. In particular embodiments, the molds may be configured so that both the female half 901 and the male half 902 may be manufactured simultaneously. In particular embodiments, layers of carbon-fiber twills or other suitable material may be placed between the molds to create the female 901 and male 902 halves of the base joint 301. For example, ten (or any other suitable number) layers of carbon-fiber material may be placed between the female exterior mold 1001 and the center mold 1003, and another ten layers of carbon-fiber material may be placed between the center mold 1003 and the male exterior mold 1002. In particular embodiments, additional plastic sheets may be placed between the carbon-fiber materials and the molds to make it easier to remove the final product (e.g., in this case, the two halves of a base joint) from the mold. By pressing the sandwiched molds together and waiting for the pressed materials to cure, the layers of carbon-fiber would conform to the contours defined by the molds and maintain that shape. Thereafter, the excess carbon-fiber material may be trimmed.

Figure 10A:
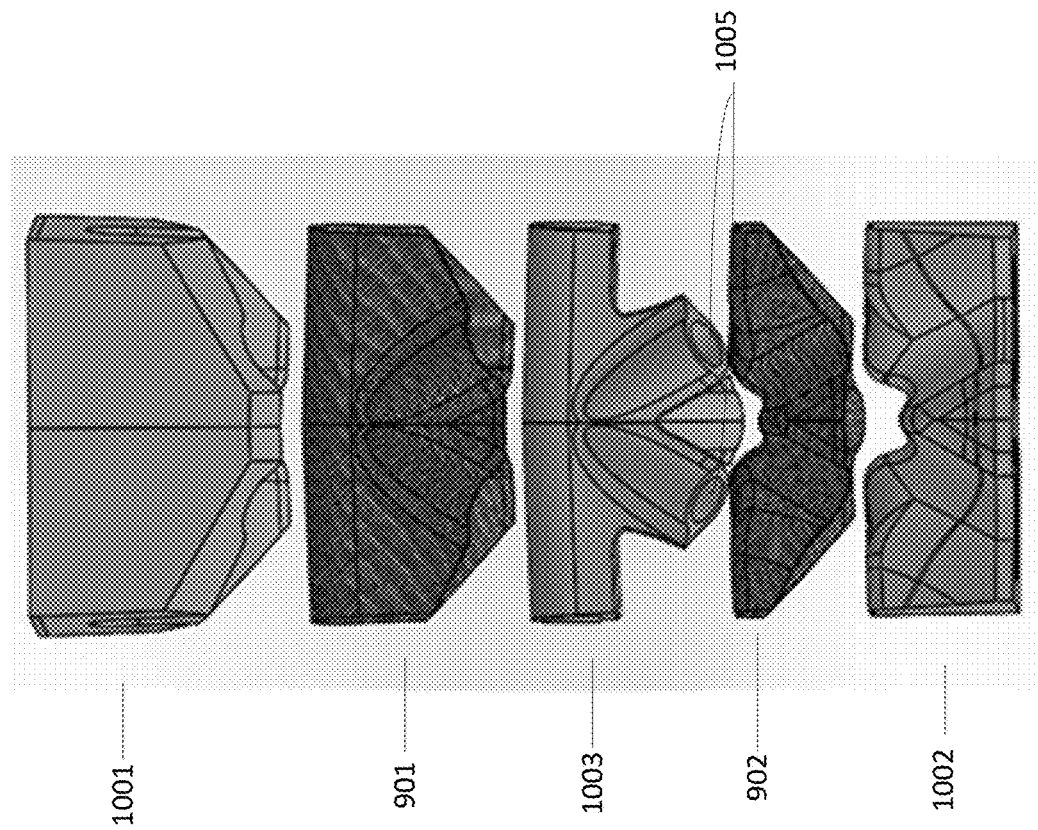
FIGS. 10A-D illustrate an example of an isometric configuration of molds and components of a mainframe's base joint manufactured using the molds.
Figure 10B:
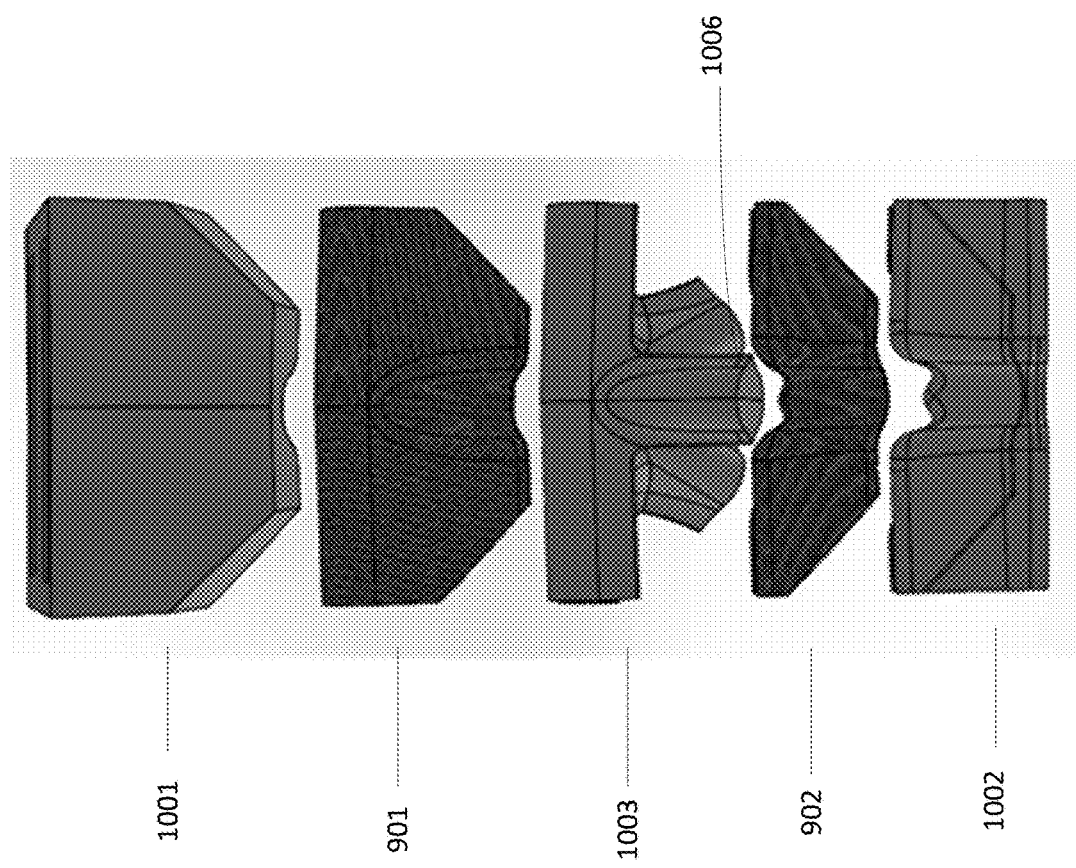
Figure 10C:
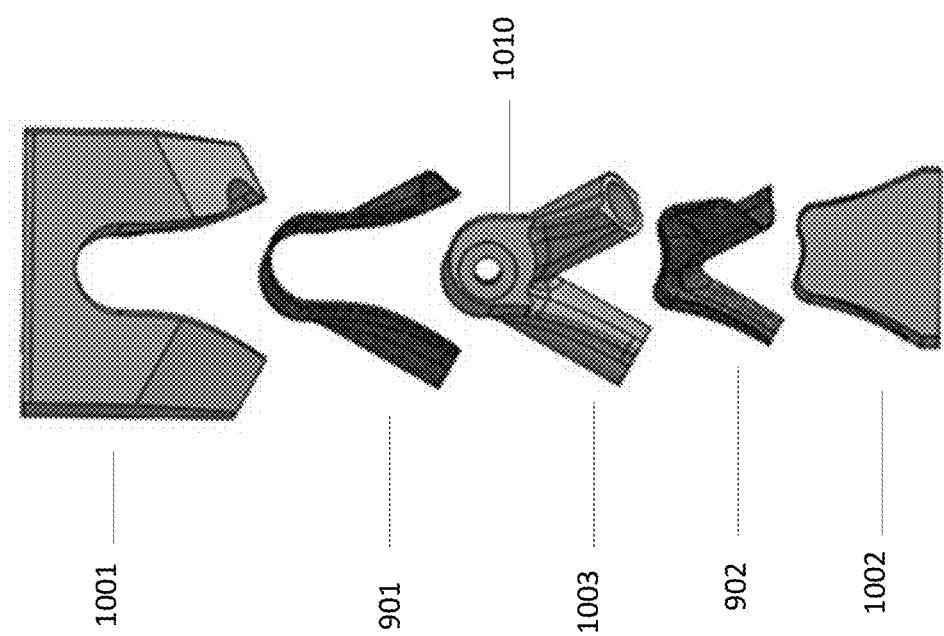
Figure 10D:
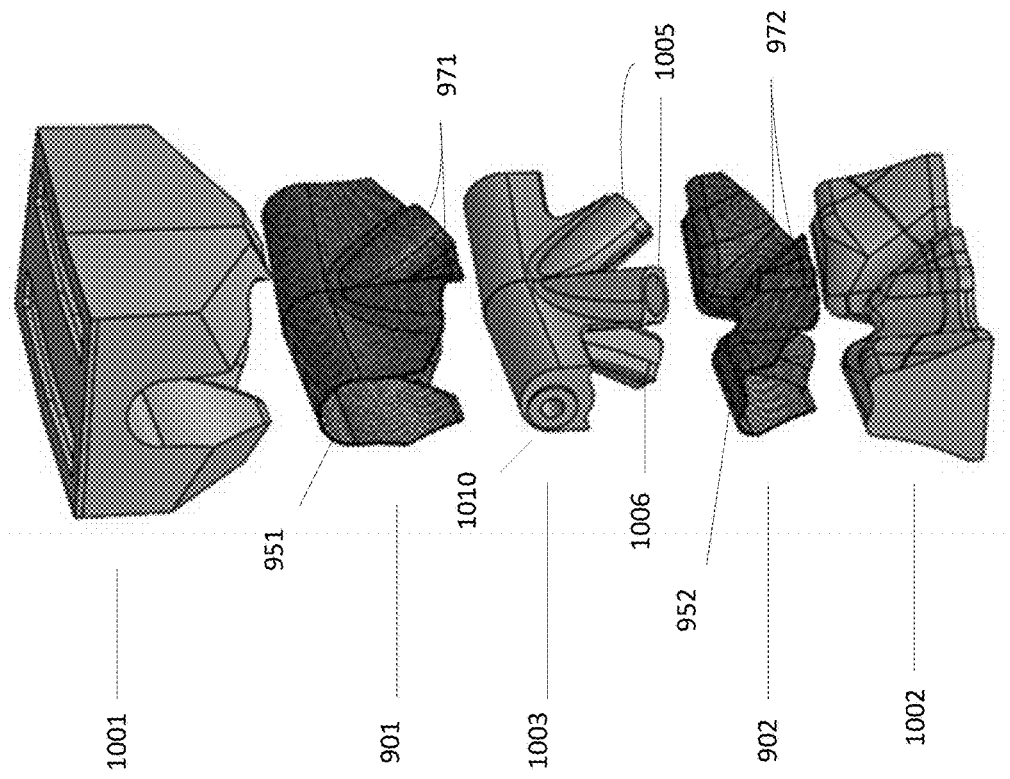

FIGS. 10A and 10B illustrate different side views of an embodiment of the molds and the female 901 and male 902 halves created by the molds. In particular embodiments, the mold assembly may include a female exterior mold 1001, a male exterior mold 1002, and a center mold 1003. The female 1001 and male 1002 exterior molds, when placed together, may define the exterior surface of the base joint 301 (or the exterior surfaces of its female half 901 and male half 902). The center mold 1003 may define the interior contours of the base joint 301. Similar to the center mold of apex joint 305, the center mold 1003 occupies the interior region of the base joint 301 so that, when the carbon-fiber twills are pressed against each other by the female 1001 and male 1002 molds, the twills will not collapse onto each other. With the structural support of the center mold 1003, the carbon-fiber twills would maintain the desired shape defined by the molds until they harden. In particular embodiments, the center mold 1003 may be configured to create placements guides on the inside surface of the base joint to facilitate rod/connector placement. As shown in FIG. 10A, portions of the center mold 1003 may define slots for receiving rods/connectors. To improve 3D printing time and structural integrity of the molds, the center of the molds 1001, 1002, and 1003, in particular embodiments, may be made hollow during the 3D printing process and subsequently filled with, e.g., cement or any other suitable material that may solidify or reinforce the structure of the mold. For example, after the center mold 1003 has been created, cement may be poured into the hollow region in its tubular portions 1005. FIG. 10C illustrates a substantially frontal view of the molds (1001-1003) and the female 901 and male 902 halves. It can be seen from this view that, in particular embodiments, the tubular portion 1010 of the center mold 1003 corresponding to the side slots for receiving connectors may be made hollow along a longitudinal axis so that, e.g., a steel rod may be inserted and used to provide pressing leverage. FIG. 10D illustrates a perspective view of the molds (1001-1003) and male 901 and female 902 halves. It should be appreciated from this view that the interior contour of the top portion 951 of the female half 901 and the top portion 952 of the male half 902 may be defined by the shape of the tubular portion 1010 of the center mold 1003. Similarly, the interior contour of the portions 971 and 972 of the female 901 and male 902 halves, respectively, may be defined by the shape of the tubular portion 1005. Likewise, the interior contour of the portions 991 and 992 (more clearly shown in FIG. 9E) of the female 902 and male halves 902, respectively, may be defined by the shape of the tubular portion 1006.

Figure 11B:
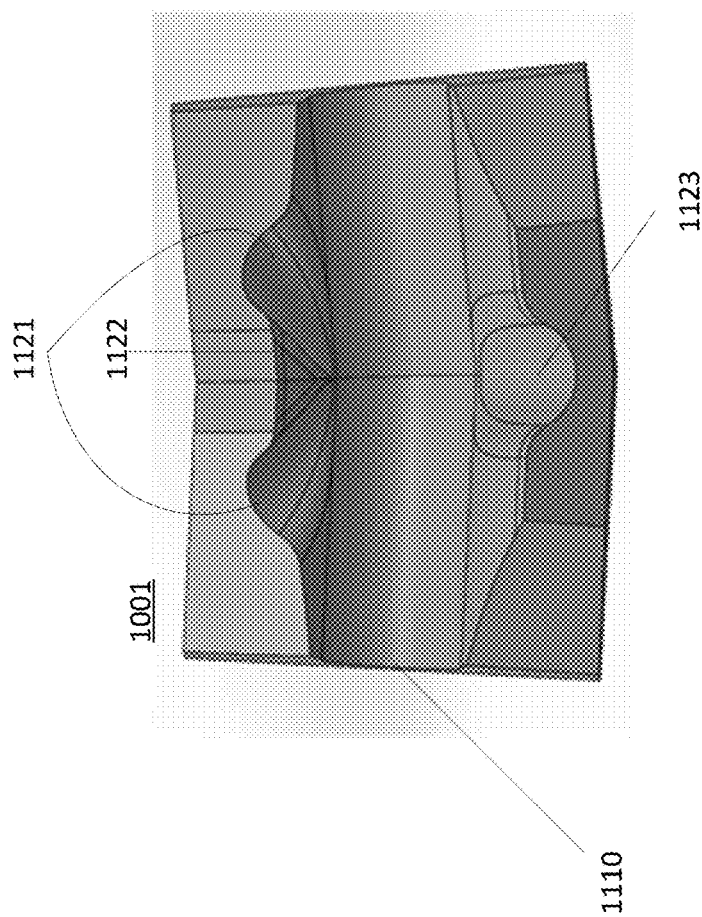
FIGS. 11A-F illustrate examples of molds used for manufacturing a mainframe's base joint.
Figure 11A:
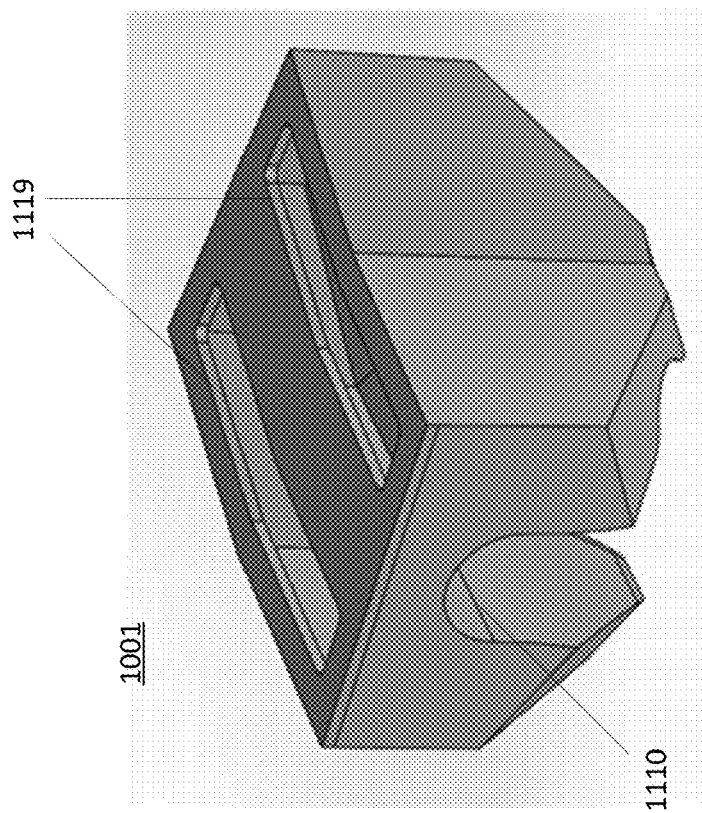

FIGS. 11A-11F illustrate examples of the molds used for manufacturing a mainframe's base joint 301. FIG. 11A illustrates a perspective view of the female exterior mold 1001. In particular embodiments, the female exterior mold 1001 may be hollow and may provide a cavity 1119 into which cement or other filling material may be placed. In particular embodiments, a portion of the female exterior mold 1001 may have an interior concave surface 1110 that defines the exterior contour of the top portion 951 of the female half 901 of the base joint 301. FIG. 11B illustrates a bottom view of the female exterior mold 1001. From this view, it can be seen that, in particular embodiments, the interior concave surface 1110 defining the exterior contour of the top portion 951 may be symmetrically defined across an imaginary vertical plane slicing through the middle of the figure. In particular embodiments, the mold 1001 may have interior concave surfaces 1121 that define the exterior contour of the female half 901 corresponding to the apex slots 913 and 915. The mold 1001 may also have interior concave surface 1123 that define the exterior contour of the female half 901 corresponding to the center slot 911. In particular embodiments, the mold 1001 may have an angled cutout 1122 between the interior concave surfaces 1121. This angled cutout 1122 may define the exterior contour of the aforementioned portion 981 of the female half 901.

Figure 11C:
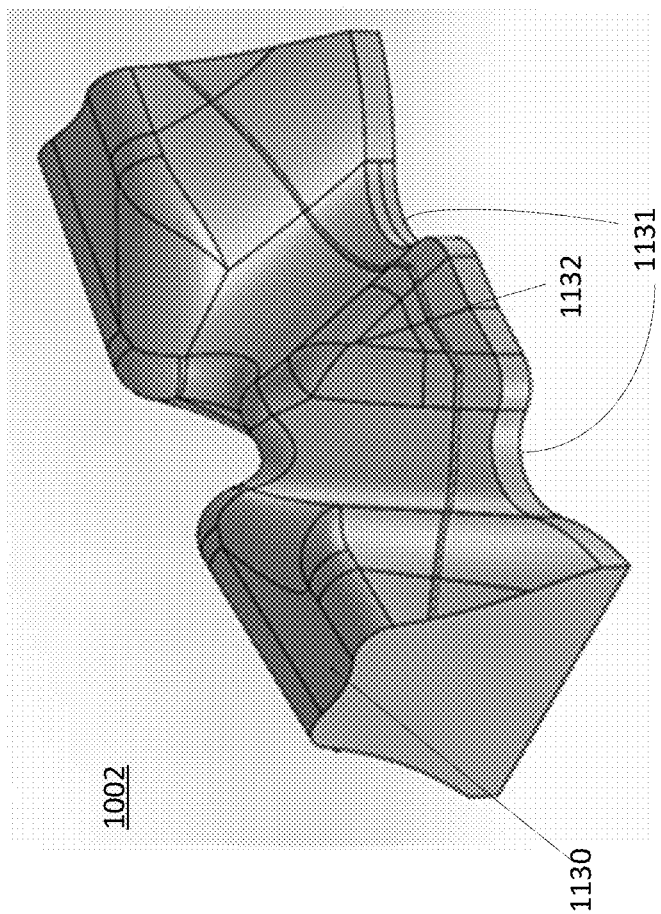
Figure 11D:
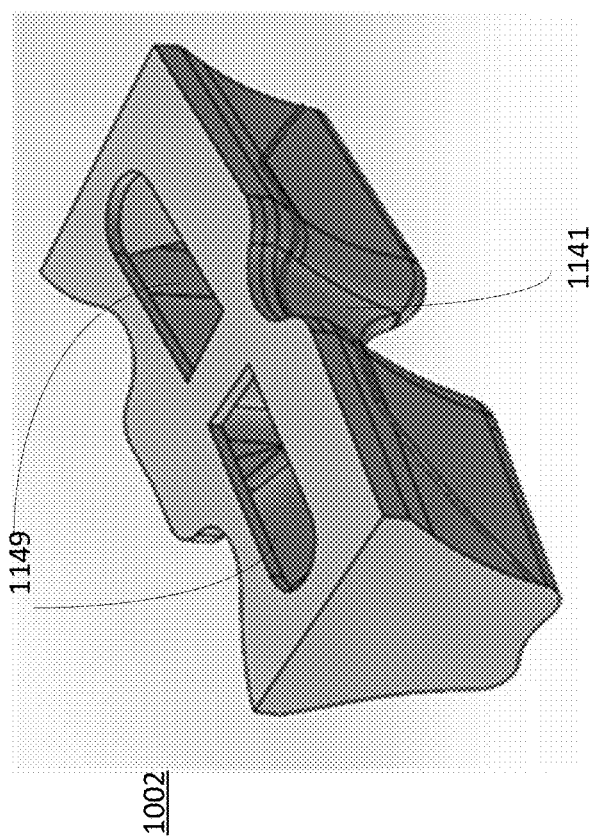

FIG. 11C illustrates a top perspective view of the male exterior mold 1002. In particular embodiments, the mold 1002 may have a front portion with an interior concave surface 1130 (it is "interior" relative to the interior space where carbon-fiber material is pressed) that defines the exterior contour of the top portion 952 of the male half 902. In particular embodiments, the mold 1002 may have interior concave surfaces 1131 that define the exterior contour of the male half 902 corresponding to the base-to-apex slots 913 and 915 (see FIG. 9A). In particular embodiments, the mold 1002 may have an angled cutout 1132 between the interior concave surfaces 1131. This angled cutout 1132 may define the exterior contour of the portion 982 of the male half 902 (see FIG. 9B). FIG. 11D illustrates a bottom perspective view of the male exterior mold 1102. In particular embodiments, the male exterior mold 1002 may be hollow and may provide a cavity 1149 into which cement or other filling material may be placed. In particular embodiments, the mold 1002 may have an interior concave surface 1141 on the opposite side of the angled cutout portion 1132, as shown in FIG. 11C. The interior concave surface 1141 may define the exterior contour of the male half 902 corresponding to the center slot 911 (see FIG. 9A). In particular embodiments, the mold 1002 may be symmetric across an imaginary center plane through the middle of the surface 1141, dividing the mold 1002 in symmetric halves. It should be appreciated that the interior contours may be continuous in the embodiment shown. In particular embodiments, the interior angles and surface shape of the molds may be designed to minimize negative draft, thereby allowing the pressed carbon-fiber material to be more easily removed from the molds. In particular embodiments, the surface shape may also be configured to help the pressed carbon fiber materials have a uniform thickness.

Figures 11E, 11F:
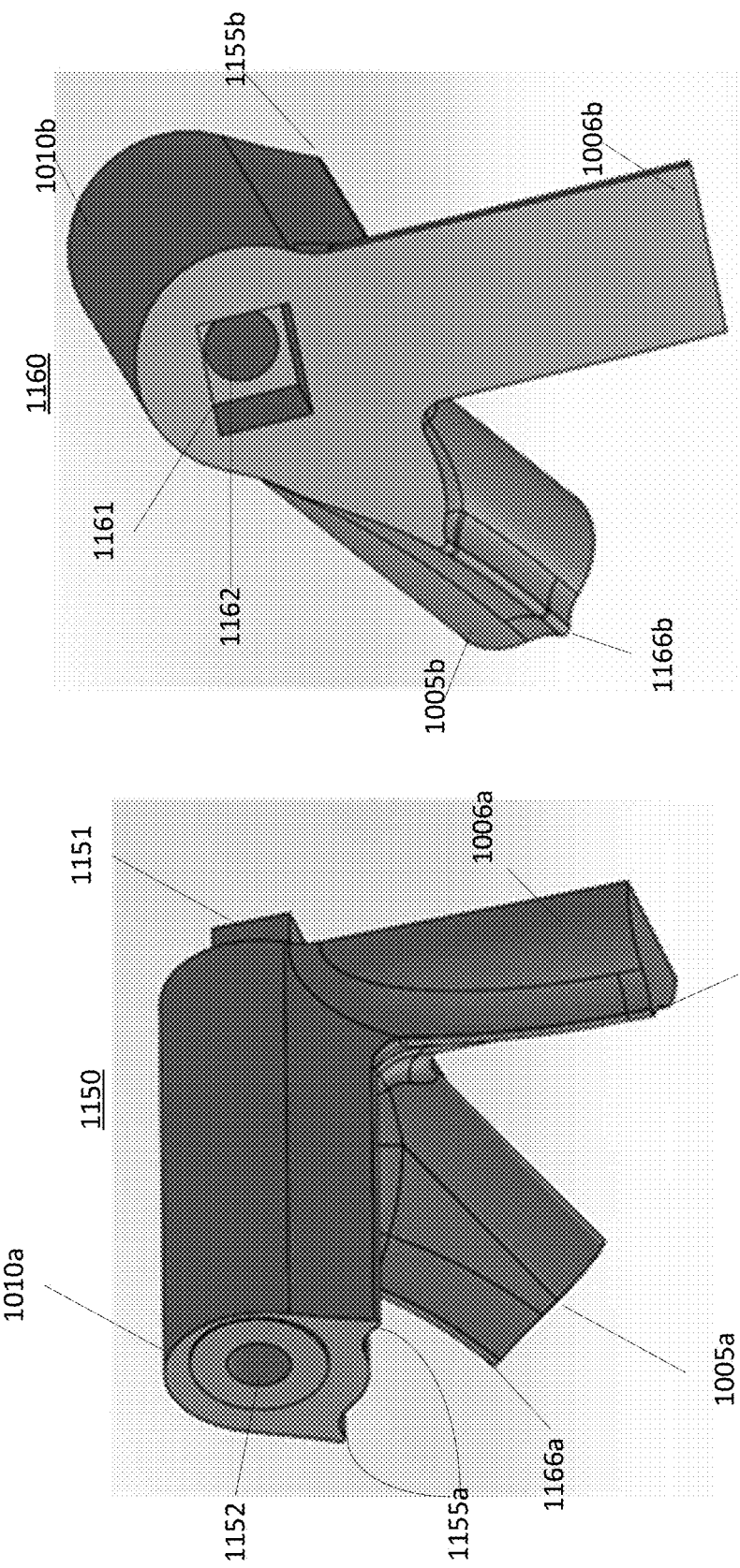

FIGS. 11E and 11F illustrate perspective views of example components of the center mold 1003. In particular embodiments, the center mold 1003 may have two components that may be separately manufactured (e.g., via 3D printing). FIG. 11E illustrates one of the two components, which will be referred to as the left component 1150, and FIG. 11F illustrates the other component, which will be referred to as the right component 1160. In particular embodiments, the left 1150 and right 1160 components may be assembled together to form the center mold 1003. In particular embodiments, the left component 1150 may have a protruding peg 1151 located on the surface that is designed to interface with the right component 1160. To receive the protruding peg 1151, the right component 1160 may have a similarly shaped cavity 1161 on its surface designed to interface with the left component 1150. In particular embodiments, the protruding peg 1151 and the corresponding cavity 1161 may be a geometric shape with angles, such as a square (as shown), a triangle, a star, or any other shape, to facilitate alignment. In particular embodiments, the left 1150 and right 1160 components of the center mold 1003 comprise the aforementioned tubular portion 1010 of the center mold 1003. As discussed above, in particular embodiments, the tubular portion 1010 may have a hole (as shown by the openings 1152 and 1162) extending along the length of the tubular portion 1010 so that a rod may be inserted for pressing leverage. In particular embodiments, the hole may extend through the peg 1151 and its corresponding cavity 1162.

As discussed above, the center mold 1003 may have (1) tubular portions 1010 for forming side slots, (2) tubular portions 1005 for forming apex slots, and (3) tubular portion 1006 for forming a center slot. In the embodiment shown in FIGS. 11E and 11F, the left 1150 and right 1160 components each has (1) one of the tubular portions 1010*a* and 1010*b*, (2) one of the tubular portions 1005*a* and 1005*b*, and (3) one of the halves (represented by 1006*a* and 1006*b*) of the tubular portion 1006. In particular embodiments, the tubular portions (e.g., 1010*a*, 1010*b*, 1005*a*, 1005*b*, 1006*a* and 1006*b*) may have "lips." For instance, each of the tubular portions 1010*a* and 1010*b* may have downward lips 1155*a* and 1155*b*, respectively, to curve the flap 962 downwards. As another example, the tubular portions 1005*a* and 1005*b* may have lips 1166*a* and 1166*b*, respectively, for guiding the carbon-fiber material to, e.g., transition smoothly and/or improving manufacturing consistency. Similarly, the tubular portions 1006*a* and 1006*b* may have lips (e.g., portion 1006*a* may have lip 1156; portion 1006*b*'s lip may be hidden from view) serving a similar functional purpose. The lips guide portions of the carbon-fiber material corresponding to the female 901 and male 902 halves to lay against each other (e.g., 961 and 962 in FIG. 9B; 981 and 982 in FIG. 9B; 993 and 994 in FIG. 9E). This creates abutting surface areas between the two halves. The continuous contours of the female 901 and male 902 halves of the base joint 301 resulting from being guided by the lips may help reduce negative draft when the halves are being removed from their molds.

Figure 12A:
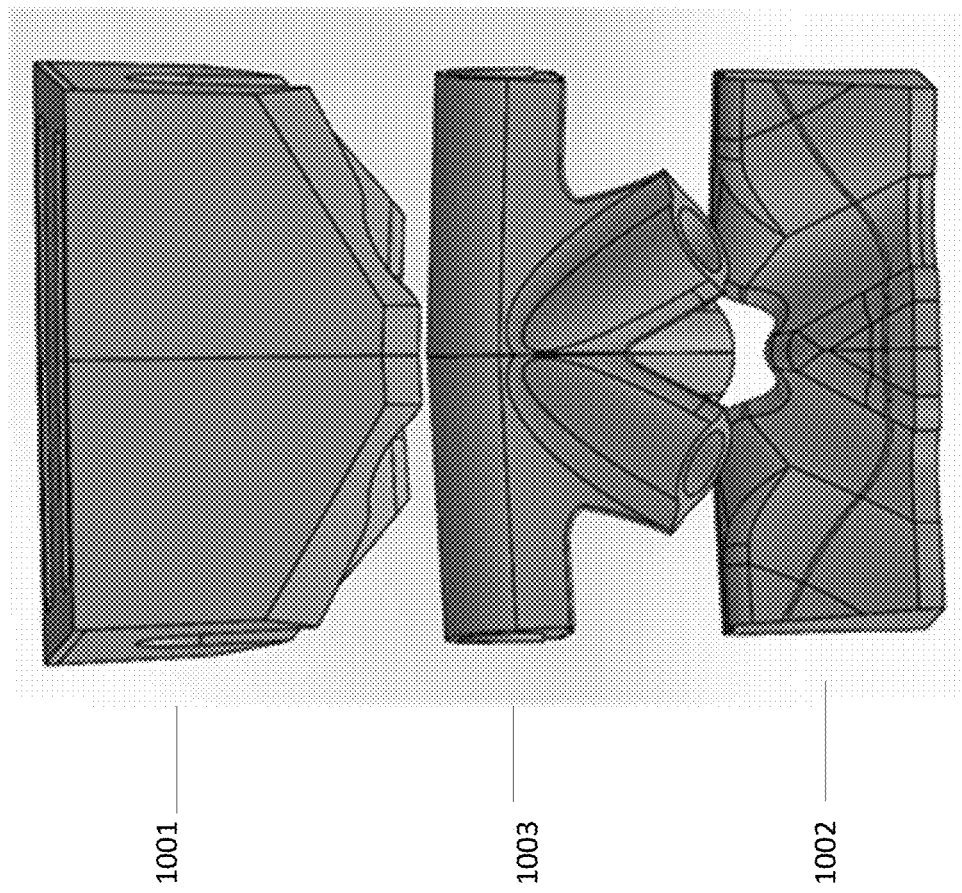
FIGS. 12A-D illustrate examples of isometric configurations of molds used for manufacturing a mainframe's base joint.
Figure 12B:
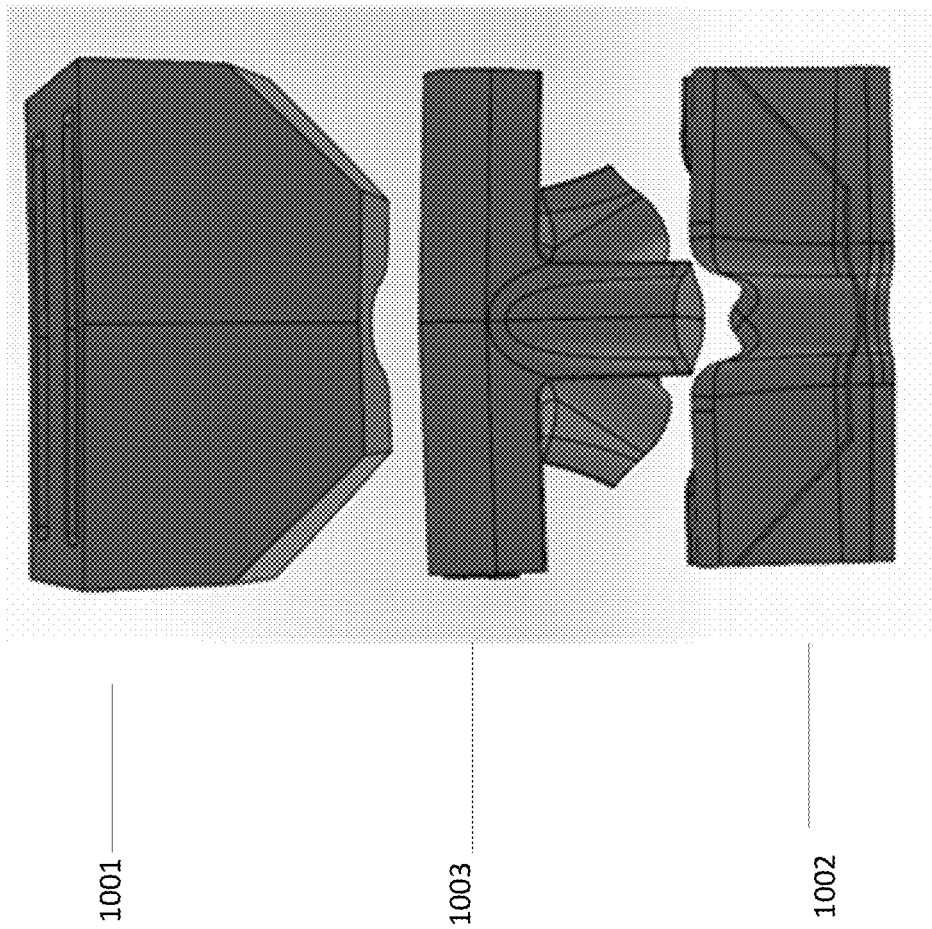
Figure 12C:
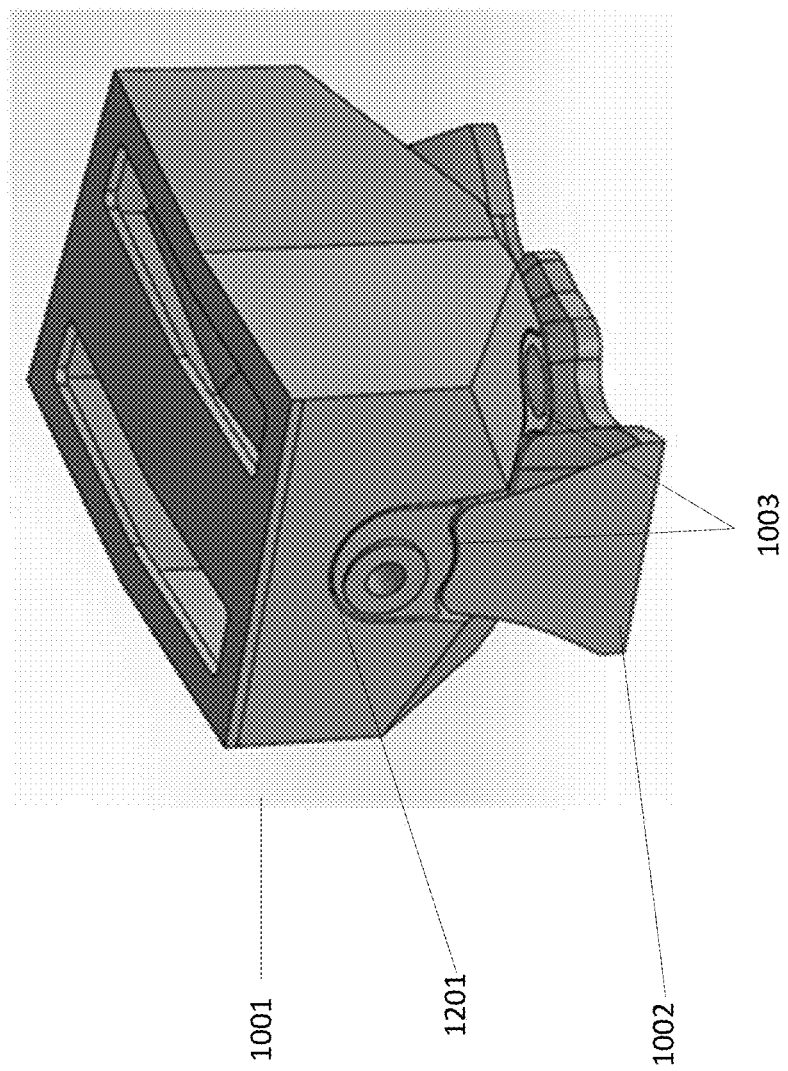
Figure 12D:
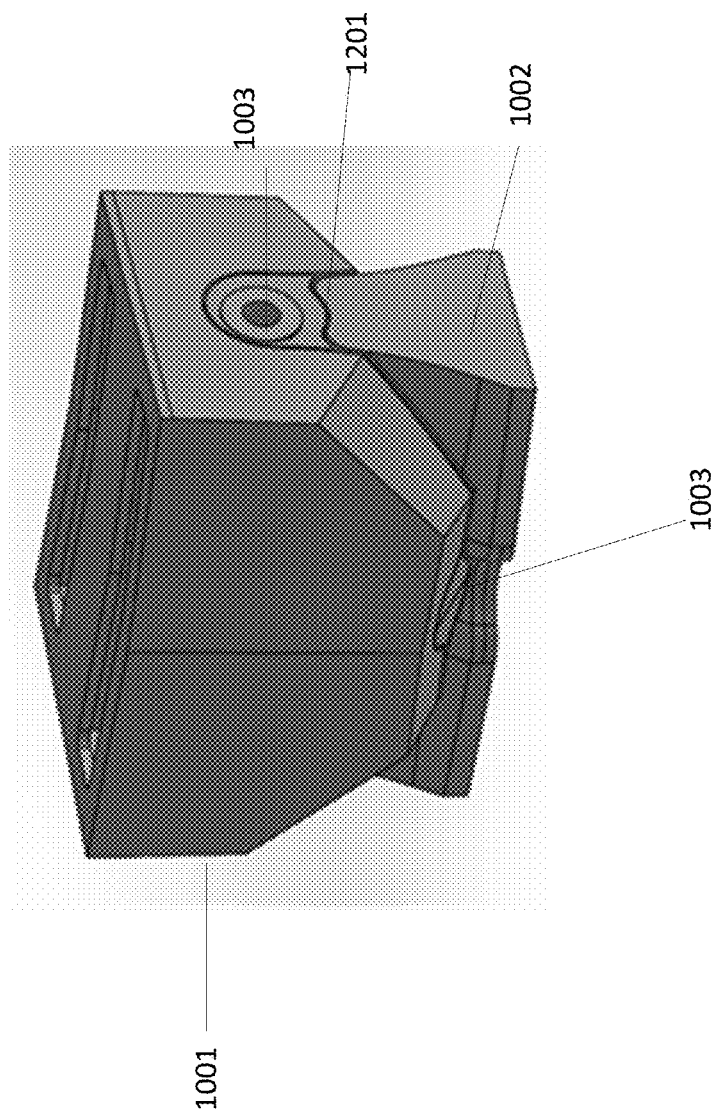

FIGS. 12A-12D illustrate example isometric configurations of molds used for manufacturing of a mainframe's base joint. FIGS. 12A and 12B illustrate exploded views of the female exterior mold 1001, center mold 1003, and male exterior mold 1002 from opposite sides. FIGS. 12C and 12D illustrate perspective views of the molds 1001-1003 once they are assembled together. Referring to FIG. 12C, due to the center mold 1003, when the carbon-fiber materials are pressed against each other, slots may be formed for receiving connectors/rods (as evident from the center mold 1003 being visible in the assembled views). The aforementioned lips (e.g., 1155*a*, 1155*b*, 1166*a*, 1166*b*, and 1156) guide the carbon-fiber layers of the female 901 and male 902 halves through a common, continuous channel 1201.

Figure 13A:
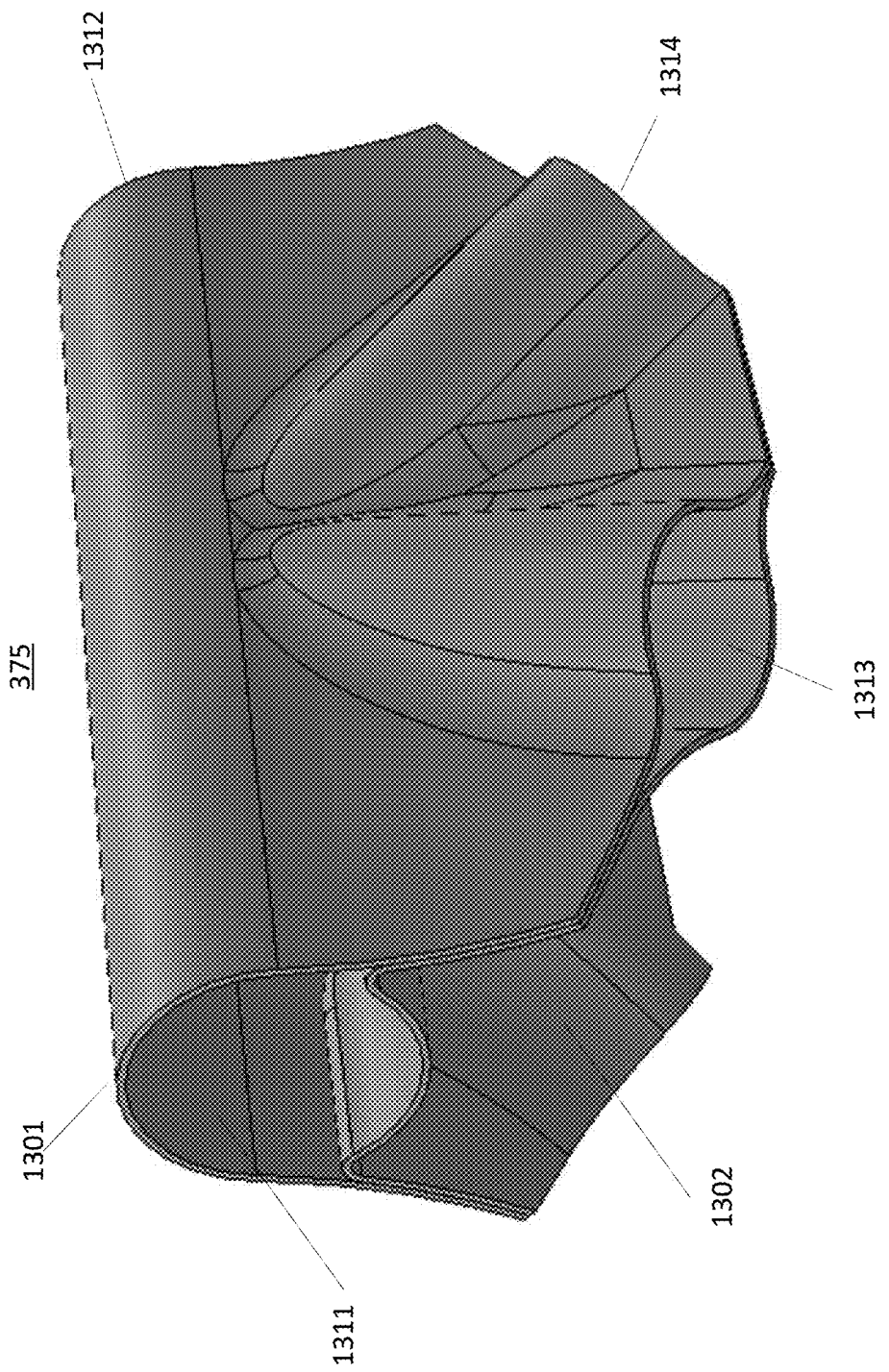
FIGS. 13A-B illustrate an example of an apex joint used for constructing a gangway's pyramid structure.
Figure 13B:
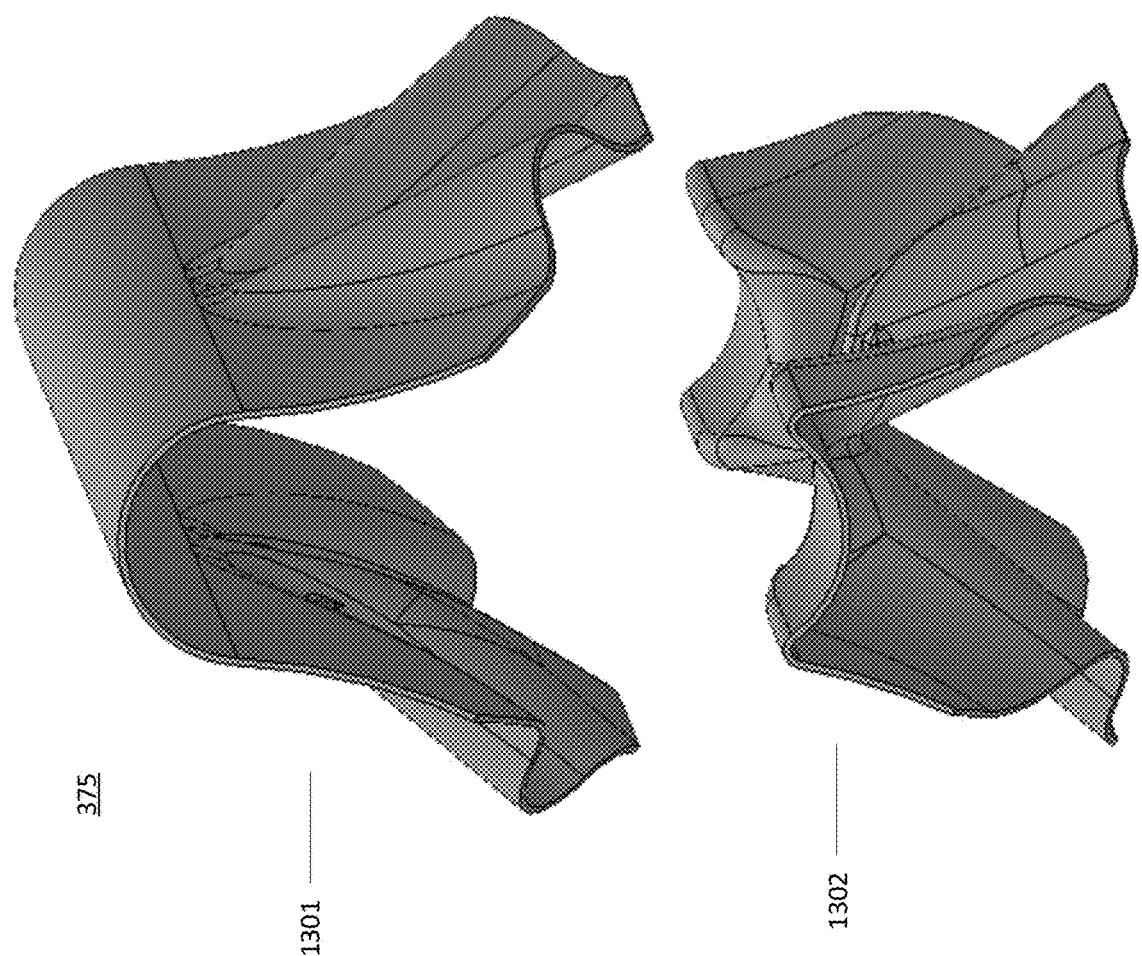

FIGS. 13A-13B illustrate an example of an apex joint 375 used for constructing a gangway's pyramid structure, such as the one as shown in FIGS. 3B and 3D. The apex joint 375 of the gangway's pyramid structure is similar to the apex joint 305 of the mainframe's pyramid structure. The apex joint 375 has a female half 1301 and a male half 1302. When assembled, the female 1301 and male 1302 halves form six slot for connecting to other joints. Four of the slot openings are apex-to-base slots (slots 1313 and 1314 are shown; while the other two are hidden from view, they are symmetrical to slots 1313 and 1314). The other two slot openings, 1311 and 1312, are apex-to-apex slots. While these apex-to-apex slots are similar to those of a mainframe's apex joint 305, they are different in that their axes are aligned to form a straight, continuous opening through which a single connector (e.g., connector 290, as shown in FIG. 2B) may pass. FIG. 13B illustrates an exploded view of the apex joint 375. Features of the separate halves 1301 and 1302 are similar to that of the mainframe's apex joint 305 and, therefore, would not be repeated for brevity.

Figure 14A:
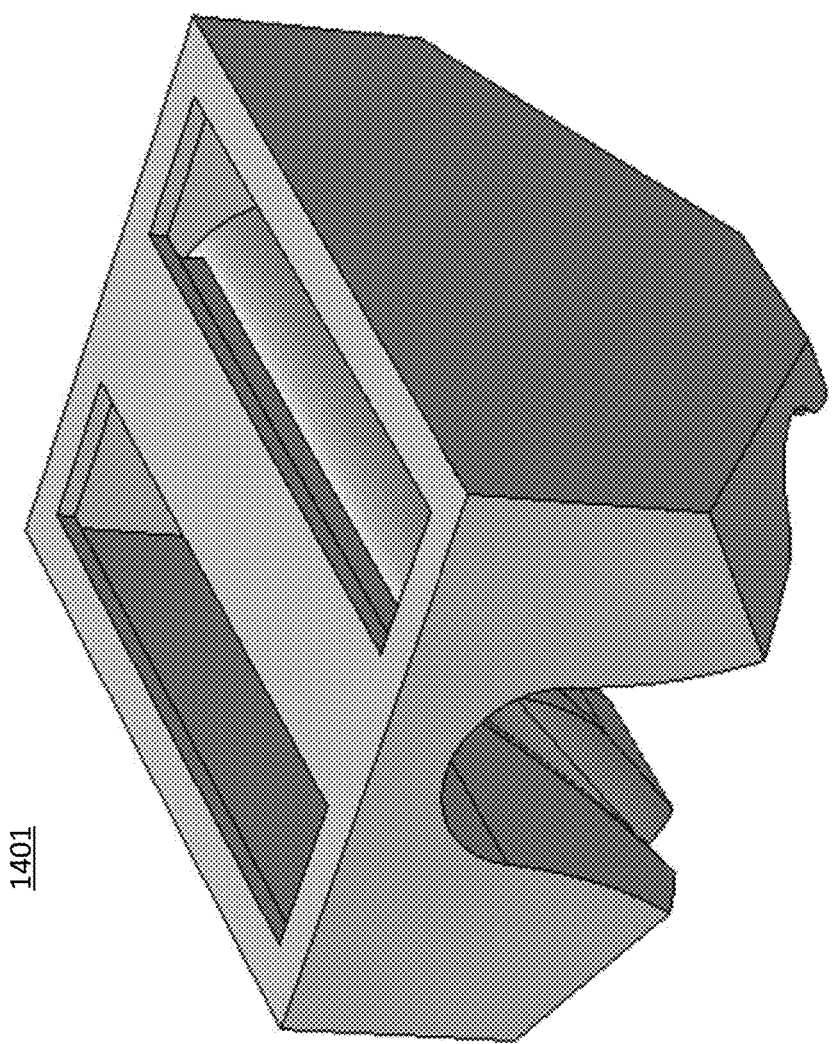
FIGS. 14A-F illustrate examples of molds used for manufacturing a gangway's apex joint.
Figure 14B:
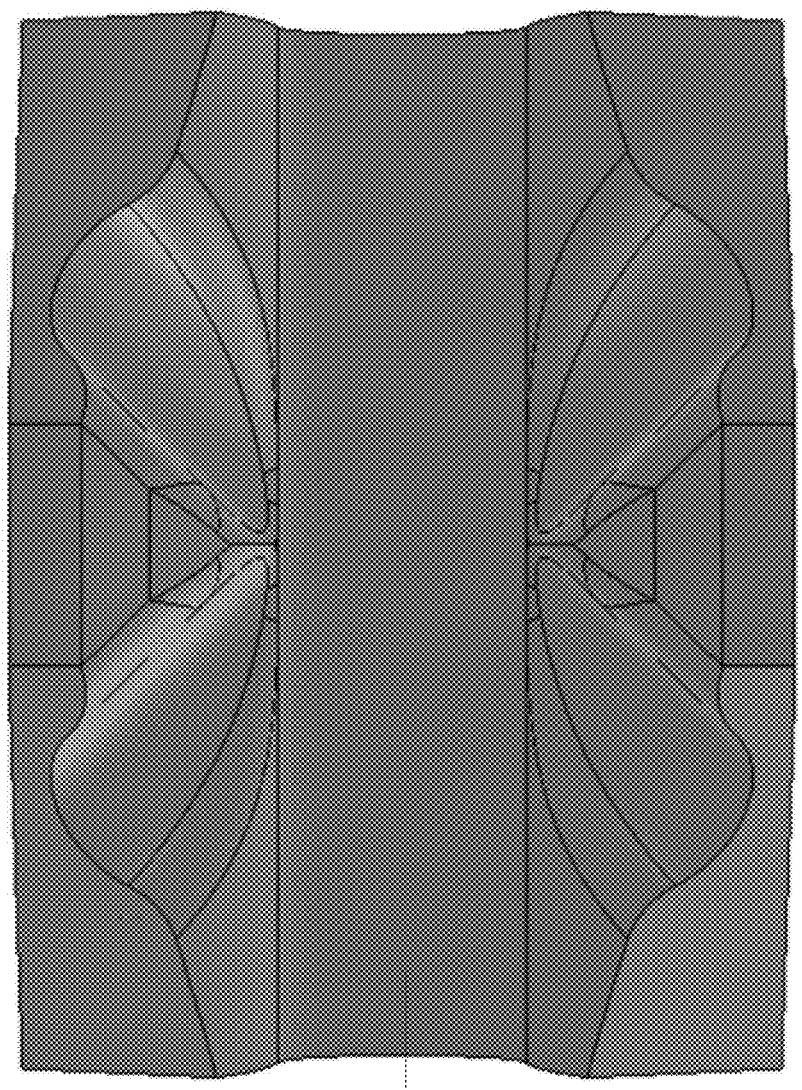
Figure 14C:
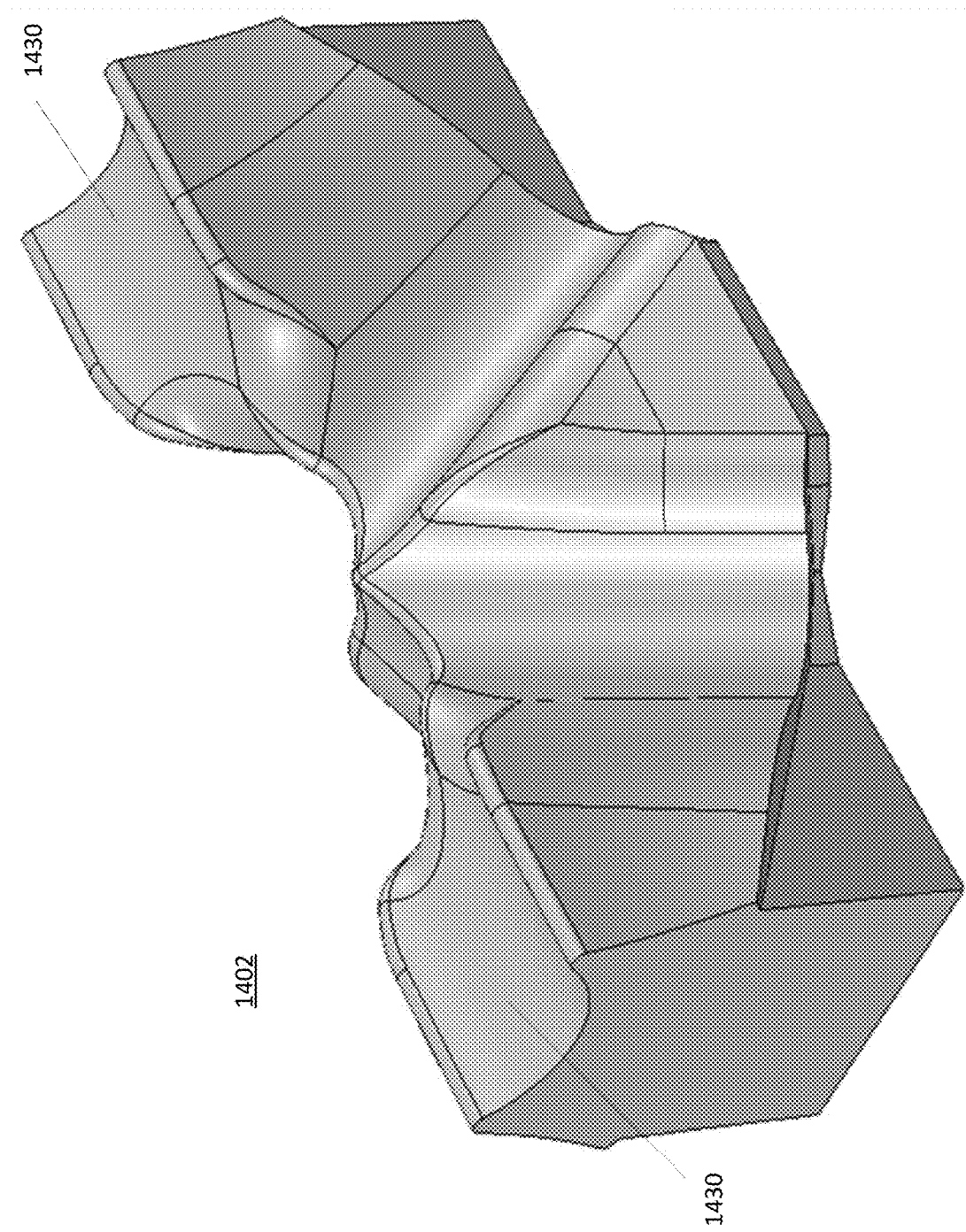
Figure 14D:
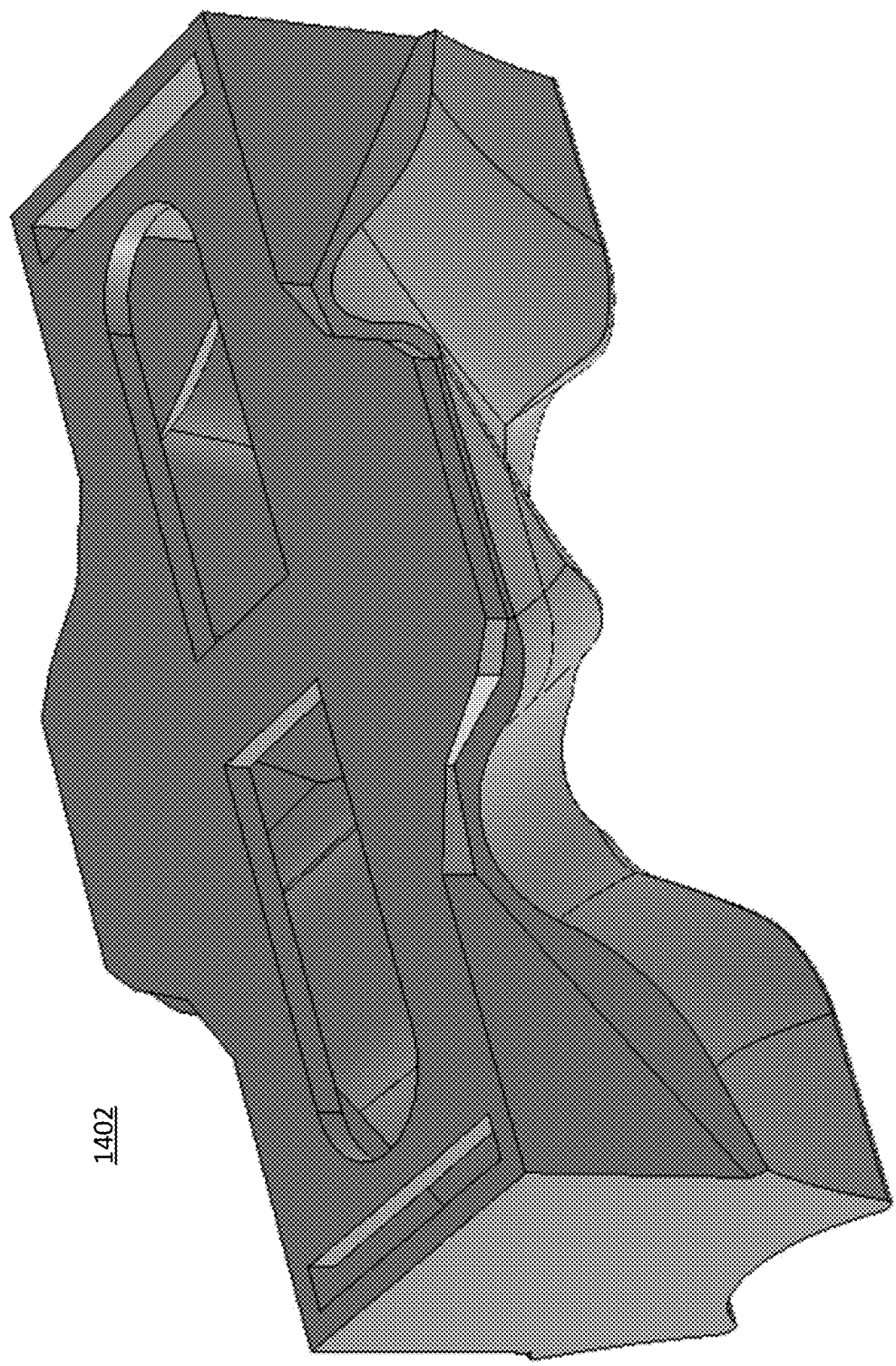
Figure 14E:
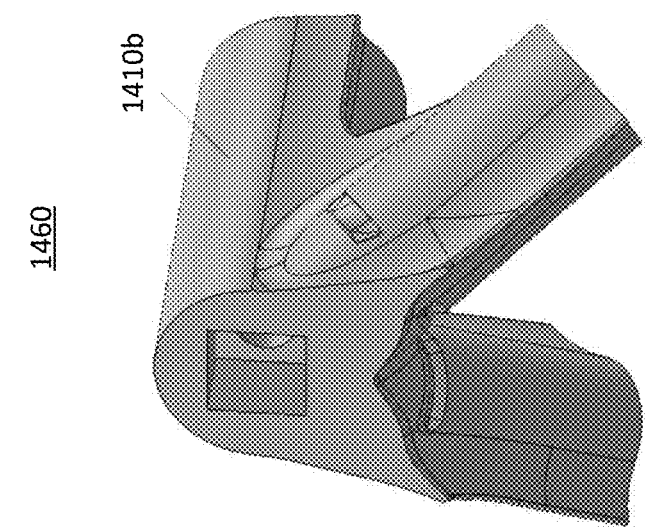
Figure 14F:
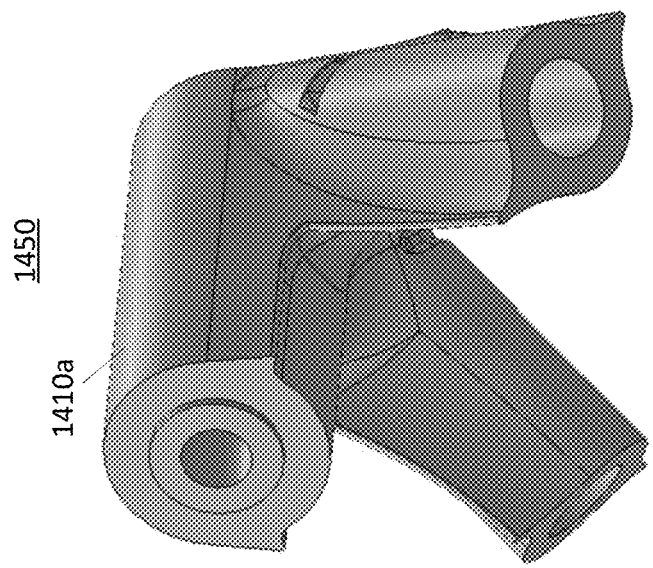

FIGS. 14A-14F illustrate examples of molds for a gangway's apex joint 375. Features of the molds are similar to that of the molds for the mainframe's apex joint 305 (e.g., as shown in FIGS. 7A-7F). The primary difference is that the molds for the gangway's apex joint 375 are configured to create apex-to-apex slots that are straight with respect to each other, as described above. For example, FIGS. 14A and 14B respectively illustrate a perspective view and a bottom view of a female exterior mold 1401 for the apex joint 375 of a gangway. As shown in FIG. 14B, the female exterior mold 1401 for the gangway's apex joint 375 may have an interior concave surface 1410 that defines the exterior contour of the top portion of the female half 1301 of the apex joint 375. The interior concave surface 1410 is substantially straight across the mold. In contrast, the interior concave surface 710 (see FIG. 7B) of the female exterior mold 601 for the mainframe's apex joint 305 have two separate segments that are slightly angled with respect to one another. The exterior male mold 1402 for the gangway's apex joint 375, as shown in FIG. 14C (perspective view) and FIG. 14D (bottom view) may also be configured to create aligned apex-to-apex slots. For instance, the two ends of the exterior male mold 1402 may have an interior concave surface 1430 (it is "interior" relative to the interior space where carbon-fiber material is pressed) that defines the exterior contour of the top portion of the male half 1302 of the apex joint. The interior concave surface 1430 of each end may be level with the other. FIGS. 14E and 14F show, respectively, that the center mold 1403 of the gangway's apex joint 375 may have a left component 1450 and right component 1460. Tubular portions 1410a and 1410b of the left 1450 and right 1460 components, respectively, may define a straight tubular interior for the apex-to-apex slots. The process for using these molds to create an apex joint 375 for the gangway is similar to the process for creating an apex joint 305 for the mainframe. For instance, similar to the configuration and process shown in FIGS. 6A-6C, the female exterior mold 1401, the center mold 1403, and the male exterior mold 1402 may be used to press carbon fiber material between them to form a female half 1301 and a male half 1302 of an apex joint 375. The female half 1301 may be formed between the female exterior mold 1401 and the center mold 1403, and the male half 1302 may be formed between the center mold 1403 and the male exterior mold 1402.

FIGS. 15A-15G illustrate an example of a base joint 1500 of a gangway's pyramid structure (e.g., see FIG. 3D, label 343). A gangway's pyramid structure 343 may be configured to be adjacent to geodesic structures, as shown in FIG. 3D. As such, in the embodiment of a gangway's base joint 1500, the base joint 1500 contains seven slots to support two adjoining gangway pyramids the adjoining geodesic structure. The base-to-base slots 1501, 1502, and 1503 are configured to support connectors that form the bases of the two adjoining gangway pyramids, which will be referred to as gangway pyramid A and B. In particular, slot 1502 is used for forming a side that is shared between the bases of the adjoining gangway pyramids A and B, and slots 1501 and 1503 are used for forming, respectively, the two adjoining gangway pyramids' sides that are on the same side of the gangway. The base-to-apex slots 1506 and 1507 are used to connect the base joint 1500 to the apexes of the two adjoining gangway pyramids, respectively. For example, slot 1506 may be used to connect to pyramid A's apex, and slot 1507 may be used to connect to pyramid B's apex. The base joint 1500 may also have base-to-geodesic slots 1504 and 1505 for connecting the base joint 1500 to the adjoining geodesic structure. The geodesic structure may be configured to form multiple "X" patterns (see FIGS. 3C and 3D). The base-to-geodesic slots 1504 and 1505 may be configured to receive connectors that from different "X" patterns. For example, slot 1504 may be used to connect to the bottom of the "\" portion of one "X" pattern, and slot 1505 may be used to connect to the bottom of the "I" portion of another "X" pattern. The slots 1501-1505 are all substantially on the same plane. The base-to-apex slots 1506 and 1507 for forming a side of a pyramid, on the other hand, are configured to form an angle from that plane.

In particular embodiments, the base joint 1500 of a gangway's pyramid structure may be constructed using three pieces: a base-and-geodesic piece 1510, a base-and-apex piece 1520, and an apex-and-geodesic piece 1530. The base slots 1501 and 1503 may be formed using all three pieces. The base slot 1502 may be formed using the base-and-geodesic piece 1510 and base-and-apex piece 1520. The base-to-apex slots 1506 and 1507 are formed using the base-and-apex piece 1520 and apex-and-geodesic piece 1530. The base-to-geodesic slots 1504 and 1505 are formed using the base-and-geodesic piece 1510 and apex-and-geodesic piece 1530. Each of the three pieces 1510, 1520, 1530 include concave interior surfaces (interior relative to the assembled base joint 1510) that, when placed together, form the slots 1501-1507.

Figure 15A:
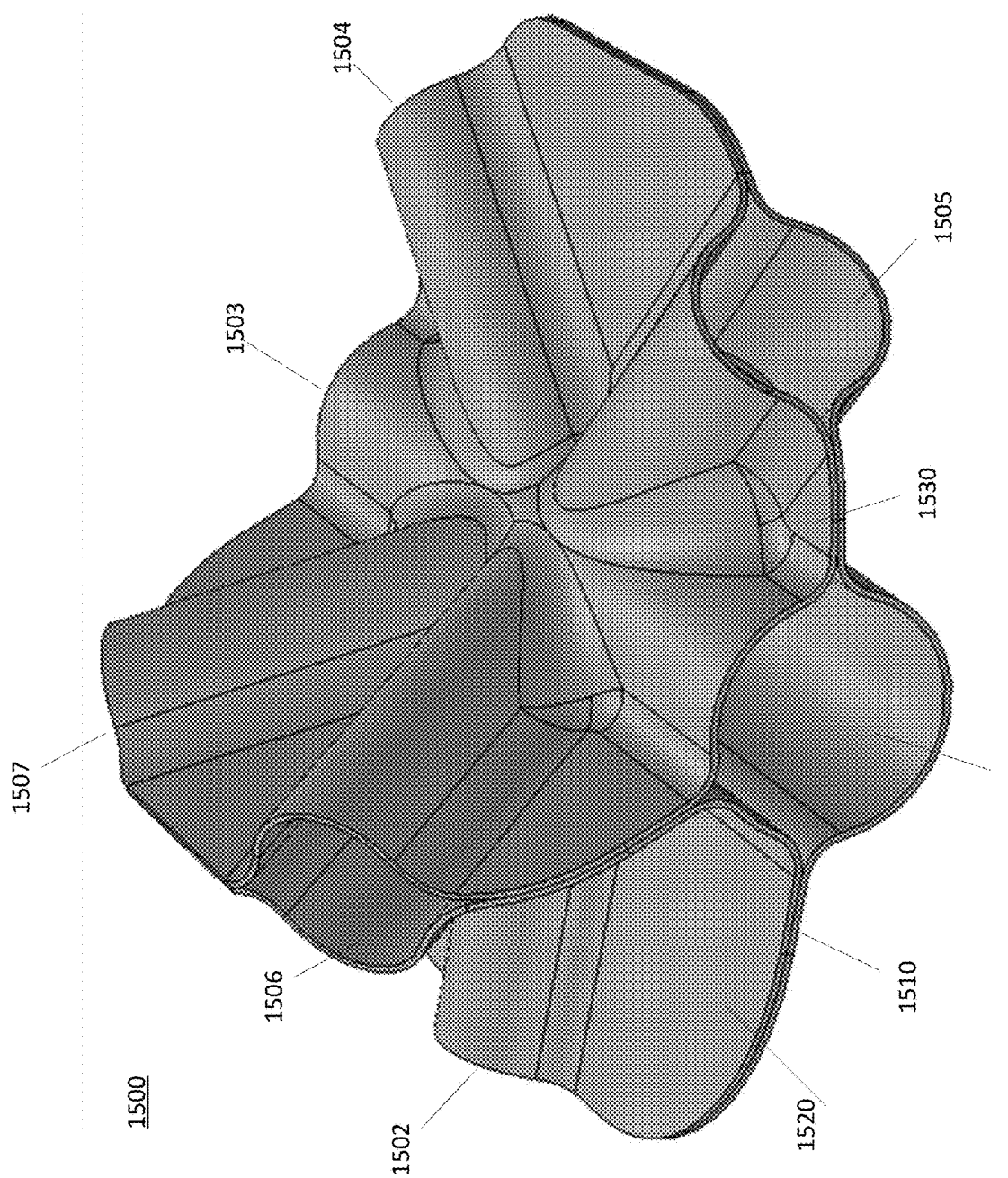
FIGS. 15A-15G illustrate an example of a base joint of a gangway's pyramid structure.
Figure 15B:
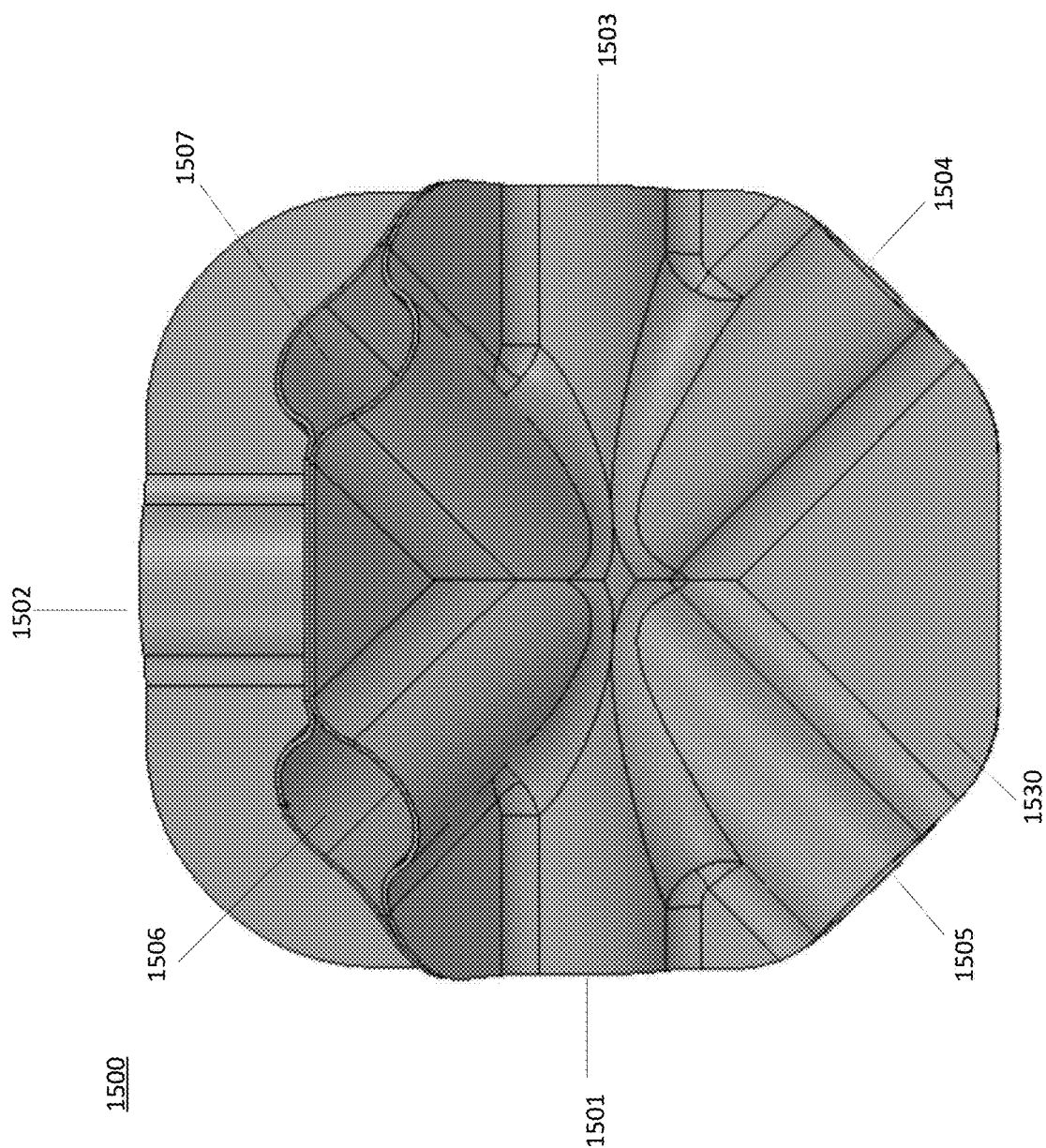

FIG. 15B illustrates a top view of the base joint 1500. From this angle, only the base-and-apex piece 1520 and apex-and-geodesic piece 1530 are clearly visible. From this view, one of ordinary skill in the art should appreciate that the base-and-apex piece 1520 includes interior concave surfaces that form the slots 1502, 1506, and 1507. The apex-and-geodesic piece 1530 includes interior concave surfaces that form the slots 1501 and 1503-1507. Non-concave portions of the two pieces 1520 and 1530 (e.g., the portions between slots 1503 and 1507, slots 1507 and 1506, and slots 1506 and 1501) may abut to form binding surfaces.

Figure 15C:
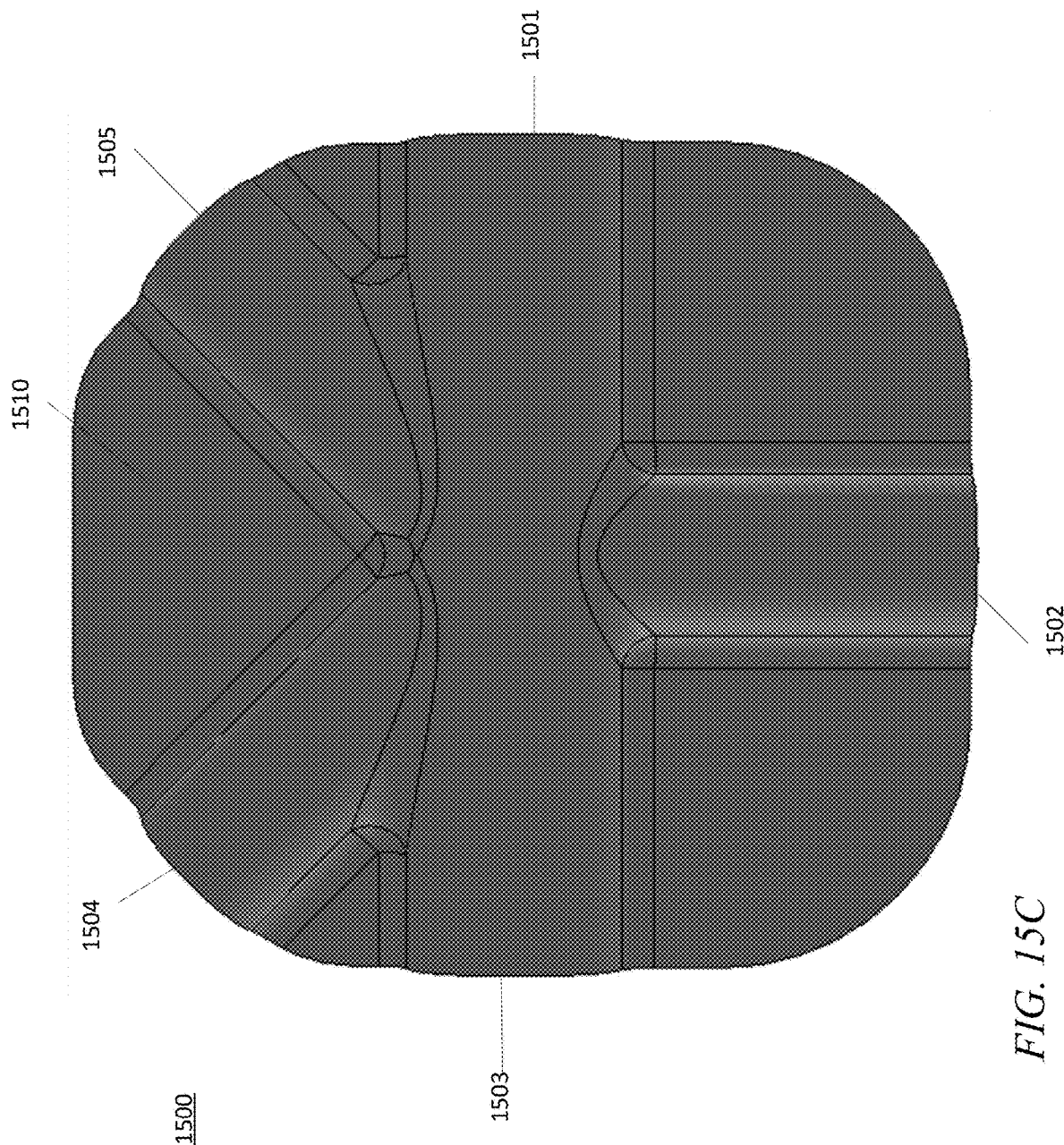

FIG. 15C illustrates a bottom view of the base joint 1500. From this angle, only the base-and-geodesic piece 1510 is visible. It should be appreciated that the base-and-geodesic piece 1510 may include interior concave surfaces that form slots 1501-1505. Non-concave portions of the piece 1510 (e.g., the portions between slots 1501 and 1502, slots 1502 and 1503, slots 1503 and 1504, slots 1504 and 1505, and slots 1505 and 1501) may abut corresponding portions of the base-and-apex piece 1520 and apex-and-geodesic piece 1530 to form binding surfaces.

Figure 15D:
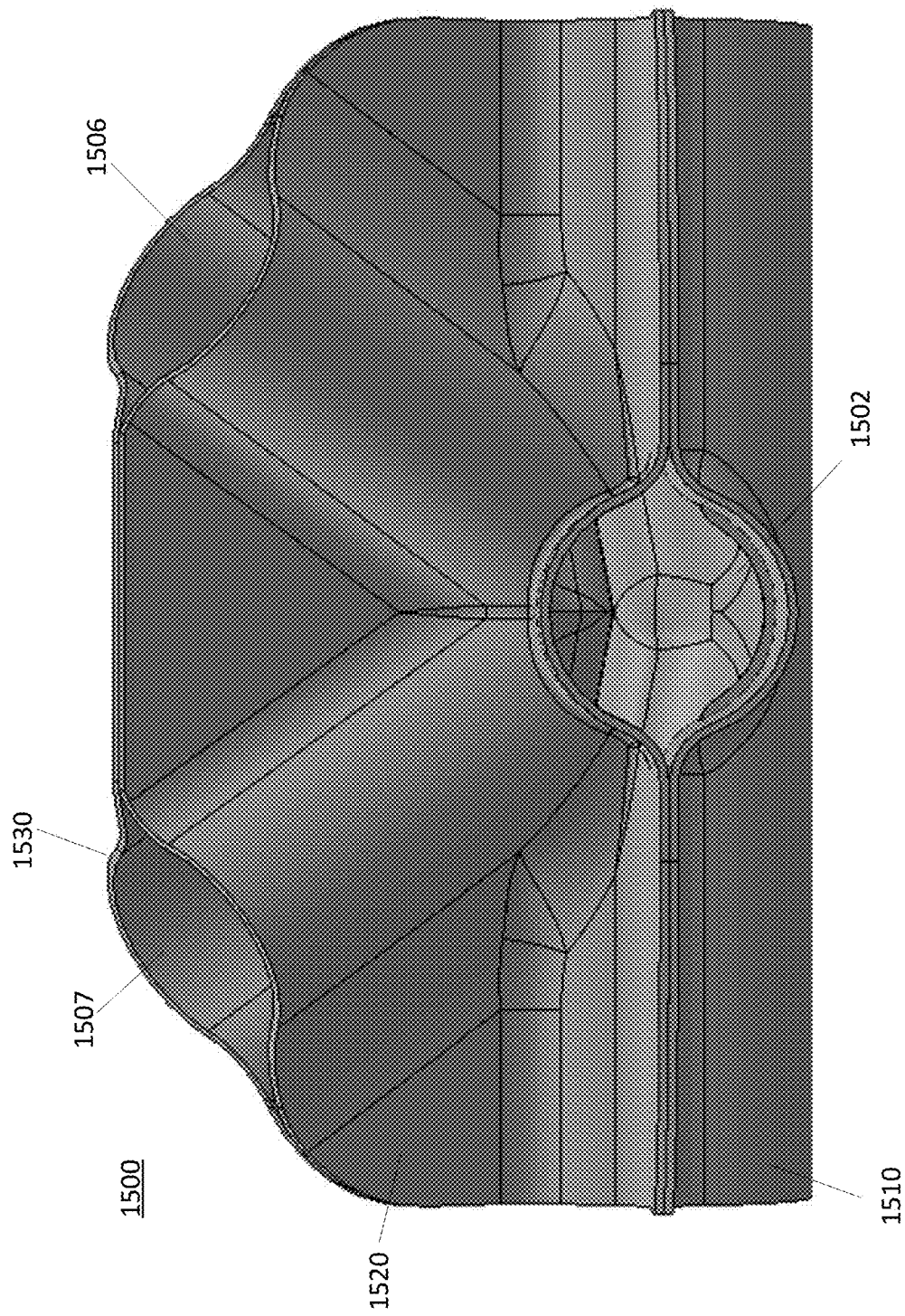

FIG. 15D illustrates a side view of the base joint 1500 where the base-to-base slot 1502 and base-to-apex slots 1506 and 1507 are positioned. From this view, the hollow interior of the base-to-base slot 1502 can be seen. The base-and-apex piece 1520 is configured to abut both the other pieces. The base-and-apex piece 1520 includes a portion that is substantially in the same plane as the base-and-geodesic piece 1510, and together they form the base-to-base slot 1502. The base-and-apex piece 1520 also includes a second portion that is at an angle to the base plane, and this portion is configured to abut a portion of the apex-and-geodesic piece 1530 to form the base-to-apex slots 1506 and 1507.

Figure 15E:
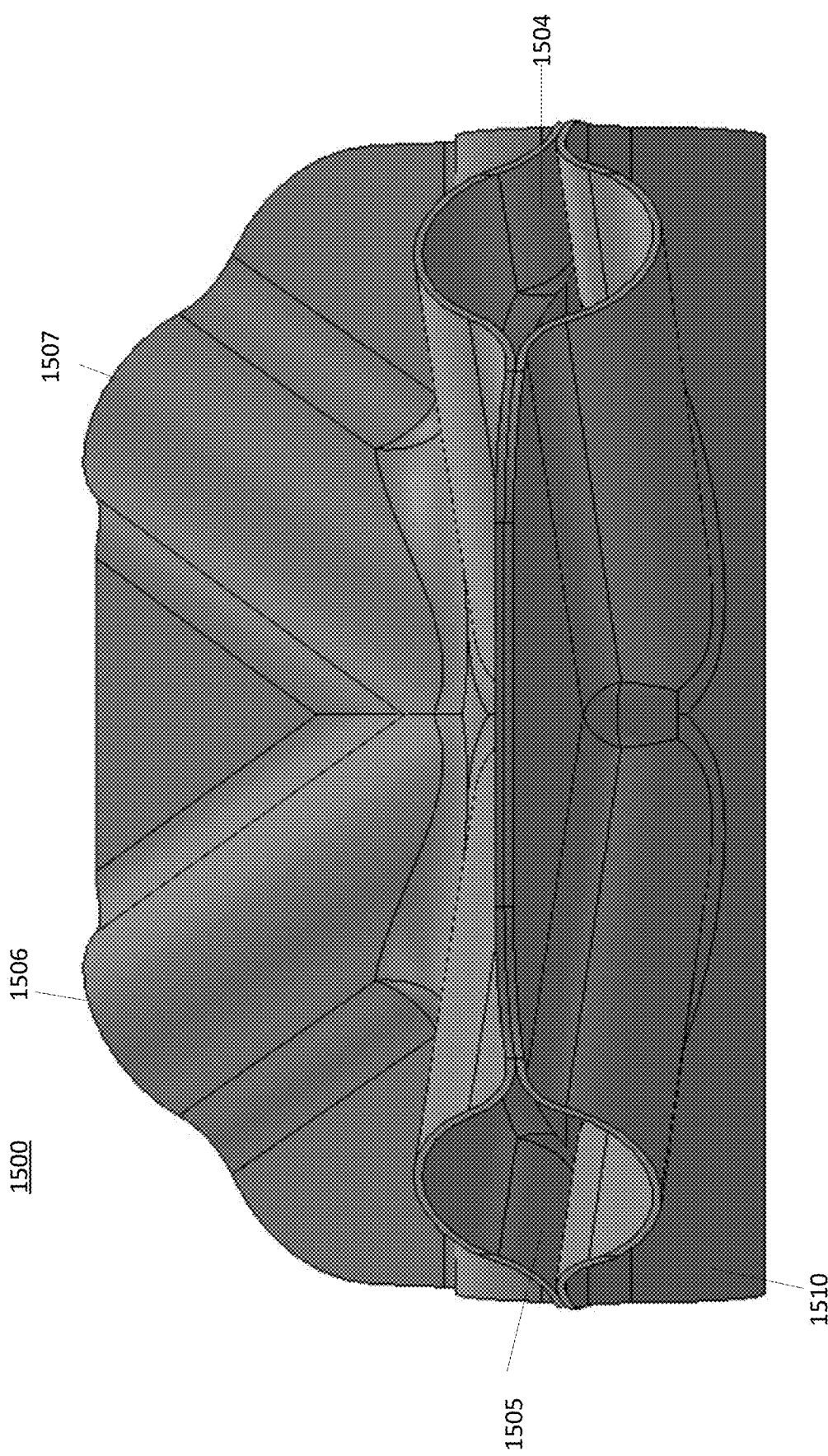

FIG. 15E illustrates another side view of the base joint 1500 opposite to the view shown in FIG. 15D. This angle shows the base-to-geodesic slots 1504 and 1505, as well as the back/top view of the base-to-apex slots 1506 and 1507. The apex-and-geodesic piece 1530 includes a portion that is substantially in the same plane as the base-and-geodesic piece 1510, and together they form the base-to-geodesic slots 1504 and 1505. The apex-and-geodesic piece 1530 also includes a second portion that is at an angle to the base plane, and this portion is configured to abut the aforementioned angled portion of the base-and-apex piece 1520 (not shown in FIG. 15E) to form the base-to-apex slots 1506 and 1507.

Figure 15F:
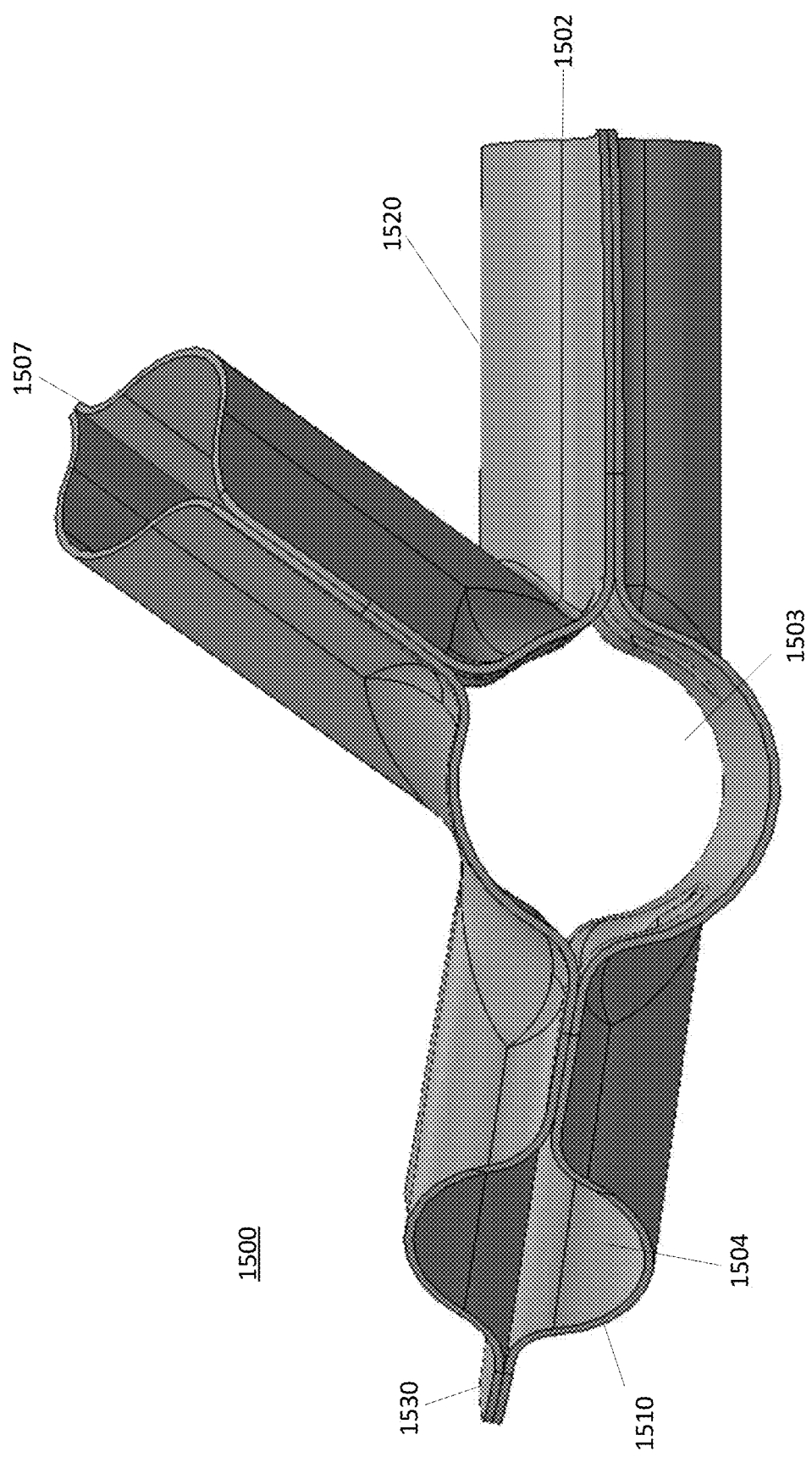

FIG. 15F illustrates yet another side view of the base joint 1500 where the base-to-base slot 1503 is positioned. The view from the opposite side where the base-to-base slot 1501 is positioned is not illustrated, as it is symmetrical to the view shown in FIG. 15F. From this angle, it can be seen that the hollow interior of the base-to-base slot 1503 extends through the body of the base joint 1500. Thus, in the embodiment shown, the base-to-base slot 1503 and 1501 are opposite ends of the same slot. A connector, therefore, may extend through the body of the base joint 1500 through this slot. In particular embodiments, the base-to-base slot 1503 (and similarly 1502) may be formed by all three of the base-and-geodesic piece 1510, base-and-apex piece 1520, and apex-and-geodesic piece 1530. An interior concave portion of the base-and-geodesic piece 1510 form roughly half of the base-to-base slot 1503. The other half may be formed by an interior concave portion of the base-and-apex piece 1520 and an interior concave portion of the apex-and-geodesic piece 1530. Since in the embodiment shown the angle between the slots 1507 and 1502 is relatively small compared to the angle between the slots 1507 and 1504, the interior concave portion of the base-and-apex piece 1520 is also relatively smaller than that of the apex-and-geodesic piece 1530.

Figure 15G:
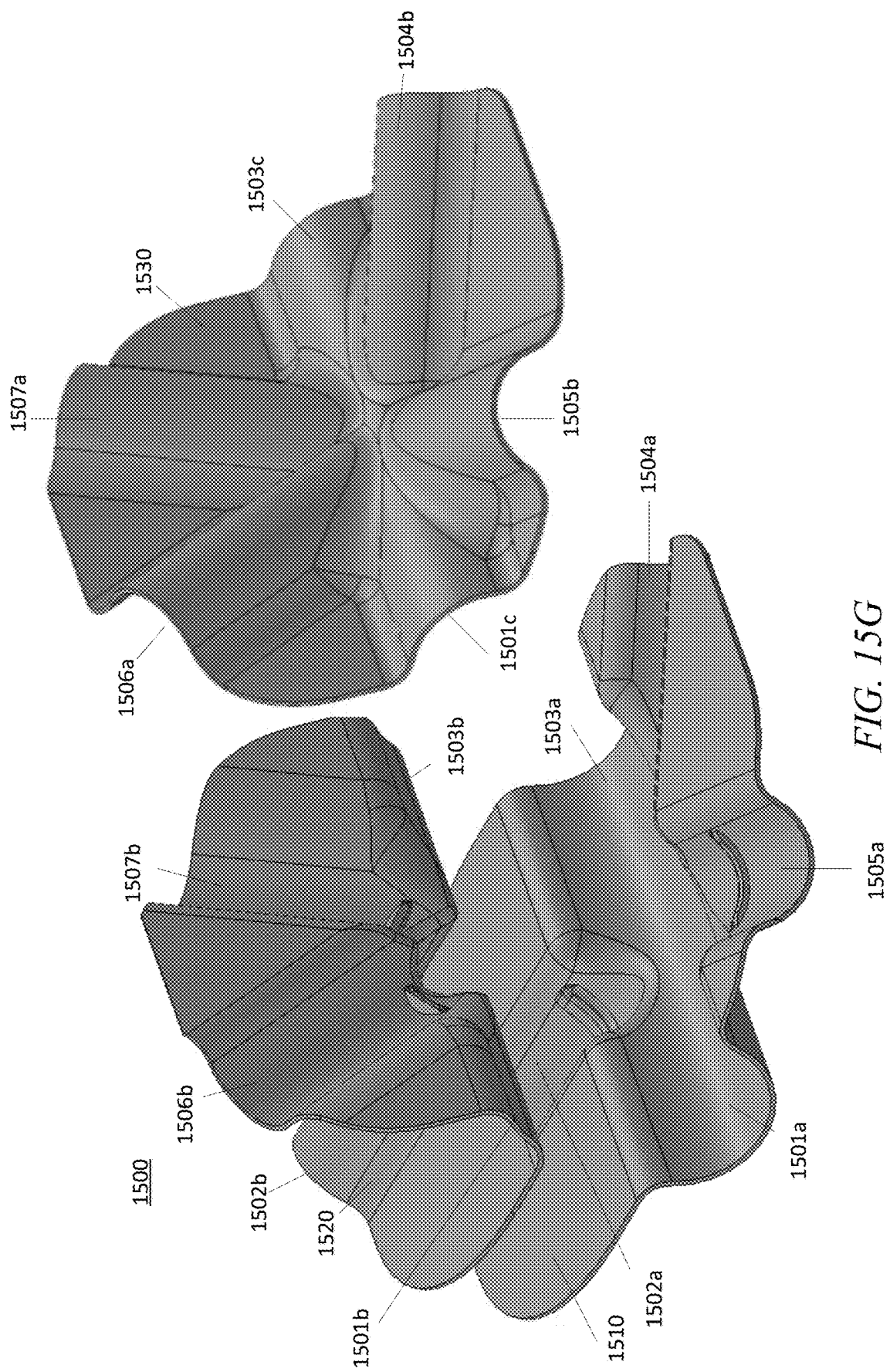

FIG. 15G illustrates an exploded view of the base joint 1500. Each of the pieces (i.e., 1510, 1520, and 1530) comprises interior concave surfaces for forming the aforementioned slots. In particular, slot 1501 is formed by the interior concave surfaces 1501*a*, 1501*b*, and 1501*c* of the pieces 1510, 1520, and 1530, respectively. Slot 1503 is formed by the interior concave surfaces 1503*a*, 1503*b*, and 1503*c* of the pieces 1510, 1520, and 1530, respectively. Slot 1502 is formed by the interior concave surfaces 1502*a* and 1502*b* of the pieces 1510 and 1520, respectively. Slot 1504 is formed by the interior concave surfaces 1504*a* and 1504*b* of the pieces 1510 and 1530, respectively. Slot 1505 is formed by the interior concave surfaces 1505*a* and 1505*b* of the pieces 1510 and 1530, respectively. Slot 1506 is formed by the interior concave surfaces 1506*a* and 1506*b* of the pieces 1530 and 1520, respectively. Slot 1507 is formed by the interior concave surfaces 1507*a* and 1507*b* of the pieces 1530 and 1520, respectively. As previously described, for each piece, the portions between the interior concave surfaces for forming slots may be substantially flat and configured to abut corresponding portions of other pieces. The surface area of the abutting surfaces is made sufficiently large to strengthen the bond between the pieces. Bonding agents such as liquid adhesives and/or conventional fasteners (e.g., nuts and bolts) may be used in particular embodiments.

Figure 16A:
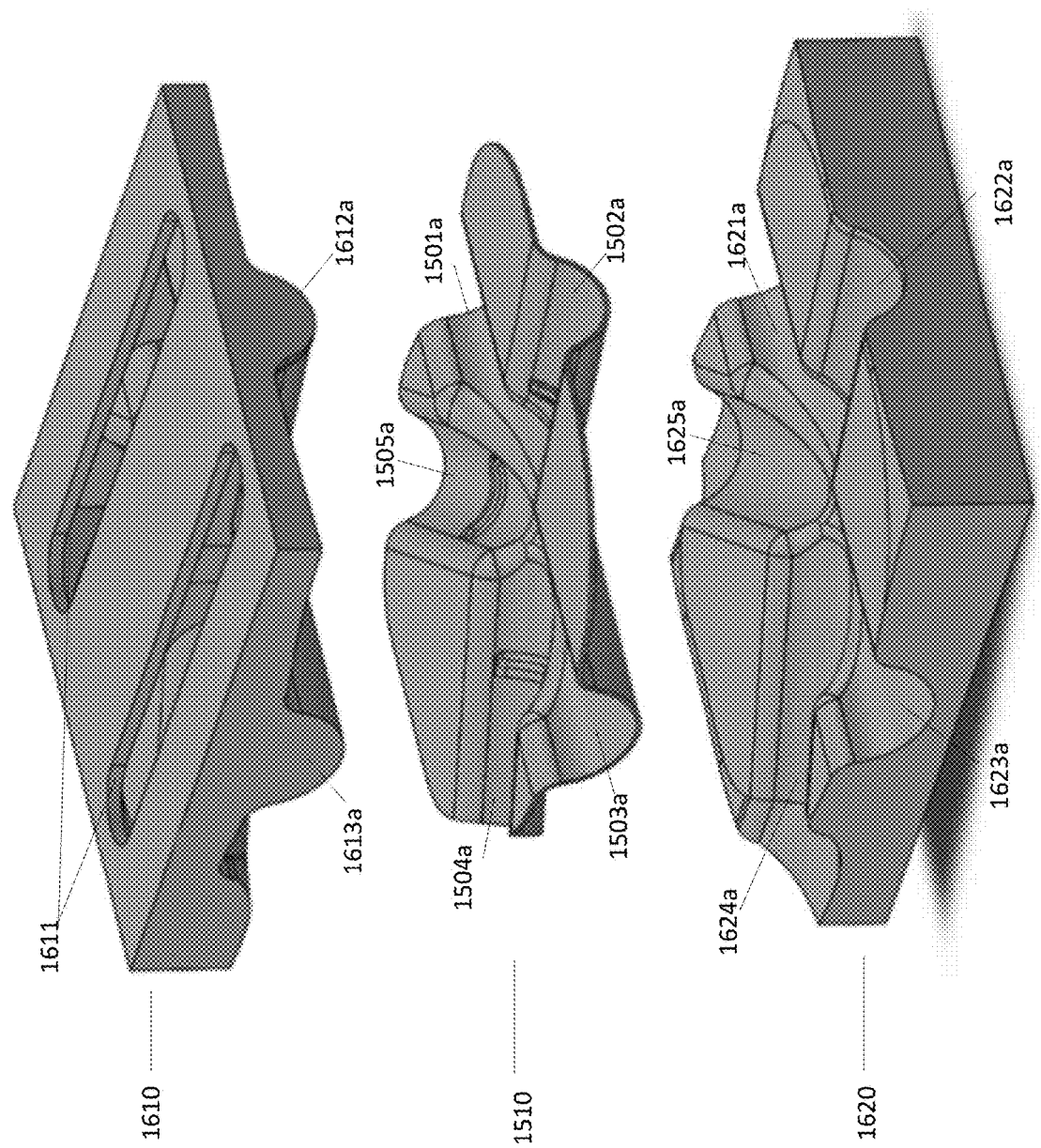
FIGS. 16A-16B illustrate an example of molds used for manufacturing a base-and-geodesic piece of a base joint of a gangway's pyramid structure.
Figure 16B:
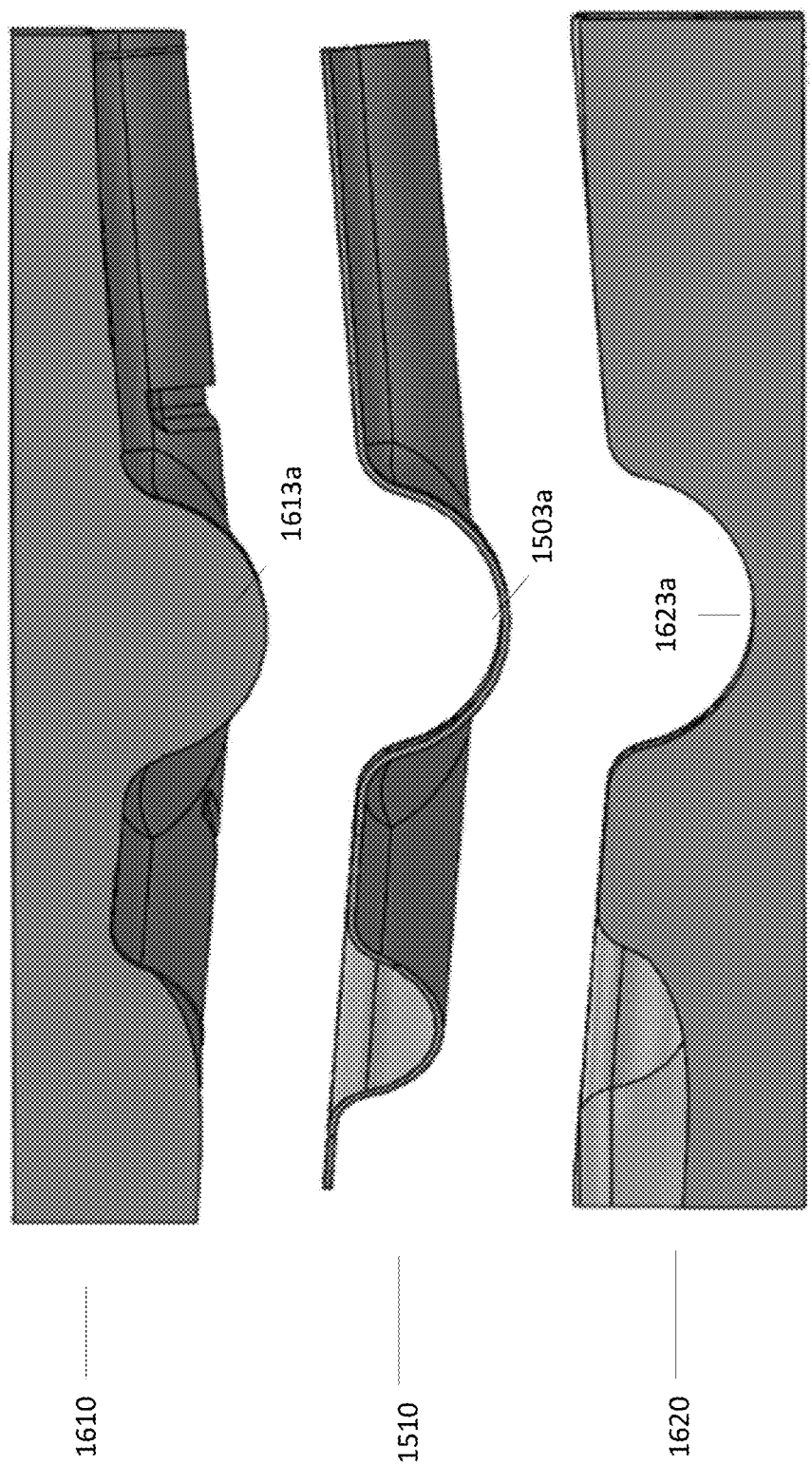
Figure 17A:
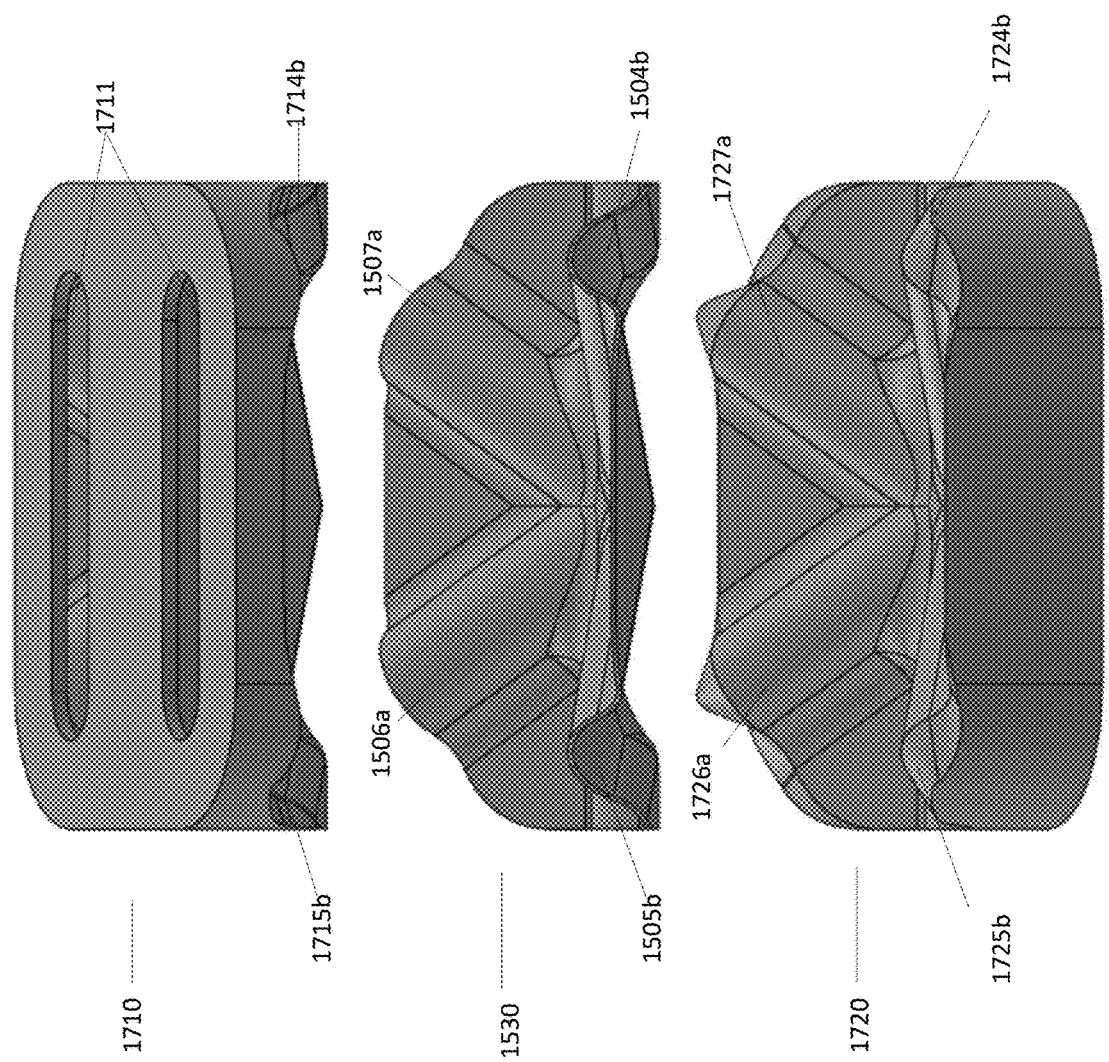
FIGS. 17A-17B illustrate an example of molds used for manufacturing an apex-and-geodesic piece of a base joint of a gangway's pyramid structure.
Figure 17B:
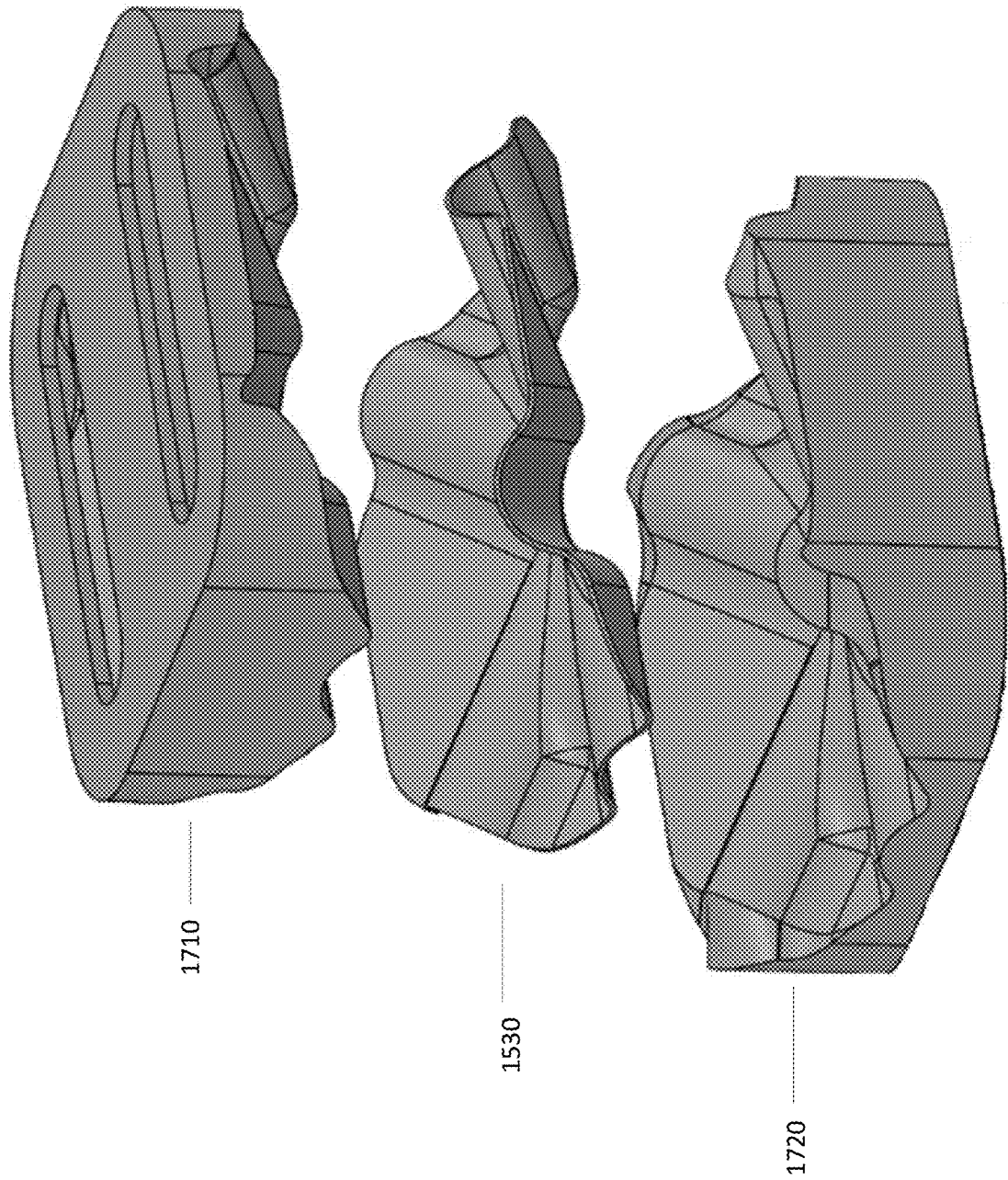

FIGS. 16A-16B illustrate an embodiment of molds used for manufacturing the base-and-geodesic piece 1510. In particular embodiments, the mold assembly may include a male mold 1610 and a female mold 1620. An example of the molds is shown in FIG. 16A. The two molds may be used to press against a carbon-fiber twill placed between them to create the base-and-geodesic piece 1510. The contours of the male mold 1610 may form the interior surface of the base-and-geodesic piece 1510, and the contours of the female mold 1620 may form the exterior surface of the base-and-geodesic piece 1510. For example, FIG. 16B illustrates a side view of the same assembly shown in FIG. 16A. It should be appreciated that protruding contour 1613*a* of the male mold 1610 and the concave contour 1623*a* of the female mold 1620, when pressed together, would form the contour 1503*a* of the base-and-geodesic piece 1510. As another example, protruding contour 1612*a* of the male mold 1610 and the concave contour 1622*a* of the female mold 1620, when pressed together, would form the contour 1502*a* of the base-and-geodesic piece 1510. Similarly, the contour of other portions of the piece 1510 may be defined by the corresponding portions of the molds 1610 and 1620. For instance, concave contours 1621*a*, 1624*a*, and 1625*a* of the female mold 1620 may press against corresponding protruding portions (not shown) of the male mold 1610 to form the contours 1501*a*, 1504*a*, and 1505*a* of the base-and-geodesic piece 1510. To improve 3D printing time and structural integrity of the molds, in particular embodiments, the molds 1610 and 1620 may be made hollow during the 3D printing process and subsequently filled with, e.g., cement or any other suitable material that may solidify or reinforce the structure of the mold. For example, after the mold 1610 has been created, cement may be poured into it through the opening 1611 on top, as shown in FIG. 16A FIGS. 17A-17B illustrate an embodiment of molds used for manufacturing the apex-and-geodesic piece 1530. In particular embodiments, the mold assembly may include a female mold 1710 and a male mold 1720. An example of the molds is shown in FIGS. 17A-17B. The two molds may be used to press against a carbon fiber twill placed between them to create the apex-and-geodesic piece 1530. The contours of the male mold 1720 may form the interior surface of the apex-and-geodesic piece 1530, and the contours of the female mold 1710 may form the exterior surface of the apex-and-geodesic piece 1530. It should be appreciated that protruding contours 1725*b* and 1724*b* of the male mold 1720 and the concave contours 1715*b* and 1714*b* of the female mold 1710, when pressed together, would form the contours 1505*b* and 1504*b* of the apex-and-geodesic piece 1530, respectively. Similarly, the contour of other portions of the piece 1530 may be defined by the corresponding portions of the molds 1710 and 1720. For instance, protruding contours 1726*a* and 1727*a* of the male mold 1720 may press against corresponding concave contours (not shown) of the female mold 1710 to form the contours 1506*a* and 1507*a* of the base-and-geodesic piece 1510. To improve 3D printing time and structural integrity of the molds, the molds 1710 and 1720, in particular embodiments, may be made hollow during the 3D printing process and subsequently filled with, e.g., cement or any other suitable material that may solidify or reinforce the structure of the mold. For example, after the mold 1710 has been created, cement may be poured into it through the opening 1711 on top.

Similar to the base-and-geodesic piece 1510 and the apex-and-geodesic piece 1530, the base-and-apex piece 1520 may be manufactured by pressing a male mold and a female mold against a carbon-fiber twill. The female mold may have concave contours and the male mold may have convex contours that, when pressed together, define the contours of the base-and-apex piece 1520.

Figure 18A:
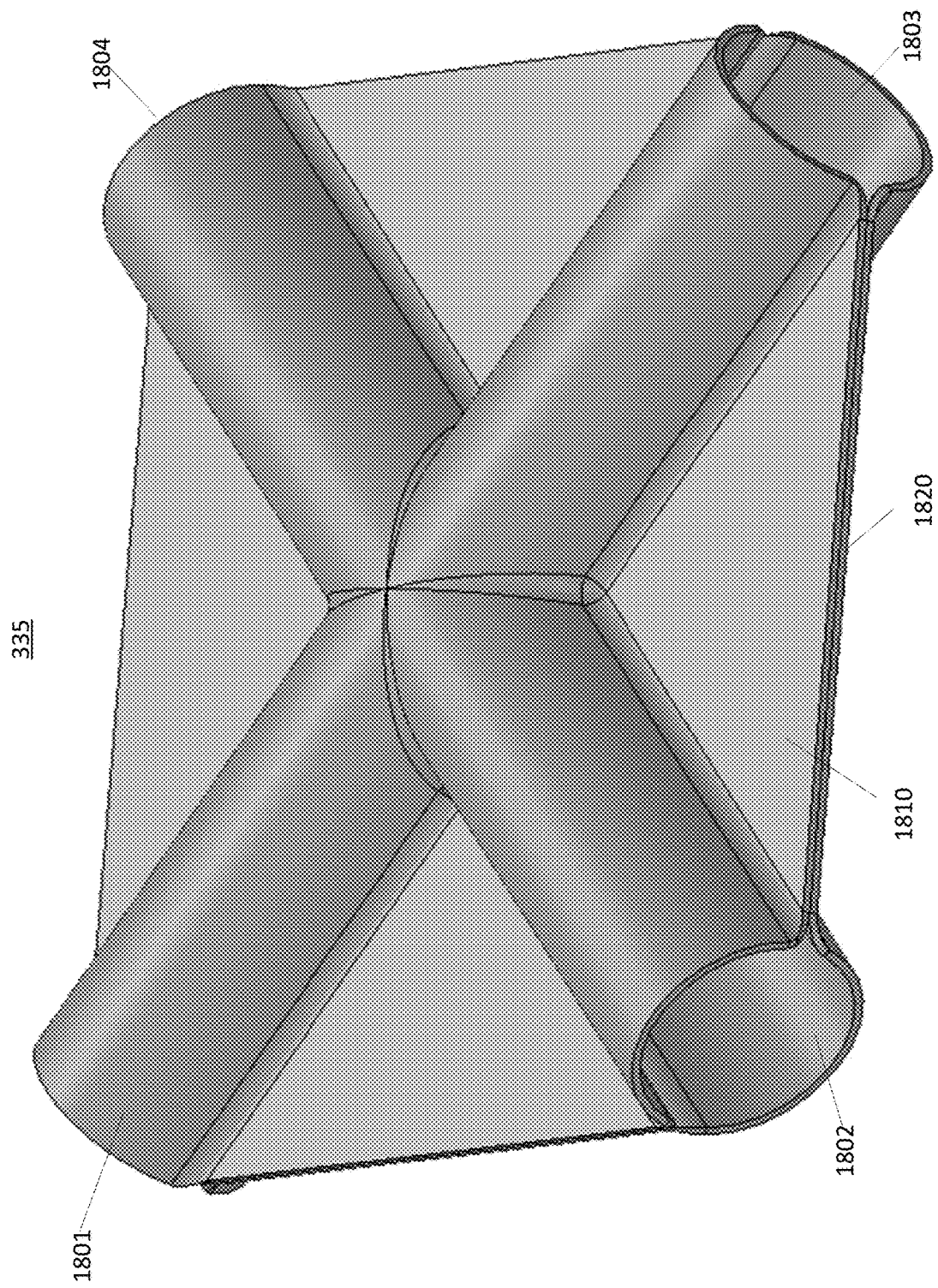
FIGS. 18A-18B illustrate an example of a 4-way geodesic joint.
Figure 18B:
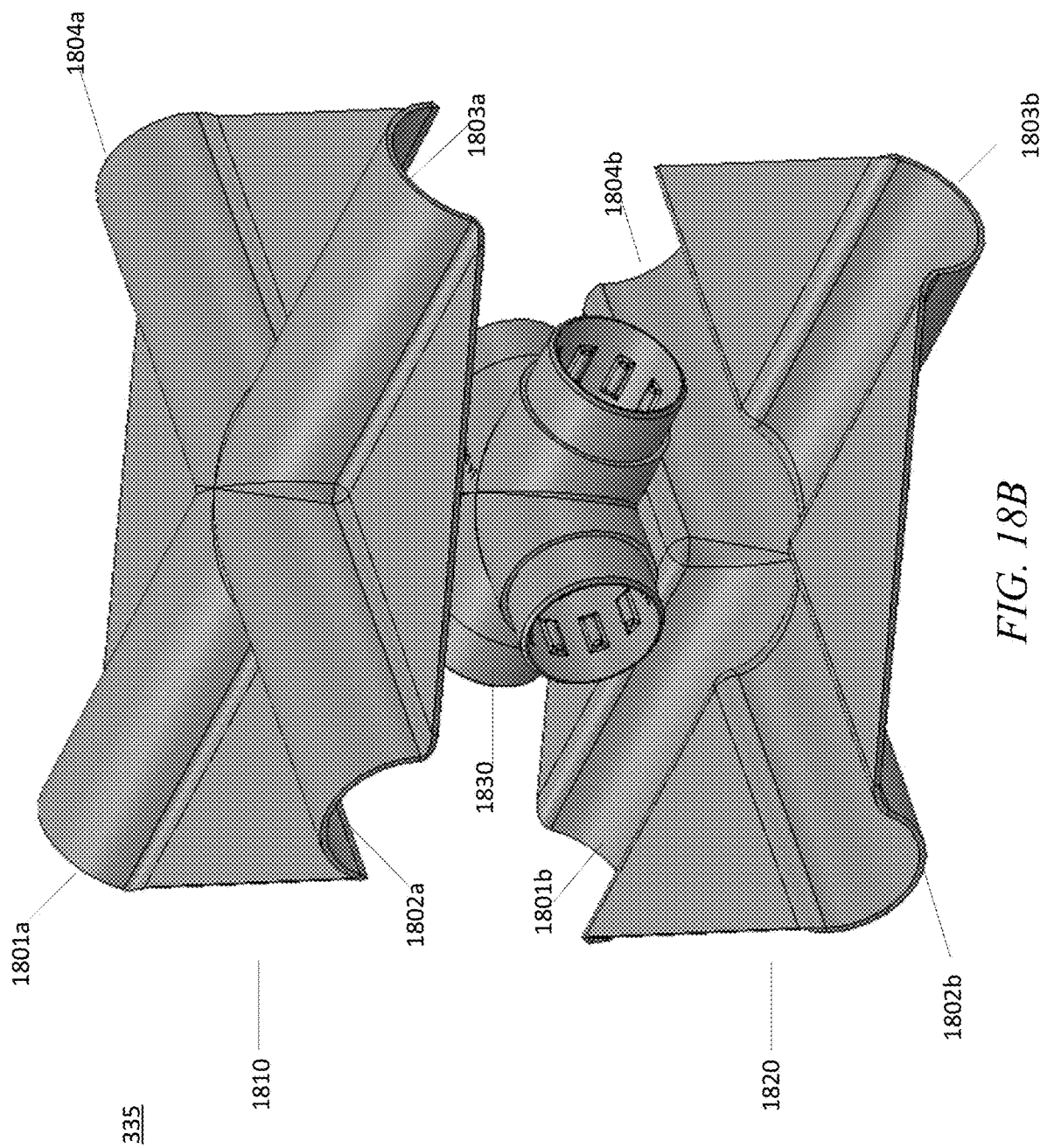

FIGS. 18A-18B illustrate an example of a 4-way geodesic joint, such as joint 335 shown in FIGS. 3C and 3D, with four connector slot openings. In particular embodiments, the 4-way geodesic joint 335 is used to form a geodesic structure that is substantially level in the same plane. Each 4-way geodesic joint 335 may serve as the intersection of four connectors to form an "X" pattern, as shown in FIG. 3C. To accommodate the four connectors, the 4-way geodesic joint 335 may have four slots, 1801, 1802, 1803, and 1804, that are symmetrically configured. The slots may be formed by interior concave surfaces of a top piece 4010 and a bottom piece 4020. FIG. 18B illustrates an exploded view of the 4-way geodesic joint 335. Each of the top piece 4010 and bottom piece 4020 has interior concave surfaces that, when assembled, form the slots 1801-1804. In particular, the interior concave surfaces 1801a, 1802a, 1803a, and 1804a of the top piece 4010 and the corresponding interior concave surfaces 1801b, 1802b, 1803b, and 1804b of the bottom piece 4020 may form, respectively, the slots 1801, 1802, 1803, and 1804. In particular embodiments, in the center of the 4-way geodesic joint 335 may be a 4-way plug 1830 that may facilitate and maintain placement of inserted connectors. In particular embodiments, the 4-way geodesic joint 335 may be manufactured by sandwiching a carbon fiber twill between molds, similar to the other processes for manufacturing joints described herein.

Figure 19A:
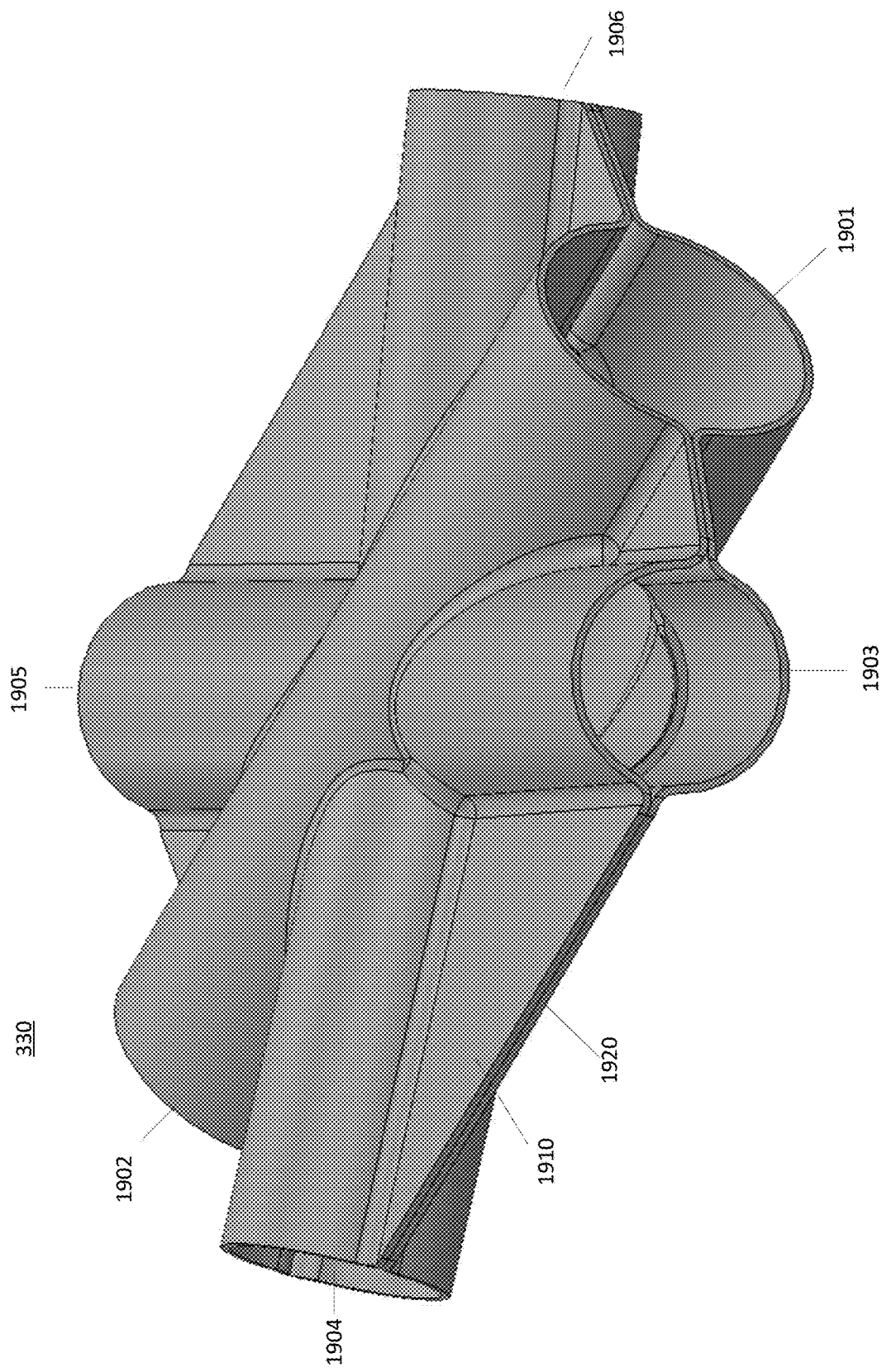
FIGS. 19A-19B illustrate an example of a 6-way geodesic joint.
Figure 19B:
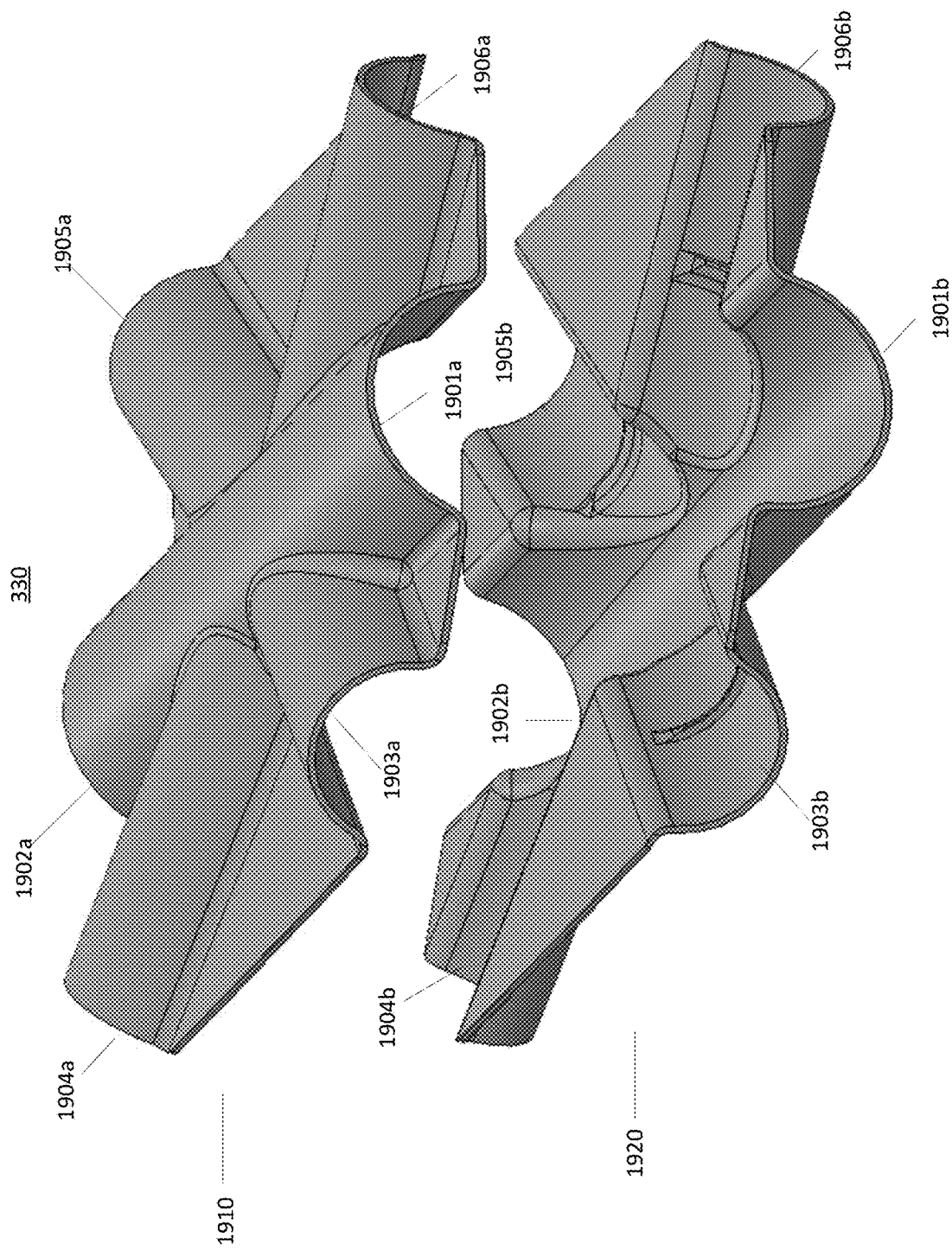

FIGS. 19A-19B illustrate an example of a 6-way geodesic joint, such as joint 330 shown in FIGS. 3C and 3D, with six connector slot openings. In particular embodiments, the 6-way geodesic joint 330 is used to form a geodesic structure that is substantially level in the same plane. As shown in FIG. 3C, the geodesic structure in one embodiment may comprise "X" patterns, formed using the aforementioned 4-way geodesic joints 335. Each "X" structure may be positioned between two longitudinal connectors 290. The "X" structures may be connected to the longitudinal connectors 290 using the 6-way geodesic joints 330. Each 6-way geodesic joint 330 may have six connector slots 1901-1906. In particular embodiments, two connector slots 1901 and 1902 on opposite sides of the joint 330 may form a channel through the joint 330 to allow a longitudinal connector 290 to pass through. The other four connector slots 1903-1906 of the 6-way geodesic joint 330 may be configured to connect to four "X" patterns, respectively, to form the geodesic structure 295. For example, the lower-right connector of a first "X" structure may be connected to slot 1905 of a 6-way geodesic joint 330; the lower-left connector of a second "X" structure may be connected to slot 1906 of the joint 330; the upper-left connector of a third "X" structure may be connected to slot 1903 of the joint 330; and the upper-right connector of a fourth "X" structure may be connected to slot 1904 of the joint 330. FIG. 19B illustrates an exploded view of the 6-way geodesic joint 330. Each of the top piece 1910 and bottom piece 1920 has interior concave surfaces that, when assembled, form the slots 1901-1906. In particular, the interior concave surfaces 1901a, 1902a, 1903a, 1904a, 1905a, and 1906a of the top piece 1910 and the corresponding interior concave surfaces 1901b, 1902b, 1903b, 1904b, 1905b, and 1906b of the bottom piece 1920 may form, respectively, the slots 1901, 1902, 1903, 1904, 1905, and 1906. In particular embodiments, the 6-way geodesic joint 330 may be manufactured by sandwiching a carbon fiber twill between molds, similar to the other processes for manufacturing joints described herein.

In particular embodiments, if additional slots are needed to attach a connector to an apex or base joint as described above, a peripheral component may be attached to the joint to form the needed slots. In particular embodiments, the peripheral component may be considered as a wrap or glove that fits over the assembled apex or base joint. The contours of the peripheral component, together with the exterior surface of the apex or base joint, may form additional slots for receiving connectors. The peripheral component may be affixed to a joint using, e.g., adhesives, screws, or other attachment means. In particular embodiments, peripheral components may be manufactured using molds, similar to the process described above. In the examples described above for manufacturing, e.g., a mainframe's joint (apex or base), three molds may be used: an exterior female mold, a center mold, and an exterior male mold. To manufacture an additional peripheral component, a fourth mold may be added to separately sandwich three layers of carbon-fiber twills to form, respectively, a female half of a joint, a male half of the joint, and a peripheral component for the joint. In particular embodiments, the fourth mold may be configured to fit on top of the female exterior mold, which would become a second center mold. In such a configuration, the top portion of the second center mold may be configured to define the desired interior contour of the peripheral component, and the fourth mold may be configured to define the desired exterior contour of the peripheral component. Alternatively, the peripheral component may be manufactured using separate molds.

Figure 20A:
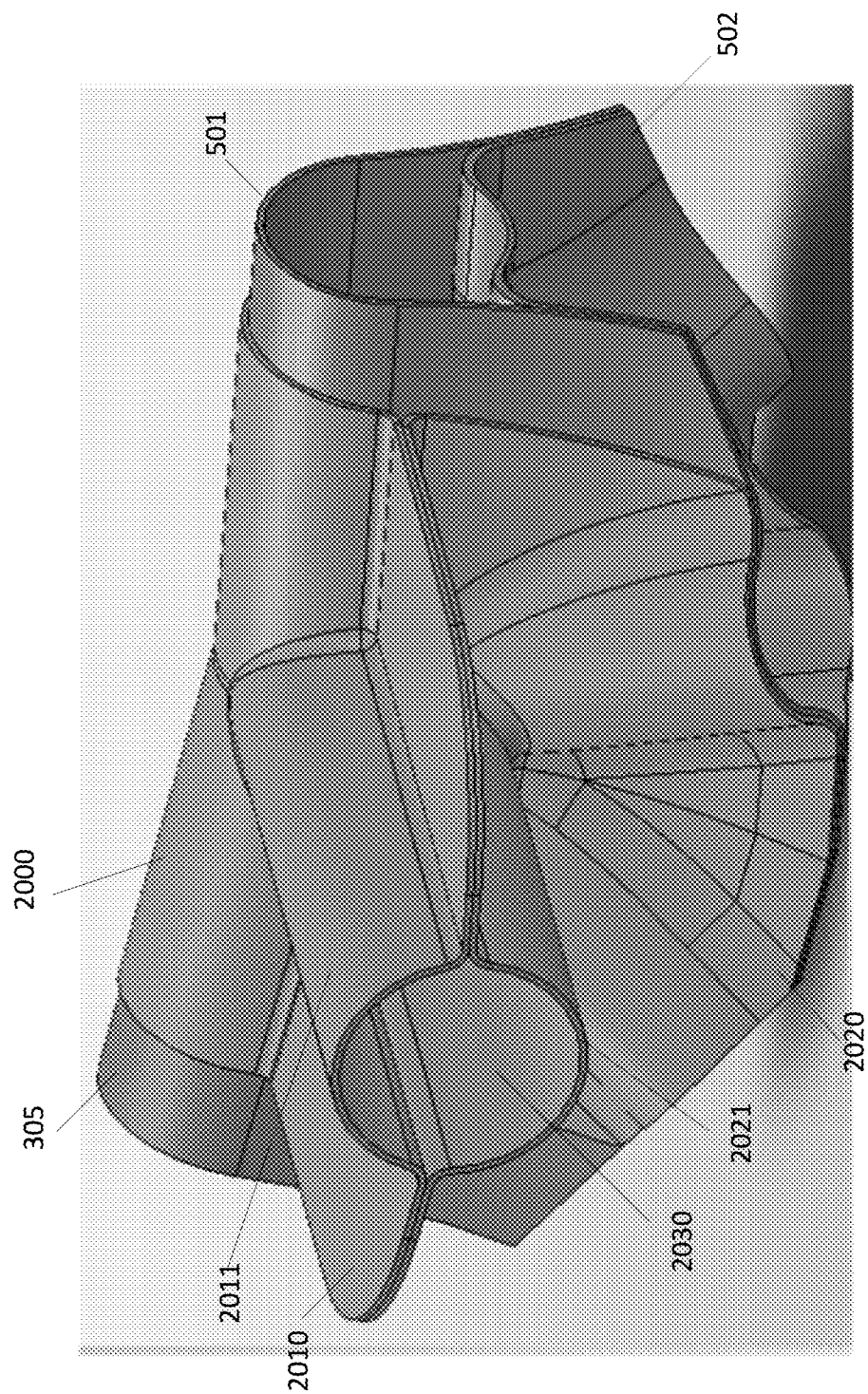
FIGS. 20A-20B illustrate an example of an extension joint for an apex joint of a mainframe's pyramid structure.
Figure 20B:
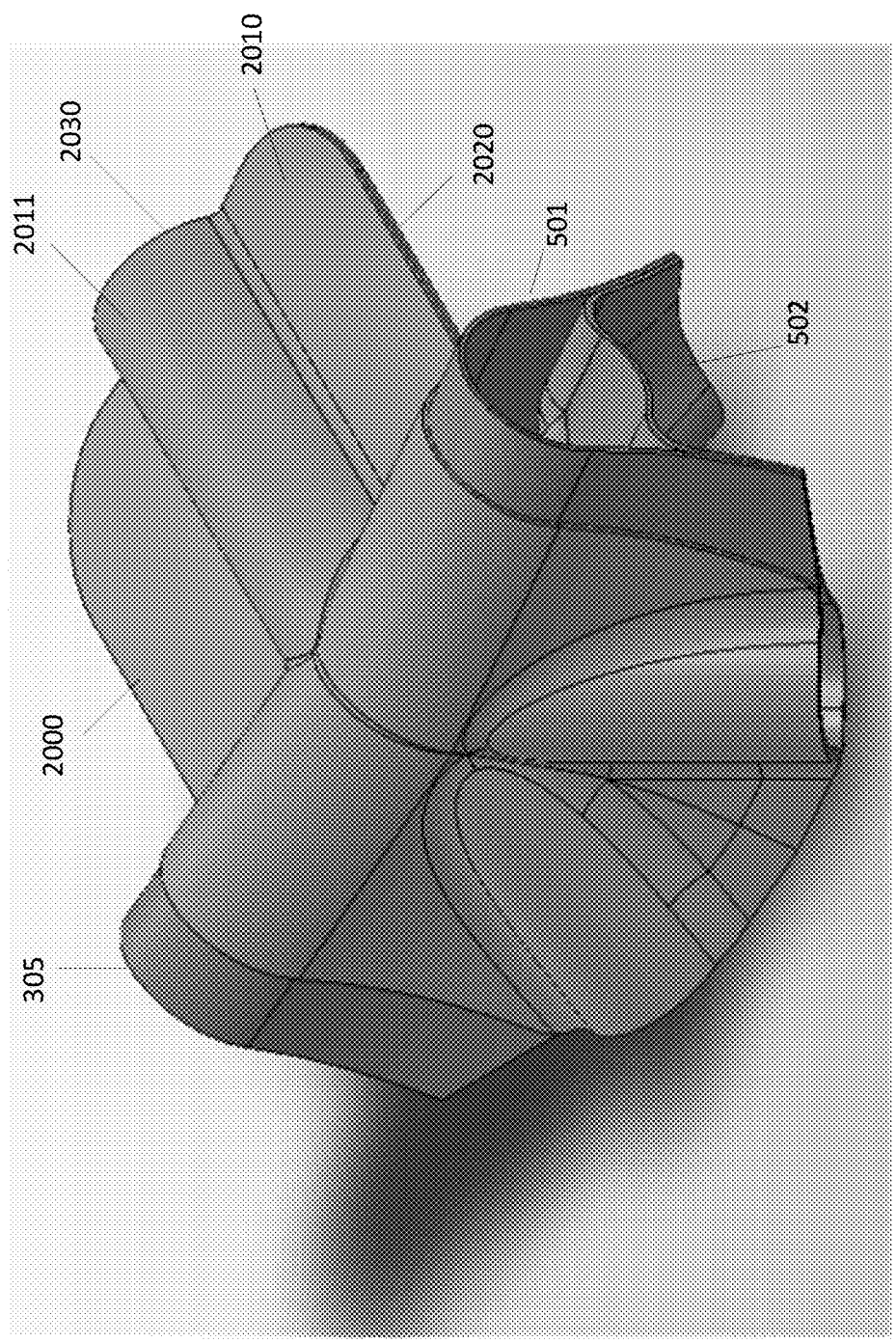

FIGS. 20A-20B illustrate, from different perspectives, an embodiment of a peripheral extension slot for an apex joint of a mainframe's pyramid structure (e.g., 305, as shown in FIG. 5A). In particular embodiments, the extension joint 2000 may be affixed to the apex joint 305 of an intersecting mainframe pyramid structure so that it may be connected to the apex joint of an adjacent intersecting gangway pyramid structure, as shown in FIG. 3D at label 349. In particular embodiments, the extension joint 2000 may have two pieces, referred herein as a top piece 2010 and a bottom piece 2020. The top 2010 and bottom 2020 pieces may be configured to envelop a portion of the exterior surface of the female half 501 of the apex joint 305 and further form a slot 2030 for receiving a connector. In particular embodiments, the slot 2030 may be substantially perpendicular to the apex-to-apex slots of the apex joint 305. One end of the top piece 2010 may have an extended portion 2011 configured to form half of the slot 2030 as well as surrounding material for interfacing with the bottom piece 2020. The remaining portion of the top piece 2010 may envelop a portion of the apex joint's 305 exterior. The bottom piece 2020 may similarly have an extended portion 2021 configured to form the other half of the slot 2030, as well as surrounding material for interfacing with that of the extended portion 2011 of the top piece 2010. The remaining portion of the bottom piece 2020 may envelop a portion of the apex joint's 305 exterior. In particular embodiments, adhesives may be used to bond the top 2010 and bottom 2020 pieces to the apex joint 305 and with each other. In particular embodiments, the top 2010 and bottom 2020 pieces of the extension joint 2000 may be manufactured using 3D-printed molds and pressing them against carbon-fiber material, similar to the manufacturing process described above for the joints.

Figure 21:
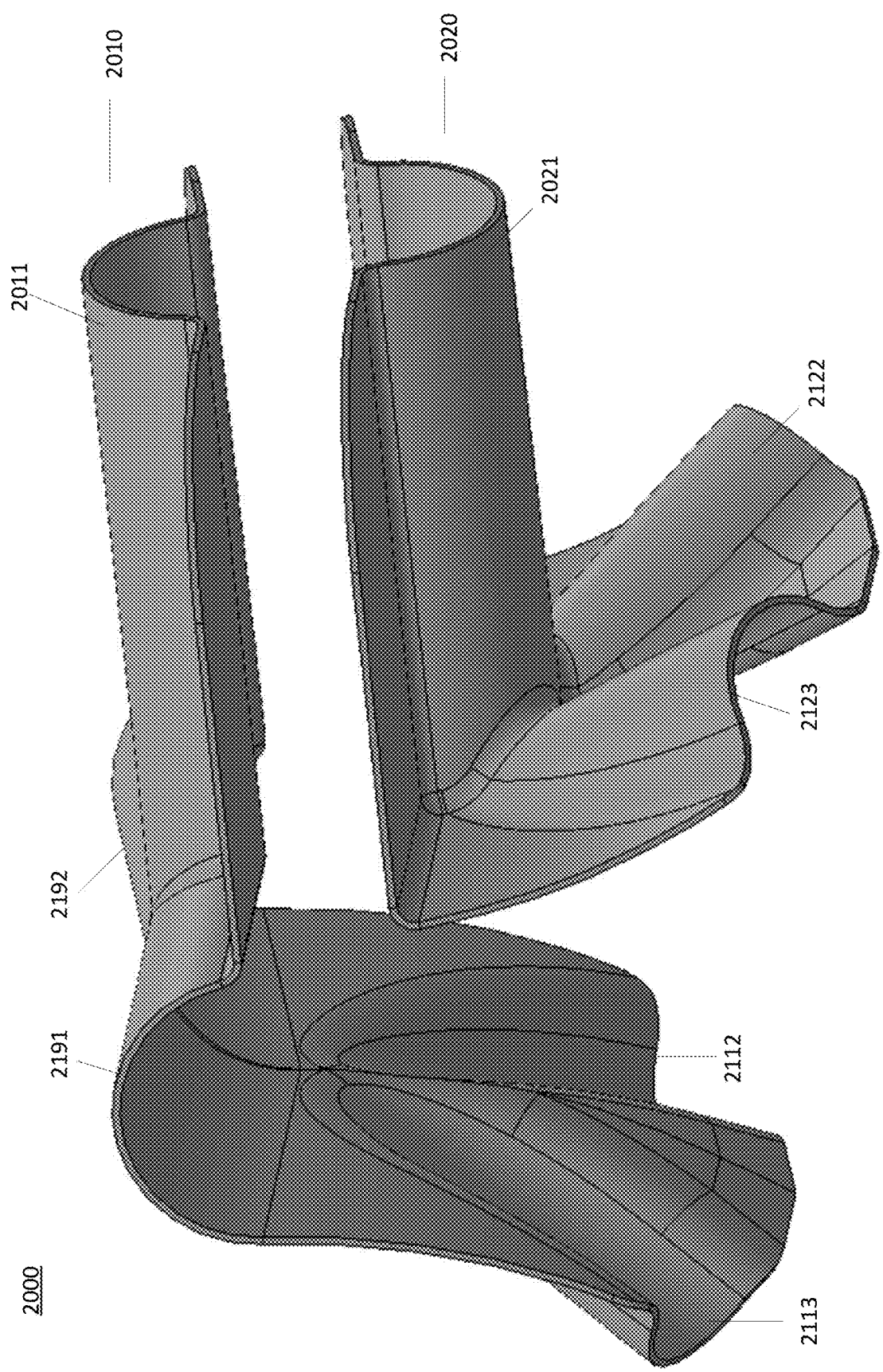
FIG. 21 illustrates an exploded view of an example of an extension joint for an apex joint of a mainframe's pyramid structure.

FIG. 21 illustrates an exploded view of the extension joint 2000 shown in FIGS. 20A-20B without the apex joint 305 of the mainframe's pyramid structure. The extended portions 2011 and 2021 of the top 2010 and bottom 2020 pieces, respectively, are configured to be placed together to form the slot 2030. Aside from the extended portions 2011 and 2021, the rest of the top 2010 and bottom 2020 pieces may be configured to envelop portions of the apex joint 305 of a mainframe's pyramid structure. For example, the top piece 2010 may have interior concave surfaces 2191 and 2192 that match the contour of the exterior surfaces of, e.g., the top portion of the female half 501 of the apex joint 305. As another example, the top piece 2010 may have interior concave surfaces 2112 and 2113 that match the contour of the exterior surfaces of, e.g., the apex-to-base slots 513 and 514 of the apex joint 305, respectively. Similarly, the bottom piece 2020 may have interior concave surfaces 2122 and 2123 that match the contour of the exterior surfaces of, e.g., the apex-to-base slots (not shown in FIG. 5A) on the opposite side of slots 513 and 514.

Figure 22A:
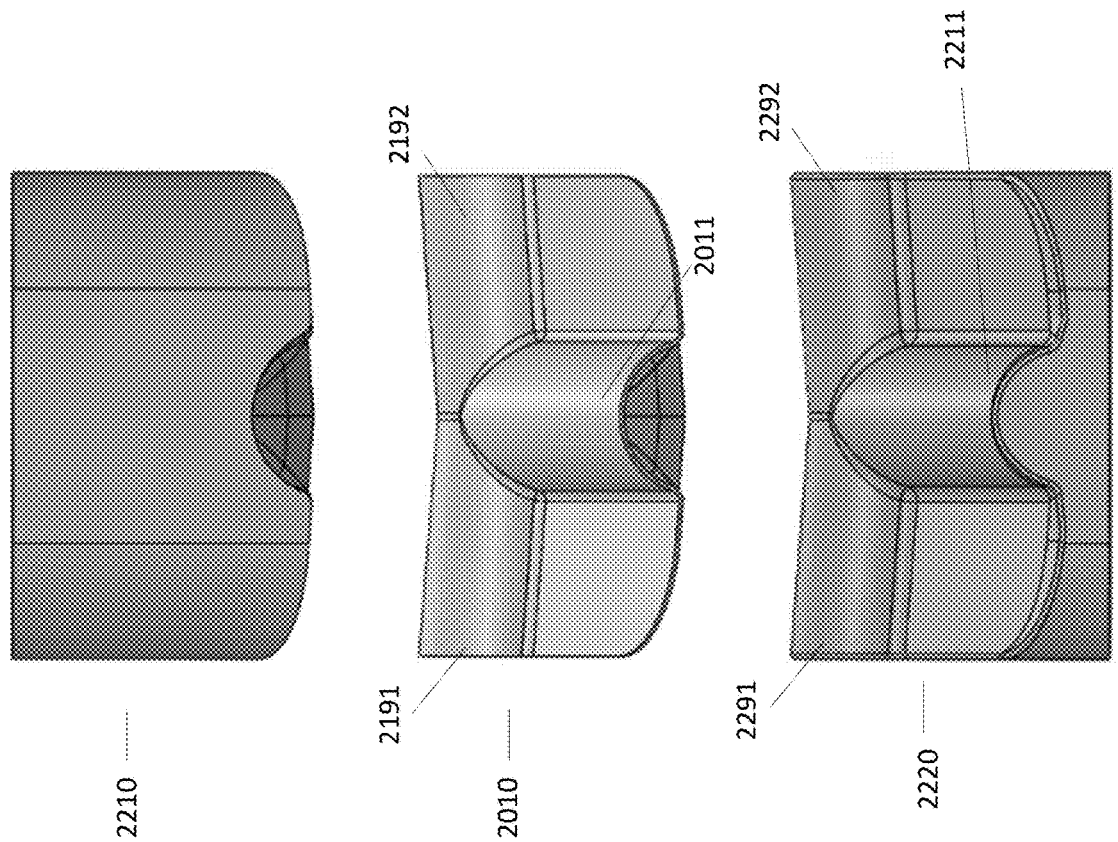
FIGS. 22A-22B illustrate an example of molds used for manufacturing a top piece of an extension joint for an apex joint of a mainframe's pyramid structure.
Figure 22B:
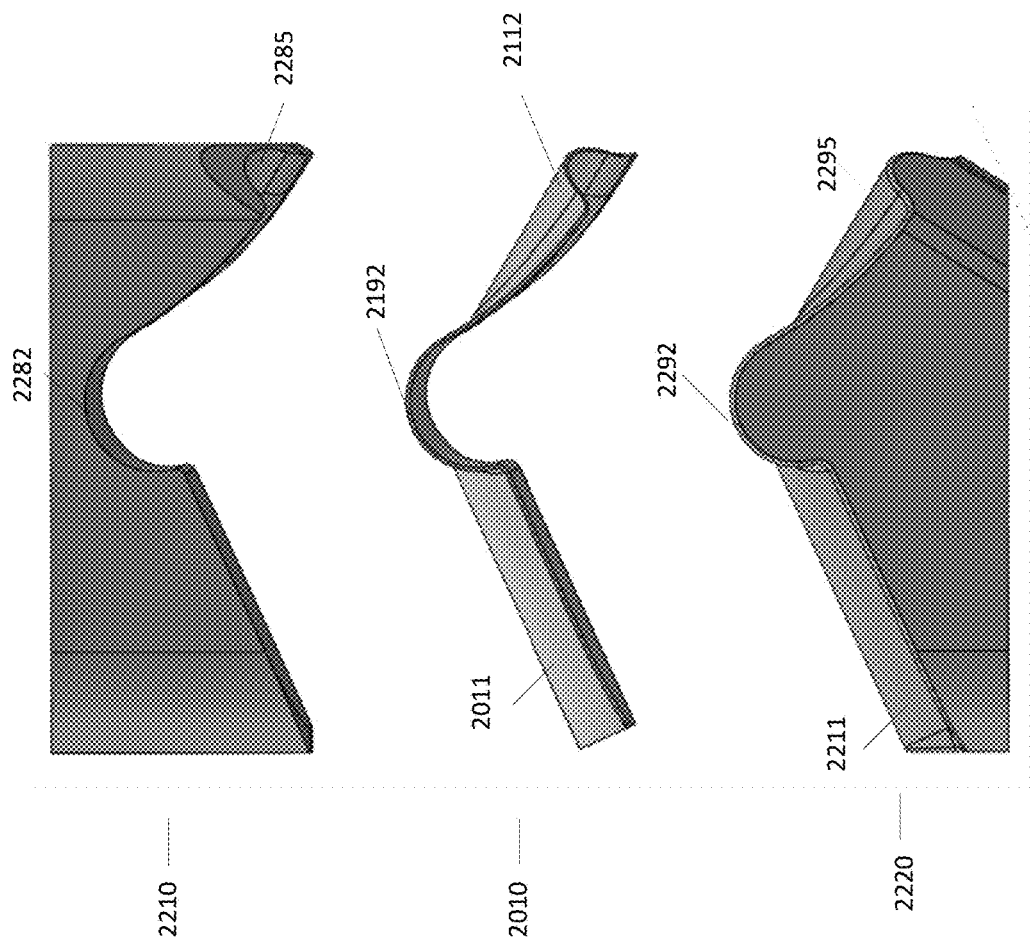

FIGS. 22A-22B illustrate an embodiment of molds used for manufacturing the top piece 2010 of the extension joint 2000. In particular embodiments, the mold assembly may include a female mold 2210 and a male mold 2220. An example of the molds is shown in FIG. 22A. The two molds may be used to press against a carbon fiber twill placed between them to create the top piece 2010 of the extension joint 2000. The contours of the male mold 2220 may form the interior surface of the top piece 2010, and the contours of the female mold 2210 may form the exterior surface of the top piece 2010. For instance, the convex contours 2291, 2292, and 2211 of the male mold 2220 may shape, respectively, the interior concave surfaces 2191, 2192, and 2011 of the top piece 2010. FIG. 22B illustrates a side view of the same assembly shown in FIG. 22A. It should be appreciated that protruding convex contour 2292 of the male mold 2220 and the concave contour 2282 of the female mold 2210, when pressed together, would form the contour 2192 of the top piece 2010. Similarly, the contour of other portions of the top piece 2010 may be defined by the corresponding portions of the molds 2210 and 2220. For example, protruding convex contour 2295 of the male mold 2220 and the concave contour 2285 of the female mold 2210, when pressed together, would form the contour 2112 of the top piece 2010. While it is not shown, the female mold 2210 has a concave contour corresponding to the placement of the protruding convex contour 2211 of the male mold 2220 so that, when they are pressed together, the contour 2011 of the top piece 2010 would be defined. To improve 3D printing time and structural integrity of the molds, the molds 2210 and 2220, in particular embodiments, may be made hollow during the 3D printing process and subsequently filled with, e.g., cement or any other suitable material that may solidify or reinforce the structure of the mold. For example, after the molds have been created, cement may be poured into it through openings.

Figure 23:
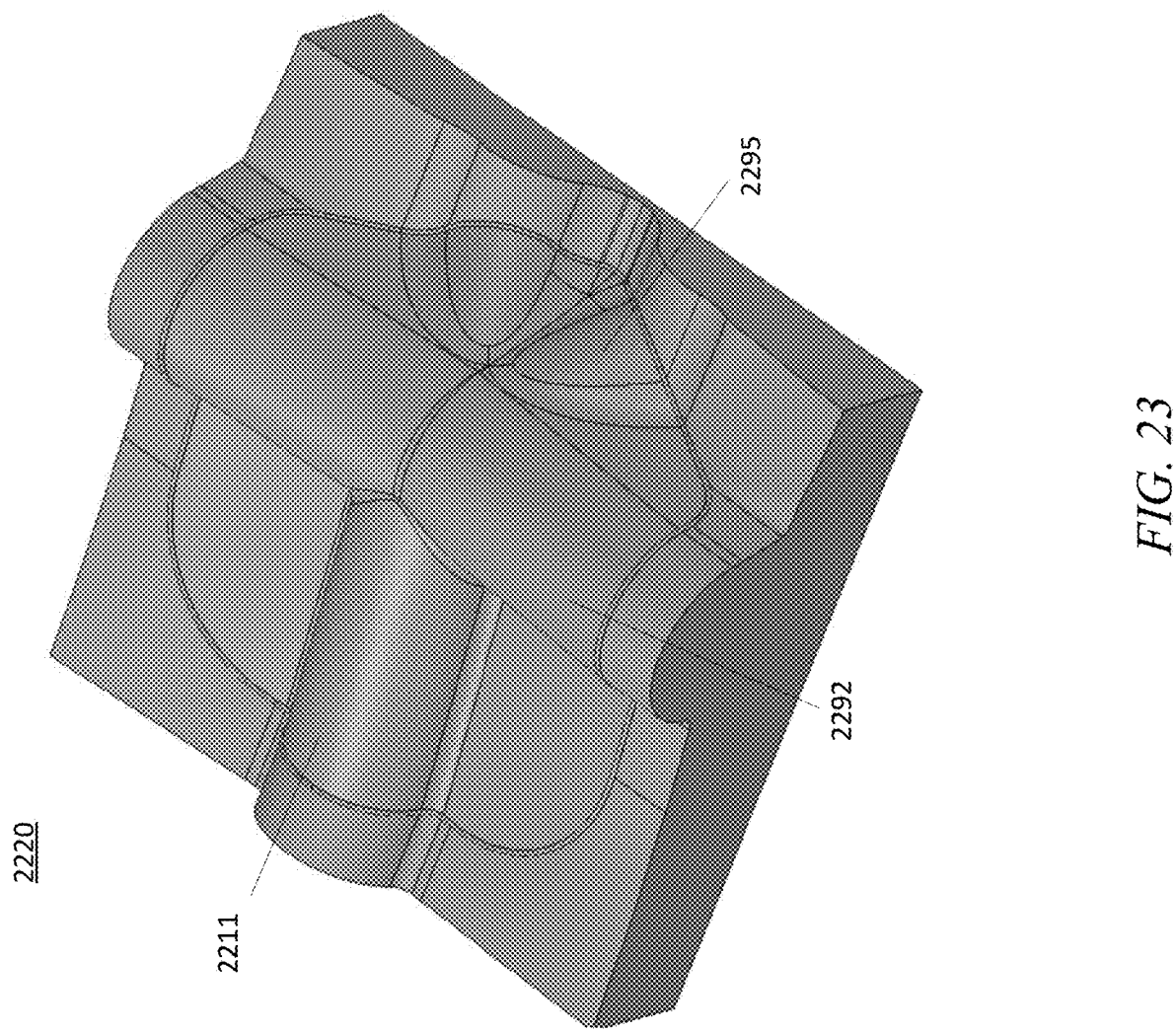
FIG. 23 illustrates an example of a male mold used for manufacturing a top piece of an extension joint for an apex joint of a mainframe's pyramid structure.

FIG. 23 illustrates a perspective view of an embodiment of a male mold used for manufacturing the top piece 2010 of the extension joint 2000. The male mold 2220 may have protruding convex surfaces 2211, 2292, and 2295 described above. As shown here, the male mold 2220 may be symmetrical across a center plane through the axis of protruding surface 2211.

In particular embodiments, as shown in FIG. 3D, the interior base joints of an intersecting mainframe pyramid structure 340 may need to be shared with base joints of an intersecting gangway pyramid structure 343 as well as geodesic structures. In order to also function as a base joint of the intersecting gangway pyramid structure 343, the base joints 359 of the intersecting mainframe pyramid structure 340 may need two additional slots. The slots may be used for connecting each base joint 359 to the apex joint 375 and one of the other base joints 1500 of the intersecting gangway pyramid structure 343. In particular embodiments, where geodesic structures are connected to the mainframes and gangways as shown in FIG. 3D, the base joint 359 of the intersecting mainframe pyramid structure 340 may need an additional slot to connect to one end of the X-patterned geodesic structure (in other words, the base joint 359 would be connected to the 4-way geodesic joint 335 of the X-pattern). Thus, in one embodiment, the interior base joint 359 of an intersecting mainframe pyramid structure 340 may need three additional slots to support the intersecting gangway pyramid structure 343 and the geodesic structure.

Figure 24A:
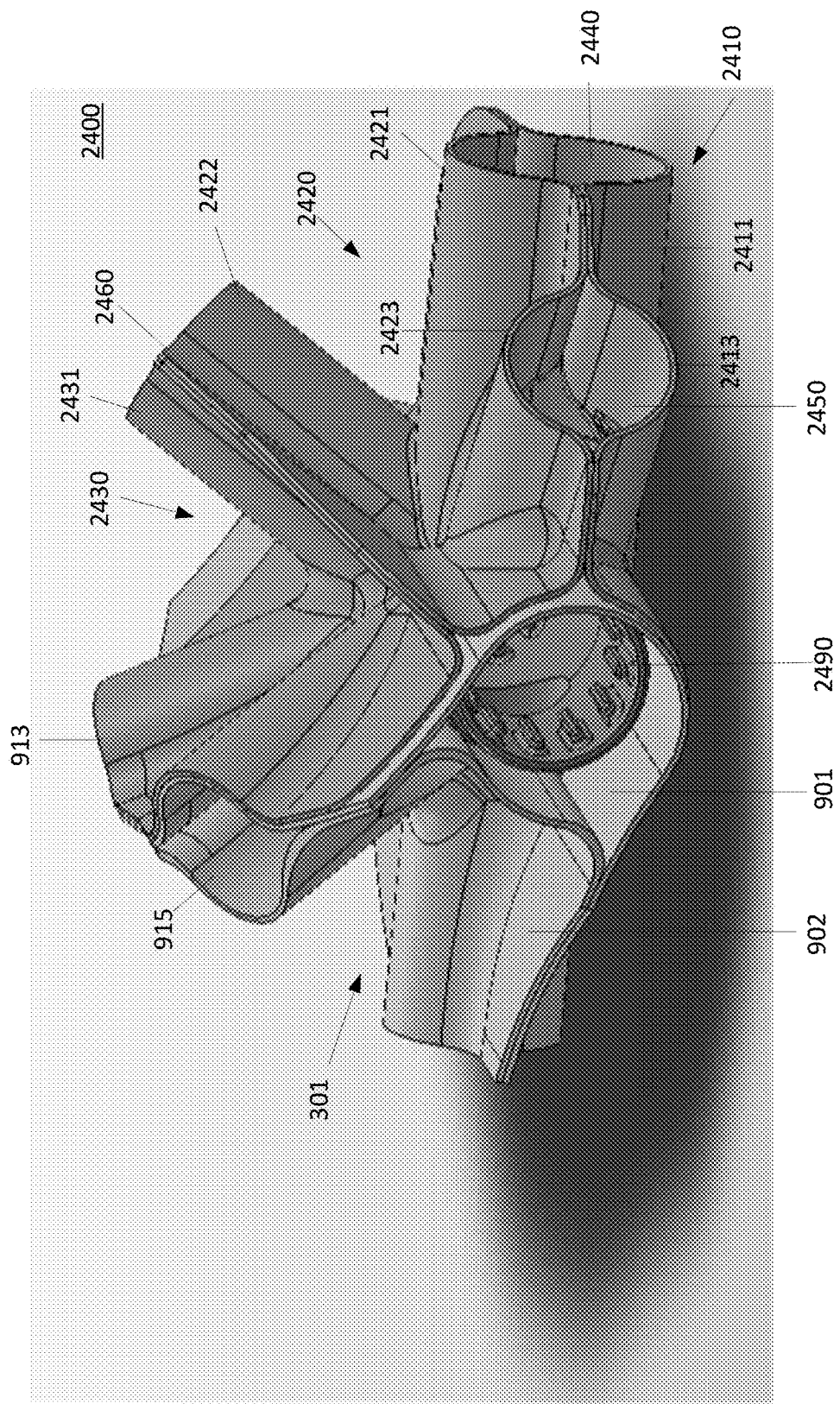
FIGS. 24A-24C illustrate an example of a mainframe-to-gangway-and-geodesic extension joint attached to a mainframe's base joint.
Figure 24B:
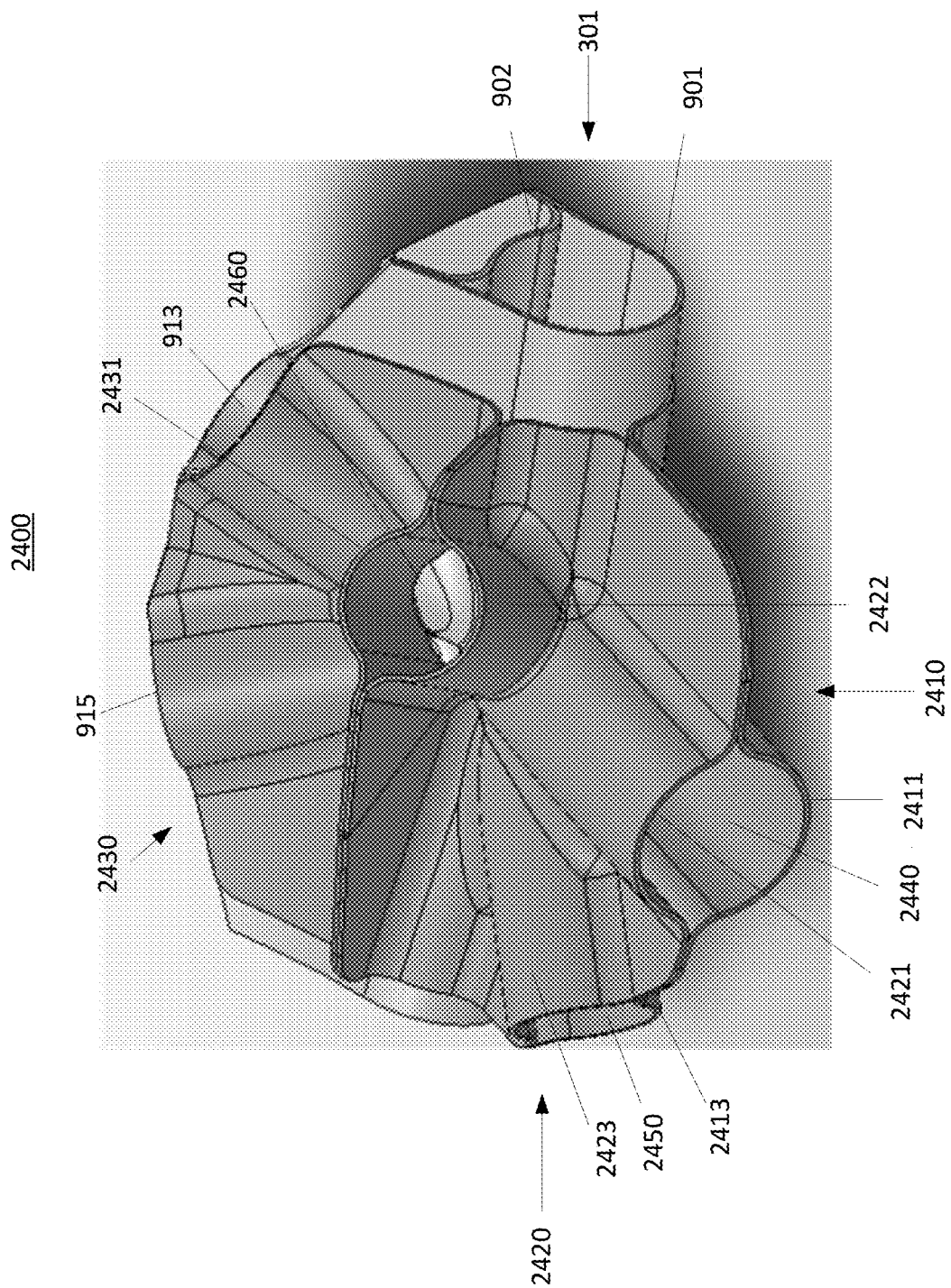
Figure 24C:
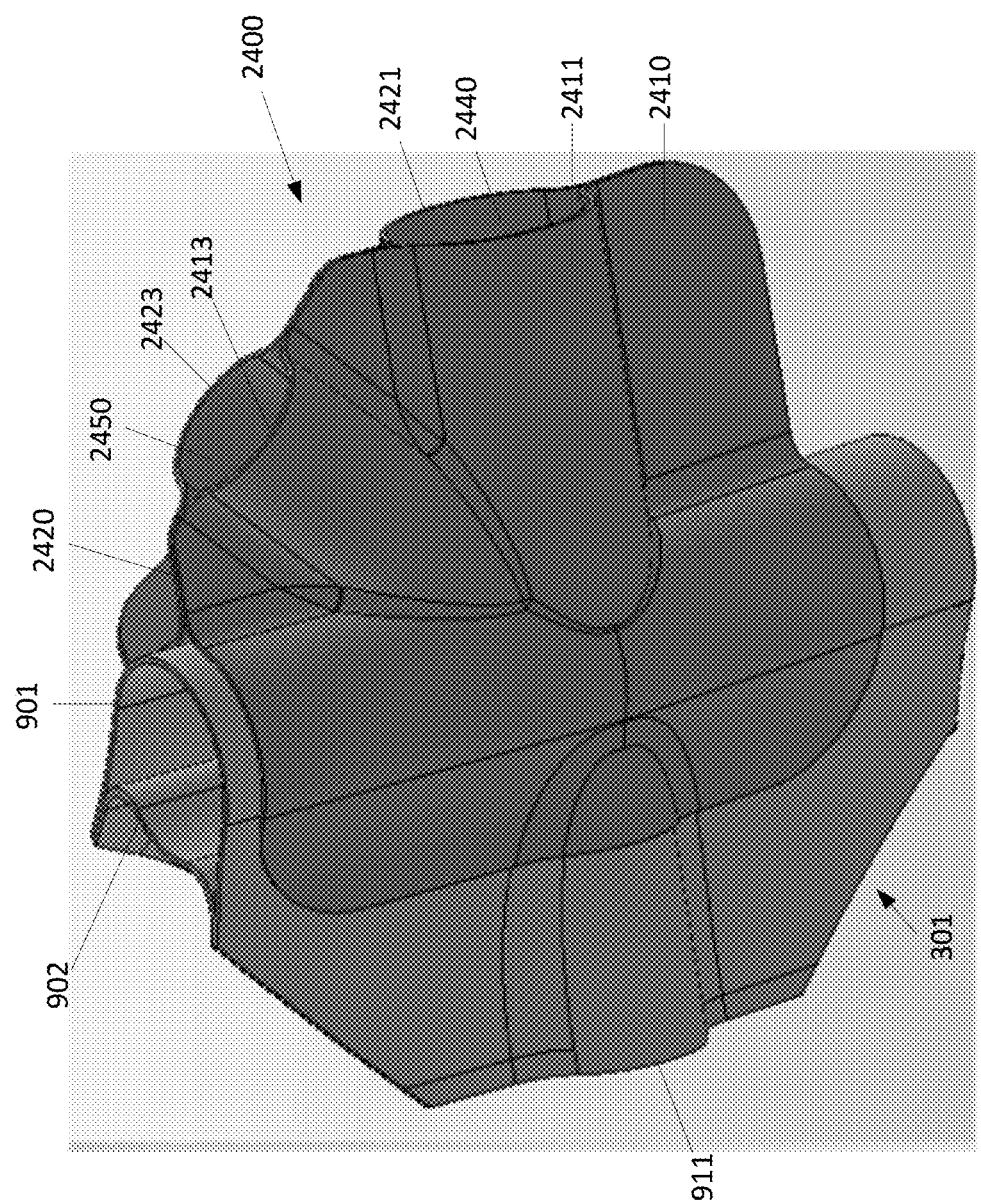

FIGS. 24A-24C illustrate an embodiment of a mainframe-to-gangway-and-geodesic extension 2400 attached to a mainframe's base joint 301, similar to the interior base joint 359 shown in FIG. 3D. The illustrated mainframe-to-gangway-and-geodesic extension 2400 includes three pieces, which would be referred to as the base piece 2410, center piece 2420, and apex piece 2430. In addition to the slots provided by the base joint 301, the extension joint 2400 adds three additional slots: slots 2440 and 2460 for connecting to an intersecting gangway pyramid structure 343, and slot 2450 for connecting to a geodesic structure. In particular, slot 2440 may be configured to receive a connector whose other end is connected to an interior base joint 1500 (see FIG. 3D) (i.e., not interfacing with the mainframe) of an adjoining intersecting gangway pyramid structure 343. The connector is substantially perpendicular to the mainframe and forms a side of the base of the intersecting gangway pyramid structure 343. Slot 2460 may be configured to receive a connector whose other end is connected to the apex 375 of that intersecting gangway pyramid structure 343. Slot 2450 may be configured to receive a connector whose other end is connected to a 4-way geodesic joint 335, through which an aforementioned "X" pattern may be formed. In addition, FIG. 24A shows that a plug 2490 may be placed inside the base joint 301 to guide and maintain the position of an inserted connector.

In particular embodiments, each of the slots 2440, 2450, and 2460 may be formed by two of the three pieces 2410, 2420, and 2430. For instance, slots 2440 and 2450 may be formed by interior concave surfaces of the base piece 2410 and the center piece 2420. Slot 2460 may be formed by interior concave surfaces of the center piece 2420 and the apex piece 2430. In particular, the base piece 2410 may have interior concave surfaces 2413 and 2411 that, when respectively aligned with corresponding interior concave surfaces 2423 and 2421 of the center piece 2420 would form slots 2450 and 2440, respectively. Another interior concave surface 2422 of the center piece 2420 may be aligned with an interior concave surface 2431 of the apex piece 2430 to form the slot 2460. Each of the pieces 2410, 2420, and 2430 may have portions that abut corresponding portions of an adjacent piece. The surface area of these portions may be used to fasten each pair of abutting pieces together (e.g., using a bonding agent, nuts and bolts, etc.).

In addition to portions of each of the pieces 2410, 2420, and 2430 for forming the slots 2440, 2450, and 2460 and abutting each other, each of the pieces 2410, 2420, and 2430 comprises an additional remaining portion for enveloping a portion of the base joint's 301 exterior. For example, the apex piece 2430 may have a portion configured to envelop the exterior surface of slots 913 and 915 (see FIG. 9A) and the surrounding surfaces of the base joint 301. The base piece 2410 may have a portion configured to envelop the exterior surface of slot 911 and the surrounding surfaces of the base joint 301. The center piece 2420 may comprise an enveloping portion that conforms to the contours of a top portion of the base joint 301 that is unoccupied by the apex piece 2430 and base piece 2410. In particular embodiments, adhesives may be used to bond the three pieces 2410, 2420, and 2430 to the base joint 301 and with each other.

Figure 25:
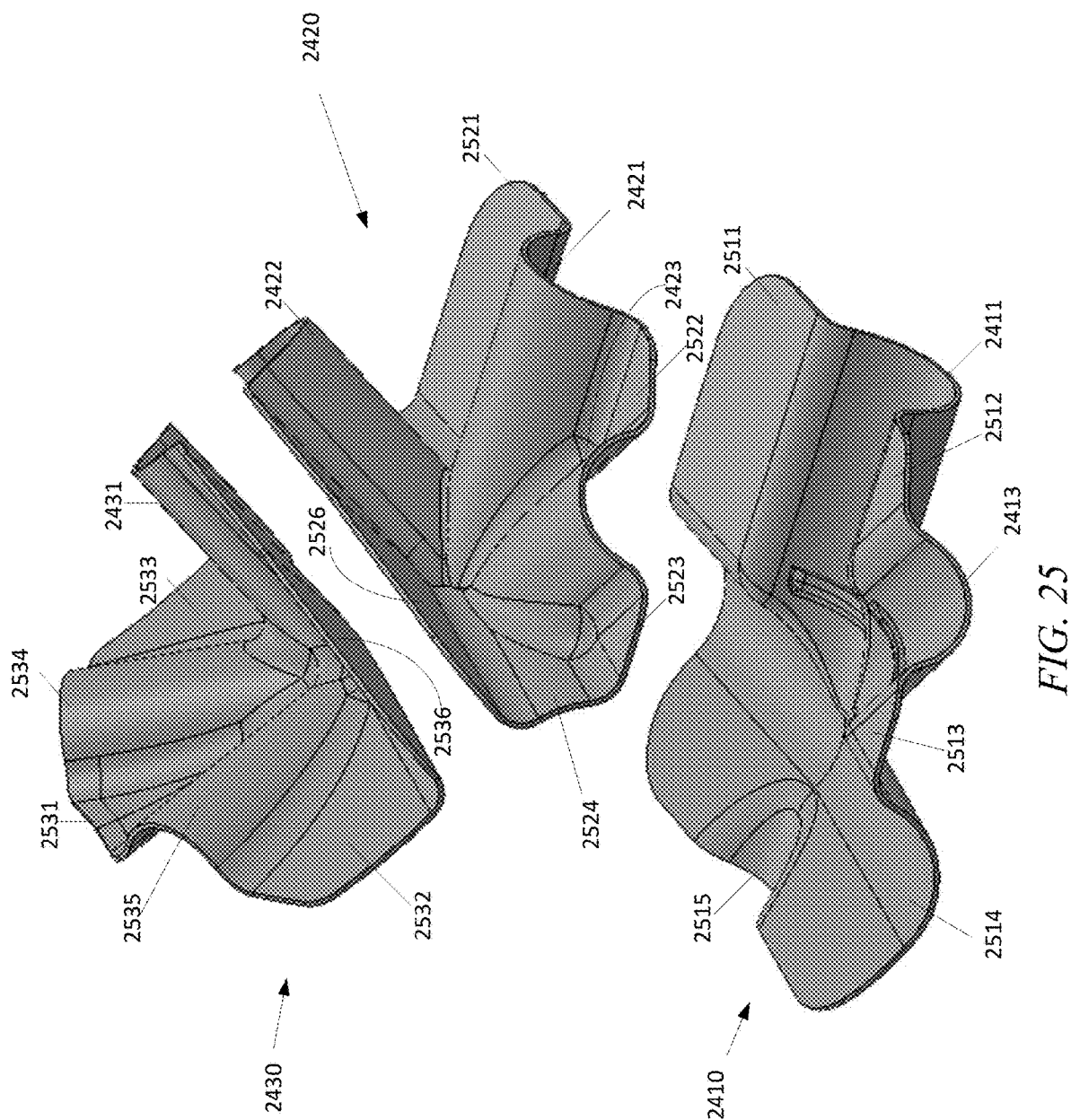
FIG. 25 illustrates an exploded view of an example of a mainframe-to-gangway-and-geodesic extension joint.

FIG. 25 illustrates an exploded view of the mainframe-to-gangway-and-geodesic extension 2400 for a mainframe's base joint 301 (not shown). As discussed with reference to FIGS. 24A-24C, the mainframe-to-gangway-and-geodesic extension 2400 may have three pieces: a base piece 2410, a center piece 2420, and an apex piece 2430. In particular embodiments, each of these pieces is a continuous piece made from sheets of carbon-fiber twill. The base piece 2410 may comprise interior concave surfaces 2411 and 2413 for forming slots 2440 and 2450, respectively. In addition, the base piece 2410 may further comprise surfaces for bonding with the center piece 2420. In particular, surfaces 2511, 2512, and 2513 of the base piece 2410 are configured to abut corresponding surfaces 2521, 2522, and 2523 of the center piece 2420, respectively. The base piece 2410 may further comprise surface 2514 for enveloping a top portion of the base joint 301. The interior concave surface 2515 may be configured to envelop a portion of the exterior surface of slot 911 of the base joint 301. The center piece 2420 may comprise surfaces such as surface 2424 for enveloping another top portion of the base joint 301. To bond to the apex piece 2430, the center piece 2420 may also comprise surfaces such as surface 2526 to abut surface 2536 of the apex piece 2430. The apex surface 2430 may comprise surfaces 2531, 2532, and 2533 for enveloping exterior surfaces of the base joint 301 around slots 913 and 915. The apex surface 2430 may further comprise surfaces 2534 and 2535 for enveloping the exterior surfaces of slots 913 and 915, respectively.

Figure 26B:
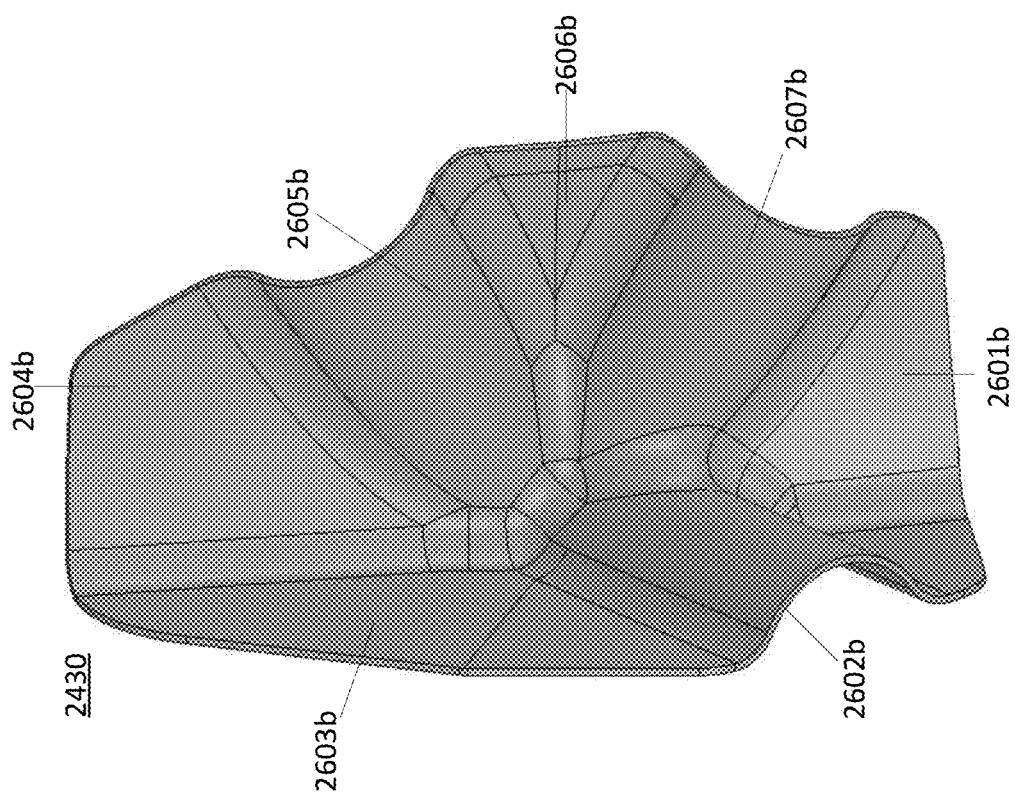
FIGS. 26A-26B illustrate an example of an apex piece of a mainframe-to-gangway-and-geodesic extension joint.
Figure 26A:
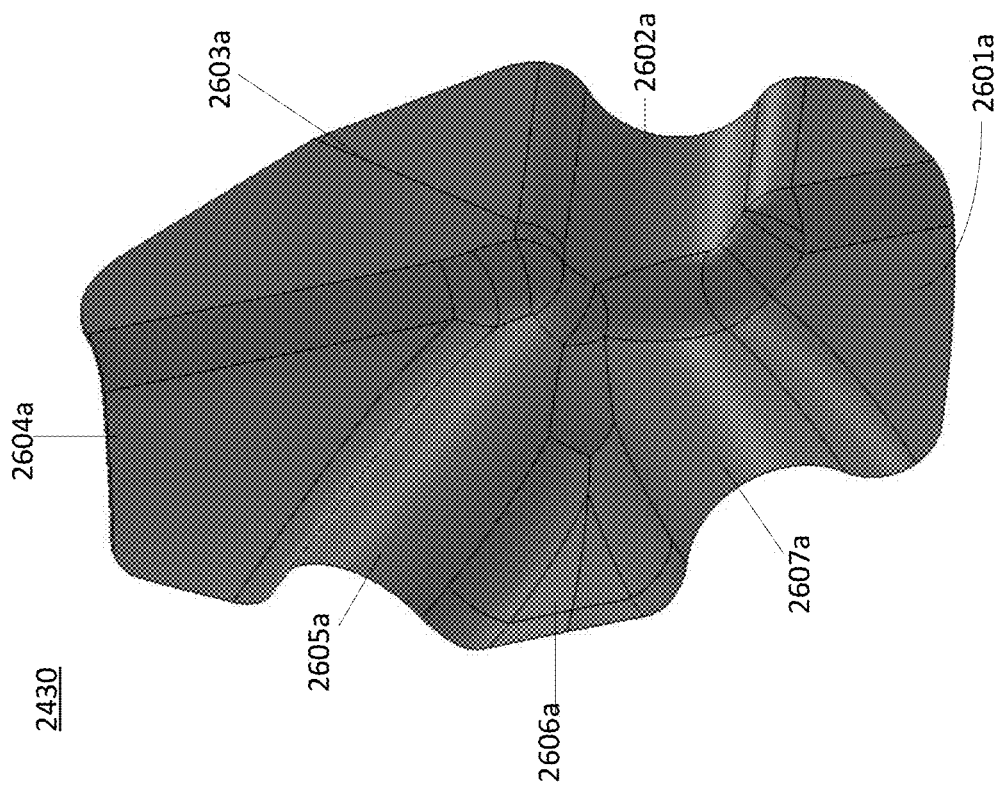

FIGS. 26A-26B illustrate a top view and a bottom view, respectively, of the apex piece 2430. The top surface shown in FIG. 26A is considered to be the interior since it would form the interior surface of the assembled mainframe-to-gangway-and-geodesic extension 2400. Referring to both FIGS. 26A and 26B, the bottom portion of the apex piece 2430 has an interior surface 2601a and a corresponding exterior surface 2601b. Similarly, the apex piece 2430 further comprises: an interior surface 2602a and a corresponding exterior surface 2602b (corresponding to portion 2431 in FIG. 25); an interior surface 2603a and a corresponding exterior surface 2603b (corresponding to portion 2536); an interior surface 2604a and a corresponding exterior surface 2604b (corresponding to portion 2532); an interior surface 2605a and a corresponding exterior surface 2605b (corresponding to portion 2535); an interior surface 2606a and a corresponding exterior surface 2606b (corresponding to portion 2531); and an interior surface 2607a and a corresponding exterior surface 2607b (corresponding to portion 2534). Once assembled, the top surface 2602a would abut a connector that connects to an intersecting gangway pyramid structure. The top surfaces 2605a and 2607a would abut and be affixed to the exterior surfaces of 915 and 913, respectively.

Figures 27A, 27B:
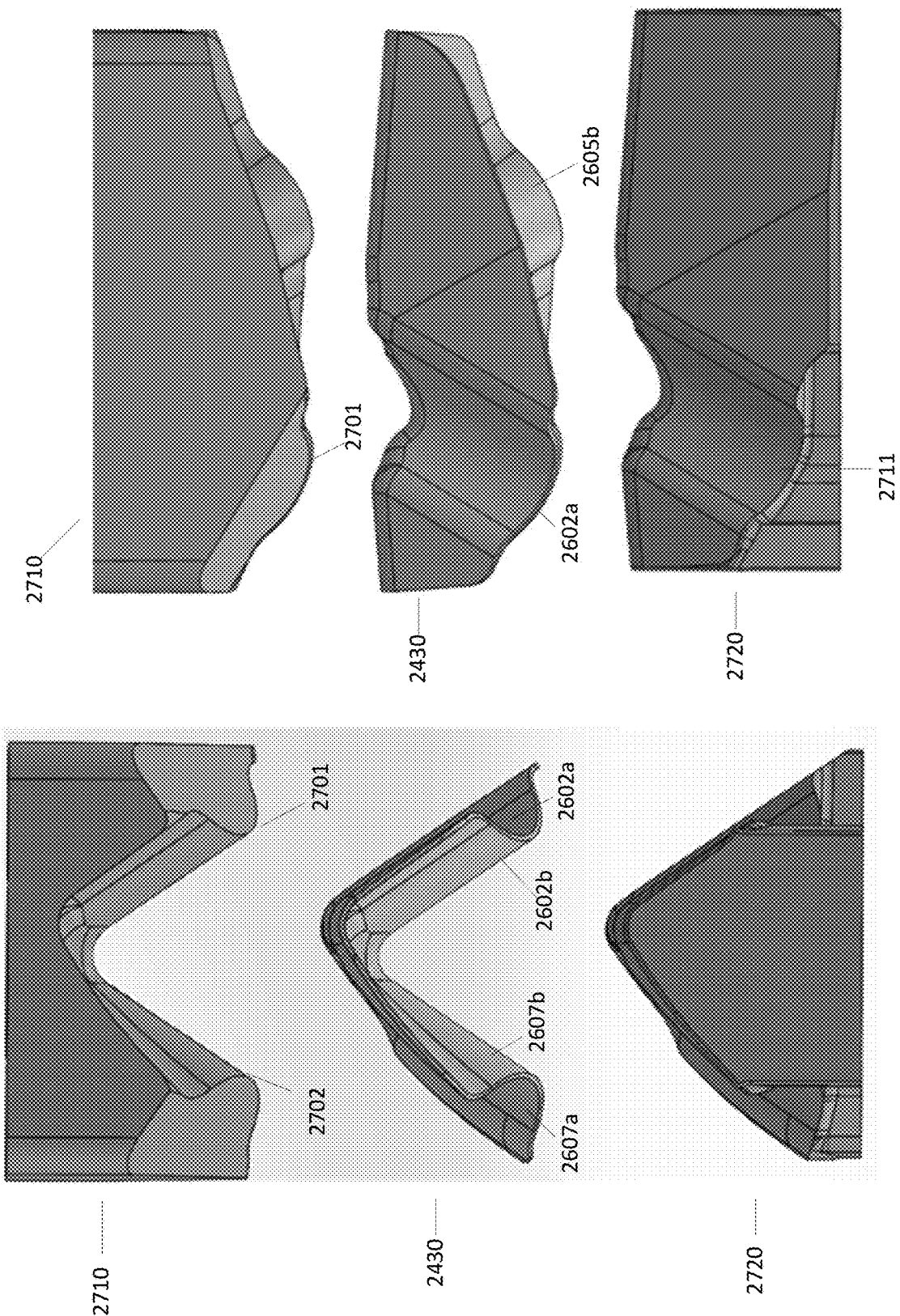
FIGS. 27A-27B illustrate an example of molds used for manufacturing an apex piece of a mainframe-to-gangway-and-geodesic extension joint.

FIGS. 27A-27B illustrate an embodiment of molds used for manufacturing the apex piece 2430. In particular embodiments, the mold assembly may include a male mold 2710 and a female mold 2720. An example of the molds is shown in FIG. 27A. The two molds may be used to press against a carbon fiber twill placed between them to create the apex piece 2430. The contours of the male mold 2710 may form the interior surface of the apex piece 2430, and the contours of the female mold 2720 may form the exterior surface of the apex piece 2430. For example, FIG. 27A shows that protruding contour 2702 of the male mold 2710 may form the contour 2607a/2607b of the apex piece 2430. FIG. 27B illustrates a side view of the same assembly shown in FIG. 27A. It should be appreciated that protruding contour 2701 of the male mold 2710 and the concave contour 2711 of the female mold 2720, when pressed together, would form the contour 2602a/2602b of the apex piece 2430. Similarly, the contour of other portions of the piece 2430 may be defined by the corresponding portions of the molds 2710 and 2720. To improve 3D printing time and structural integrity of the molds, the molds 2710 and 2720, in particular embodiments, may be made hollow during the 3D printing process and subsequently filled with, e.g., cement or any other suitable material that may solidify or reinforce the structure of the mold. For example, after the molds have been created, cement may be poured into it through openings.

Figure 28B:
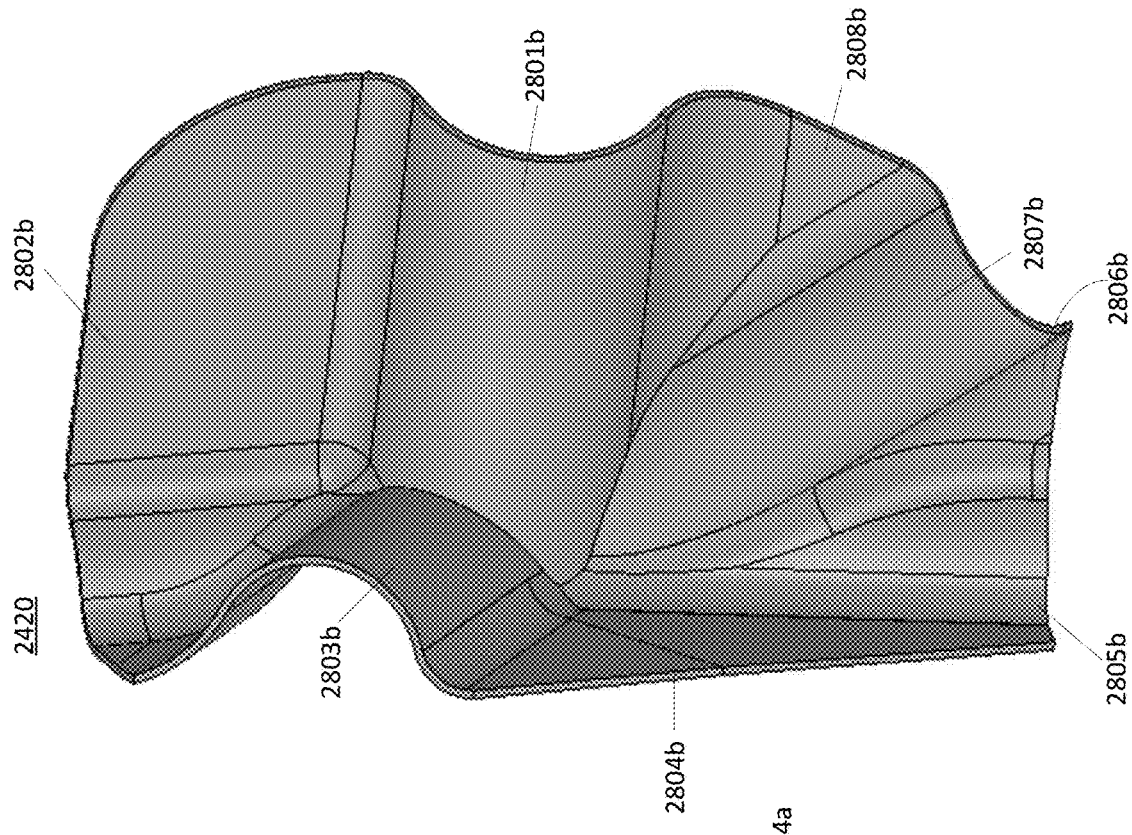
FIGS. 28A-28B illustrate an example of a center piece of a mainframe-to-gangway-and-geodesic extension joint.
Figure 28A:
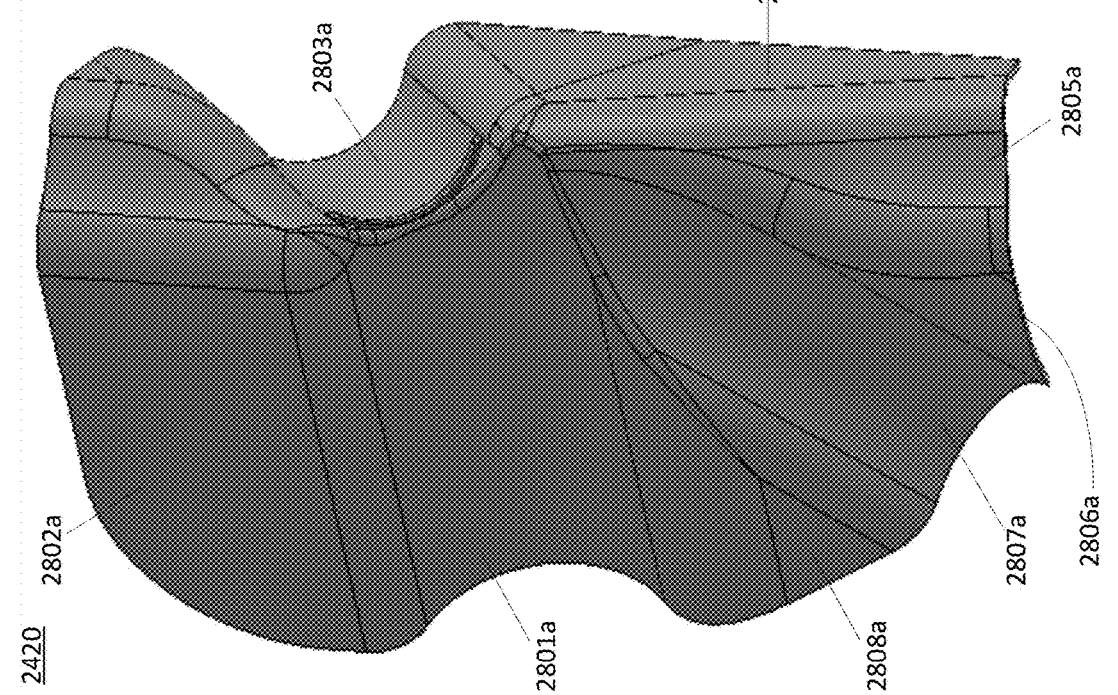

FIGS. 28A-28B illustrate a top view and a bottom view, respectively, of the center piece 2420. The top surface shown in FIG. 28A is considered to be the interior since it would form the interior surface of the assembled mainframe-to-gangway-and-geodesic extension 2400. Referring to both FIGS. 28A and 28B, the center piece 2420 comprises: an interior surface 2801a and a corresponding exterior surface 2801b (corresponding to portion 2421 in FIG. 25); an interior surface 2802a and a corresponding exterior surface 2802b (corresponding to portion 2521); an interior surface 2803a and a corresponding exterior surface 2803b (corresponding to portion 2422); an interior surface 2804a and a corresponding exterior surface 2804b (corresponding to portion 2526); an interior surface 2805a and a corresponding exterior surface 2805b (corresponding to portion 2524); an interior surface 2806a and a corresponding exterior surface 2806b (corresponding to portion 2523); an interior surface 2807a and a corresponding exterior surface 2807b (corresponding to portion 2423); and an interior surface 2808a and a corresponding exterior surface 2808b (corresponding to portion 2522). Once assembled, the top surface 2803a would abut a connector whose other end is connected to the apex 375 of an intersecting gangway pyramid structure 343, as shown in FIG. 3D. The top surface 2801a would abut a connector whose other end is connected to an interior base joint 1500 of the adjoining intersecting gangway pyramid structure 343. The top surface 2807a would abut a connector whose other end is connected to a 4-way geodesic joint 335, through which an aforementioned "X" pattern may be formed.

Figure 29B:
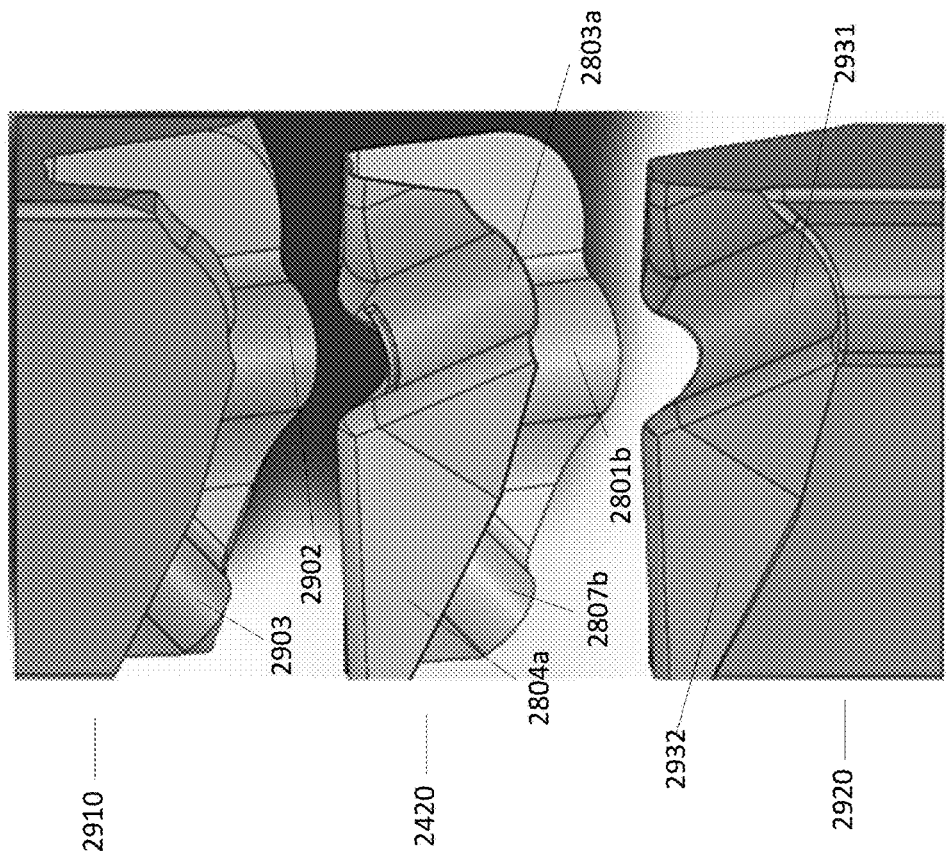
FIGS. 29A-29B illustrate an example of molds used for manufacturing a center piece of a mainframe-to-gangway-and-geodesic extension joint.
Figure 29A:
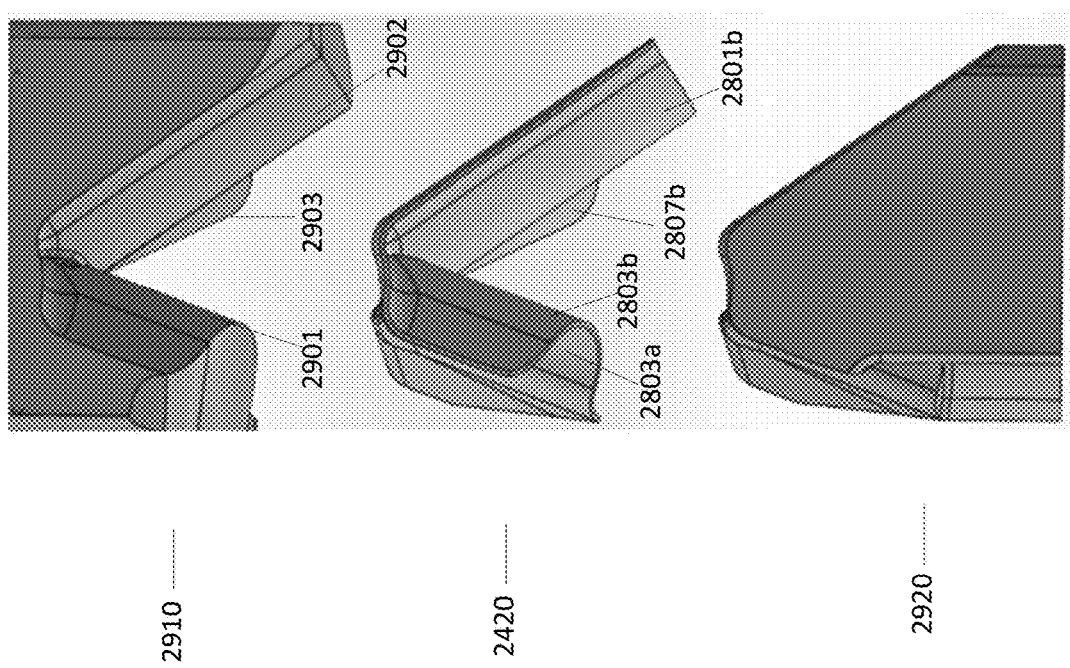

FIGS. 29A-29B illustrate an embodiment of molds used for manufacturing the center piece 2420. In particular embodiments, the mold assembly may include a male mold 2910 and a female mold 2920. An example of the molds is shown in FIG. 29A. The two molds may be used to press against a carbon fiber twill placed between them to create the center piece 2420. The contours of the male mold 2910 may form the interior surface of the center piece 2420, and the contours of the female mold 2920 may form the exterior surface of the center piece 2420. For example, the protruding convex portion 2901 of the male mold 2910 shown in FIG. 29A is configured to form the interior concave surface 2803a of the center piece 2420. Similarly, the protruding convex portions 2902 and 2903 of the male mold 2910 are configured to form the interior surfaces 2801a and 2807a, respectively, which are on the opposite sides of exterior surfaces 2801b and 2807b, respectively. FIG. 29B illustrates a side view of the same assembly shown in FIG. 29A. It should be appreciated that protruding contour 2902 and 2903 of the male mold 2910 would form the concave contours 2801b and 2807b, respectively, of the center piece 2420. Similarly, the contour of other portions of the center piece 2420 may be defined by the corresponding portions of the molds 2910 and 2920. For example, the substantially flat surface 2804a of the center piece 2420 may be formed by the surface 2932 of the female mold 2920 and a corresponding surface (not shown) of the male mold 2910. The back side of the 2803a surface would be formed by the concave contour 2931 of the female mold 2920. To improve 3D printing time and structural integrity of the molds, the molds 2910 and 2920, in particular embodiments, may be made hollow during the 3D printing process and subsequently filled with, e.g., cement or any other suitable material that may solidify or reinforce the structure of the mold. For example, after the molds have been created, cement may be poured into it through openings.

Figure 30B:
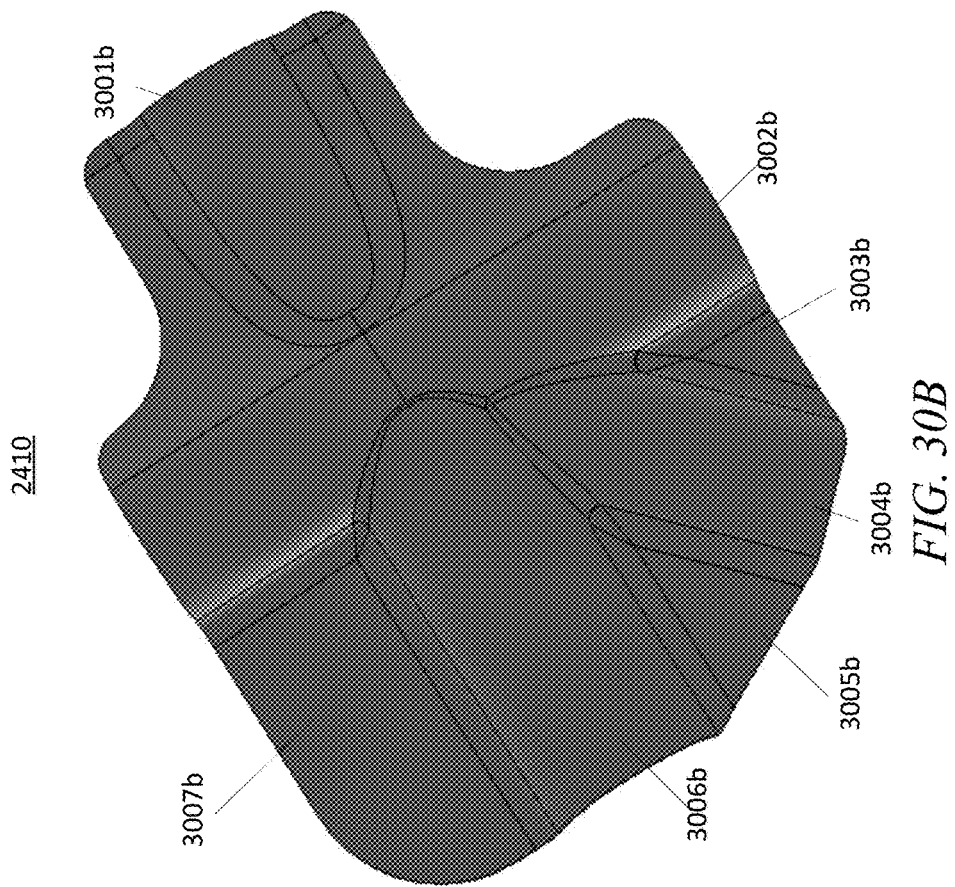
FIGS. 30A-30B illustrate an example of a base piece of a mainframe-to-gangway-and-geodesic extension joint.
Figure 30A:
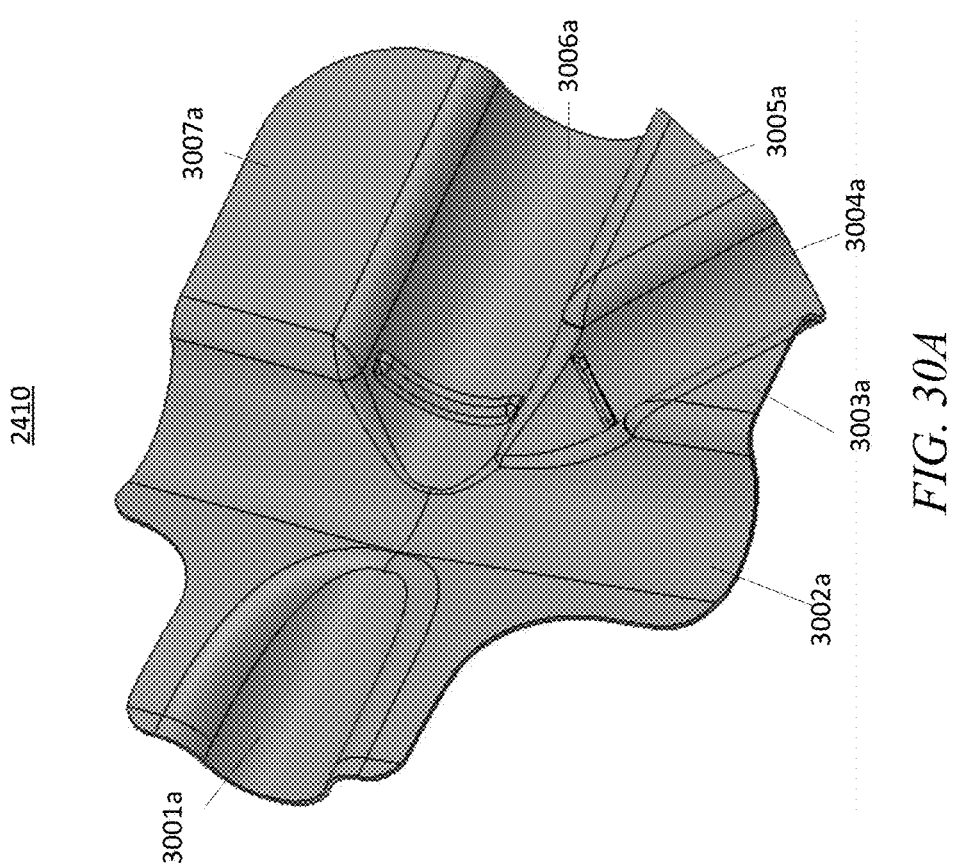

FIGS. 30A-30B illustrate a top view and a bottom view, respectively, of a base piece 2410, with some variations. The top surface shown in FIG. 30A is considered to be the interior since it would form the interior surface of the assembled mainframe-to-gangway-and-geodesic extension 2400. Referring to both FIGS. 30A and 30B, the base piece 2410 comprises: an interior surface 3001a and a corresponding exterior surface 3001b (similar to portion 2515 in FIG. 25); an interior surface 3002a and a corresponding exterior surface 3002b (corresponding to portion 2514); an interior surface 3003a and a corresponding exterior surface 3003b (corresponding to portion 2513); an interior surface 3004a and a corresponding exterior surface 3004b (corresponding to portion 2413); an interior surface 3005a and a corresponding exterior surface 3005b (corresponding to portion 2512); an interior surface 3006a and a corresponding exterior surface 3006b (corresponding to portion 2411); and an interior surface 3007a and a corresponding exterior surface 3007b (corresponding to portion 2511). Once assembled, the top surface 3006a would abut a connector whose other end is connected to an interior base joint (i.e., not interfacing with the mainframe) of an adjoining intersecting gangway pyramid structure. The top surface 3004a may abut a connector whose other end is connected to a 4-way geodesic joint 335, through which an aforementioned "X" pattern may be formed. The top surfaces 3001a and 3002a would abut and be affixed to the exterior surfaces of the female half 901 of the base joint 301.

Figure 31A:
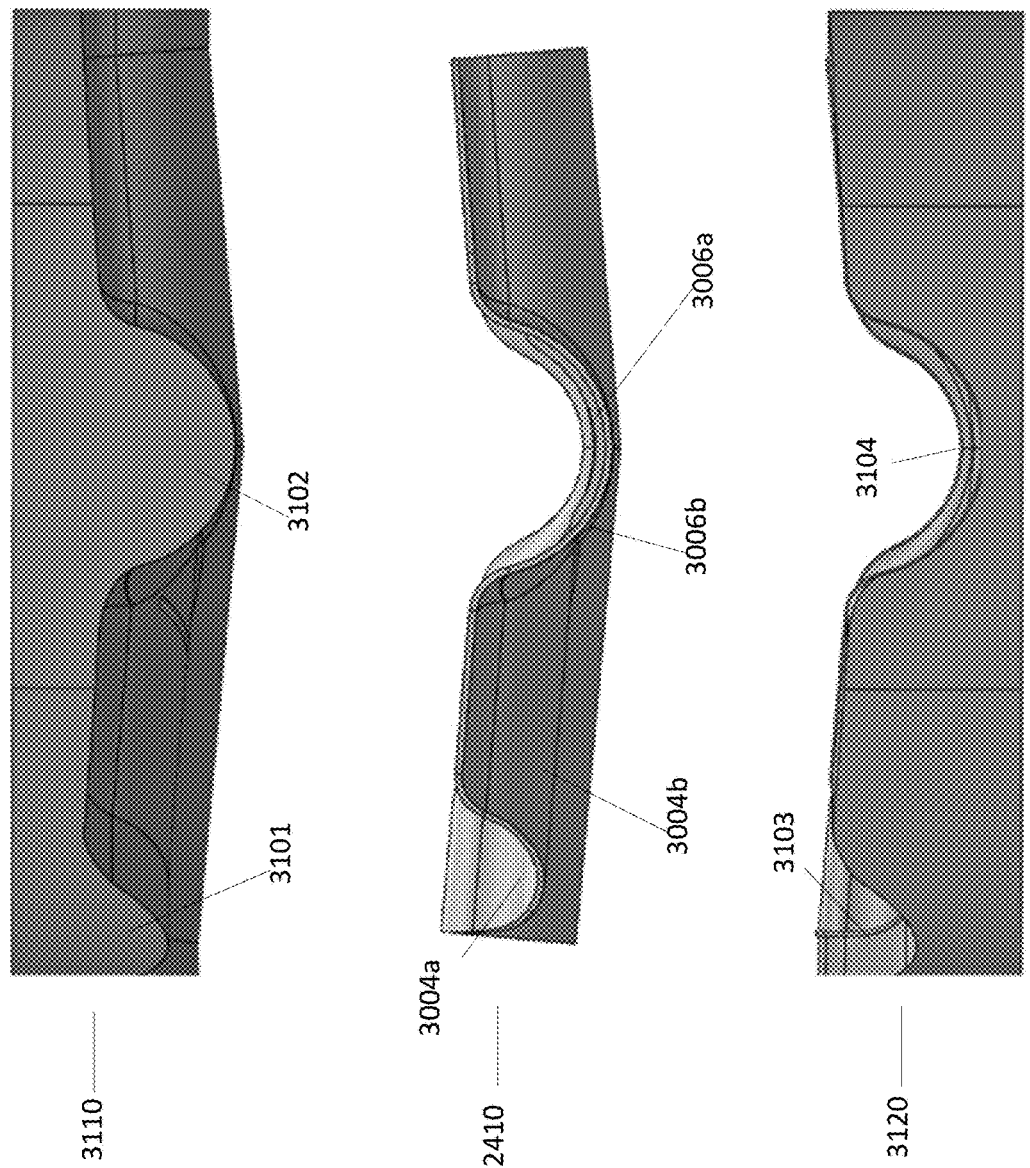
FIGS. 31A-31B illustrate an example of molds used for manufacturing a base piece of a mainframe-to-gangway-and-geodesic extension joint.
Figure 31B:
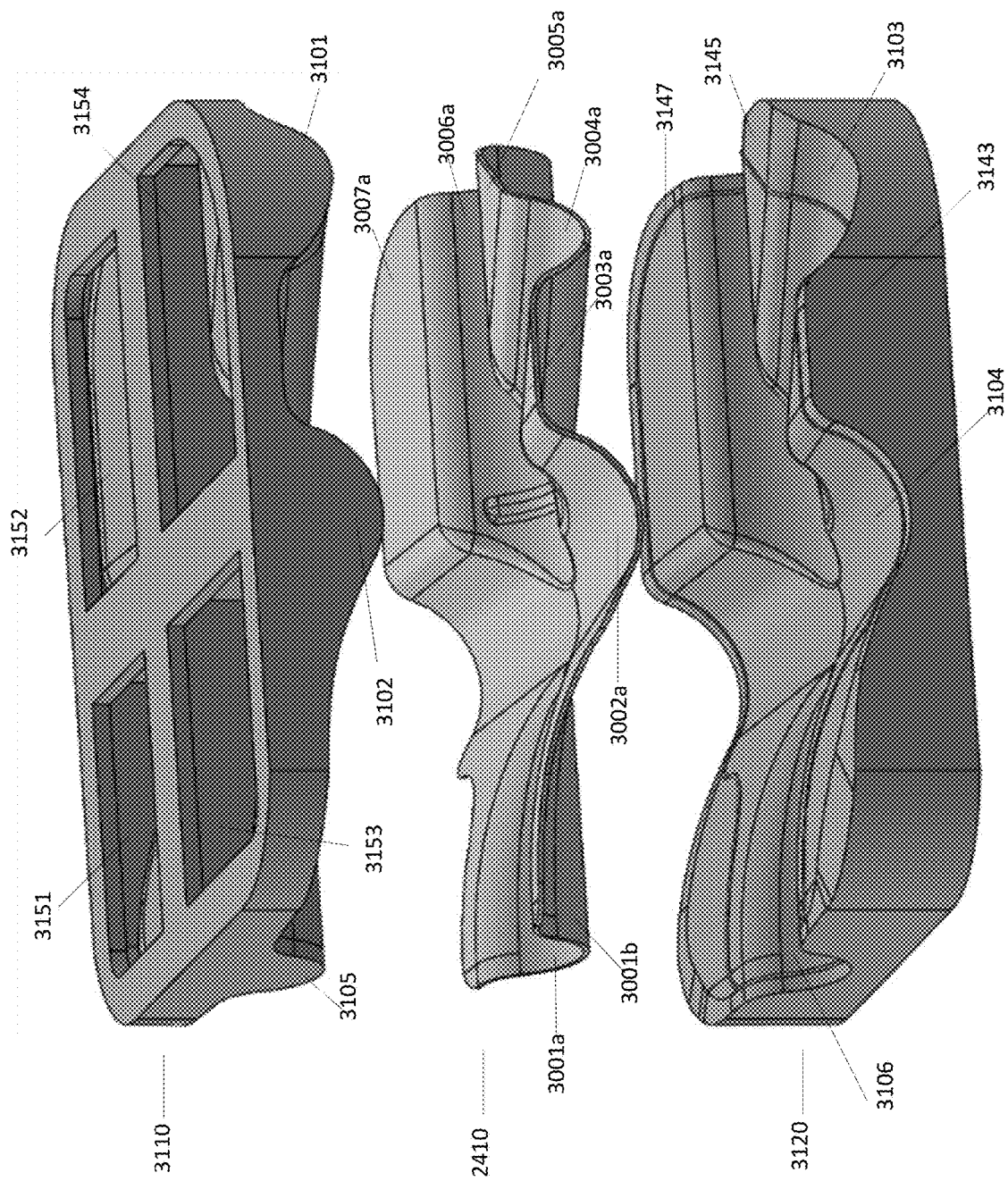

FIGS. 31A-31B illustrate an embodiment of molds used for manufacturing the base piece 2410. In particular embodiments, the mold assembly may include a male mold 3110 and a female mold 3120. An example of the molds is shown in FIG. 31A. The two molds may be used to press against a carbon fiber twill placed between them to create the base piece 2410. The contours of the male mold 3110 may form the interior surface of the base piece 2410, and the contours of the female mold 3120 may form the exterior surface of the base piece 2410. For example, the protruding convex portion 3102 of the male mold 3110 shown in FIG. 31A is configured to form the interior concave surface 3006a of the base piece 2410, and the concave portion 3104 of the female mold 3120 is configured to form the exterior surface 3006b of the base piece 2410. Similarly, the protruding convex portion 3101 of the male mold 3110 and the concave portion 3103 of the female mold 3120 are configured to form, respectively, the interior surface 3004a and the corresponding exterior surface 3004b of the base piece 2410. FIG. 31B illustrates a perspective view of the same assembly shown in FIG. 31A. It should be appreciated that the protruding concave surface 3001a and the corresponding back surface 3001b are formed by pressing together the convex portion 3105 of the male mold 3110 and the concave portion 3106 of the female mold 3120. Similarly, the base piece's 2410 concave surface 3002a and its corresponding back side is formed by pressing together the convex portion 3102 of the male mold 3110 and the concave portion 3104 of the female mold 3120. The base piece's 2410 concave surface 3004a and its corresponding back side is formed by pressing together the convex portion 3101 of the male mold 3110 and the concave portion 3103 of the female mold 3120. Other portions of the base piece 2410 are similarly formed. For example, the substantially flat surfaces 3003a, 3005a, and 3007a and their corresponding back sides are formed by substantially flat portions of the molds, such as 3143, 3145, and 3147 of the female mold 3120. To improve 3D printing time and structural integrity of the molds, the molds 3110 and 3120, in particular embodiments, may be made hollow during the 3D printing process and subsequently filled with, e.g., cement or any other suitable material that may solidify or reinforce the structure of the mold. For example, after the molds have been created, cement may be poured into it through openings, such as the holes 3151-3154 of the male mold 3110.

Figure 32:
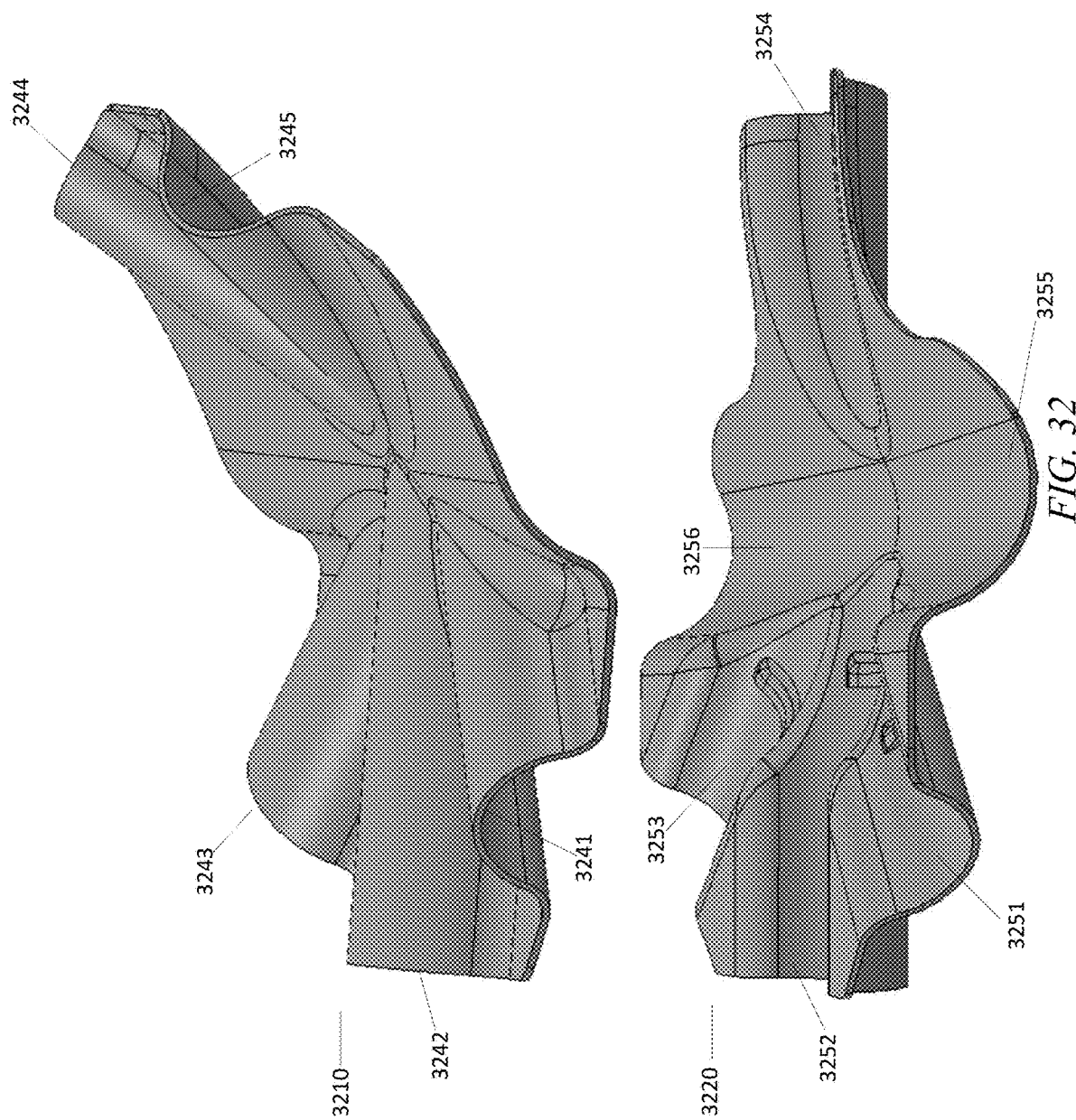
FIG. 32 illustrates an exploded view of an example of a mainframe-to-geodesic extension joint.

FIG. 32 illustrates an exploded view of an embodiment of a mainframe-to-geodesic extension 3200 configured to be attached to a mainframe's base joint 301. Particular embodiments of the joint 339 shown in FIGS. 3C and 3D may be assembled in this manner using the mainframe-to-geodesic extension 3200. In particular embodiments, the base joint 301 of the mainframe may be one that interfaces with geodesic structures and not the gangway. The illustrated mainframe-to-geodesic extension 3200 include two pieces, referred to as the top piece 3210 and bottom piece 3220. When assembled, the top 3210 and bottom pieces 3220 form three additional extension slots for connecting the base joint 301 to geodesic structures. One of the three extension slots, referred to as a longitudinal slot, may be configured to receive a connector whose other end is connected to a 6-way geodesic joint 330 (see FIG. 3C). The connector may be substantially perpendicular to the mainframe and may form a shared border between two "X" patterns of the geodesic structure. The two "X" patterns may be referred to as top "X" pattern and bottom "X" pattern, respectively, and each of the "X" patterns may have a corresponding 4-way geodesic joint 335 in the center. The remaining two of the three extension slots of the mainframe-to-geodesic extension 3200 may be configured to connect to the top and bottom "X" patterns, respectively. In particular, one of the extension slots may be configured to receive a connector whose other end is connected to the 4-way geodesic joint 335 of the top "X" pattern, and the other extension slot may be configured to receive a connector whose other end is connected to the 4-way geodesic joint 335 of the bottom "X" pattern.

In particular embodiments, each of the extension slots of the mainframe-to-geodesic extension 3200 may be formed by the top 3210 and bottom 3220 pieces once they are assembled. For instance, the longitudinal slot for connecting to a 6-way geodesic joint may be formed by interior concave surfaces 3242 and 3252 of the top 3210 and bottom 3220 pieces, respectively. One of the slots for connecting to a 4-way geodesic joint may be formed by interior concave surfaces 3243 and 3253 of the top 3210 and bottom 3220 pieces, respectively. The other slot for connecting to another 4-way geodesic joint may be formed by interior concave surfaces 3241 and 3251 of the top 3210 and bottom 3220 pieces, respectively. In particular embodiments, the top piece 3210 may have portions—such as the substantially flat surfaces between the interior concave surfaces—that abut corresponding portions of the bottom piece 3220. The surface area of these portions may be used to bond the top 3210 and bottom 3220 pieces together (e.g., using bonding agent, nuts and bolts, etc.).

Aside from the portions for creating the extension slots, the top 3210 and bottom 3220 pieces comprise additional portions for enveloping an exterior portion of the base joint 301. For example, the top piece 3210 may have interior concave surfaces 3244 and 3245 configured to envelop the exterior surface of slots 915 and 913 (see FIG. 9A), respectively, of the base joint 301. The bottom piece 3220 may have an interior concave surface 3254 configured to envelop the exterior surface of slot 911 and the surrounding surfaces of the base joint 301. The bottom piece 3220 may further have interior concave surfaces 3255 and 3256 configured to envelop the exterior surfaces of slots 912 and 914 of the base joint 301. In particular embodiments, adhesives may be used to bond the top 3210 and bottom 3220 pieces of the mainframe-to-geodesic extension 3200 to the base joint 301 and with each other.

FIGS. 33A-33B illustrate a top view and a bottom view, respectively, of the top piece 3210. The top surface shown in FIG. 33A is considered to be the interior since it would form the interior surface of the assembled mainframe-to-geodesic extension 3200. Referring to both FIGS. 33A and 33B, the top piece 3210 comprises: an interior surface 3341*a* and a corresponding exterior surface 3341*b* (corresponding to portion 3243 in FIG. 32); an interior surface 3342*a* and a corresponding exterior surface 3342*b* (corresponding to portion 3242); an interior surface 3343*a* and a corresponding exterior surface 3343*b* (corresponding to portion 3231); an interior surface 3344*a* and a corresponding exterior surface 3344*b* (corresponding to portion 3245); and an interior surface 3345*a* and a corresponding exterior surface 3345*b* (corresponding to portion 3244). The top piece 3210 further comprises interior surfaces 3361*a*, 3362*a*, 3363*a*, 3364*a*, and 3365*a* and corresponding exterior surfaces 3361*b*, 3362*b*, 3363*b*, 3364*b*, and 3365*b*, respectively. Once assembled, the interior surfaces 3241, 3242, and 3243 would abut connectors connecting to adjacent geodesic structures. For instance, the interior surfaces 3361*a*, 3362*a*, 3363*a*, and 3364*a* of the top piece 3210 would abut corresponding interior surfaces of the bottom piece 3220, which will be described with reference to FIGS. 35A-35B. The interior surfaces 3344*a*, 3345*a*, and 3365*a* would abut and be affixed to the exterior surfaces of slot 913, slot 915, and the portion between them, respectively.

Figure 34A:
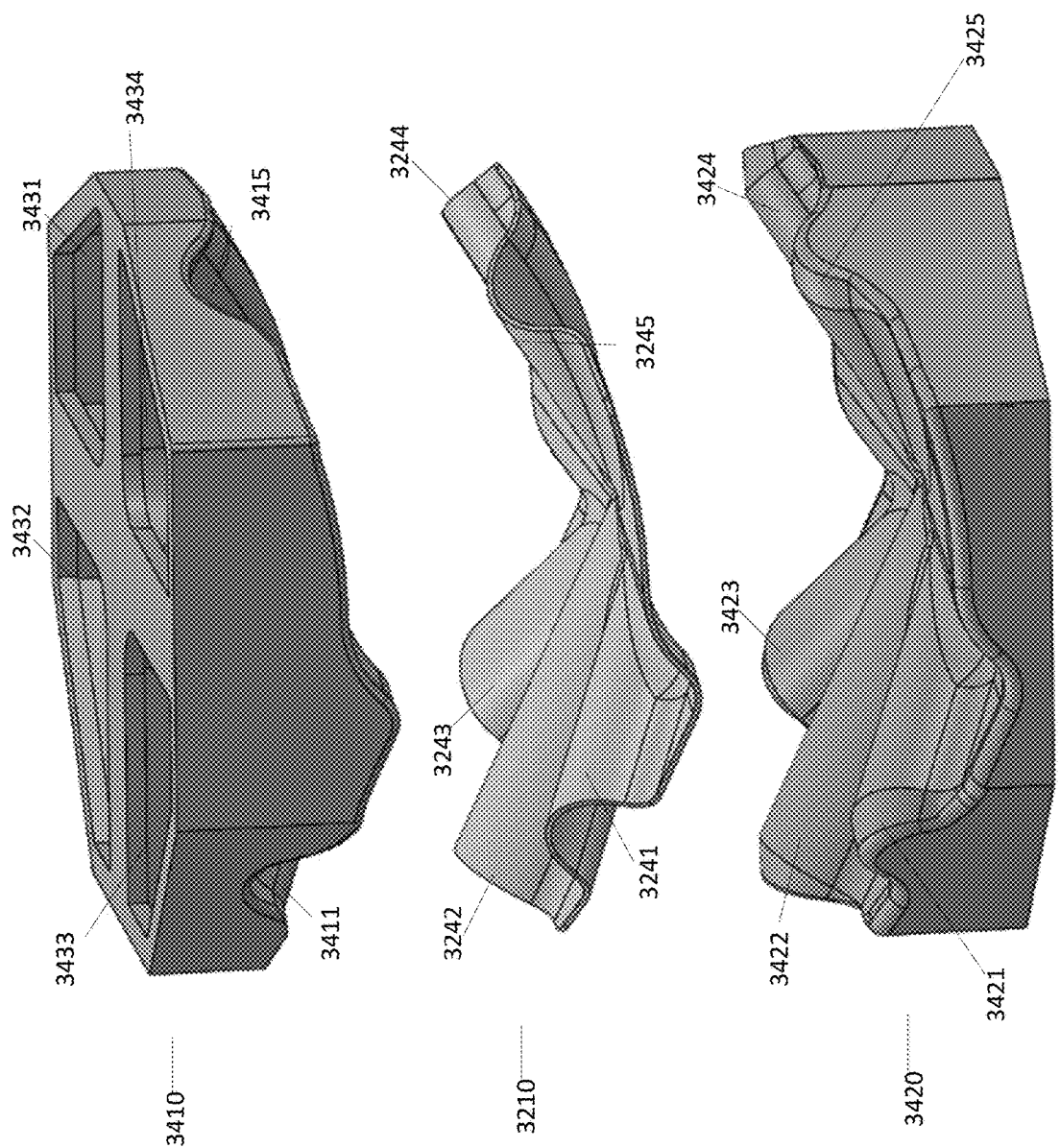
FIGS. 34A-34B illustrate an example of molds used for manufacturing a top piece of a mainframe-to-geodesic extension joint.
Figure 34B:
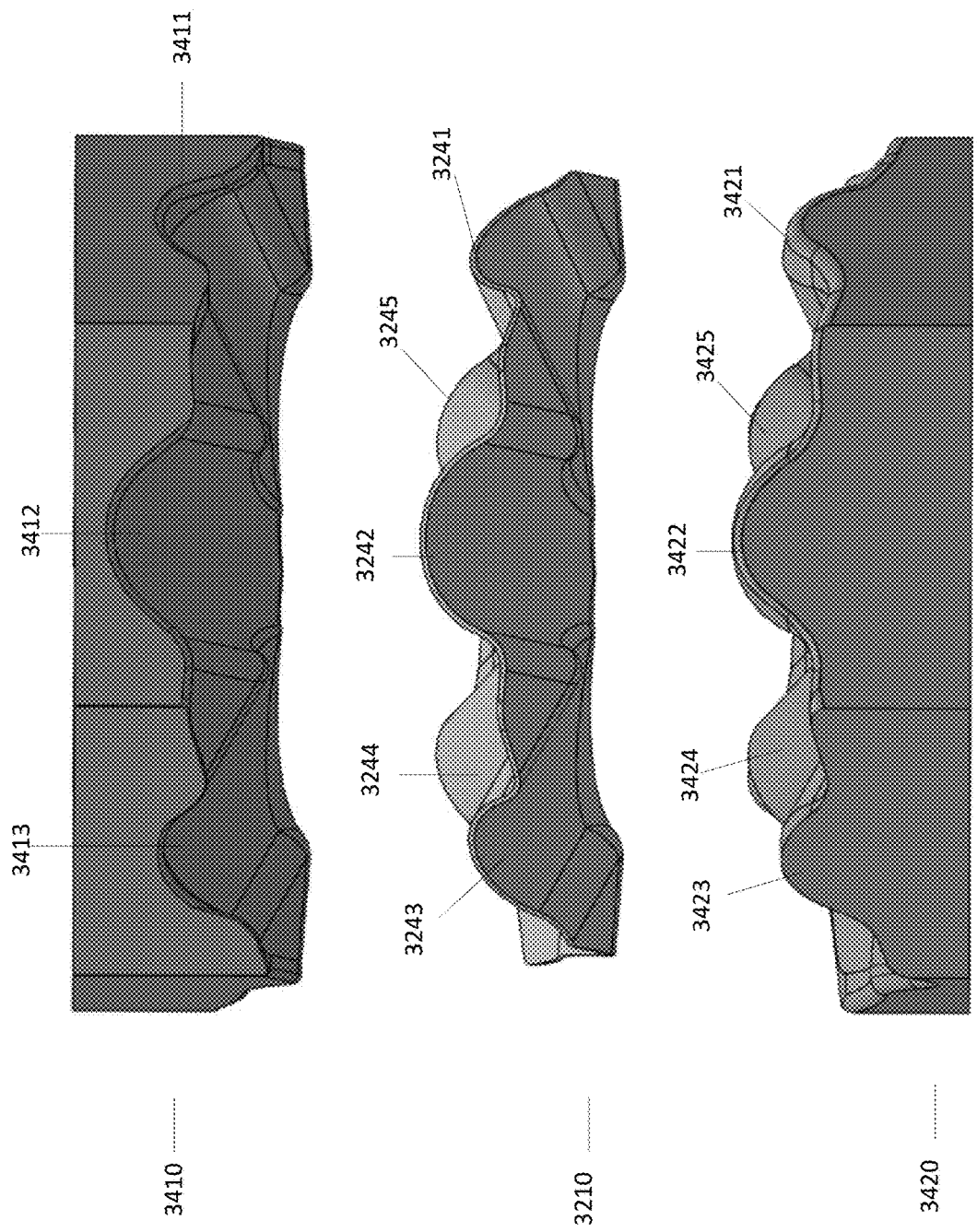

FIGS. 34A-34B illustrate an embodiment of molds used for manufacturing the top piece 3210. In particular embodiments, the mold assembly may include a female mold 3410 and a male mold 3420. An example of the molds is shown in FIG. 34A. The two molds may be used to press against a carbon-fiber twill placed between them to create the top piece 3210. The contours of the male mold 3420 may form the interior surface of the top piece 3210, and the contours of the female mold 3410 may form the exterior surface of the top piece 3210. For example, the concave contour 3411 of the female mold 3410 and the convex contour 3421 of the male mold 3420, when pressed together, may form the concave portion 3241 of the top piece 3210. Similarly, the concave contour 3415 of the female mold 3410 and the convex contour 3425 of the male mold 3420, when pressed together, may form the concave portion 3245 of the top piece 3210. While not illustrated, it should be appreciated that additional concave contours of the female mold 3410 corresponding to the convex contours 3422, 3423, and 3424 of the male mold 3420, when pressed together, may form the concave portions 3242, 3243, and 3244 of the top piece 3210. FIG. 34B illustrates a side view of the same assembly shown in FIG. 34A. It should be appreciated that protruding convex contours 3421, 3422, and 3423 of the male mold 3420 and the corresponding concave contours 3411, 3412, and 3413 of the female mold 3410, when pressed together, would form the concave portions 3241, 3242, and 3243 of the top piece 3210, respectively. Similarly, while not shown, concave contours of the female mold 3410 and the corresponding convex contours 3424 and 3425, when pressed together, may form the concave portions 3244 and 3245 of the top piece 3210, respectively. To improve 3D printing time and structural integrity of the molds, the molds 3410 and 3420, in particular embodiments, may be made hollow during the 3D printing process and subsequently filled with, e.g., cement or any other suitable material that may solidify or reinforce the structure of the mold. For example, after the molds have been created, cement may be poured into it through openings such as 3431, 3432, 3433, and 3434 of the female mold 3410.

FIGS. 35A-35B illustrate a top view and a bottom view, respectively, of the bottom piece 3220. The top surface shown in FIG. 35A is considered to be the interior since it would form the interior surface of the assembled mainframe-to-geodesic extension 3200. Referring to both FIGS. 35A and 35B, the top piece 3220 comprises: an interior surface 3551*a* and a corresponding exterior surface 3551*b* (corresponding to portion 3251 in FIG. 32); an interior surface 3552*a* and a corresponding exterior surface 3552*b* (corresponding to portion 3252); an interior surface 3553*a* and a corresponding exterior surface 3553*b* (corresponding to portion 3253); an interior surface 3554*a* and a corresponding exterior surface 3554*b* (corresponding to portion 3254); an interior surface 3555*a* and a corresponding exterior surface 3555*b* (corresponding to portion 3255); and an interior surface 3556*a* and a corresponding exterior surface 3556*b* (corresponding to portion 3256). The bottom piece 3220 further comprises interior surfaces 3571*a*, 3572*a*, 3573*a*, and 3574*a* and corresponding exterior surfaces 3571*b*, 3572*b*, 3573*b*, and 3574*b*. Once assembled, the interior surfaces 3551*a*, 3552*a*, and 3553*a* would abut connectors connecting to adjacent geodesic structures. The interior surfaces 3571*a*, 3572*a*, 3573*a*, and 3574*a* of the bottom piece 3220 would abut corresponding interior surfaces 3364*a*, 3363*a*, 3362*a*, and 3361*a* of the top piece 3210. The interior surfaces 3555*a*, 3556*a*, and 3554*a* would abut and be affixed to the exterior surfaces of slot 912, slot 914, and slot 911 of the mainframe's base joint 301, respectively.

Figure 36A:
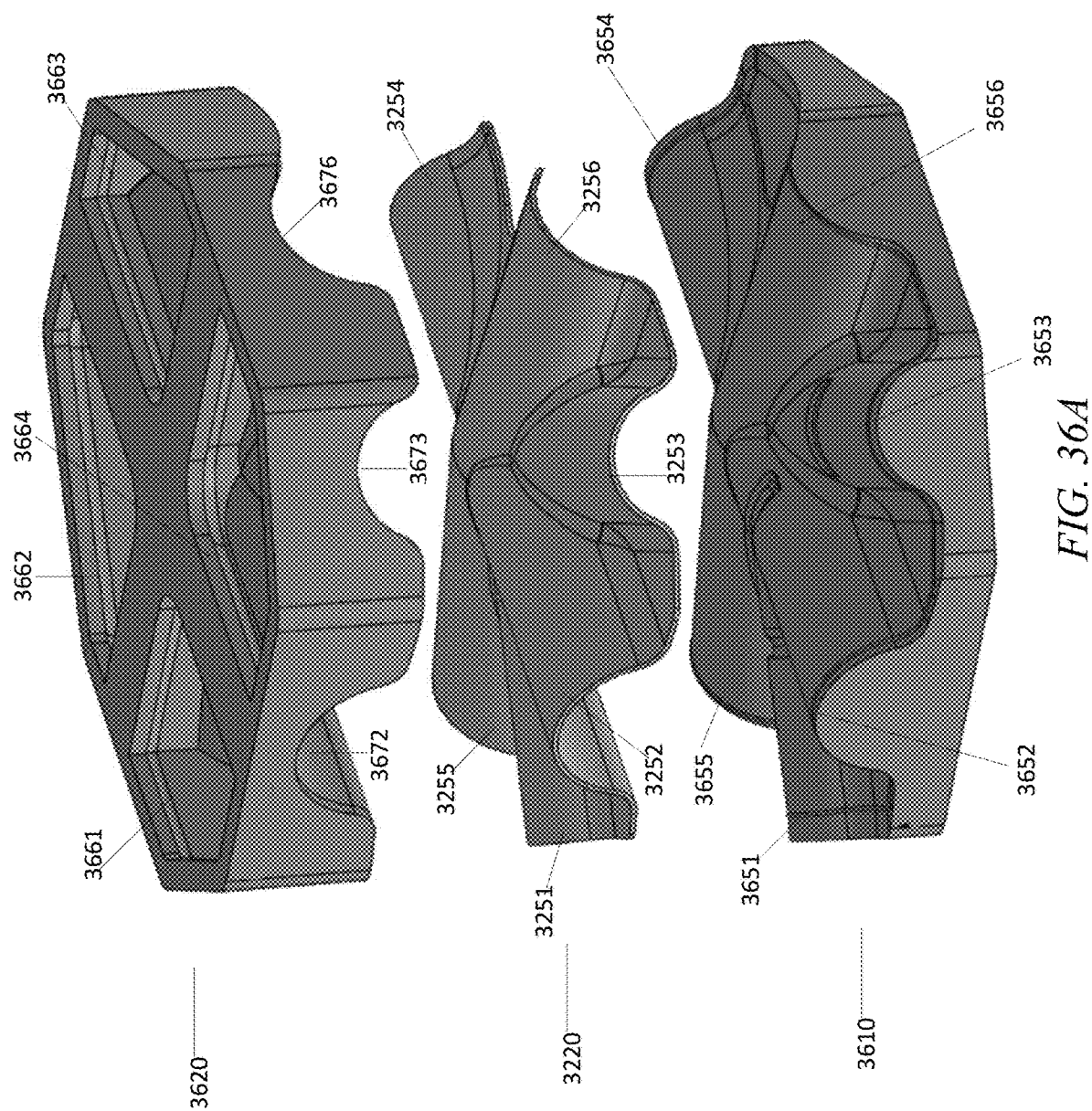
FIGS. 36A-36B illustrate an example of molds used for manufacturing a bottom piece of a mainframe-to-geodesic extension joint.
Figure 36B:
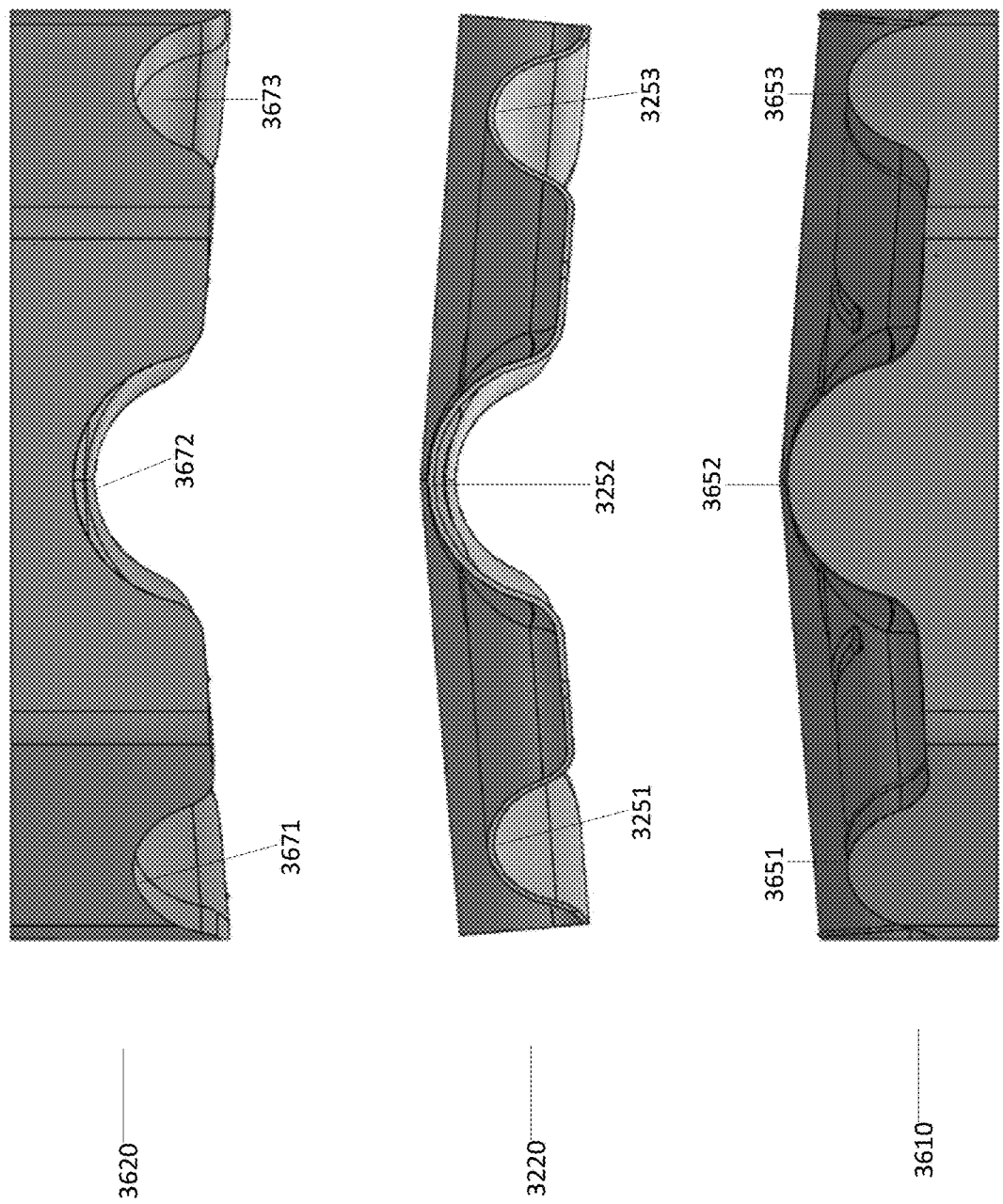

FIGS. 36A-36B illustrate an embodiment of molds used for manufacturing the bottom piece 3220. In particular embodiments, the mold assembly may include a female mold 3620 and a male mold 3610. An example of the molds is shown in FIG. 34A. The two molds may be used to press against a carbon fiber twill placed between them to create the bottom piece 3220. The contours of the male mold 3610 may form the interior surface of the bottom piece 3220, and the contours of the female mold 3620 may form the exterior surface of the bottom piece 3220. For example, the concave contours 3672, 3673, and 3676 of the female mold 3620 and the convex contours 3652, 3653, and 3656 of the male mold 3610, when pressed together, may form the concave portions 3252, 3253, and 3256 of the bottom piece 3220. While not illustrated, it should be appreciated that additional concave contours of the female mold 3620 corresponding to the convex contours 3651, 3655, and 3654 of the male mold 3610, when pressed together, may form the concave portions 3251, 3255, and 3254 of the bottom piece 3220. FIG. 36B illustrates a side view of the same assembly shown in FIG. 36A. It should be appreciated that protruding convex contours 3651, 3652, and 3653 of the male mold 3610 and the corresponding concave contours 3671, 3672, and 3673 of the female mold 3620, when pressed together, would form the concave portions 3251, 3252, and 3253 of the bottom piece 3220, respectively. To improve 3D printing and structural integrity of the molds, the molds 3610 and 3620, in particular embodiments, may be made hollow during the 3D printing process and subsequently filled with, e.g., cement or any other suitable material that may solidify or reinforce the structure of the mold. For example, after the molds have been created, cement may be poured into it through openings such as 3661, 3662, 3663, and 3664 of the female mold 3620.

Figure 37A:
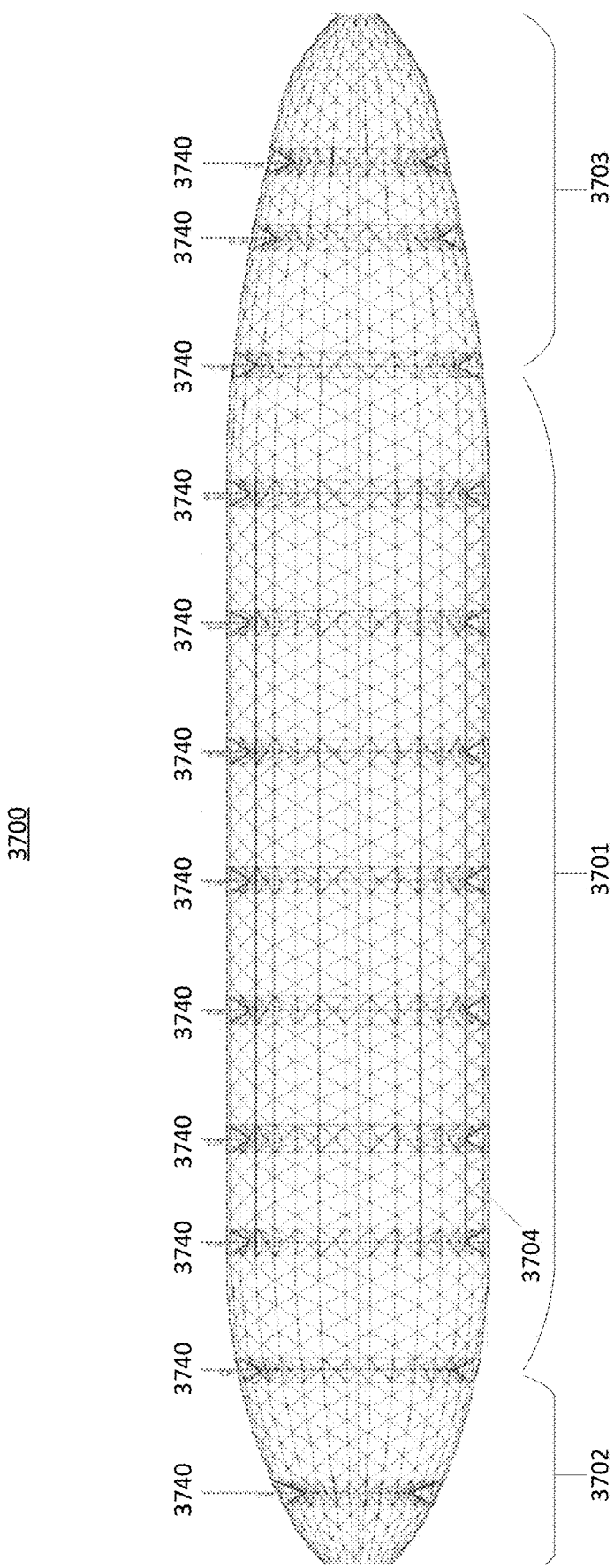
FIG. 37A illustrates an example structure of a rigid airship.

FIG. 37A illustrates an example structure 3700 of a rigid airship, in accordance with particular embodiments. The structure 3700 may comprise a hall section 3701, a bow section 3702, and a stern section 3703 to which the airship's rudder may be attached. The structure 3700 may comprise multiple main transverse frames or mainframes 3740. In particular embodiments, each mainframe 3740 is circular. In particular embodiments, the mainframes 3740 may be interconnected using longitudinal gangways 3704. In particular embodiments, wires (e.g., which may be constructed using Vectran fiber or any other suitable material with suitable strength and flexibility characteristics) connecting points on the inner circumference of each mainframe 3740 may physically section the hull 3701 into multiple segments. The segments may be used to hold individual airbags containing lifting gas (e.g., helium).

Figure 37B:
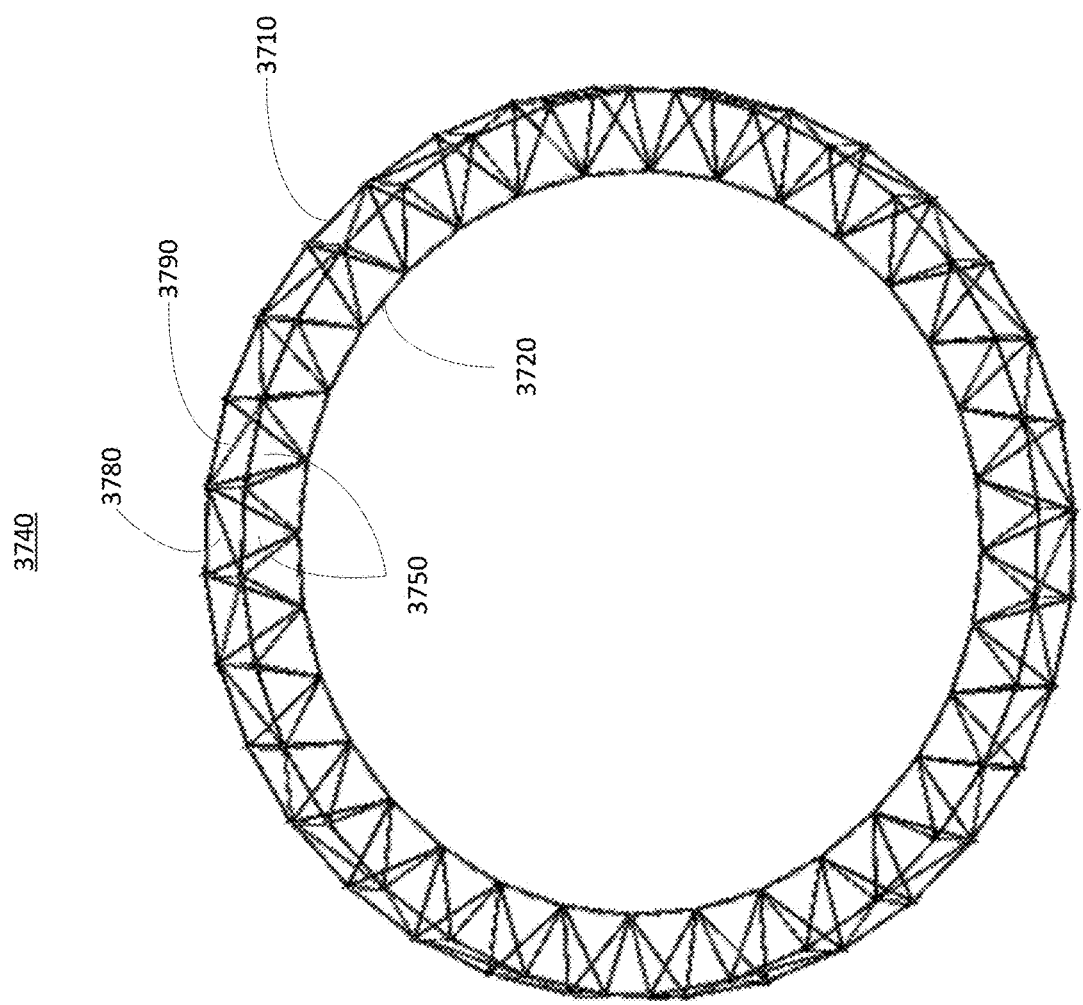
FIG. 37B illustrates an embodiment of a mainframe.

FIG. 37B illustrates an embodiment of the mainframe 3740. The mainframe 3740 may comprise an outer portion 3710 and an inner portion 3720. In particular embodiments, the mainframe 3740 may be constructed using pyramid structures 3750. Each pyramid structure 3750 may have a base and an apex. In particular embodiments, the pyramid structures 3750 may be configured so that their apexes point toward the center of the mainframe 3740 and their bases face outwards. In such a configuration, the outer portion 3710 of the mainframe 3740 is formed by the connectors that form the bases of pyramid structures 3750, and the inner portion 3720 of the mainframe 3740 is formed by the connectors that connect the apexes 3770 of those pyramid structures 3750. In particular embodiments, the bases of the pyramid structures 3750 may include diagonal connectors 3780 and 3790, which may cross the bases diagonally in an alternating, zig-zag pattern.

Figure 38:
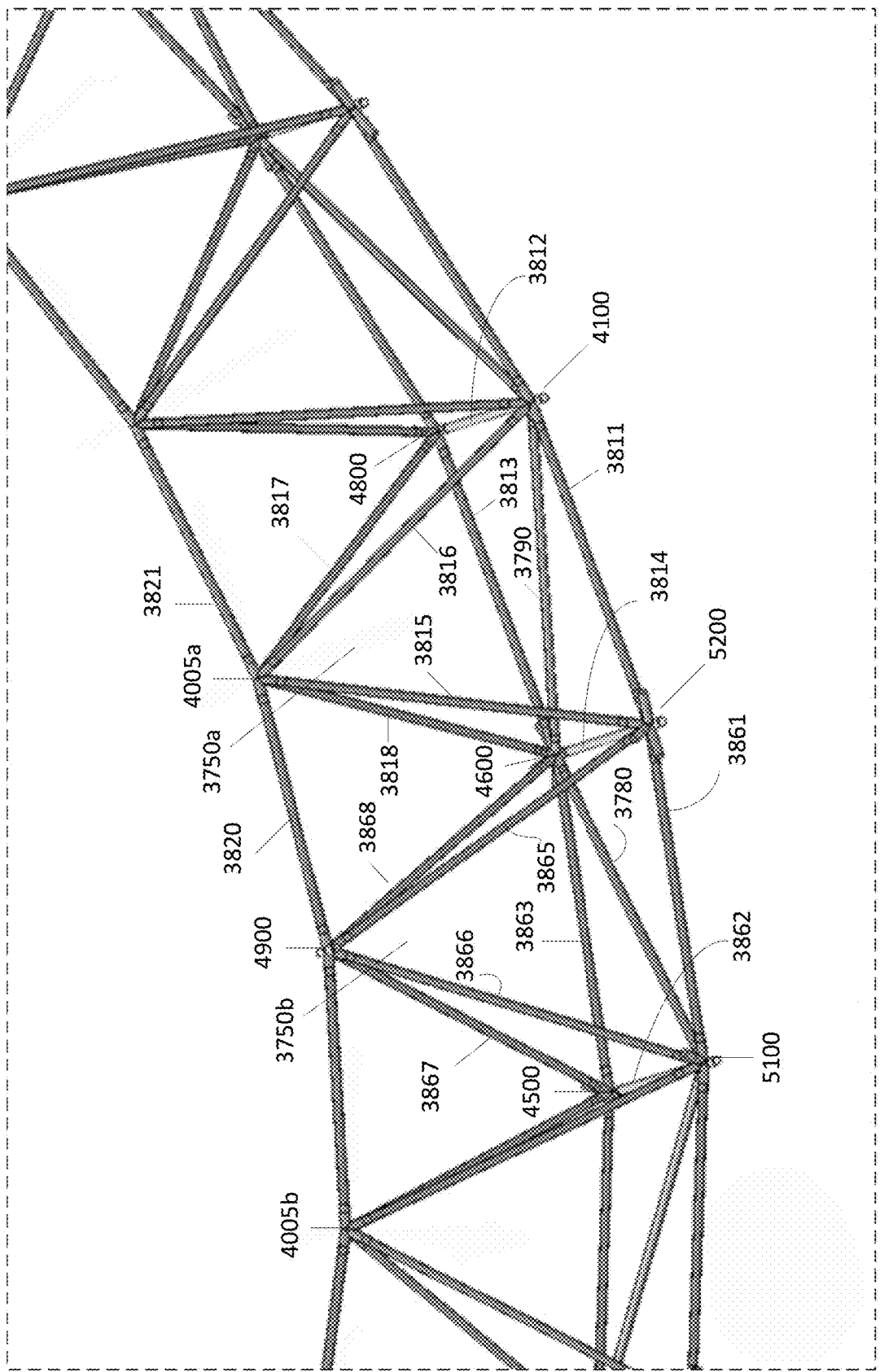
FIG. 38 illustrates an example perspective view of a portion of a mainframe.

FIG. 38 illustrates an example perspective view of a portion of the mainframe 3740. In particular embodiments, each pyramid structure (e.g., 3750a and 3750b) used for building the mainframe 3740 may have four base joints (e.g., 5200, 4100, 4800, and 4600) forming the base of the pyramid (e.g., 3750a) and an apex joint (e.g., 4005a) forming the apex of that pyramid. In particular embodiments, connectors or rods may connect the joints to form a pyramid structure 3750. For example, a pyramid's 3750a base may be formed by a connector 3811 connecting base joints 5200 and 4100, a connector 3812 connecting base joints 4100 and 4800, a connector 3813 connecting base joints 4800 and 4600, a connector 3814 connecting base joints 4600 and 5200, and diagonal connector 3790 connecting base joints 4100 and 4600. The pyramid's 3750a sides may be formed by connectors 3815, 3816, 3817, and 3818 connecting the apex joint 4005a to the base joints 5200, 4100, 4800, and 4600, respectively. As another example, a pyramid's 3750b base may be formed by a connector 3861 connecting base joints 5100 and 5200, a connector 3814 connecting base joints 5200 and 4600, a connector 3863 connecting base joints 4600 and 4500, a connector 3862 connecting base joints 4500 and 5100, and diagonal connector 3780 connecting base joints 5100 and 4600. The pyramid's 3750b sides may be formed by connectors 3865, 3866, 3867, and 3868 connecting the apex joint 4900 to the base joints 5200, 5100, 4500, and 4600, respectively. In particular embodiments, the mainframe 3740 may be constructed using adjacent pyramid structures 3750. For example, between two adjacent pyramids 3750a and 3750b, one connector (e.g., 3814) may be shared between the bases of the two pyramids 3750a and 3750b. In such a configuration, two adjacent pyramids may share one base connector and two corresponding base joints. For instance, FIG. 38 shows the base joints 5200 and 4600 and their connector 3814 being shared by the two labeled pyramids 3750a and 3750b. In particular embodiments, the apex joints (e.g., 4005a and 4900) of adjoining pyramids (e.g., 3750a and 3750b, respectively) may be connected by an apex connector 3820. In particular embodiments, the structural pattern of interconnected pyramid structures 3750 described above repeats through the entire mainframe 3740. In particular embodiments, the joints may be configured to create a circular mainframe 3740. For instance, the apex joint 4005 may be configured so that its slots for receiving apex-to-apex connectors 3820 and 3821 may be angled with respect to each other to form a corner of a polygon that approximates the interior of a circular mainframe 140. Similarly, each of the base joints (e.g., 5200) may be configured so that its two slots for receiving base connectors (e.g., 3811 and 3861) forming respective sides of adjacent pyramids (e.g., 3750a and 3750b) may be angled with respect to each other to form a corner of a polygon that approximates an exterior of a circular mainframe 3740. For example, base joint 5200 may be configured so that connectors 3811 and 3861 form a corner of a 36-sided polygon. Further details of the joints' configurations are provided below.

Figure 39A:
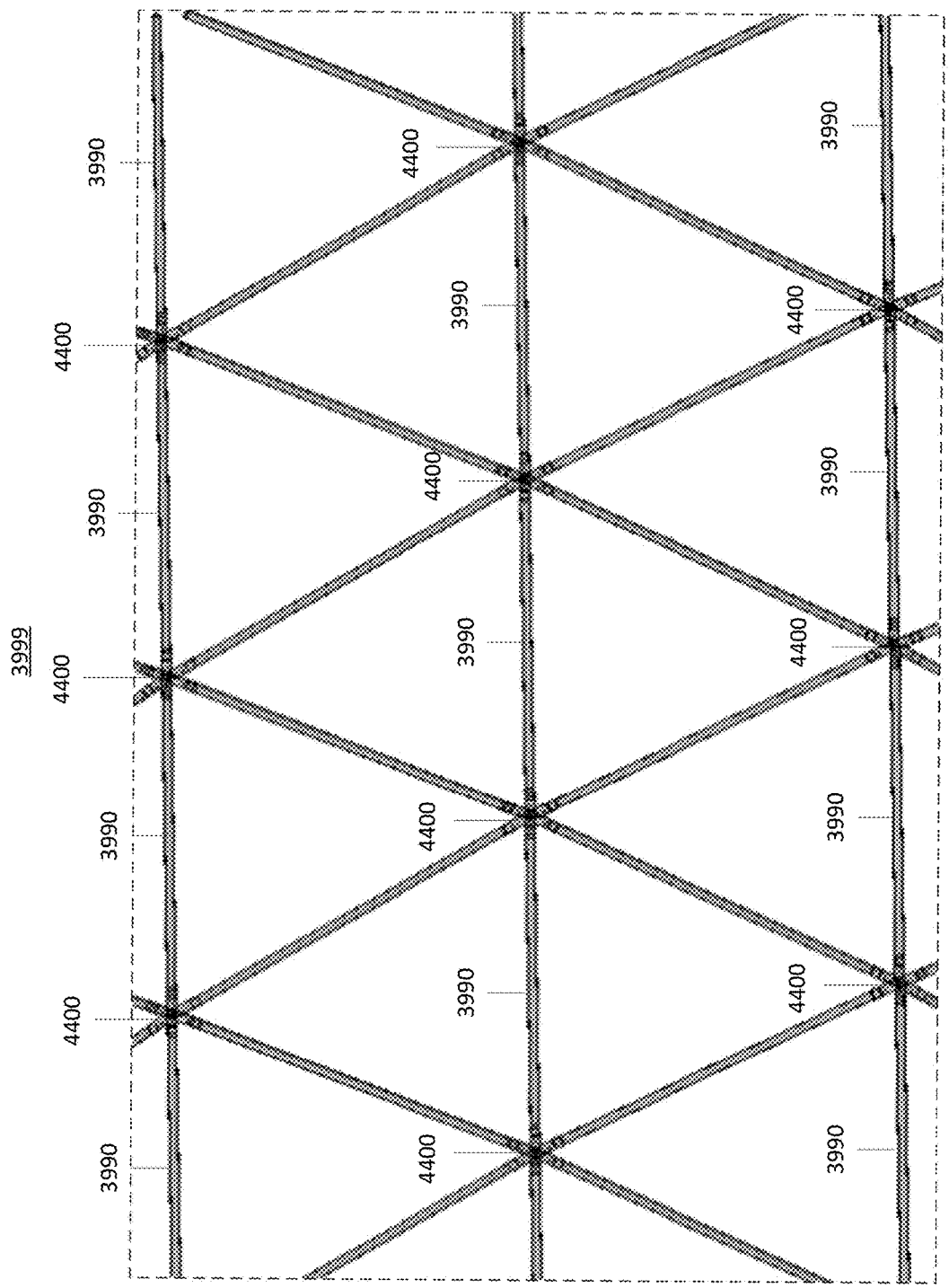
FIG. 39A illustrates an example top view of a portion of an alternative geodesic structure.

FIG. 39A illustrates an example top view of a portion of an alternative geodesic structure 3999. As discussed above with reference to FIG. 2B, mainframes 140 may be connected by longitudinal connectors 290. Similarly, mainframes 3740 (e.g., as illustrated in FIG. 37B) may be connected by longitudinal connectors 3990 in the geodesic structure 3999 shown in FIG. 39A. In particular embodiments, two base joints of the mainframes 3740 may be connected by a single longitudinal connector 3990 that extends through a series of geodesic joints, such as the 6-way geodesic joints 4400. In particular embodiments, the 6-way geodesic joint 4400 may have six connector slot openings. Two of the slots on opposite sides of the joint 4400 may form a channel through which a longitudinal connector 3990 may pass. The other four connector slots of the 6-way geodesic joint 4400 may be configured to connect to four other 6-way geodesic joints 4400, to form the geodesic structure. In alternative embodiments, two base joints may be connected by a series of longitudinal connectors 3990 connected by 6-way geodesic joints 4400 to form a substantially straight line.

Figure 39B:
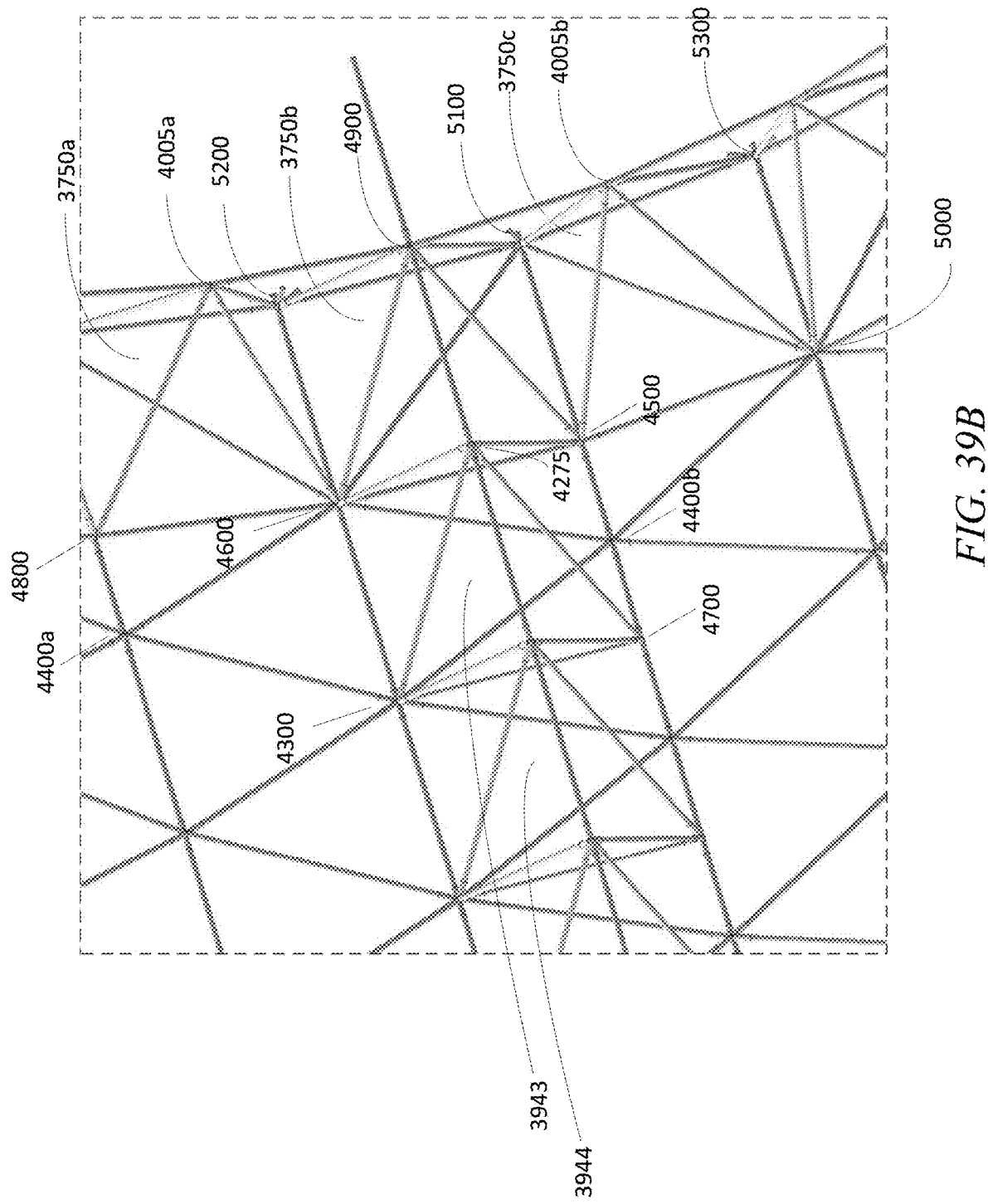
FIG. 39B illustrates an alternative embodiment of a portion of the hull structure where a mainframe intersects a gangway.

FIG. 39B illustrates an embodiment of a portion of the hull structure that is alternative to what is shown in FIG. 3D. FIG. 39B shows a mainframe 3740 (not labeled in FIG. 39B for clarity but formed in part by the pyramid structures 3750a, 3750b, and 3750c) intersecting a gangway (not labeled in FIG. 39B for clarity but formed in part by the pyramid structures 3943 and 3944). Referring back to FIG. 2B, two mainframes 3740 may be connected by one or more gangways. In particular embodiments, both the mainframes 3740 and gangways may be constructed using pyramid structures. Thus, at the intersection between a mainframe 3740 and a gangway, the mainframe's 3740 pyramid structure (hereinafter referred to as "intersecting mainframe pyramid structure") may need additional slots to connect to or support the gangway's pyramid structure (hereinafter referred to as "intersecting gangway pyramid structure"). FIG. 39B, for example, shows that an intersecting mainframe pyramid structure 3750b may be adjacent to three pyramid structures: two mainframe pyramid structures 3750a and 3750c and one intersecting gangway pyramid structure 3943. In particular embodiments, the apex 4900 of the intersecting mainframe pyramid structure 3750b may have additional connector slots for connecting to the apex of the intersecting gangway pyramid structure 3943. In particular embodiments, in addition to the slots used to connect to adjoining pyramid structures of the mainframe (e.g., 3750b and 3750a), the interior base joint 4600 of the intersecting mainframe pyramid structure 3750b may have additional connector slots to connect to (1) the apex 4275 of the intersecting gangway pyramid structure 3943, (2) a base joint 4300 of the intersecting gangway pyramid structure 3943, (3) a 6-way geodesic joint 4400a, and (4) a gangway base 6-way geodesic joint 4400b that forms part of the base of the intersecting gangway pyramid structure 3943. In particular embodiments, in addition to the slots used to connect to adjoining pyramid structures of the mainframe (e.g., 3750b and 3750c), the interior base joint 4500 of the intersecting mainframe pyramid structure 3750b may have additional connector slots to connect to (1) the apex 4275 of the intersecting gangway pyramid structure 3943, and (2) the gangway base 6-way geodesic joint 4400b that forms part of the base of the intersecting gangway pyramid structure 3943. In the embodiment shown in FIG. 39B, each gangway pyramid structure (e.g., 3943 and 3944) has a base that is constructed using four corner base joints (e.g., 4300, 4600, 4500, and 4700) and a gangway base 6-way geodesic joint (e.g., 4400b) that are connected in the manner shown.

In particular embodiments, all joints described in this application or otherwise represented for use in the construction of an airship may be made of metal, including steel or titanium. The joints, including joints constructed using metal, may be fabricated from multiple lengths of tube joined together through adhesive, welding, or any other method for joining tube. As an example, multiple lengths of steel or titanium tube may be fishmouth cut so that the tubes may be joined together without any gaps and without bending the tube. In particular embodiments, joints made of metal may be joined to carbon-fiber connectors using adhesive. In particular embodiments, one length of tube on a metal joint may be joined with several carbon-fiber connectors (in particular embodiments, the connectors may also be made of metal). In particular embodiments, the metal joint may be joined with the carbon-fiber connectors by fitting a tubular metal section of the joint outside of a carbon-fiber connector and injecting adhesive into the space between the joint and the connector. In other embodiments the metal joint may be joined with the carbon fiber connectors by fitting a tubular metal section of the joint inside of a tubular carbon-fiber connector and injecting adhesive into the space between the joint and the connector. In particular embodiments, a collar may be used to assist with injecting adhesive into the space between a joint and a connector. In particular embodiments, the collar may be 3D printed from resin or any other suitable material and may consist of an internal stepped structure such that the collar may fit snugly around both the carbon-fiber connector and the metal joint, regardless of which is larger, and which may hold both the joint and connector in place as the adhesive is injected and dries, hardens.

Figure 40A:
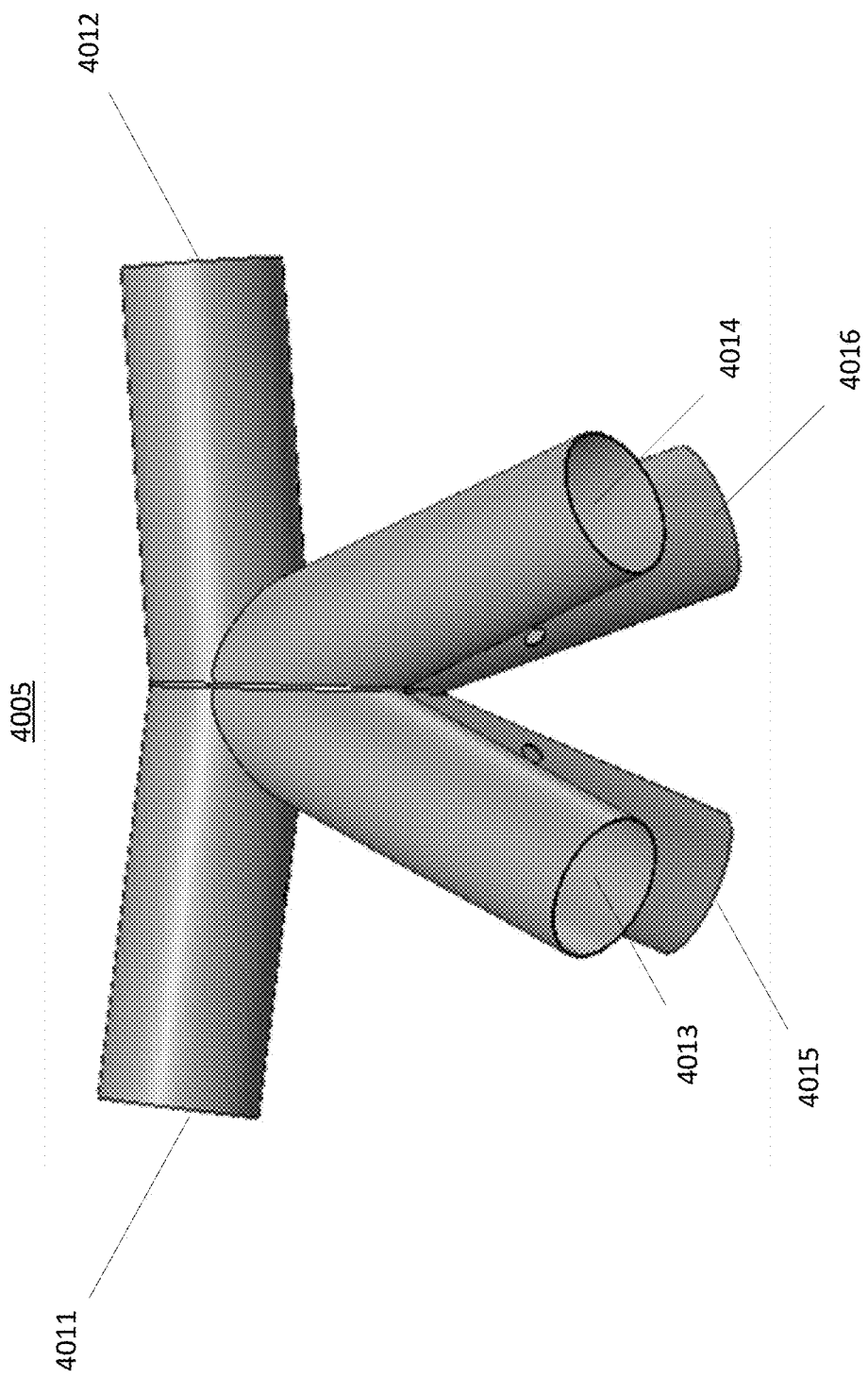
FIGS. 40A-40B illustrate different perspectives of an alternative embodiment of an apex joint used for constructing a mainframe's pyramid structure.

FIGS. 40A (perspective side view) and 40B (bottom view) illustrate different views of an alternative embodiment of an apex joint 4005, which is functionally similar to apex joint 305 shown in FIG. 5A, used for constructing a pyramid structure of a mainframe 3740 (e.g., mainframe pyramid structures 3750a and 3750c as shown in FIG. 39B) other than an intersecting mainframe pyramid structure (e.g., 3750b shown in FIG. 39B). In particular embodiments, the apex joint 4005, as well as the base joints to which it connects, may be made of metal material and are structural units used for constructing an airship.

Figure 40B:
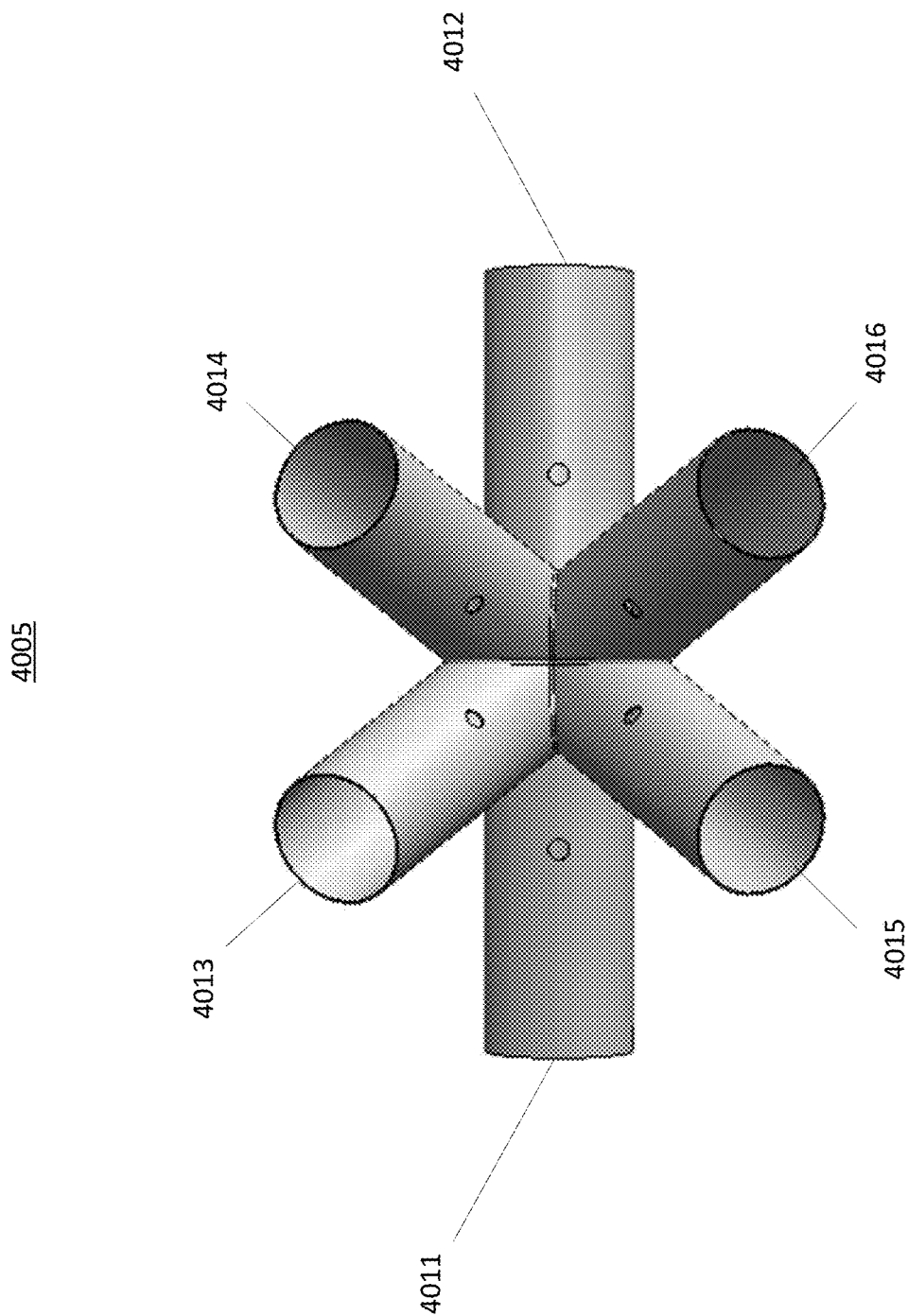

In particular embodiments, the assembled apex joint 4005 (e.g., corresponding to apex joint 4005a or 4005b shown in FIGS. 38 and 39B) may be configured to have slots for receiving connectors/rods. From the perspective view shown in FIGS. 40A-B, a slot 4011 for receiving an apex connector (e.g., connector 3820 or 3821 shown in FIG. 38) is shown. In particular embodiments, the slot 4011 may be configured to receive and substantially envelop a tubular object. In particular embodiments, a similar slot 4012 for receiving another apex connector may be formed on the opposite end of the apex joint 4005. The opening or end of that slot, which is not visible from the perspective shown in FIGS. 40A-B, would be located at 4012. In particular embodiments, the slots 4011 and 4012 may be symmetrical across an imaginary vertical plane dividing the apex joint 4005 in half through the center between slot 4011 and slot 4012. In particular embodiments, each of the slots 4011 and 4012 may be substantially cylindrical. In certain embodiments where a pyramid structure is used to construct a straight structure, such as a gangway as described below, an apex joint's cylindrical slots for receiving apex connectors may align with each other to form a straight line (in other words, the axes of the cylindrical slots may coincide). On the other hand, in embodiments where pyramid structures are used for constructing a circular mainframe, such as the one shown in FIG. 37B, the exterior angle (i.e., the angle measured from outside the joint's body and not through the body) between the two cylindrical slots 4011 and 4012 (or their corresponding axes) may be less than 180 degrees. The particular angle depends on the geometry of the mainframe. In particular embodiments, a circular mainframe may be approximated by a regular polygon (e.g., 36-sided polygon). As such, the angle between two connectors created by an apex joint 4005 may correspond to the interior angle of a vertex or corner of the polygon. The angle may depend on the number of vertices/corners that the polygon is designed to have. For example, the sum of the interior angles of the polygon may be determined based on the formula, (n−2)×180 degrees, where n is the number of vertices/corners of the polygon (the sum of the exterior angles of all the vertices/corners of the polygon is 360 degree). Thus, for example, each interior angle of a regular polygon may be determined based on the formula: ((n−2)×180)/n.

In particular embodiments, the apex joint 4005 may also comprise a slot 4013 for receiving an apex-to-base connector (e.g., connector 3815 shown in FIG. 38). In particular embodiments, the apex joint 4005 may have four such apex-to-base slots 4013, 4014, 4015, and 4016 to form a pyramid structure. Since each side of the pyramid structure is a triangle, the angle between each pair of apex-to-base slots corresponding to a vertex of a triangle side depends on the desired geometric properties of the pyramid. For example, if the sides of the pyramid structure are to be identical equilateral triangles, then the angle between each pair of apex-to-base slots would be substantially 60 degrees.

In particular embodiments, each slot (e.g., 4011, 4013, etc.) may have one or more holes into which liquid adhesive may be injected. With rods/connectors inserted, liquid adhesive may be injected into one or more of the holes, and air bubbles and/or excess adhesive may be allowed to exit from one or more other holes. This mechanism for bonding pieces of joints and connectors may be applied to any of the joints described herein.

Figure 41A:
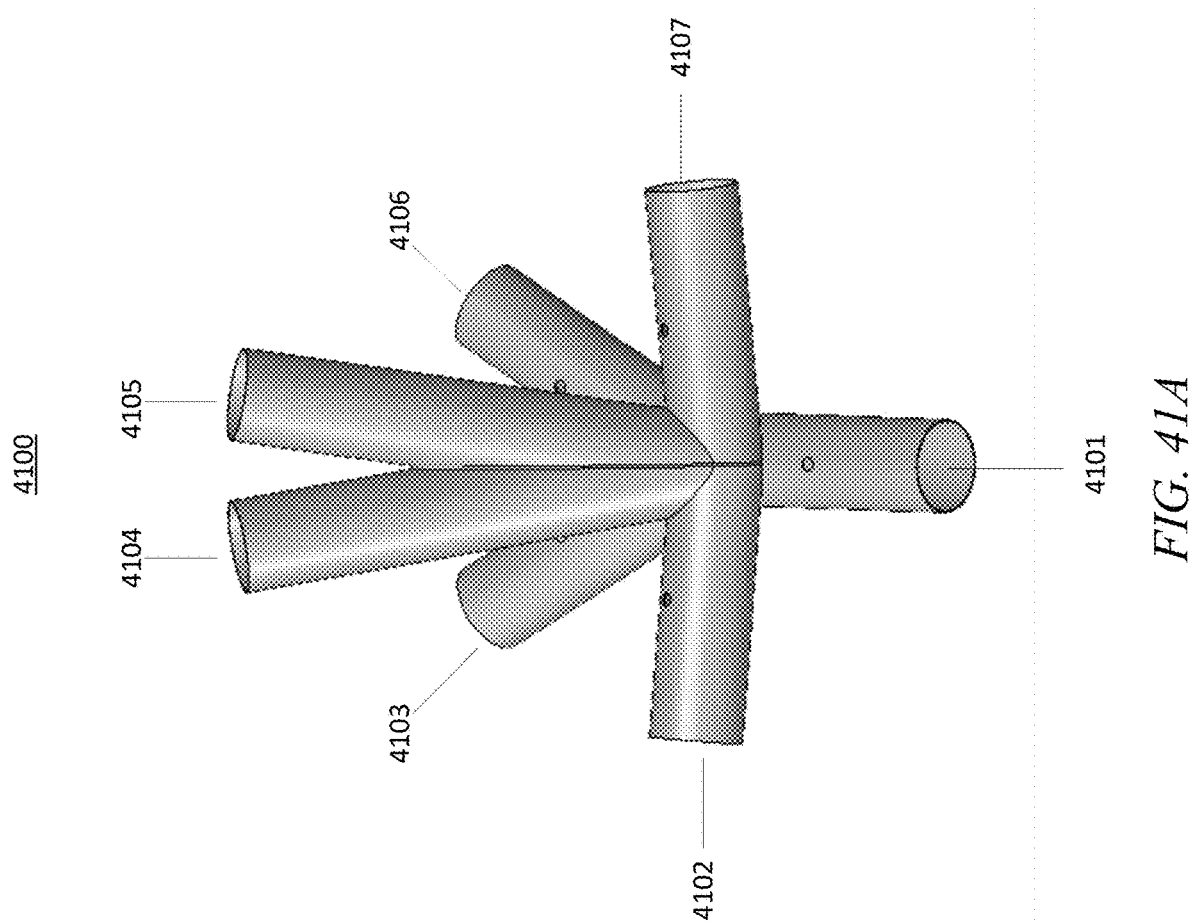
FIGS. 41A-41B illustrate different perspectives of an alternative embodiment of a mainframe-to-geodesic base joint used for constructing a mainframe's pyramid structure.
Figure 41B:
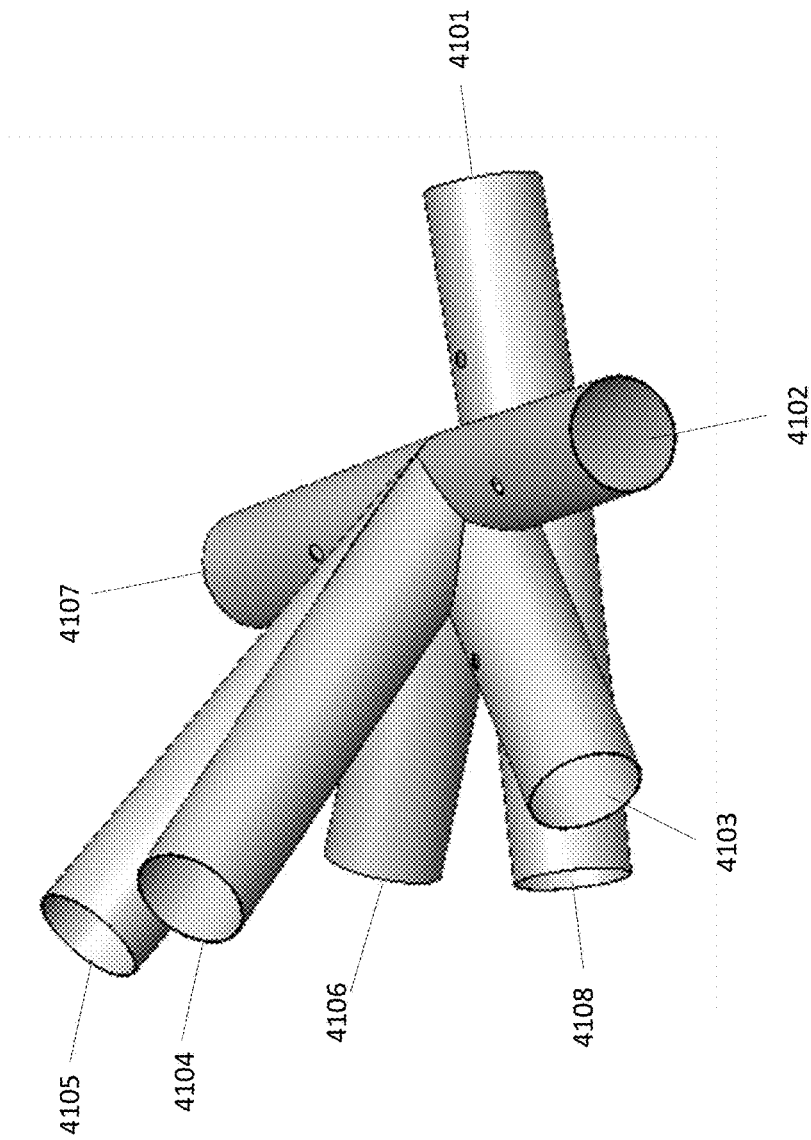

FIGS. 41A and 41B illustrate different perspectives of an alternative embodiment of a base joint 4100 used for constructing a mainframe's 3740 pyramid structure (e.g., as shown in FIG. 38). In particular embodiments, the base joint 4100 may be made of metal or any other similar material. In particular embodiments, the base joint 4100 may include one or more slots. For instance, base joint 4100 may have eight slots 4101, 4102, 4103, 4104, 4105, 4106, 4107, and 4108 (not visible in FIG. 41A but visible in FIG. 41B). In particular embodiments, each of the slots 4101-4108 may be configured to receive and substantially envelop a tubular object, such as a connector. In particular embodiments, each of the slots 4101-4108 may be substantially cylindrical.

In particular embodiments, the base joint 4100 may have a total of eight slots—a center slot 4108 for receiving a connector shared between the bases of two adjacent pyramids (e.g., connector 3812 shown in FIG. 38), a connecting slot 4101 for connecting to some other structure (e.g., a 6-way geodesic joint 4400), a first side slot 4102, a first diagonal slot 4103, a first apex slot 4104 for one of the pyramids, a second side slot 4107, a second diagonal slot 4106, and a second apex slot 4105 for the other pyramid. The side slot 4102 may be configured to receive a connector (e.g., 3811 in FIG. 38) connecting the base joint 4100 with an adjacent base joint (e.g., 5200 in FIG. 38) of a first pyramid (e.g., pyramid 3750a), the diagonal slot 4103 may be configured to receive a connector (e.g., 3790 in FIG. 38) connecting the base joint 4100 with the diagonal base joint 4600 of the first pyramid 3750a, and the apex slot 4104 may be configured to receive a connector (e.g., 3816 in FIG. 38) connecting the base joint 4100 with the apex joint (e.g., 4005a in FIG. 38) of that first pyramid 3750a. The other slots, 4105-4107 may be used to form the corner structure of a second adjacent pyramid (e.g., the pyramid structure on the right of the pyramid structure 3750a). Similar to slots 4102-4104, the side slot 4107, diagonal slot 4106, and apex slot 4105 of the base joint 4100 may be configured to receive connectors connecting the base joint 4100 with the adjacent base joint, diagonal base joint, and apex joint of the second pyramid structure, respectively.

In certain embodiments where a pyramid structure is used to construct a straight structure, such as a gangway as described below, a base joint's cylindrical side slots (similar to slots 4102 and 4107) may align with each other to form a straight line (in other words, the axes of the cylindrical slots may coincide). On the other hand, in embodiments where pyramid structures are used for constructing a circular mainframe, such as the one shown in FIG. 37B, the interior angle (i.e., the angle with an opening pointing towards the center of the mainframe) between the two cylindrical side slots (or their corresponding axes) may be less than 180 degrees. In particular embodiments, a circular mainframe may be approximated by a regular polygon (e.g., 36-sided polygon). As such, the angle between two connectors created by a base joint 4100 may correspond to the interior angle of a vertex or corner of the polygon. The angle may depend on the number of vertices/corners that the polygon is designed to have. For example, the sum of the interior angles of the polygon may be determined based on the formula, $(n-2) \times 180$ degrees, where n is the number of vertices/corners of the polygon (the sum of the exterior angles of all the vertices/corners of the polygon is 360 degree). Thus, for example, each interior angle of a regular polygon may be determined based on the formula: $((n-2) \times 180)/n$.

As discussed above, the base joint 4100 may comprise a center slot 4108 and two side slots 4102 and 4107. In particular embodiments, the center slot 4108 may be substantially perpendicular to each of the side slots 4102 and 4105. Also as discussed above, the base joint 4100 may form the corner joints of two adjacent pyramid structures, as shown in, e.g., FIG. 38. As such, center slot 4108, side slot 4102, and apex slot 4104 may define and support the corner structure of one pyramid (e.g., pyramid structure 3750a), and center slot 4108, side slot 4107, and apex slot 4105 may define and support the corner structure of the other pyramid. With respect to each one of the pyramids, such as the pyramid 3750a formed using slots 4108, 4102, and 4104, the angle between the apex slot 4104 and the center slot 4108 and the angle between the apex slot 4104 and the side slot 4102 depend on the desired geometric properties of the pyramid. For example, if each side of the pyramid structure is an equilateral triangle (the base of the pyramid is not being referred to as a side), then the angle between the apex slot 4104 and center slot 4108 slots and the angle between the apex slot 4104 and the side slot 4102 would both be substantially 60 degrees. In particular embodiments, the corresponding structures for the other half of the base joint 4100 may have the same configuration.

In particular embodiments, each slot may have one or more holes into which liquid adhesive may be injected. With rods/connectors inserted, liquid adhesive may be injected into one or more of the holes, and air bubbles and/or excess adhesive may be allowed to exit from one or more other holes. This mechanism for bonding pieces of joints and connectors may be applied to any of the joints described herein.

Figure 42:
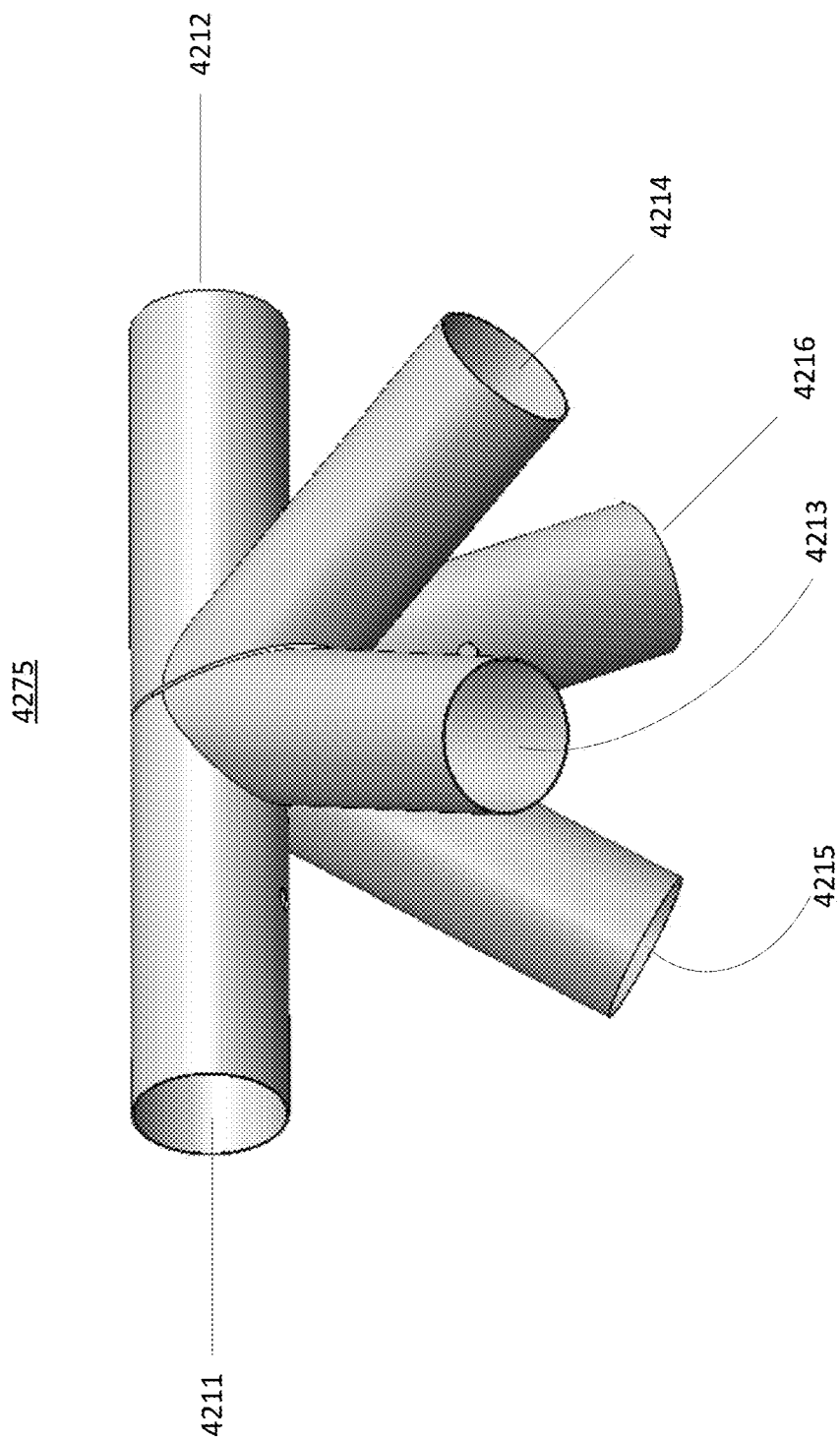
FIG. 42 illustrates an alternative embodiment of an apex joint used for constructing a gangway's pyramid structure.

FIG. 42 illustrates an alternative example of an apex joint 4275, functionally similar to apex joint 375 in FIG. 3B, used for constructing a gangway's pyramid structure, such as the one as shown in 39B. The apex joint 4275 of the gangway's pyramid structure is similar to the apex joint 4005 of the mainframe's pyramid structure. Four of the slot openings are apex-to-base slots (the openings of slots 4213, 4214, and 4215 are shown; the opening of the fourth slot is hidden from view but is located within slot 4216). Slots 4213 and 4214 are symmetrical to slots 4215 and 4216 across an imaginary plane cutting through the center of the joint 4275. The other two slot openings, 4211 and 4212, are apex-to-apex slots. While these apex-to-apex slots are similar to those of a mainframe's apex joint 4005, they are different in that their axes are aligned. In particular embodiments, the interior of the slots 4211 and 4212 may not be connected, which means that two separate connectors would need to be inserted into the two slots. In other embodiments, the interior of the slots 411 and 4212 may form a continuous channel through which a single connector may be inserted. Other features of the apex joint 4275 are similar to that of the mainframe's apex joint 305 or 4005 and, therefore, would not be repeated for brevity.

Figure 43A:
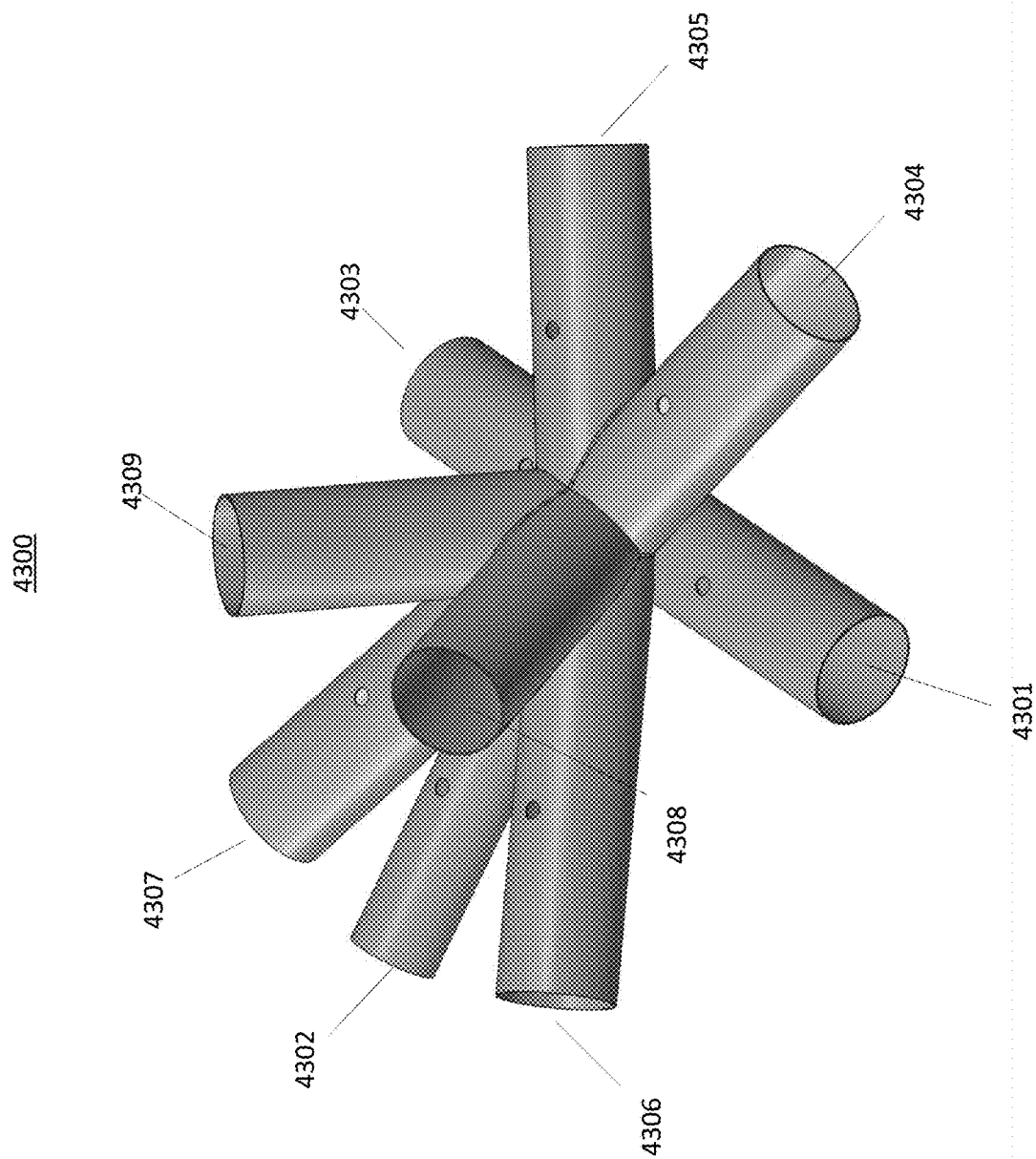
FIGS. 43A-43B illustrate different perspectives of an embodiment of a gangway-to-geodesic base joint of a gangway's pyramid structure.
Figure 43B:
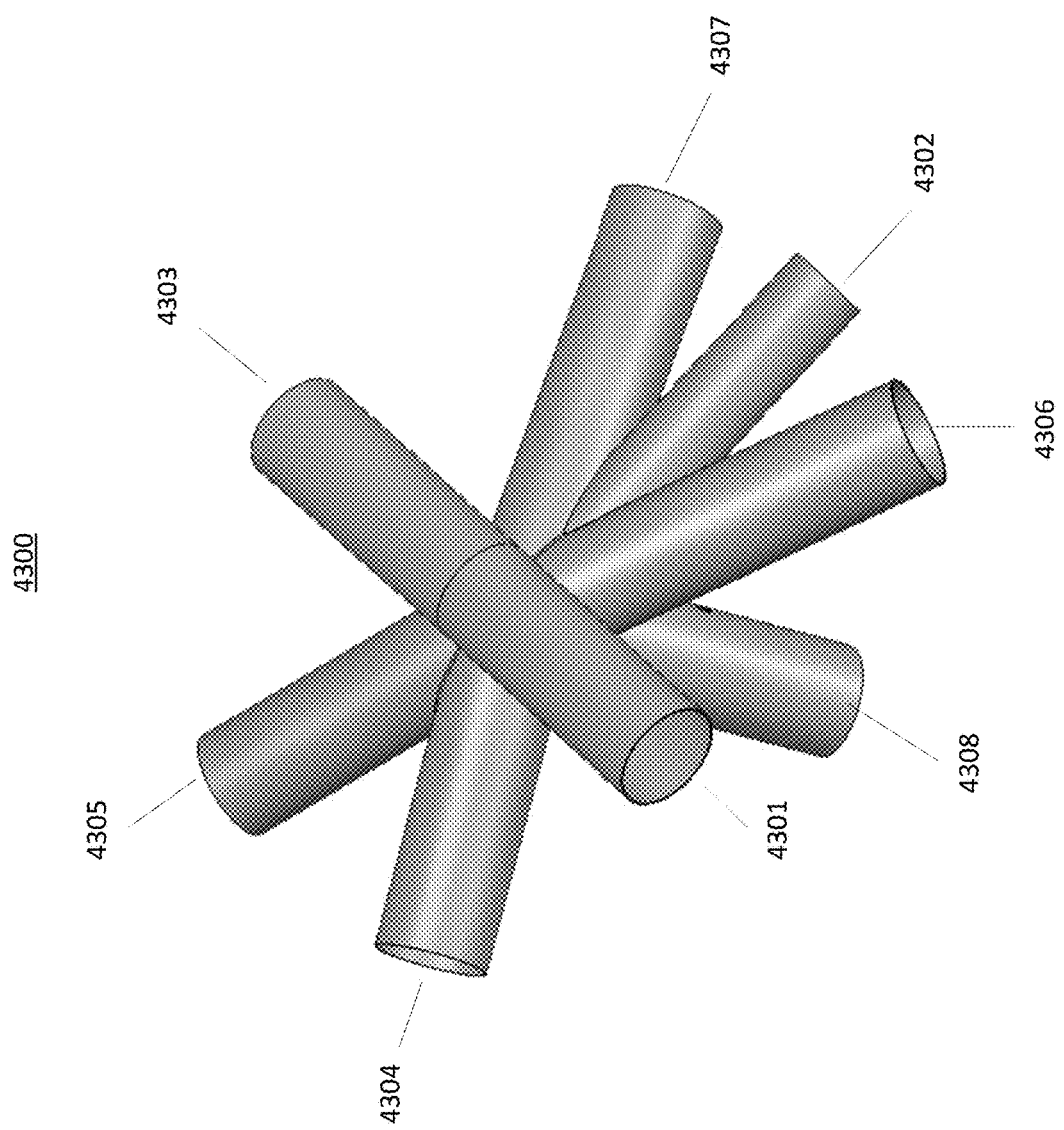

FIGS. 43A-43B illustrate an example of a gangway-to-geodesic base joint 4300 of a gangway's pyramid structure (e.g., pyramid 3943 in FIG. 39B). A gangway's pyramid structure 3943 may be configured to be adjacent to geodesic structures, as shown in FIG. 39B. As such, in the embodiment of a gangway-to-geodesic base joint 4300, the gangway-to-geodesic base joint 4300 contains nine slots to support two adjoining gangway pyramids and the adjoining geodesic structure. The base-to-base slots 4301, 4302, and 4303 are configured to support connectors that form the bases of the two adjoining gangway pyramids, which will be referred to as gangway pyramids A and B (pyramid structures 3943 and 3944 in FIG. 39B). In particular, slot 4302 is used for forming a side that is shared between the bases of the adjoining gangway pyramids A and B, and slots 4301 and 4303 are used for forming, respectively, the two adjoining gangway pyramids' sides that are on the same side of the gangway. The base-to-apex slots 4308 and 4309 are used to connect the gangway-to-geodesic base joint 4300 to the apexes of the two adjoining gangway pyramids, respectively. For example, slot 4308 may be used to connect to pyramid A's apex, and slot 4309 may be used to connect to pyramid B's apex. The gangway-to-geodesic base joint 4300 may also have base-to-geodesic slots 4304 and 4305 for connecting the gangway-to-geodesic base joint 4300 to the adjoining geodesic structure (e.g., slot 4304 may connect to the 6-way geodesic joint 4400a in FIG. 39B). The gangway-to-geodesic base joint 4300 may also have slots 4306 and 4307 for diagonal connection across the gangway to the 6-way geodesic joints (e.g., 4400b) that are also configured to connect the other sides of the bases of gangway pyramid structures to the geodesic structure. Such a 6-way geodesic joint (e.g., 4400b) is part of the base each gangway pyramid structure (e.g., 3943). As an example, the gangway-to-geodesic base joint 4300 is connected, via its slot 4306, to the 6-way geodesic joint 4400b. The slots 4301-4307 are all substantially on the same plane. The base-to-apex slots 4308 and 4309 for forming a side of a pyramid, on the other hand, are configured to form an angle from that plane.

Figure 44:
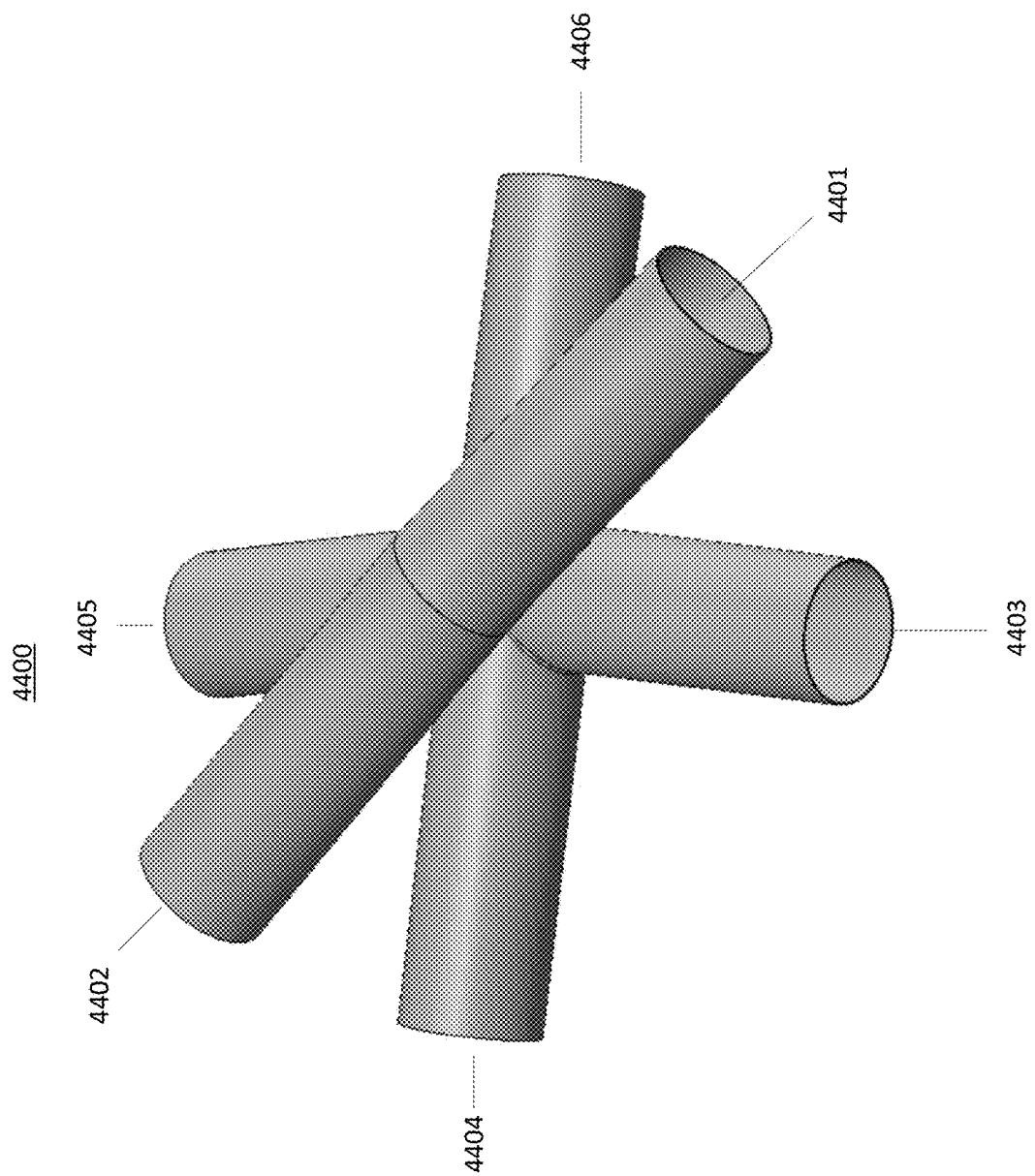
FIG. 44 illustrates an alternative embodiment of a 6-way geodesic joint.

FIG. 44 illustrates an alternative embodiment of a 6-way geodesic joint 4400, which is functionally similar to joint 330 shown in FIG. 3C with six connector slot openings. In particular embodiments, the 6-way geodesic joint 4400 is used to form a geodesic structure, as shown in FIGS. 39A and 39B. As shown in FIG. 39A, the geodesic structure in one embodiment may comprise rows of triangles with alternating orientations, with a 6-way geodesic joint 4400 anchoring the intersection between three triangles from one row and three adjacent triangles from an adjacent row. Each 6-way geodesic joint 4400 may have six connector slots 4401, 4402, 4403, 4404, 4405, and 4406. In particular embodiments, two connector slots 4401 and 4402 on opposite sides of the joint 4400 may form a channel through the joint 4400 to allow a sing longitudinal connector 3990 to pass through. In other embodiments, the interior of the connector slots 4401 and 4402 may not be connected, thus requiring separate longitudinal connectors 3990 to be inserted into slots 4401 and 4402, respectively. The 6-way geodesic structure 4400 in one embodiment may comprise an "X" pattern, formed by slots 4403, 4404, 4405, and 4406, that is placed under (or over, depending on its orientation when viewed) slots 4401 and 4402. The geodesic structure 3999 may be formed by connecting each slot of a 6-way geodesic joint 4400 with a slot of another 6-way geodesic joint 4400, as shown in FIG. 39A. The connector slots 4401 of 4402 of a series of 6-way geodesic joints 4400 may be connected to form a longitudinal row (e.g., the row formed by a series of longitudinal connectors 3990).

In particular embodiments, in addition to forming geodesic structures 3999, a 6-way geodesic joint 4400 may be used to form part of the base of a gangway pyramid structure and to connect the gangway pyramid structure to the geodesic structure. For example, FIG. 39B shows a 6-way geodesic gangway base joint 4400b used to form a part of the base of the gangway pyramid structure 3943. In these embodiments, connector slots 4401 and 4402 may connect to base joints (e.g., 4500 and 4700) on one side of a gangway pyramid structure. Connector slots 4403 and 4404 may connect to gangway base joints (e.g., 4300 and 4600) on the opposite side of a gangway pyramid structure. Connector slots 4405 and 4406 may connect to either two 6-way geodesic joints 4400 or to one 6-way geodesic joint 4400 and a mainframe-to-geodesic joint 5000. Additional detail on embodiments including a geodesic structure comprising only 6-way geodesic joints 4400 can be found in FIG. 39A.

Figure 45A:
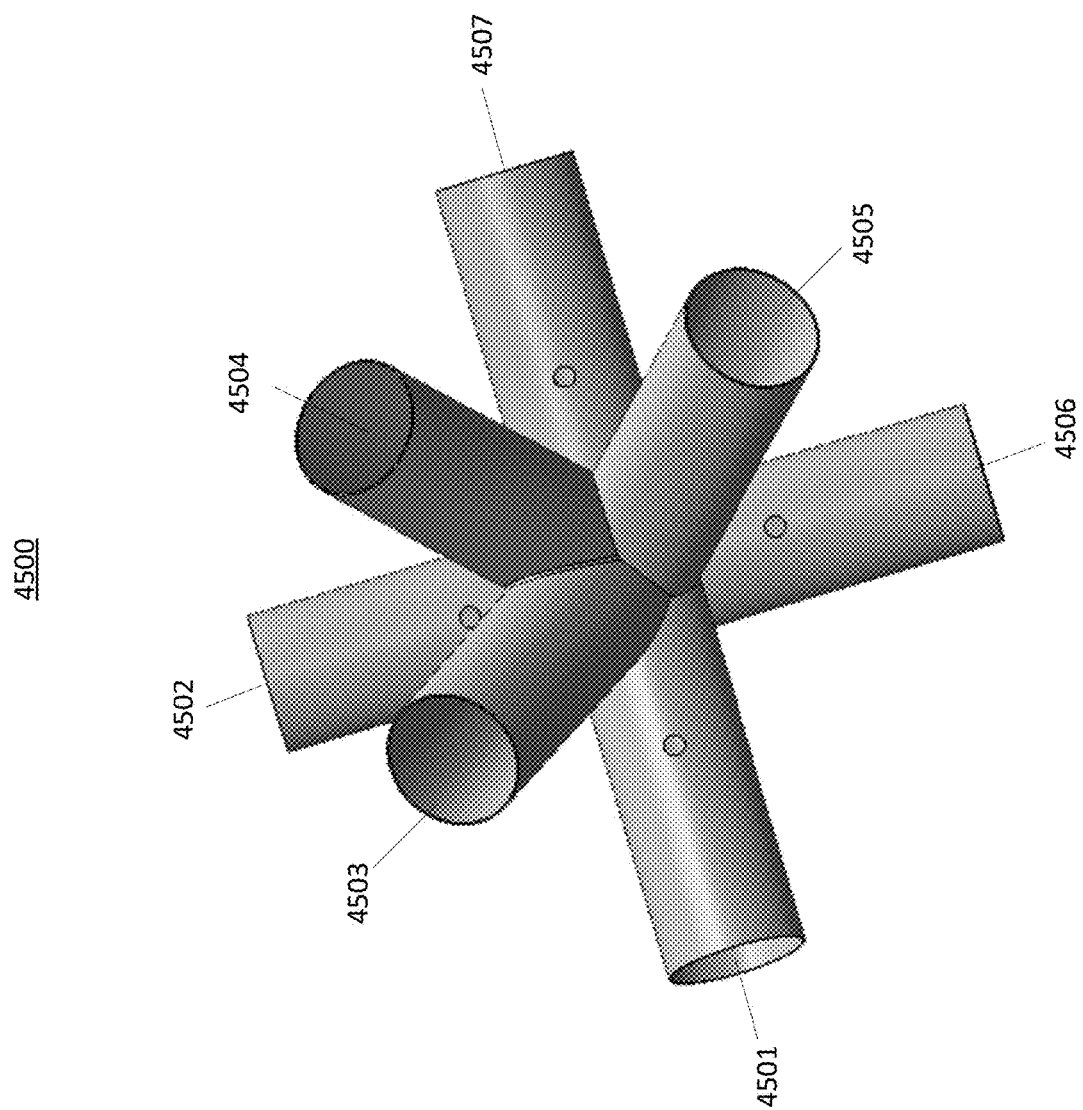
FIGS. 45A-45B illustrate different perspectives of an embodiment of a gangway-to-mainframe base joint.
Figure 45B:
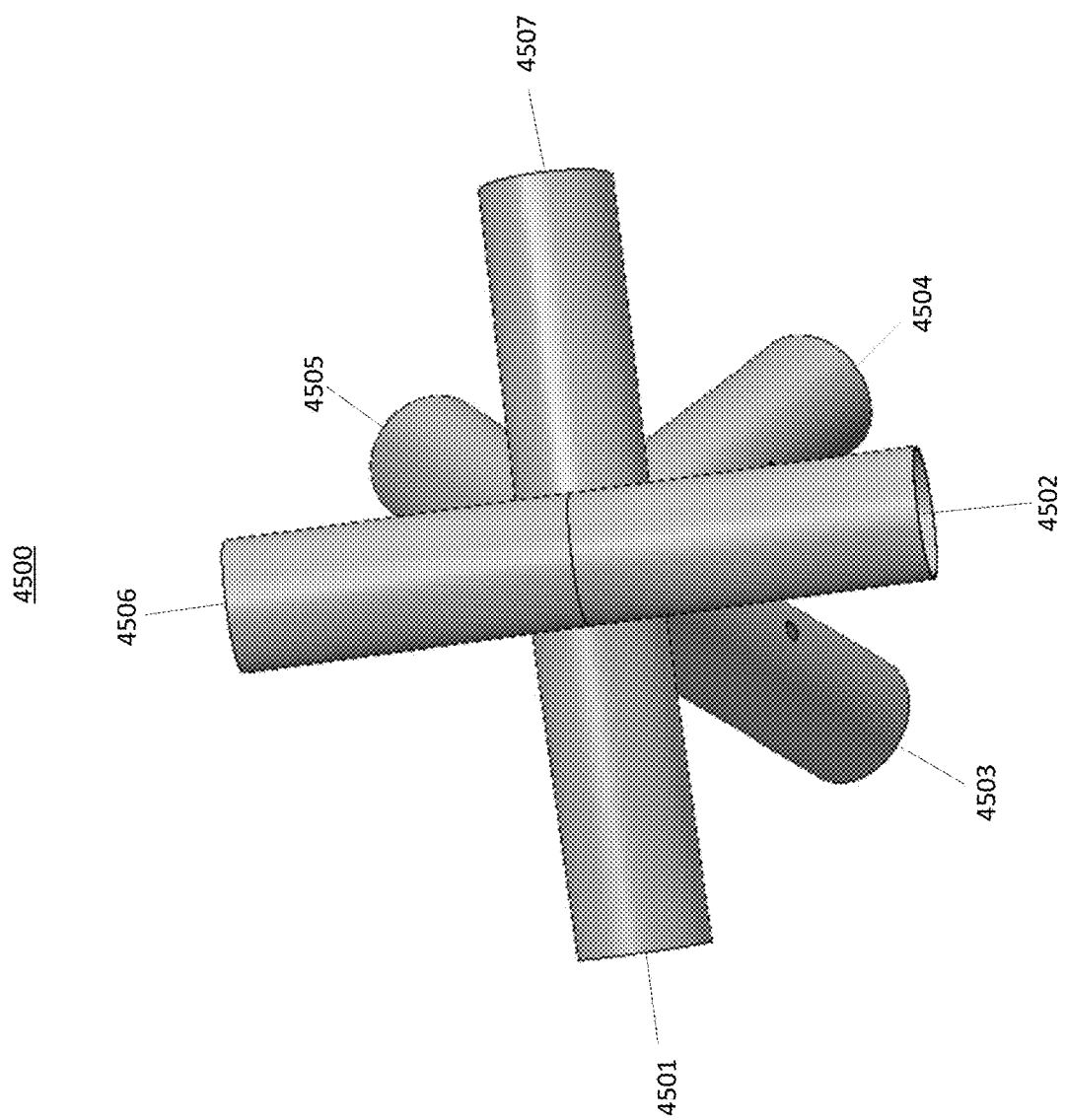

FIGS. 45A-45B illustrate different perspective views of an example of a gangway-to-mainframe base joint 4500 that connects two mainframe pyramid structures to a gangway pyramid structure at their bases (the gangway-to-mainframe base joint 4500 forms the corner of the three pyramid structures). For example, referring to FIG. 39B, gangway-to-mainframe base joint 4500 may connect mainframe pyramid structures 3750b and 3750c to gangway pyramid structure 3943. The gangway-to-mainframe base joint 4500 may contain seven slots 4501, 4502, 4503, 4504, 4505, 4506, and 4507. Slot 4501 may be configured to connect to a 6-way geodesic gangway base joint 4400b. Slot 4502 may connect to mainframe-gangway-base-geodesic joint 4600. Slot 4503 may connect to gangway apex joint 4275 of pyramid structure 3943. Slots 4504 and 4505 may connect to mainframe apex joints 4900 and 4005b of the two adjoining mainframe pyramid structures 3750b and 3750c, respectively. Slot 4506 may connect to mainframe-to-geodesic joint 5000. And slot 4507 may connect to mainframe base joint 5100.

Figure 46A:
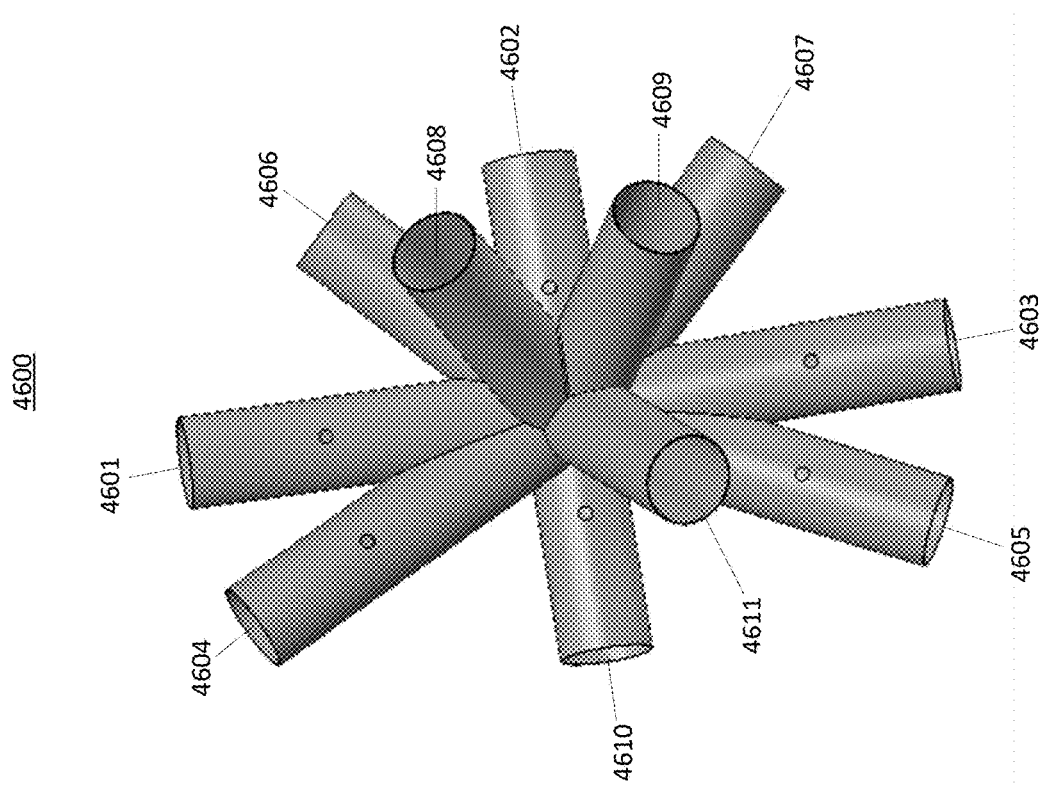
FIGS. 46A-46B illustrate different perspectives of an embodiment of a mainframe-gangway-base-geodesic joint.
Figure 46B:
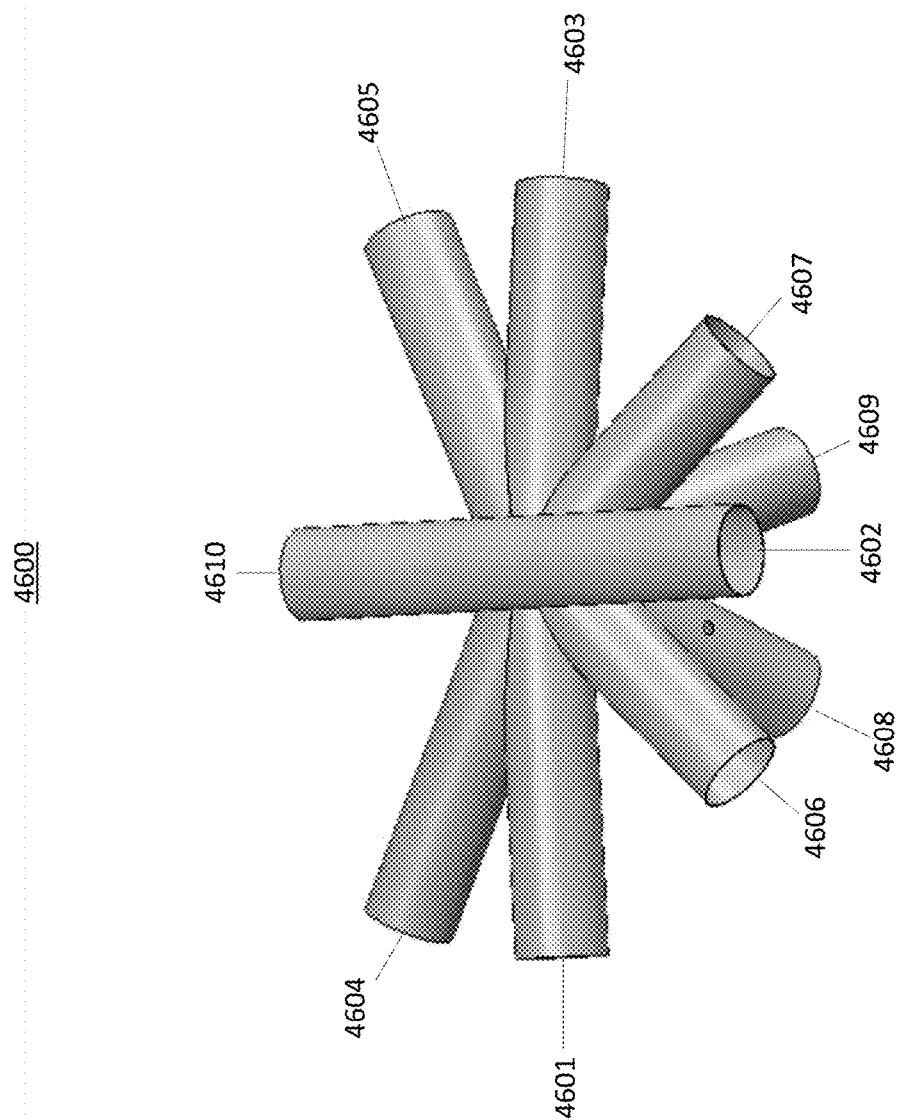

FIGS. 46A-46B illustrate an example of mainframe-gangway-base-geodesic joint 4600. In particular embodiments, a mainframe-gangway-base-geodesic joint 4600 may include eleven connector slots for connecting to multiple other joints in the gangway, mainframe, and geodesic structure. Slots 4601, 4606, 4602, 4607, and 4603 may be used to form the bases of two adjoining mainframe pyramid structures, such as pyramid structures 3750a and 3750b shown in FIG. 39B. Specifically, slots 4601 and 4602 may be used to form adjoining sides of the base of the pyramid structure 4750a (e.g., connecting to joints 4800 and 5200, respectively) and slot 4606 may be used to form the diagonal connector for that base (e.g., connecting to joint 4100, not shown in FIG. 39B). As such, slot 4606 may be angled at 45 degrees relative to slots 4601 and 4602. Similarly, slots 4603 and 4602 may be used to form adjoining sides of the base of the pyramid structure 4750b (e.g., connecting to joints 4500 and 5200, respectively) and slot 4607 may be used to form the diagonal connector for that base (e.g., connecting to joint 5100). As such, slot 4607 may be angled at 45 degrees relative to slots 4602 and 4603. Slots 4603, 4605, and 4610 may be used to form one corner of the adjoining gangway pyramid structure 3943. Slots 4603 and 4610 may be used to form adjoining sides of the base of the gangway pyramid structure 3943 (e.g., connecting to joints 4500 and 4300, respectively). Slot 4605 may be used to connect to the 6-way geodesic joint 4400b on the other side of the gangway pyramid structure 3943. Slots 4604 may be used to connect to another 6-way geodesic joint 4400a of the adjoining geodesic structure. The remaining three slots 4611, 4608, and 4609 connect to the apex joints of the adjacent pyramid structures. In particular, connector slot 4611 connects to the apex joint 4275 of the adjoining gangway pyramid structure 3943; connector slot 4608 connects to the apex joint 4005a of the pyramid structure 3750a; and connect slot 4609 connects to the apex joint 4900 of the pyramid structure 3750b.

Figure 47A:
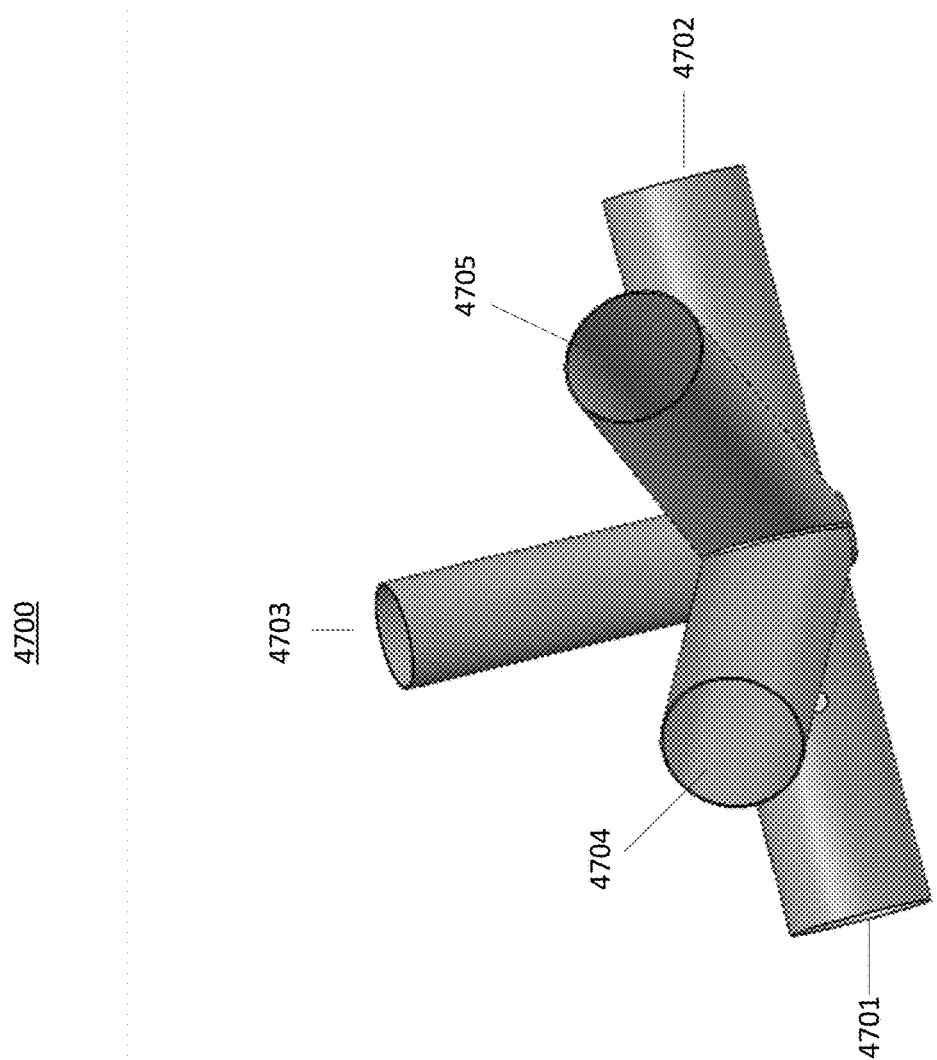
FIGS. 47A-47B illustrate different perspectives of an embodiment of a base joint of a gangway's pyramid structure.
Figure 47B:
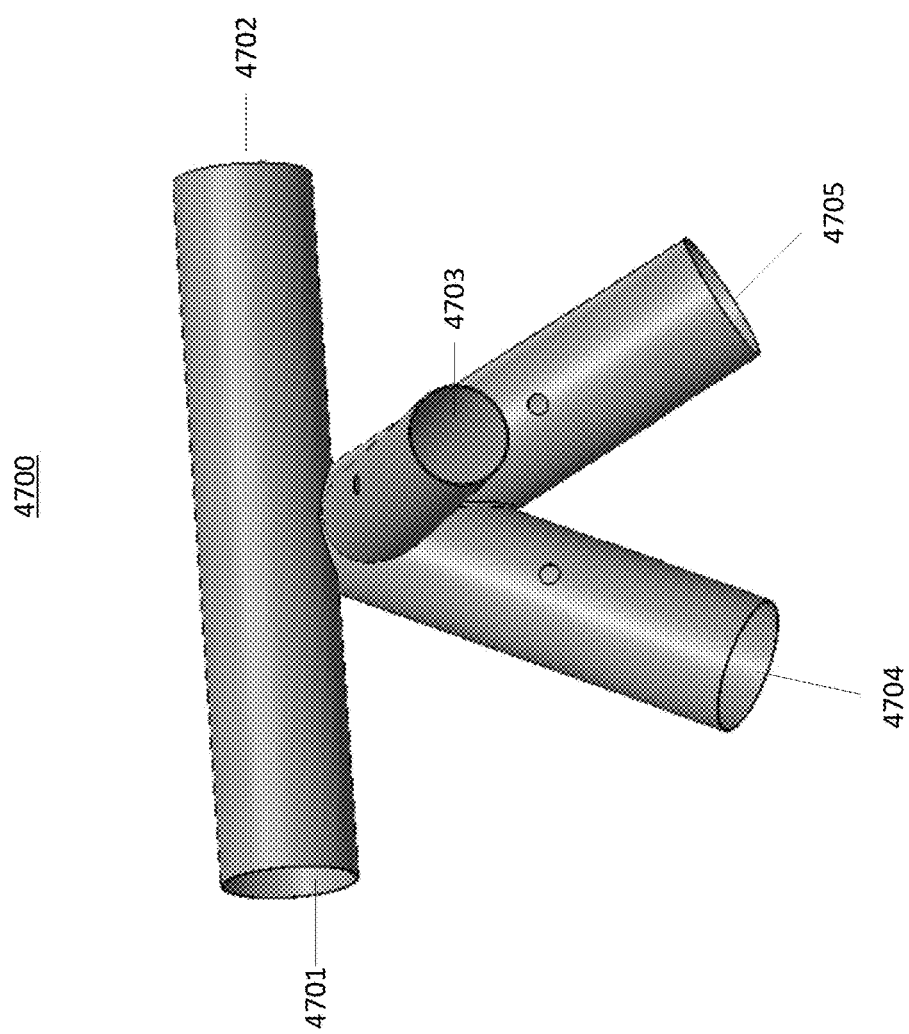

FIGS. 47A-47B illustrate different perspectives of an example of a gangway base joint 4700 of a gangway's pyramid structure. In some embodiments, a gangway's pyramid structure, such as pyramid structure 3944 in FIG. 39B, may comprise gangway-to-geodesic base joints 4300 on one side of the gangway base and staggered gangway base joints 4700 and 6-way geodesic gangway base joints 4400b on the other side of the gangway base. The intersecting gangway pyramid structure 3943 may be different from other gangway pyramid structures (e.g., 3944) in that its base is constructed using a gangway-to-geodesic base joint 4300, gangway base joint 4700, and joints 4600 and 4500. In particular embodiments, the gangway base joint 4700 may form adjacent corners of two adjacent gangway pyramid structures, such as pyramid structures 3944 and 3943. The gangway base joint 4700 may include three gangway base-to-base slots 4701, 4702, and 4703. Slots 4701 and 4703 may form the corner of a base of one gangway pyramid structure 3944 and slots 4702 and 4703 may form the corner of a base of the other gangway pyramid structure 3943. Slots 4701 and 4702 may connect to two adjacent 6-way geodesic gangway base joints (e.g., 4400b), while slot 4703 may connect to the gangway-to-geodesic base joint 4300 on the other side of the gangway. Base-to-apex slots 4704 and 4705 connect to the apex joints of the adjoining gangway pyramid structures 3944 and 3943. For example, a gangway base joint 4700 in FIG. 39B may connect to the apex joint of gangway pyramid structure 3944 as well as the apex joint of adjacent gangway pyramid structure 3943.

Figure 48A:
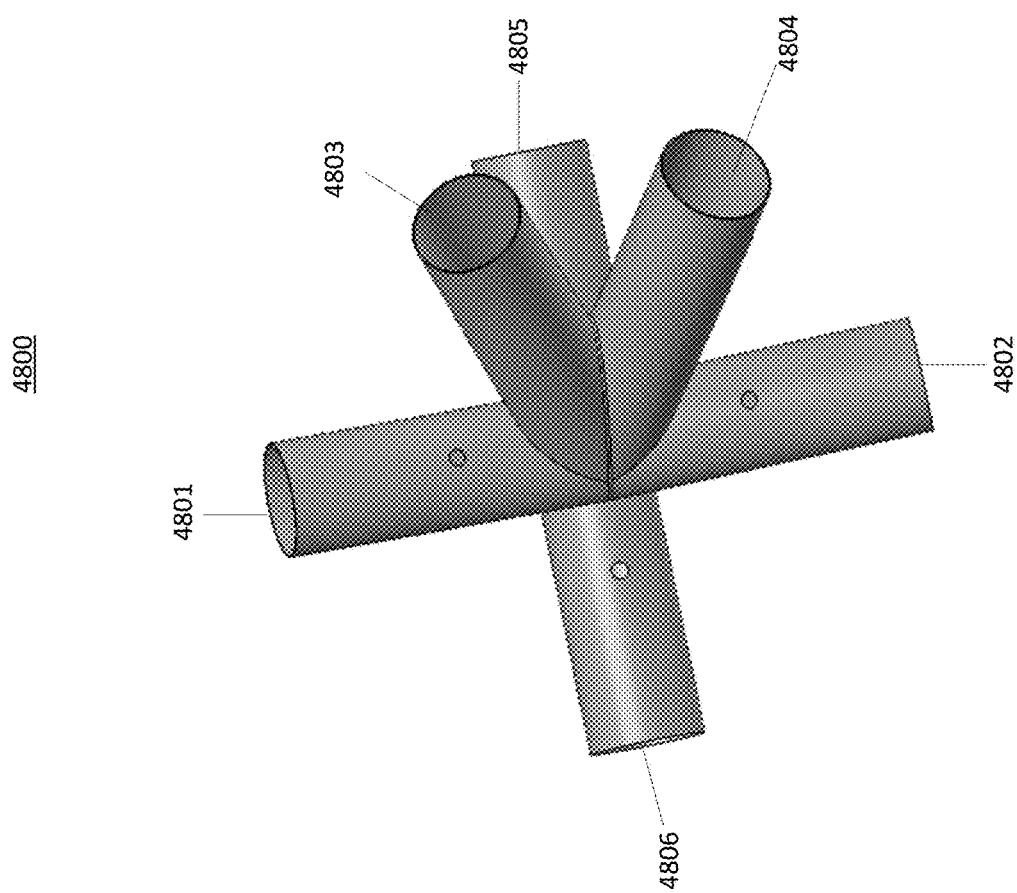
FIGS. 48A-48B illustrate different perspectives of an embodiment of a mainframe-to-geodesic base joint.
Figure 48B:
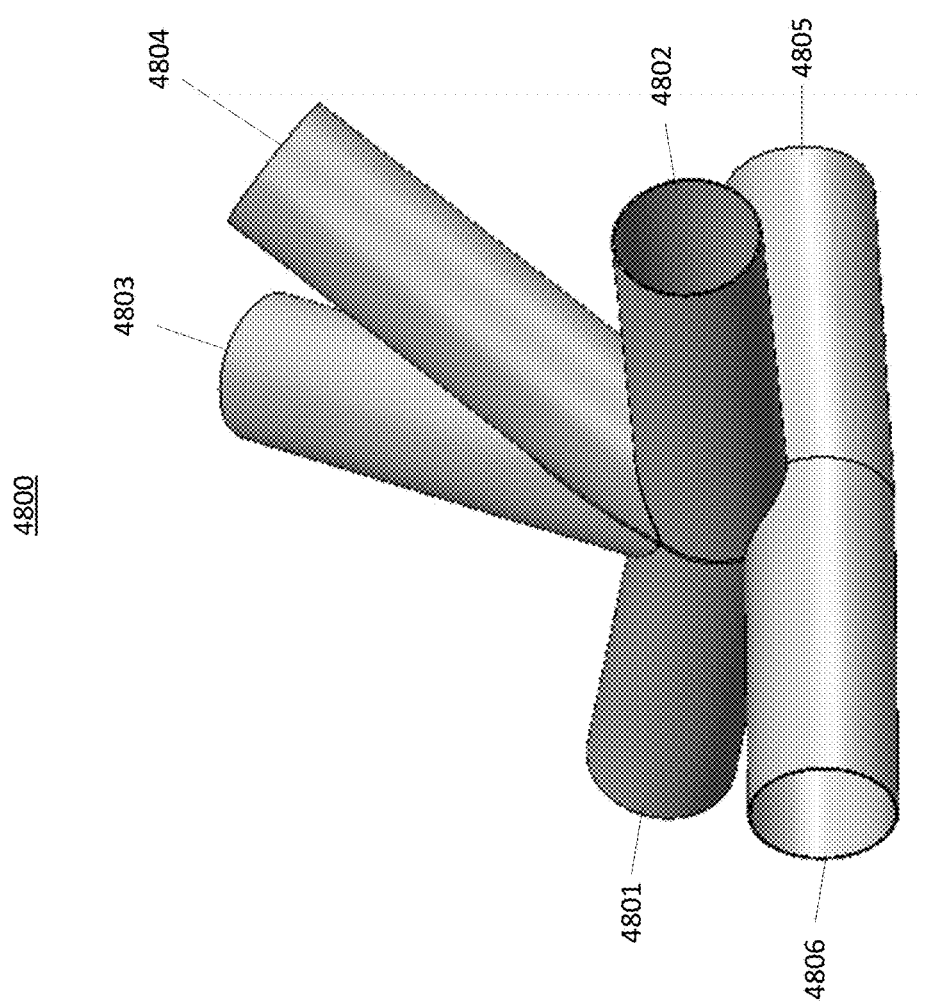

FIGS. 48A and 48B illustrate different perspectives of an example of a mainframe-to-geodesic base joint 4800. The joint 4800 is configured to connect two mainframe pyramid structures at the corner of each of their respective bases to a geodesic structure via a longitudinal connector. In FIG. 39B, the base joint 4800 is used to form the corners of the mainframe pyramid structure 3750a and an adjacent mainframe pyramid structure above it (not shown). The base joint 4800 may have six connector slots. Slots 4801 and 4802 may be configured to connect to adjacent mainframe base joints (e.g., base joint 4600 of the mainframe pyramid structure 3750a in FIG. 38B, though it should be understood that mainframe base joint 4800 connector slots 4801 and 4802 may connect to mainframe base joints of various types and configurations). Center connector slot 4805 may connect to another base joint (e.g., 4100 shown in FIG. 38), located on the other side of the mainframe, that is shared by the same two pyramid structures. Apex connector slots 4803 and 4804 may be configured to connect to the apexes of the two mainframe pyramid structures (e.g., slot 4804 connects to the apex joint 4005a of the mainframe pyramid structure 3750a). Lastly, connector slot 4806 may be configured to connect, via a longitudinal connector, to a 6-way geodesic joint 4400a of the adjacent geodesic structure.

Figure 49A:
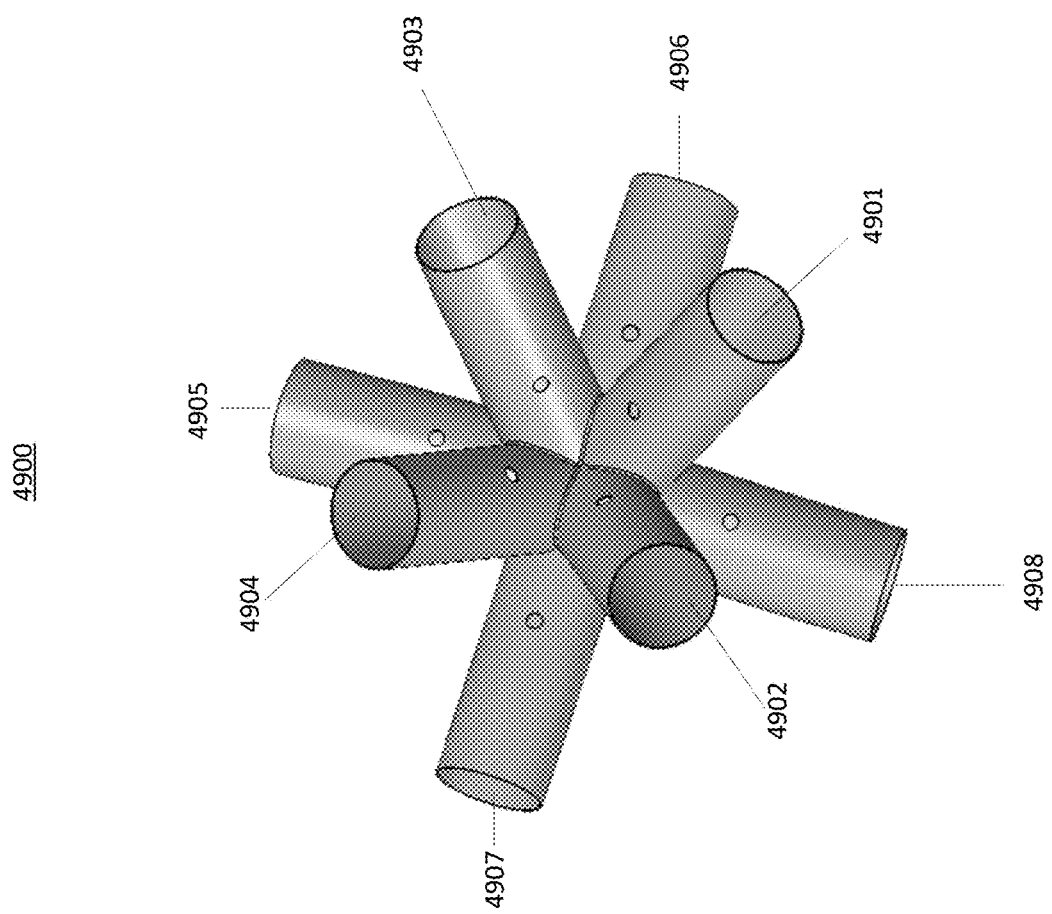
FIGS. 49A-49B illustrate different perspectives of an embodiment of a gangway-to-mainframe apex joint.
Figure 49B:
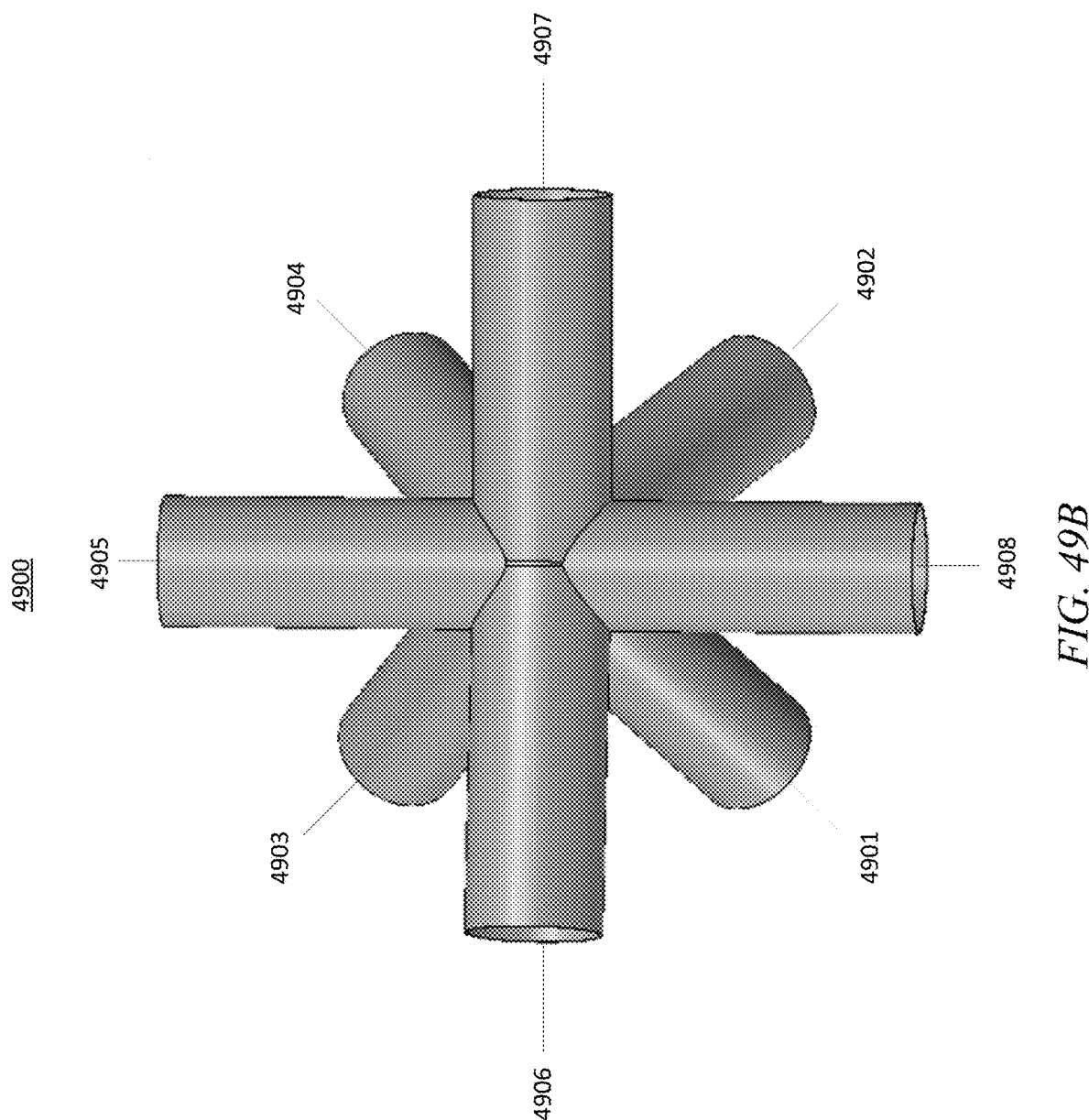

FIGS. 49A and 49B illustrate different perspectives of an example of a gangway-to-mainframe apex joint 4900. In particular embodiments, joint 4900 contains eight connector slots 4901, 4902, 4903, 4904, 4905, 4906, 4907, and 4908. Apex-to-base connector slots 4901-4904 may respectively connect to the four base joints (e.g., 5200, 4600, 5100, and 4500) of the intersecting mainframe pyramid structure 3750b in FIG. 39B. In particular embodiments, the intersecting mainframe pyramid structure 3750b may be adjacent to two mainframe pyramid structures (e.g., 3750a and 3750c) and two intersecting gangway pyramid structures (e.g., 3943 and another unshown intersecting gangway pyramid structure on the other side of the intersecting mainframe pyramid structure 3750b). To connect to the apexes of those pyramid structures, the apex joint 4900 may also contains four apex-to-apex connector slots 4905-4908 that respectively connect to the apex joint 4005b of mainframe pyramid structure 3750c, the apex joint of the fourth, unshown pyramid structure, the apex joint 4275 of the gangway pyramid structure 3943, and the apex joint 4005a of the mainframe pyramid structure 3750a.

Figure 50:
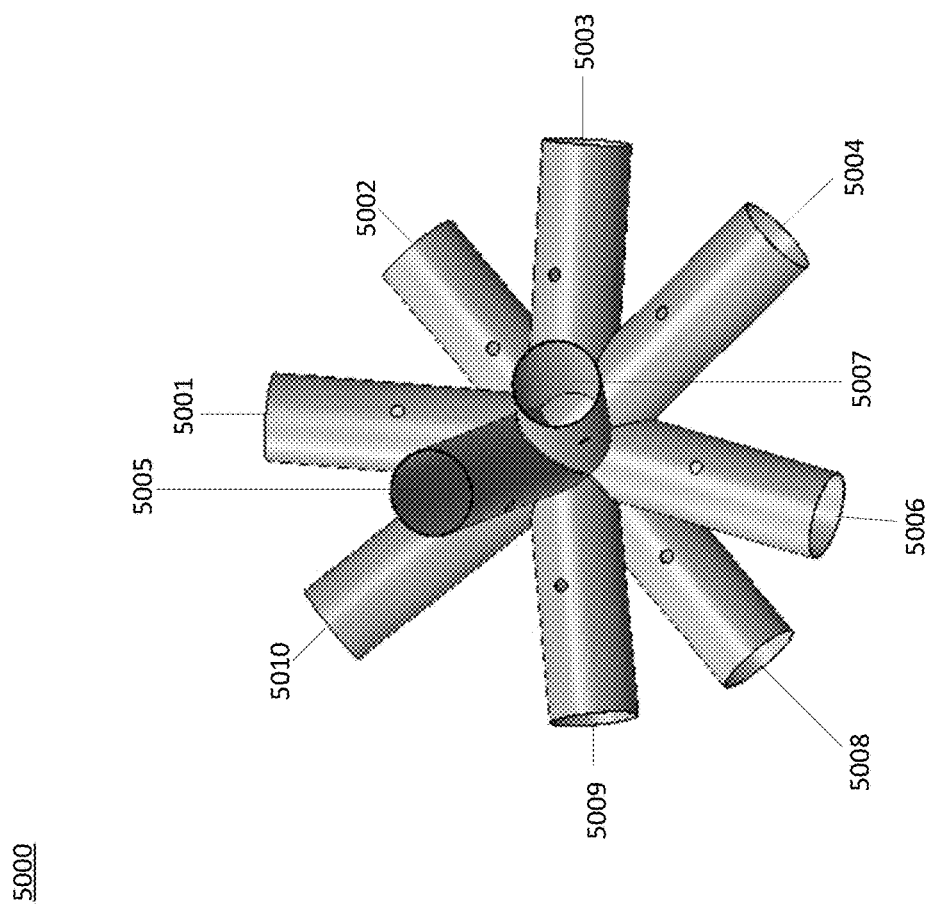
FIG. 50 illustrates an embodiment of a mainframe-to-geodesic joint.

FIG. 50 illustrates an example of a mainframe-to-geodesic joint 5000. Joint 5000 may include ten connector slots 5001, 5002, 5003, 5004, 5005, 5006, 5007, 5008, 5009, and 5010 to connect to multiple other joints. The slots 5001-5010 may be used to form the adjacent corners of two mainframe pyramid structures (e.g., pyramid structures 3750c and the partially-shown pyramid structure below it) and connect to the gangway (e.g., at 4400b) and the adjoining geodesic structure. For example, as shown in FIG. 39B, slot 5004 of joint 5000 may connect to joint 4500 to form one side of the mainframe pyramid structure 3750c. Slot 5008 may connect to joint 5300 on the other side of the mainframe to form an adjacent side of the mainframe pyramid structure 3750c. Slot 5006 may connect, via a diagonal connector, to joint 5100 at the opposite corner of the mainframe pyramid structure 3750c. Slot 3007 may be connected to the apex joint 4005b of the mainframe pyramid structure 3750c. Similarly, slots 5008, 5010, 5009, and 5005 may be used to form the adjacent corner of the adjacent mainframe pyramid structure (partially shown). Slots 5008 and 5010 may be used to form the adjacent sides of that corner, slot 5009 may be used to form the diagonal through the base of that mainframe pyramid structure, and slot 5005 may be used to connect to the apex joint of that mainframe pyramid structure. The other three slots 5003, 5002, and 5001 may connect to the adjoining geodesic structure via 6-way geodesic joints 4400. Slot 5002 may connect, via a longitudinal connector, to one 6-way geodesic joint, and slots 5003 and 5001 may connect to 6-way geodesic joints in neighboring rows (e.g., slot 5003 may connect to the 6-way geodesic joint 4400b in the row above that forms a side of the gangway).

Figure 51A:
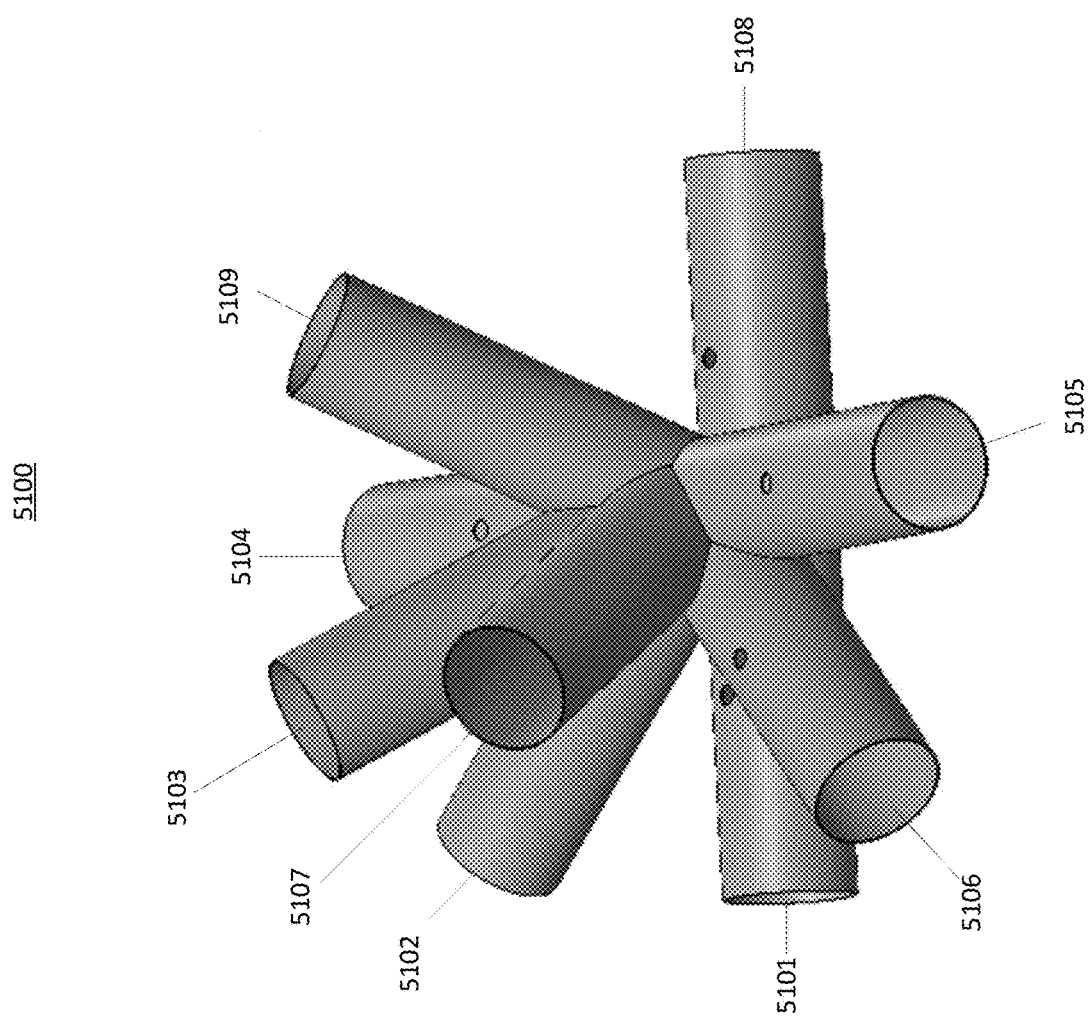
FIGS. 51A-51B illustrate different perspectives of an embodiment of a mainframe base joint with nine connector slots.
Figure 51B:
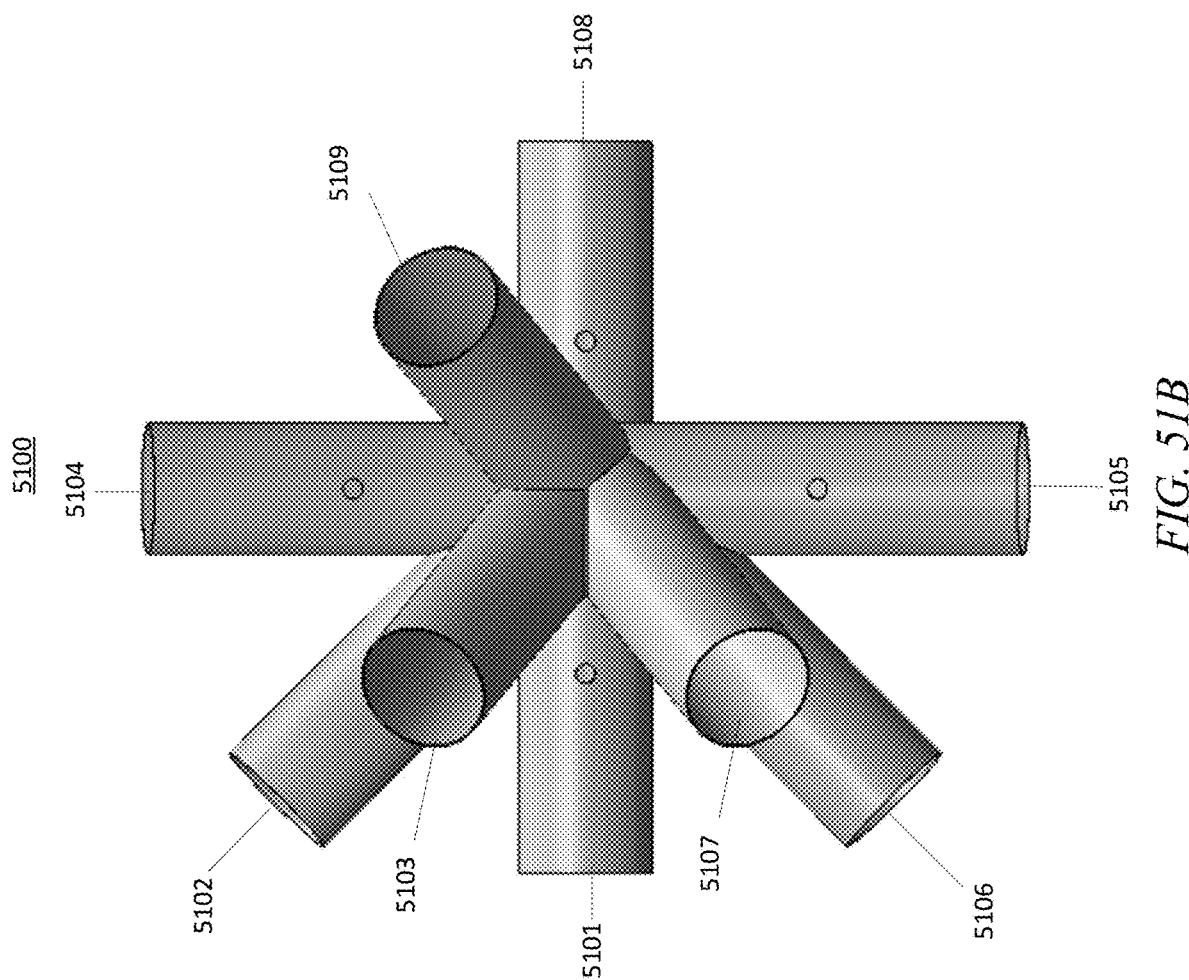

FIGS. 51A and 51B illustrate different perspectives of an example of mainframe base joint 5100. In particular embodiments, mainframe base joint 5100 includes nine connector slots 5101, 5102, 5103, 5104, 5105, 5106, 5107, 5108, and 5109. The joint 5100 may be used to form the adjoining corners of intersecting mainframe pyramid structure 3750b, mainframe pyramid structure 3750c, and a gangway pyramid structure (not shown) on the opposite side gangway pyramid structure 3943. Using FIG. 39B as an example, slots 5101, 5104, 5102, and 5103 of joint 5100 may be used to form the corner of intersecting mainframe pyramid structure 3750b. In particular, connector slot 5101 may connect to gangway-to-mainframe base joint 4500; slot 5102 may connect, via a diagonal connector, to mainframe-gangway-base-geodesic joint 4600; slot 5104 may connect to mainframe base joint 5200, and slot 5103 may connect to joint 4900. In a similar manner, slots 5101, 5106, 5105, and 5107 of joint 5100 may be used to form the adjoining corner of mainframe pyramid structure 3750c. In particular, connector slot 5101 may connect to gangway-to-mainframe base joint 4500; slot 5107 may connect to mainframe apex joint 4005b; slot 5105 may connect to base joint 5300; and slot 5106 may connect, via a diagonal connector, to mainframe-to-geodesic joint 5000. In addition, slot 5108 may be used to form a side of the adjacent gangway pyramid structure (not shown) and slot 5109 may be used to connect to the apex joint of that gangway pyramid structure.

Figure 52A:
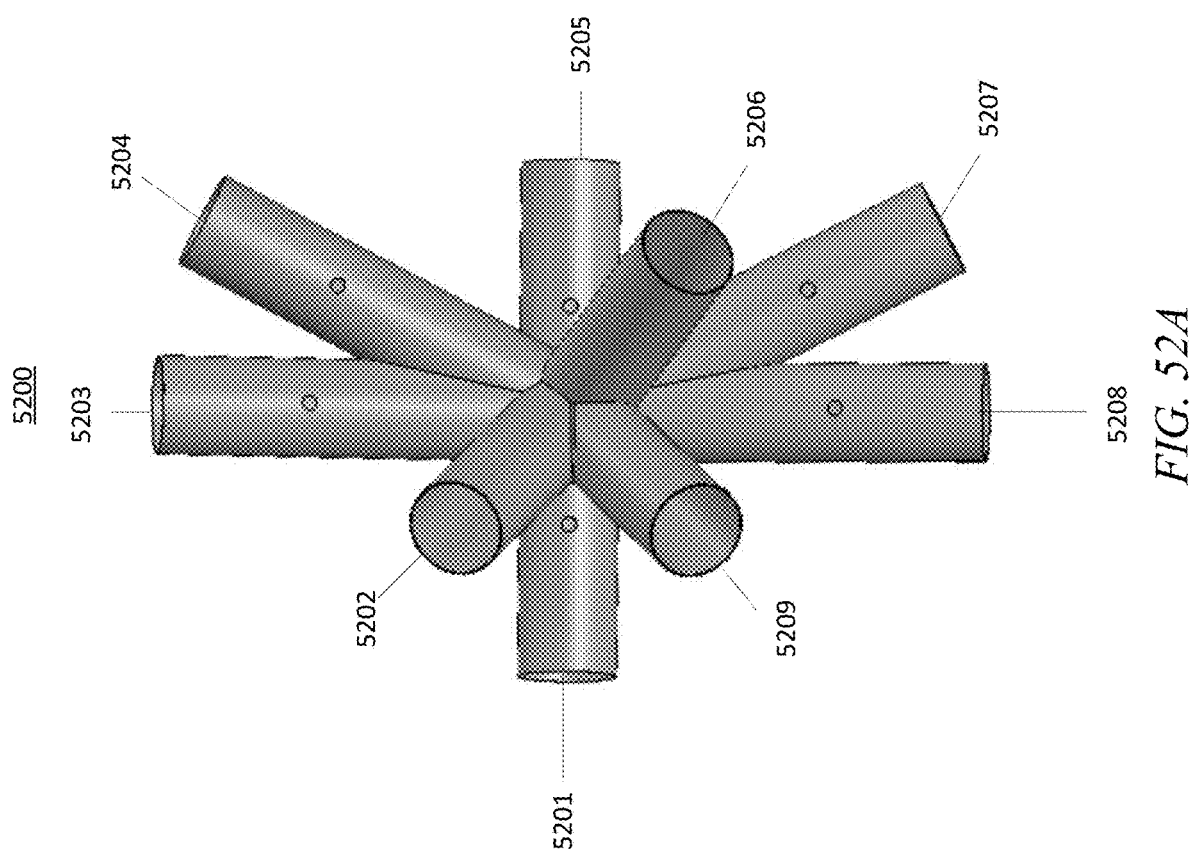
FIGS. 52A-52B illustrate different perspectives of an embodiment of a mainframe-to-geodesic base joint.
Figure 52B:
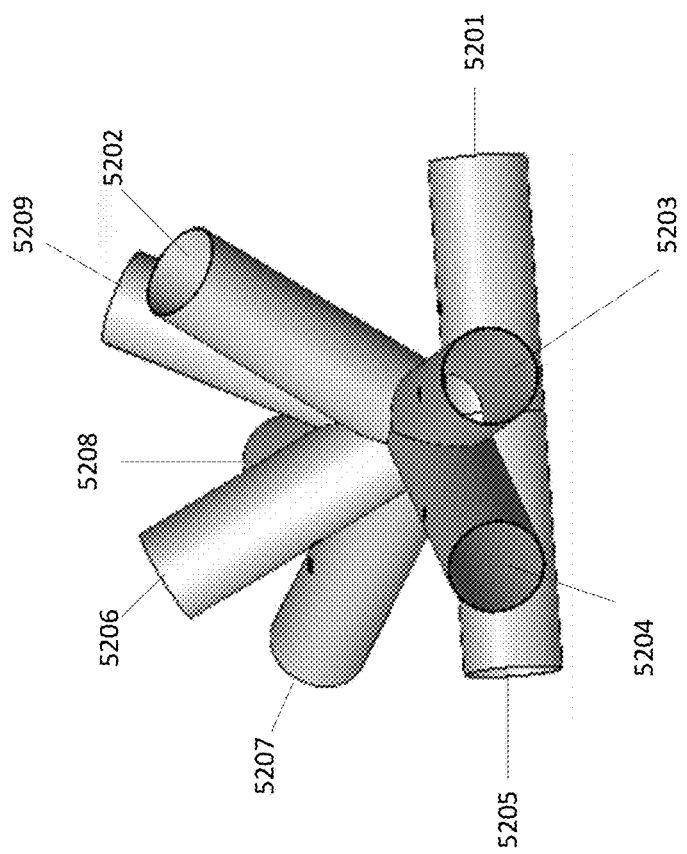

FIGS. 52A and 52B illustrate different perspectives of an example of mainframe base joint 5200. In particular embodiments, mainframe base joint 5200 includes nine connector slots 5201, 5202, 5203, 5204, 5205, 5206, 5207,

5208, and 5209. The joint 5200 may be used to form the adjoining corners of intersecting mainframe pyramid structure 3750*b*, mainframe pyramid structure 3750*a*, a gangway pyramid structure (not shown) on the opposite side gangway pyramid structure 3943, and an adjoining geodesic structure (not shown). Using FIG. 39B as an example, slots 5201, 5208, and 5209 of joint 5200 may be used to form the corner of intersecting mainframe pyramid structure 3750*b*. In particular, connector slot 5201 may connect to mainframe-gangway-base-geodesic joint 4600; slot 5209 may connect to mainframe apex joint 4900; and slot 5208 may connect to base joint 5100. Similarly, slots 5201, 5202, and 5203 may be used to form the corner of mainframe pyramid structure 3750*a*. In particular, connector slot 5201 may connect to mainframe-gangway-base-geodesic joint 4600; slot 5202 may connect to mainframe apex joint 4005*a*; and slot 5208 may connect to base joint 4100 (not shown in FIG. 39B but shown in FIG. 38). Slots 5205, 5206, and 5207 may be used to form the corner of a gangway pyramid structure that is not shown in FIG. 39B but would be on the opposite side of the intersecting mainframe pyramid structure 3750*b* relative to gangway pyramid structure 3943. In particular, connector slot 5205 may be connected to a base joint of that pyramid structure to form a side of the gangway; slot 5206 may be connected to the apex joint of that pyramid structure, and slot 5207 may be connected to a 6-way geodesic joint on the other side of the gangway, similar to joint 4400*b*. Slot 5204 may be connected to a 6-way geodesic joint 4400 (not shown) of an adjacent geodesic structure.

Figure 53A:
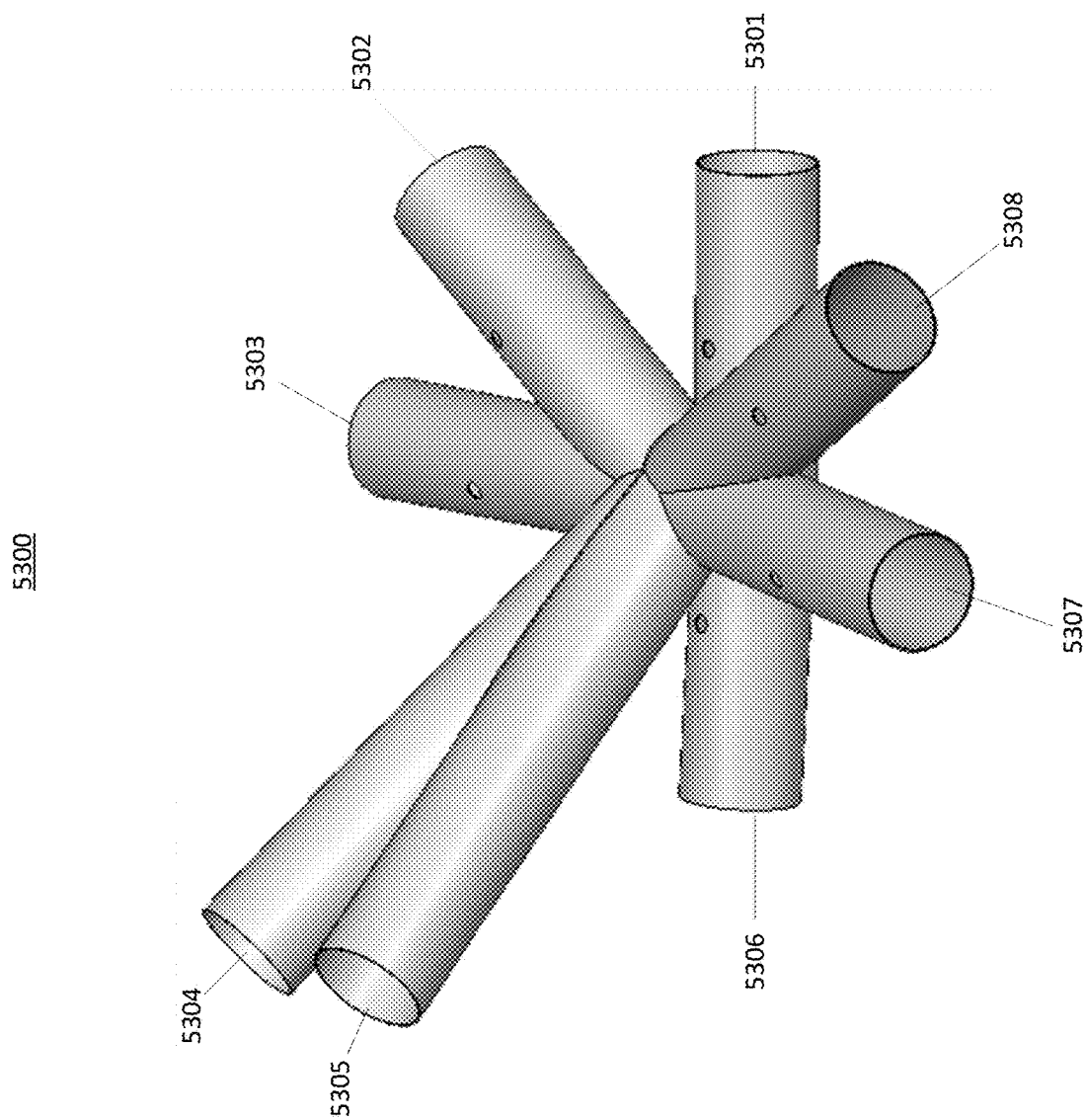
FIGS. 53A-53B illustrate different perspectives of an embodiment of a mainframe-to-geodesic base joint with eight connector slots.
Figure 53B:
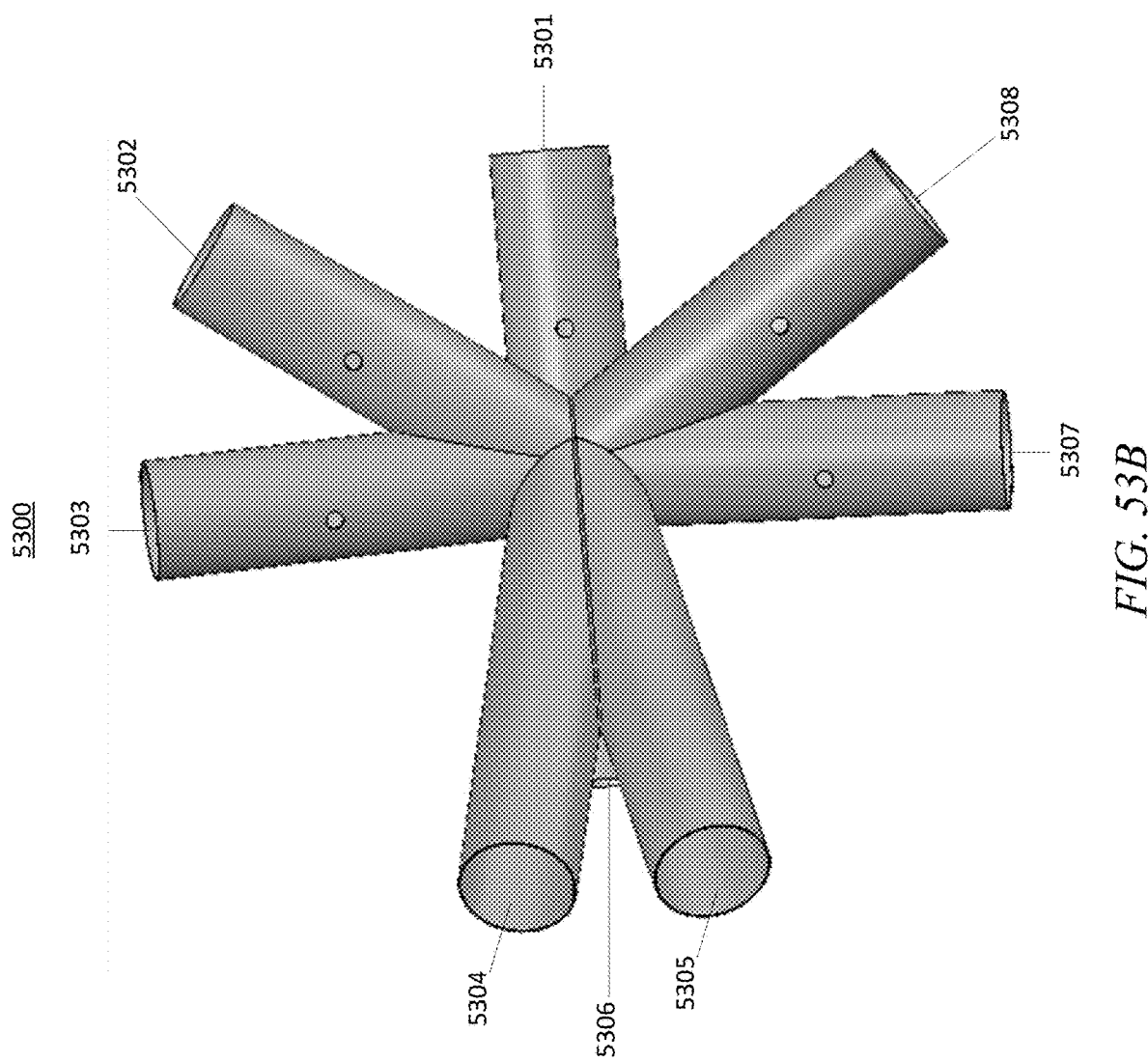

FIGS. 53A and 53B illustrate different perspectives of an example of mainframe base joint 5300. In particular embodiments, mainframe base joint 5300 includes eight connector slots 5301, 5302, 5303, 5304, 5305, 5306, 5307, and 5308. The joint 5300 may be used to form a corner of mainframe pyramid structures 3750*c* and another adjoining mainframe pyramid structure that is partially shown in FIG. 39B. Using FIG. 39B as an example, slots 5303, 5304, and 5306 of joint 5300 may be used to form the corner of intersecting mainframe pyramid structure 3750*c*. In particular, connector slot 5303 may connect to joint 5100; slot 5304 may connect to mainframe apex joint 4005*b*; and slot 5306 may connect to base joint 5000. Similarly, slots 5307, 5305, and 5306 may be used to form the corner of the adjoining, partially shown mainframe pyramid structure. In particular, slots 5306 and 5307 may be used to form the corner of the base of that pyramid structure and slot 5305 may be used to connect to the apex of that pyramid structure. In addition, joint 5300 may be used to connect to the adjoining geodesic structure (not shown in FIG. 39B). In particular, slot 5301 may connect to a 6-way geodesic joint 4400 on the same row using a longitudinal connector; slot 5308 may connect to a 6-way geodesic joint 4400 on another row of a geodesic structure; and slots 5302 may connect to a 6-way geodesic joint 4400 that is part of the base of a gangway pyramid structure.

Particular embodiments described herein referred to as the "Rollercoaster" provide a safer, faster assembly structure and methodology for manufacturing airships. Traditionally, airships are kept stationary while being built, which means that builders must climb to great heights to build airships. Embodiments of the Rollercoaster structure allow an airship (or partially completed portions of it) to be rotated while being built so that builders may stay grounded, thereby improving safety and speed. In particular embodiments, each mainframe of the airship may be manufactured on the ground by rotating the mainframe to bring the portions being worked on to an elevation suitable for builders on the ground. Longitudinal support between mainframes may then be added to connect adjacent mainframes.

Figure 54:
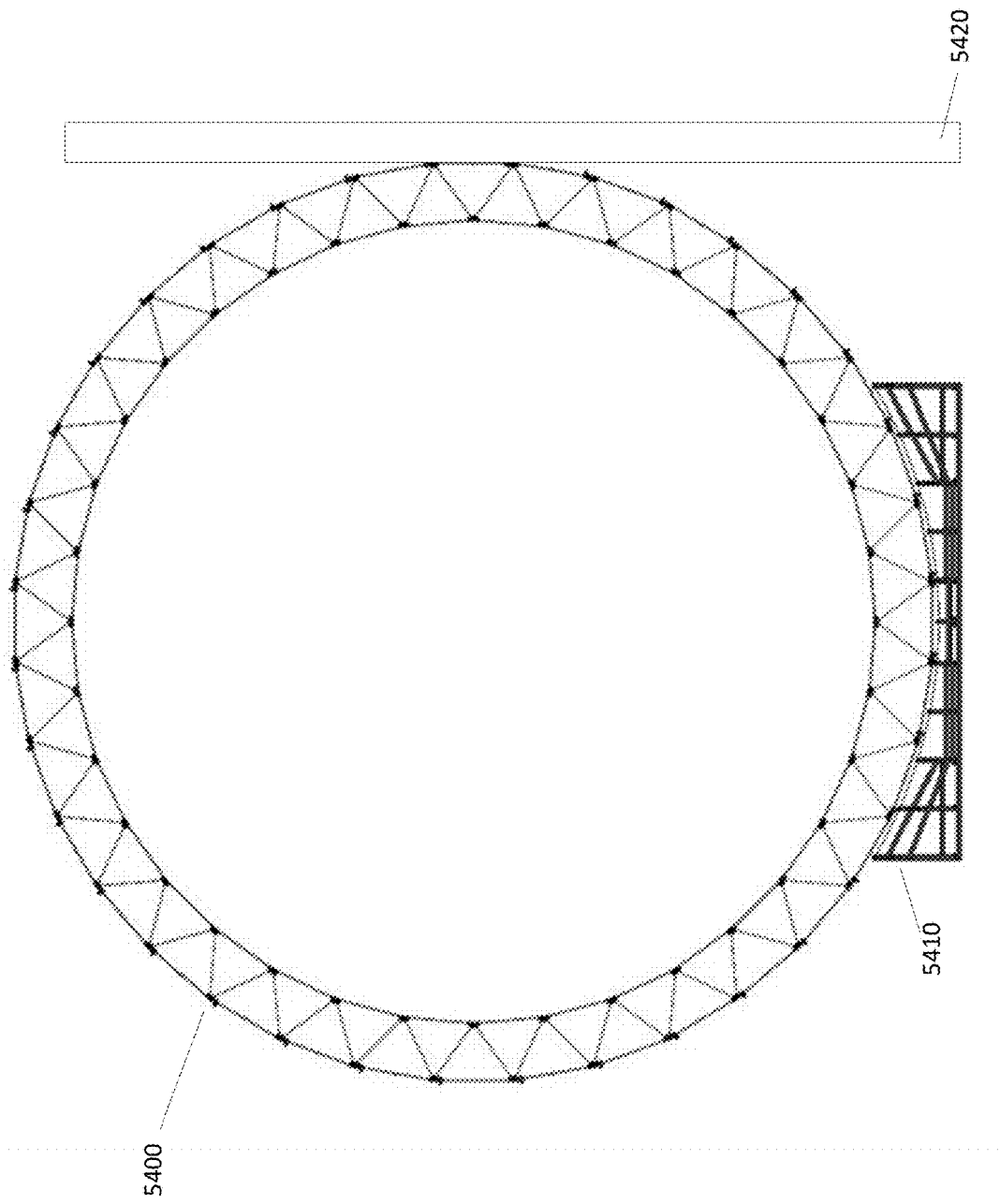
FIG. 54 illustrates an embodiment of a mainframe assembled on a Rollercoaster jig.

FIG. 54 illustrates an example of a mainframe assembled on a Rollercoaster jig, where a mainframe 5400 is set on top of a jig 5410. It should be appreciated that a partially completed mainframe may also be set on the jig 5410 while it is being built. In particular embodiments, the Rollercoaster may also comprise a tower 5420 to prevent the mainframe 5400 from falling sideways off the jig 5410.

Figure 55A:
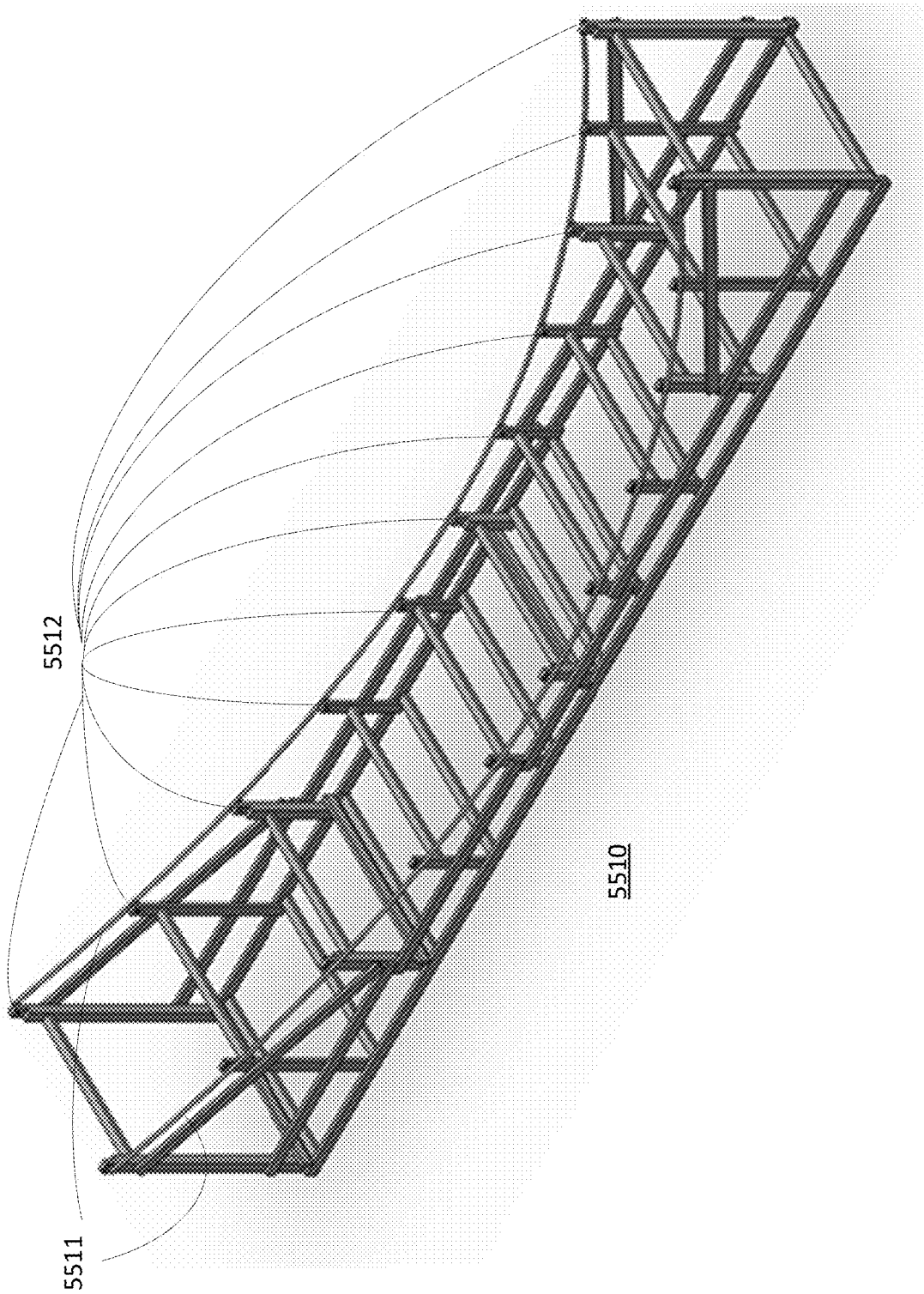
FIGS. 55A-55B illustrate embodiments of a Rollercoaster jig.
Figure 55B:
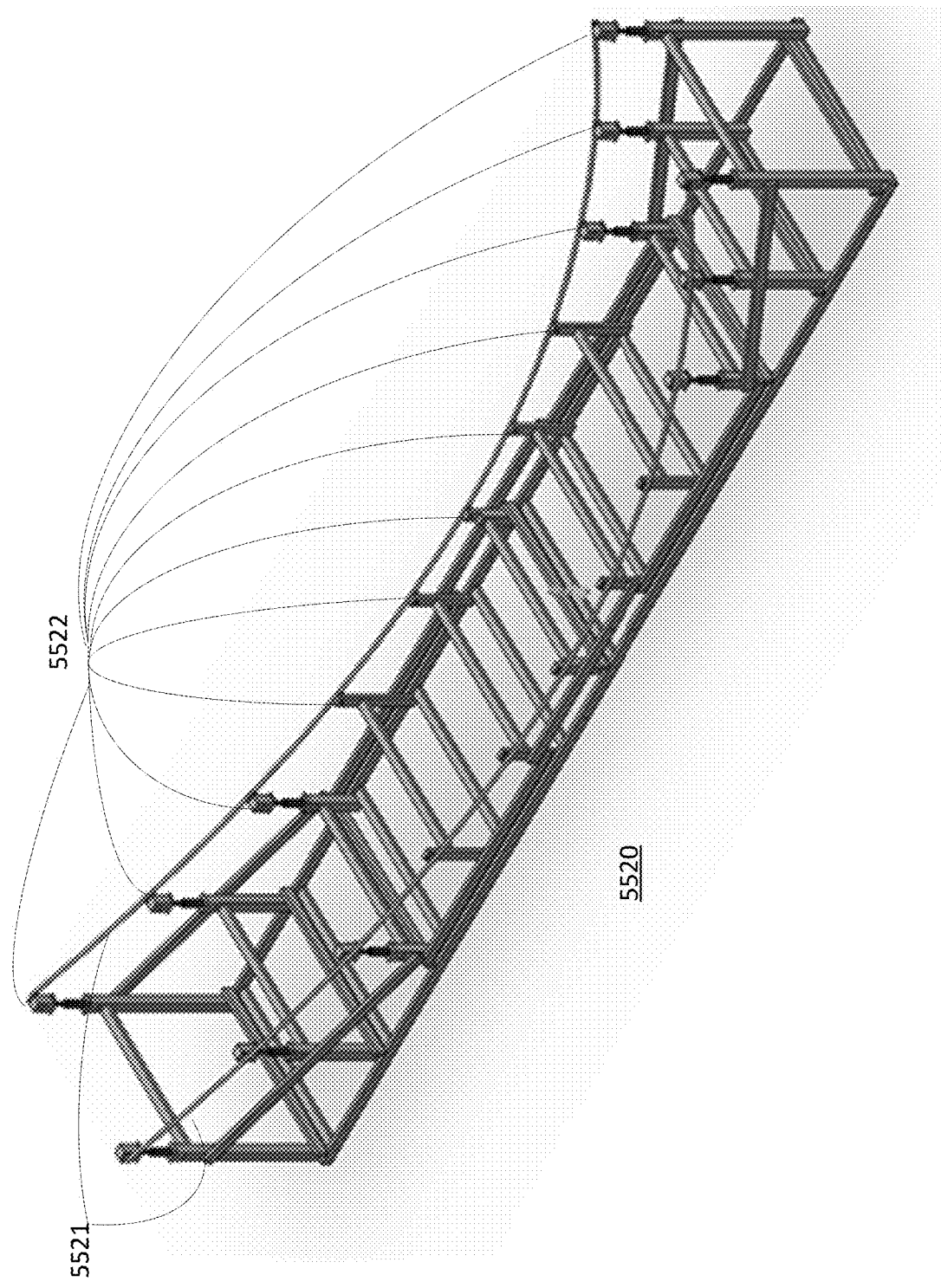

FIGS. 55A-55B illustrate embodiments of a Rollercoaster jig. In the embodiment shown in FIG. 55A, a jig 5510 may have a pair of rails 5511 running parallel to one another. The distance between the rails 5511 may depend on the width of the mainframe which the Rollercoaster is designed to support. For example, the distance between the rails 5511 may be configured to substantially match the width of the mainframe. The rails 5511 may form an arc, which may conform to the curvature of the mainframe. The length of the rails 5511 (or the arc) may be any suitable length to provide adequate support for the mainframe. In the embodiment shown in FIG. 55A, the rails 5511 may be affixed to stationary supporting structures 5512 (e.g., with fixed heights). In the embodiment shown in FIG. 55B, the rails 5521 may be affixed to adjustable supporting structures 5522 (e.g., individually adjustable with respect to height), which may be used to adjust the height and/or curvature of the Rollercoaster's rails 5521.

Figure 56:
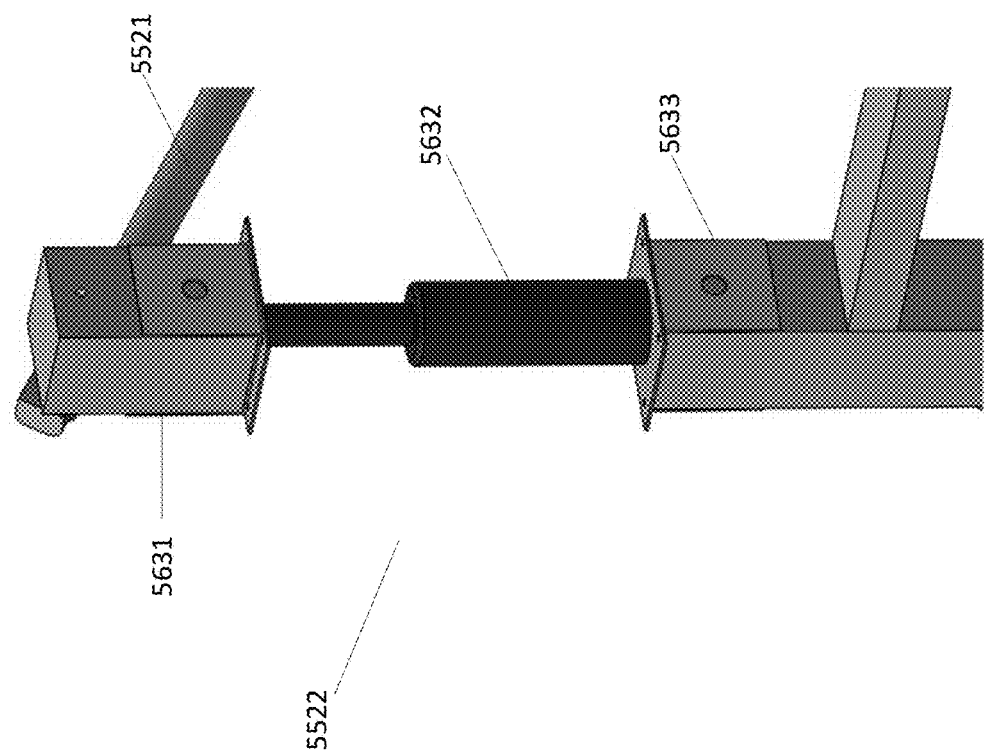
FIG. 56 illustrates an embodiment of an adjustable supporting structure for the Rollercoaster jig.

FIG. 56 illustrates a close-up view of one of the adjustable supporting structures 5522. Each of the rails 5521 may be attached to an attachment block 5631. The attachment block 5631 may be affixed to an adjustable platform 5632, which in turn may be affixed to the body of the jig 5633.

Figure 57A:
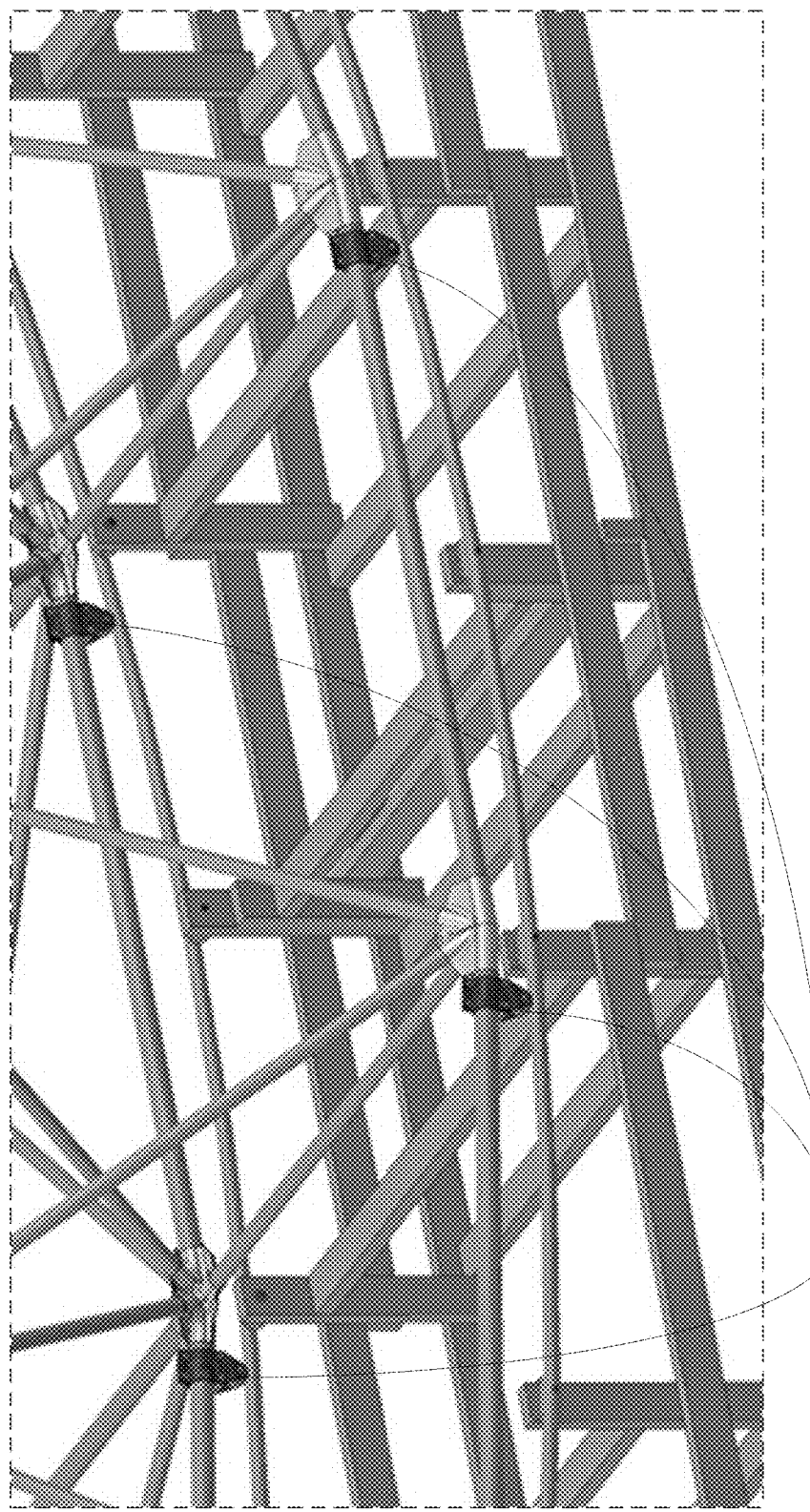
FIGS. 57A-57B illustrate an embodiment of detachable wheels for a mainframe to interface with a Rollercoaster jig.
Figure 57B:
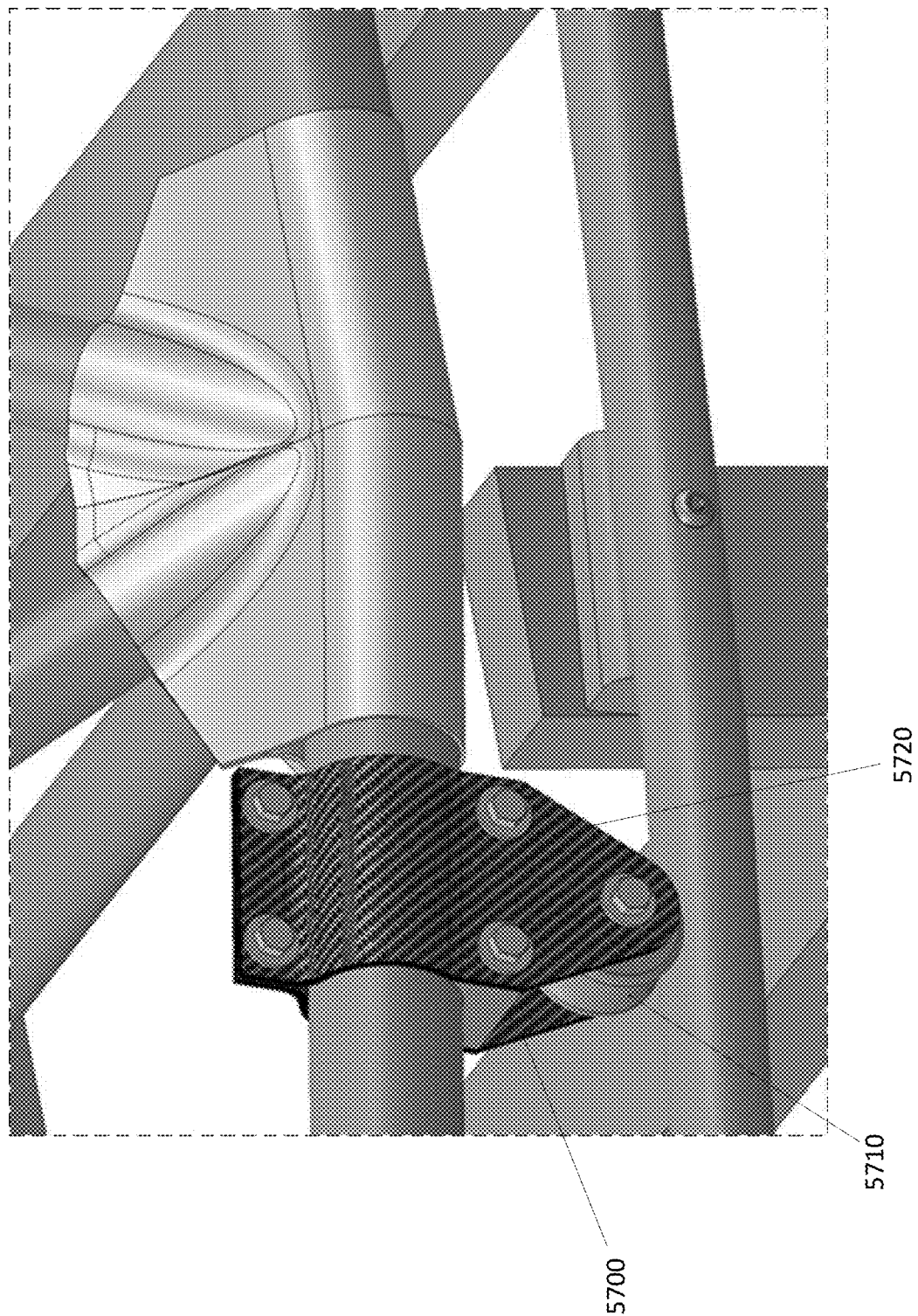

In particular embodiments, the outer surface of a mainframe may have detachable wheels configured to interface the mainframe with the Rollercoaster's rails and allow the mainframe to rotate along its axis. FIGS. 57A-57B illustrate an embodiment of detachable wheels 5700. A detachable wheel 5700 may be affixed at or near each base joint of the mainframe. In particular embodiments, the wheel 5710 may have a concave surface to improve its fit on top of convex rails. In particular embodiments, the wheel may have a concave surface to fit over concave rails (the concavity of the rails may form a channel in which the wheels may be placed). In particular embodiments, the housing 5720 for the wheel 5710 may be manufactured using carbon-fiber twills, similar to those used for the apex and base joints as described above. For example, the housing 5720 may be manufactured using 3D-printed molds. In particular embodiments, screws may be used to affix the housing 5720 to the mainframe and the wheel 5710. In another embodiment, two wheels may be attached to opposite ends of an elongated housing. The top side of the housing may have adjustable clamps that may be clamped to the connectors of a mainframe, such as, for example, any connector forming the base of a pyramid structure. Once the airship is complete, the detachable wheels may be detached from the airship's mainframes.

In particular embodiments, a mainframe may be rotated on a Rollercoaster manually (e.g., by sliding them across the surface of the Rollercoaster or by manually cranking a lever to rotate the mainframe on the Rollercoaster). In other embodiments, a powered drive unit may be used to facilitate the rotation of a mainframe on a Rollercoaster. In particular embodiments, the drive unit may be gas powered, electric powered, or powered by any other form of energy. In particular embodiments, multiple Rollercoasters may be arranged side by side, each with a corresponding mainframe.

The Rollercoasters may be engaged simultaneously to rotate all of the corresponding mainframes. In this way, large sections of airship body, comprising multiple sections of mainframe, may be rotated for assembly. In particular embodiments, a drive unit attached to each of the multiple Rollercoasters may facilitate the rotation. In particular embodiments, the drive units may be synchronized, either mechanically or electronically (e.g., by a central computer) so that each section of mainframe is rotated at the same time and by the appropriate degrees of rotation.

The apparatuses described above may be used to efficiently and cost-effectively build airships. In particular embodiments, each of the aforementioned joints used in the construction of a rigid airship's frame may be manufactured using molds. In particular embodiments, any of the molds described herein may be manufactured as follows. Each component of a mold (e.g., the male, female, or center piece) may be quickly and cost-effectively created using 3D printers. For instance, a digital 3D model defining a mold component may be sent to a 3D printer for printing. Layer by layer, the 3D printer may "print" the mold component based on its digital model. Any sufficiently strong material may be used, including but not limited to: nylon, ABS plastic, metal, resin, etc. In particular embodiments, the mold component may be solid with 3D-printing material. In other embodiments, the mold component may be designed to have a hollow cavity in the middle, with built-in external openings to the cavity. Once the shell of the mold component has been 3D-printed, cement or other suitable types of material may be injected into the cavity through the openings. Advantages of this process include, e.g., strengthening the mold component beyond what can be offered by the 3D-printing material alone, decreasing 3D-printing time (since less mass is printed), and reducing costs associated with 3D printing. Once the cement hardens, the mold component would be ready for use.

In particular embodiments, the mold components may be used to press against joint materials to create joints for the rigid airship. In particular embodiments, carbon-fiber twills may be used, as they have the desirable properties of being strong, lightweight, rigid, and initially pliable. The carbon-fiber twills may be treated with a hardening agent, such as epoxy resin. Thereafter, layers of twills may be placed between mold components. In particular embodiments, to aid subsequent detachment of the pressed carbon-fiber twills from the mold components, a layer of plastic sheet may be placed between the twills and each mold component. The mold components may then be pressed together so that corresponding portions designed to fit together are aligned with each other. A suitable amount of force may be applied to the molds to maintain their pressed configuration and to shape the carbon-fiber twills until they harden. The force may be applied by, e.g., using clamps, weights, or any other suitable means. Once the carbon-fiber twills harden, the mold components may be separated from each other to allow the carbon-fiber twills to be removed. In particular embodiments, the hardened carbon-fiber twills, which are then joint components, may be trimmed to remove undesirable or unneeded portions.

The joint components may then be used to construct the frame of a rigid airship. In particular embodiments, components of a joint may be affixed to each other to form the desired joint. For example, the male and female halves of the mainframe's apex joint may be assembled as shown in FIG. 5A. In particular embodiments, the joint components may be affixed by using bolts, adhesives or any other suitable bonding agent. Any such fastening means may be applied to surfaces where the joint components abut each other. FIG. 5A, for example, shows that aside from portions where the slots are formed, other portions of the male and female halves are substantially in contact. Liquid adhesives, for example, may be applied to such surfaces to bind the components together to form the joint. In particular embodiments, the joints may be permanently formed in such manner first, and thereafter connectors may be inserted into the slots. In other embodiments, connectors may be positioned before a joint is permanently assembled. For instance, connectors may be positioned with just the male half of a joint, and thereafter the female half may be assembled into place. In effect, the male and female halves may be used to clasp the connectors while they are positioned in the designated slots.

In particular embodiments, the connectors may be affixed to the joint using liquid adhesives. For example, adhesives may be applied to the interior surfaces of the slots and/or the ends of the connectors that would be inserted into the slots. In particular embodiments, the binding surfaces of the slots and the connectors may be pre-treated with adhesives before the connectors are placed into the slots. In particular embodiments, the connectors may first be inserted into a joint, and then adhesives may be injected into the space between the abutting surfaces. In such case, holes may be drilled into each slot before a connector is inserted. For example, for a given slot of a joint, the corresponding portion in the male half may have a hole and the corresponding portion in the female half may similarly have a hole. After a connector has been inserted into the slot, liquid adhesive may be injected into the slot through one of the holes, thereby bonding the interior surface of the slot with the inserted end of the connector. Air bubbles and excess adhesive may flow out of the other hole during the injection process. While the adhesive is drying, clasps, zip-ties, rubber bands, or any other type of constraining devices may be used to hold the connectors and slots in place. In particular embodiments, to confine the injected liquid adhesive to a limited region within a slot, and/or to ensure that a sufficient amount of adhesive is between an inserted connector and the interior of the slot, a region within the slot surrounding the holes may be compartmentalized to prevent injected adhesive from seeping beyond the region. For instance, two O-rings or similar devices may be attached to the end of a connector or to the interior surface of a slot. The two O-rings may be spaced apart so that, once the connector is inserted, the O-rings would define a region surrounding the holes in the slot through which adhesive is injected. The O-rings serve as barriers that prevent the injected adhesive from extending beyond the defined region.

In particular embodiments, a mainframe may be assembled using the aforementioned joints and connectors (e.g., either the carbon fiber or metal embodiments). In particular embodiments, the mainframe may be built on top of the Rollercoaster jig. For example, after a pyramid structure of a mainframe has been constructed, detachable wheels may be attached to the corners of the pyramid's base. The pyramid structure may then be placed onto the Rollercoaster jig, with the wheels aligned with the rails of the jig. Additional pyramid structures may be similarly built and connected to one another on the jig. Engineers may rotate the partially-assembled mainframe on the Rollercoaster jig as needed so that segments that are to be worked on would remain accessible to the engineers on the ground. This not only provides a much safer working environment (since the Engineers would not have to climb to great heights), but also improves efficiency.

In particular embodiments, assembled mainframes may be placed in parallel to each other so that a hull segment may be built between them. In particular embodiments, two mainframes may both be placed on Rollercoaster jigs and rotated so that corresponding pyramid structures of the two mainframes are aligned. In particular embodiments, extension joints, such as those described with reference to FIGS. 20-36, may be attached to the mainframes' joints. Using those extension joints, gangways (e.g., four evenly-spaced gangways, such as those shown in FIG. 1) may be built to connect the mainframes. If metal joints are used instead (e.g., FIGS. 37-53), the slots used for connecting a mainframe to the gangways and geodesic structures are integrated with the joints without the need for extension joints. In particular embodiments, the remaining portions between each pair of mainframes may be constructed using geodesic structures, described herein. In particular embodiments, the geodesic structures may comprise longitudinal connectors that connect each base joint of one mainframe to a corresponding base joint of the other mainframe. To add additional structural support, the geodesic structures may further comprise crossing diagonals, thereby forming the aforementioned "X" patterns or 6-way geodesic patterns. In this manner, a hull segment of the airship may be built. Additional hull segments may be similarly built and connected to one another to form the frame of a rigid airship.

What is claimed is:

1. An airship structure, comprising:
 a plurality of mainframes, wherein each of the plurality of mainframes comprises a plurality of interconnected pyramid structures, the plurality of interconnected pyramid structures comprising a first pyramid structure and a second pyramid structure, the first pyramid structure being adjacent to the second pyramid structure, wherein the first pyramid structure of the plurality of interconnected pyramid structures comprises:
  an apex joint having slots configured for receiving connectors, wherein the slots of the apex joint comprise four apex-to-base slots;
  four base joints, each having slots configured for receiving connectors, wherein the slots of each of the base joints comprise a base-to-apex slot and two base-to-base slots, wherein a first base joint and a second base joint of the four base joints of the first pyramid structure are base joints of the adjacent second pyramid structure, wherein the first base joint further comprises an additional slot configured to be connected to a geodesic joint of a geodesic structure;
  a plurality of first connectors, wherein each of the first connectors connects the apex joint to one of the four base joints using one of the apex-to-base slots of the apex joint and the base-to-apex slot of that base joint; and
  a plurality of second connectors, wherein each of the second connectors connects two of the four base joints using one of the base-to-base slots of each of the two base joints connected by that second connector.

2. The airship structure of claim 1,
 wherein the plurality of interconnected pyramid structures of each of the plurality of mainframes are connected in a loop;
 wherein apex joints of the interconnected pyramid structures are interconnected by a plurality of third connectors; and
 wherein the plurality of third connectors define a polygon.

3. The airship structure of claim 1, further comprising:
 at least one gangway connecting a first mainframe and a second mainframe of the plurality of mainframes, wherein the gangway comprises a plurality of interconnected gangway pyramid structures, wherein bases of the gangway pyramid structures are substantially in the same plane.

4. The airship structure of claim 1, wherein the apex joint and the four base joints are made of metal.

5. The airship structure of claim 1, wherein one of the plurality of second connectors connecting the first base joint and the second base joint forms a side that is shared by a first base of the first pyramid structure and a second base of the second pyramid structure.

6. The airship structure of claim 1, wherein the slots of the apex joint further comprise:
 a first apex-to-apex slot configured to be connected to an apex joint of an adjacent second pyramid structure; and
 a second apex-to-apex slot configured to be connected to an apex joint of an adjacent third pyramid structure, wherein the second pyramid structure and the third pyramid structure are on opposite sides of the first pyramid structure.

7. The airship structure of claim 1, wherein the slots of the first base joint further comprise:
 a second base-to-apex slot configured to be connected to an apex joint of the second pyramid structure; and
 a third base-to-base slot configured to be connected to a third base joint of the second pyramid structure.

8. The airship structure of claim 7, wherein the slots of the first base joint further comprise:
 a fourth base-to-base slot configured to be connected, by a diagonal connector, to a fourth base joint of the second pyramid structure.

9. The airship structure of claim 1, further comprising:
 at least one gangway connecting a first mainframe and a second mainframe of the plurality of mainframes, wherein the gangway comprises a plurality of interconnected second pyramid structures, wherein one of the second pyramid structures is adjacent to the first pyramid structure, wherein the first pyramid structure is one of the plurality of interconnected pyramid structures of the first mainframe.

10. The airship structure of claim 9, wherein a shared base joint is used to form a corner of the first pyramid structure and a corner of the second pyramid structure, wherein the shared base joint is one of the four base joints of the first pyramid structure.

11. The airship structure of claim 1, wherein the apex joint and the four base joints are made of carbon fiber.

12. The airship structure of claim 11, wherein the apex joint comprises a male half and a female half, wherein the slots of the apex joint are formed by contours of the male half and the female half.

13. The airship structure of claim 12, wherein each of the apex-to-base slots of the apex joint is formed by interior concave surfaces of the male half and the female half.

14. The airship structure of claim 12, wherein the male half and the female half are each constructed by pressing carbon-fiber twills between molds.

15. The airship structure of claim 14, wherein the molds are constructed using 3D printing.

16. An airship structure, comprising:
 a plurality of mainframes, wherein each of the plurality of mainframes comprises a plurality of interconnected pyramid structures, the plurality of interconnected pyramid structures comprising a first pyramid structure and a second pyramid structure, the first pyramid structure being adjacent to the second pyramid structure, wherein the first pyramid structure of the plurality of interconnected pyramid structures comprises:
an apex joint having slots configured for receiving connectors, wherein the slots of the apex joint comprise four apex-to-base slots;
four base joints, each having slots configured for receiving connectors, wherein the slots of each of the base joints comprise a base-to-apex slot and two base-to-base slots, wherein a first base joint and a second base joint of the four base joints of the first pyramid structure are base joints of the adjacent second pyramid structure, wherein the first base joint further comprises three additional slots configured to be connected, respectively, to three geodesic joints of a geodesic structure;
a plurality of first connectors, wherein each of the first connectors connects the apex joint to one of the four base joints using one of the apex-to-base slots of the apex joint and the base-to-apex slot of that base joint; and
a plurality of second connectors, wherein each of the second connectors connects two of the four base joints using one of the base-to-base slots of each of the two base joints connected by that second connector.

17. The airship structure of claim 16, wherein the three geodesic joints are 4-way geodesic joints.

18. The airship structure of claim 16, wherein the three geodesic joints are 6-way geodesic joints.

19. The airship structure of claim 18, wherein one of the three geodesic joints is used to form a base of a third pyramid structure of a gangway.

20. An airship structure, comprising:
a plurality of mainframes, wherein each of the plurality of mainframes comprises a plurality of interconnected pyramid structures, wherein a first pyramid structure of the plurality of interconnected pyramid structures comprises:
an apex joint having slots configured for receiving connectors, wherein the slots of the apex joint comprise:
four apex-to-base slots;
a first apex-to-apex slot configured to be connected to an apex joint of an adjacent second pyramid structure;
a second apex-to-apex slot configured to be connected to an apex joint of an adjacent third pyramid structure, wherein the second pyramid structure and the third pyramid structure are on opposite sides of the first pyramid structure; and
a third apex-to-apex slot configured to be connected to an apex joint of an adjacent fourth pyramid structure;
four base joints, each having slots configured for receiving connectors, wherein the slots of each of the base joints comprise a base-to-apex slot and two base-to-base slots;
a plurality of first connectors, wherein each of the first connectors connects the apex joint to one of the four base joints using one of the apex-to-base slots of the apex joint and the base-to-apex slot of that base joint; and
a plurality of second connectors, wherein each of the second connectors connects two of the four base joints using one of the base-to-base slots of each of the two base joints connected by that second connector.

21. The airship structure of claim 20, wherein the fourth pyramid structure is part of a gangway.

22. An airship structure, comprising:
a plurality of mainframes, wherein each of the plurality of mainframes comprises a plurality of interconnected pyramid structures, wherein a first pyramid structure of the plurality of interconnected pyramid structures comprises:
an apex joint having slots configured for receiving connectors, wherein the slots of the apex joint comprise four apex-to-base slots;
four base joints, each having slots configured for receiving connectors, wherein the slots of each of the base joints comprise a base-to-apex slot and two base-to-base slots;
a plurality of first connectors, wherein each of the first connectors connects the apex joint to one of the four base joints using one of the apex-to-base slots of the apex joint and the base-to-apex slot of that base joint; and
a plurality of second connectors, wherein each of the second connectors connects two of the four base joints using one of the base-to-base slots of each of the two base joints connected by that second connector; and
at least one gangway connecting a first mainframe and a second mainframe of the plurality of mainframes, the gangway comprising a plurality of interconnected gangway pyramid structures, wherein a gangway pyramid structure of the plurality of interconnected gangway pyramid structures is adjacent to the first pyramid structure of the plurality of interconnected pyramid structures of the first mainframe, wherein a shared base joint is used to form a corner of the first pyramid structure, a corner of the gangway pyramid structure, and a corner of a third pyramid structure of the plurality of interconnected pyramid structures of the first mainframe, the shared base joint being one of the four base joints of the first pyramid structure, the third pyramid structure and the first pyramid structure being adjacent pyramid structures of the first mainframe.

23. The airship structure of claim 22, wherein the shared base joint comprises:
a second base-to-apex slot configured to be connected to an apex joint of the gangway pyramid structure;
a third base-to-apex slot configured to be connected to an apex joint of the third pyramid structure;
a third base-to-base slot configured to be connected to a first base joint of the gangway pyramid structure; and
a fourth base-to-base slot configured to be connected to a first base joint of the third pyramid structure.

24. The airship structure of claim 23, wherein the shared base joint comprises:
an additional slot configured to be connected to a geodesic joint of a geodesic structure.

25. The airship structure of claim 23, wherein the shared base joint comprises:
an additional slot configured to be connected to a geodesic joint that is used to form a base of the gangway pyramid structure.

26. The airship structure of claim 25, wherein the geodesic joint forms the base of the gangway pyramid structure by being connected to each of four base joints of the gangway pyramid structure, wherein the four base joints of the gangway pyramid structure comprise the shared base joint and the first base joint of the gangway pyramid structure.

27. The airship structure of claim 23, wherein the shared base joint comprises:
   a fifth base-to-base slot configured to be connected, by a diagonal connector, to one of the four base joints of the first pyramid structure, other than the shared base joint.

28. The airship structure of claim 27, wherein the shared base joint comprises:
   a sixth base-to-base slot configured to be connected, by a diagonal connector, to a second base joint of the third pyramid structure.

29. An airship structure, comprising:
   a plurality of mainframes, wherein each of the plurality of mainframes comprises a plurality of interconnected pyramid structures, wherein a first pyramid structure of the plurality of interconnected pyramid structures comprises:
      an apex joint having slots configured for receiving connectors, wherein the slots of the apex joint comprise four apex-to-base slots;
      four base joints, each having slots configured for receiving connectors, wherein the slots of each of the base joints comprise a base-to-apex slot and two base-to-base slots;
      a plurality of first connectors, wherein each of the first connectors connects the apex joint to one of the four base joints using one of the apex-to-base slots of the apex joint and the base-to-apex slot of that base joint; and
      a plurality of second connectors, wherein each of the second connectors connects two of the four base joints using one of the base-to-base slots of each of the two base joints connected by that second connector;
   wherein apex joints of the plurality of interconnected pyramid structures are interconnected by a plurality of third connectors, the plurality of third connectors defining a polygon, wherein each of the apex joints of the plurality of interconnected pyramid structures comprises a pair of apex-to-apex slots configured for receiving two of the plurality of third connectors, wherein the pair of apex-to-apex slots of each of the apex joints of the plurality of interconnected pyramid structures are angled with respect to each other to form an interior vertex of the polygon defined by the plurality of third connectors.

* * * * *